(12) United States Patent
Zang et al.

(10) Patent No.: US 12,534,527 B2
(45) Date of Patent: Jan. 27, 2026

(54) KIR3DL3 IS AN INHIBITORY RECEPTOR OF THE IMMUNE SYSTEM AND USES THEREOF

(71) Applicant: Albert Einstein College of Medicine, Bronx, NY (US)

(72) Inventors: Xingxing Zang, New York, NY (US); Yao Wei, Larchmont, NY (US); Xiaoxin Ren, Bronx, NY (US); Scott Moerdler, New York, NY (US)

(73) Assignee: Albert Einstein College of Medicine, Bronx, NY (US)

( * ) Notice: Subject to any disclaimer, the term of this patent is extended or adjusted under 35 U.S.C. 154(b) by 931 days.

(21) Appl. No.: 17/753,731

(22) PCT Filed: Oct. 1, 2020

(86) PCT No.: PCT/US2020/053857
§ 371 (c)(1),
(2) Date: Mar. 11, 2022

(87) PCT Pub. No.: WO2021/067633
PCT Pub. Date: Apr. 8, 2021

(65) Prior Publication Data
US 2023/0040568 A1    Feb. 9, 2023

Related U.S. Application Data

(60) Provisional application No. 62/911,169, filed on Oct. 4, 2019.

(51) Int. Cl.
*A61P 35/00*    (2006.01)
*A61K 39/395*    (2006.01)
(Continued)

(52) U.S. Cl.
CPC ...... *C07K 16/2803* (2013.01); *A61K 39/3955* (2013.01); *A61K 45/06* (2013.01);
(Continued)

(58) Field of Classification Search
CPC ............ C07K 16/2803; C07K 2317/21; C07K 2317/24; C07K 2319/00; C07K 2317/565;
(Continued)

(56) References Cited

U.S. PATENT DOCUMENTS 4,816,567 A    3/1989    Cabilly et al.
4,868,116 A    9/1989    Morgan et al.
(Continued)

FOREIGN PATENT DOCUMENTS

RU    2682449 C2    3/2019
WO    8902468 A1    3/1989
(Continued)

OTHER PUBLICATIONS

Herold EM, John C, Weber B, et al. Determinants of the assembly and function of antibody variable domains. Sci Rep. 2017;7(1):12276. (Year: 2017).*
(Continued)

*Primary Examiner* — Joanne Hama
*Assistant Examiner* — Hannah Sunshine
(74) *Attorney, Agent, or Firm* — Perkins Coie LLP

(57) ABSTRACT

Described herein are antibodies, immunogenic fragments and compositions thereof targeting the killer-cell immunoglobulin-like receptor protein KIR3DL3, as well as methods of using the same for the treatment of human diseases including cancer. In certain embodiments, the disclosure relates to an antibody or an immunogenic fragment thereof that specifically binds to KIR3DL3 protein, wherein the antibody or the immunogenic fragment thereof specifically
(Continued)

binds to a KIR3DL3 epitope comprising the whole extracellular domain or a portion thereof.

16 Claims, 16 Drawing Sheets

Specification includes a Sequence Listing.

(51) Int. Cl.
*A61K 45/06* (2006.01)
*C07K 16/28* (2006.01)

(52) U.S. Cl.
CPC .......... *A61P 35/00* (2018.01); *C07K 2317/21* (2013.01); *C07K 2317/24* (2013.01); *C07K 2319/00* (2013.01)

(58) Field of Classification Search
CPC ............ C07K 2317/76; C07K 2317/92; A61K 39/3955; A61K 45/06; A61K 2039/585; A61K 2039/505; A61P 35/00; A61P 31/00; A61P 37/00; Y02A 90/10; G16H 15/00
See application file for complete search history.

(56) References Cited

U.S. PATENT DOCUMENTS

| | | | |
|---|---|---|---|
| 4,980,286 | A | 12/1990 | Morgan et al. |
| 5,530,101 | A | 6/1996 | Queen et al. |
| 5,585,089 | A | 12/1996 | Queen et al. |
| 5,693,761 | A | 12/1997 | Queen et al. |
| 5,693,762 | A | 12/1997 | Queen et al. |
| 5,807,715 | A | 9/1998 | Morrison et al. |
| 5,866,692 | A | 2/1999 | Shitara et al. |
| 6,180,370 | B1 | 1/2001 | Queen et al. |
| 6,311,415 | B1 | 11/2001 | Lind |
| 8,907,136 | B2 | 12/2014 | Elowe et al. |
| 9,458,231 | B2* | 10/2016 | Dylla ................ C07K 16/2896 |
| 10,093,737 | B2 | 10/2018 | Zang |
| 11,390,679 | B2* | 7/2022 | Wang ................... G01N 33/577 |
| 2014/0127223 | A1 | 5/2014 | Yamazaki et al. |
| 2016/0272709 | A1 | 9/2016 | Richardson |
| 2017/0081410 | A1 | 3/2017 | Crawley et al. |
| 2018/0072800 | A1 | 3/2018 | Delcros et al. |
| 2018/0155446 | A1 | 6/2018 | Yamazaki et al. |

FOREIGN PATENT DOCUMENTS

| | | | |
|---|---|---|---|
| WO | 8905345 | A1 | 6/1989 |
| WO | 9207573 | A1 | 5/1992 |
| WO | 2015187359 | A1 | 12/2015 |
| WO | 2019/204057 | | 10/2019 |

OTHER PUBLICATIONS

Rabia LA, Desai AA, Jhaj HS, Tessier PM. Understanding and overcoming trade-offs between antibody affinity, specificity, stability and solubility. Biochem Eng J. Sep. 15, 2018;137:365-374. (Year: 2018).*

Trundley et al. "Molecular characterization of KIR3DL3," Immunogenetics, Jan. 4, 2006, vol. 57, pp. 904-916.

International Search Report and Written Opinion for PCT/US2020/053857, dated Mar. 25, 2021, 15 pages.

English translation of First Office Action in Japanese Application No. 2022-520560; Date of Mailing: Aug. 27, 2024; 4 pages.

Examination Report for Canadian Application No. 3,153,638; Date of Mailing Mar. 6, 2024; 4 pages.

Extended European Search Report for European Application No. 20872204.1; Date of Mailing: Sep. 29, 2023; 11 pages.

Office Action in Russian Application No. 2022111588; Date of Mailing: Mar. 18, 2024; 13 pages (English translation).

English translation of Office Action in Chinese Application No. 202080085653.8; Date of Mailing: Feb. 22, 2025; 8 pages.

Written Opinion and Search Report for Singapore Application No. 11202203389X; Date of Mailing: Jul. 23, 2025; 12 pages.

R&D Systems: "Recombinant Monoclonal Rabbit IgG Clone # 1136B Catalog No. FAB8919R, anti-human KIR3DL3 antibody," Feb. 6, 2018; 1 page.

* cited by examiner

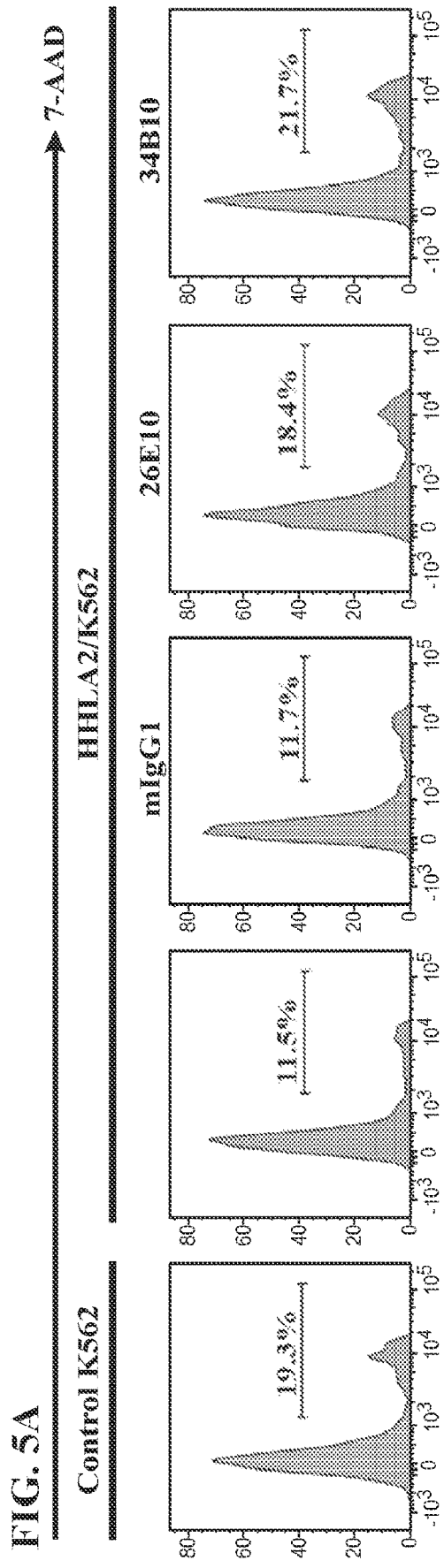
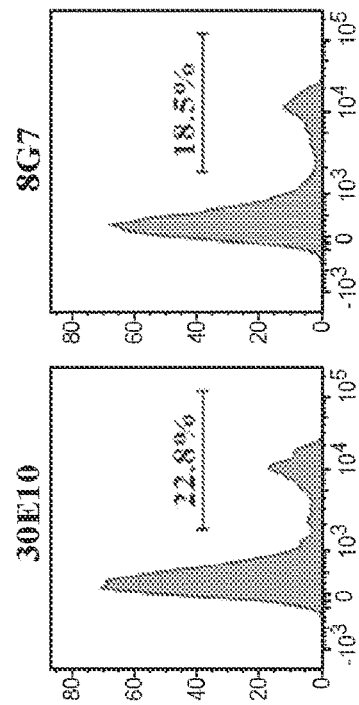
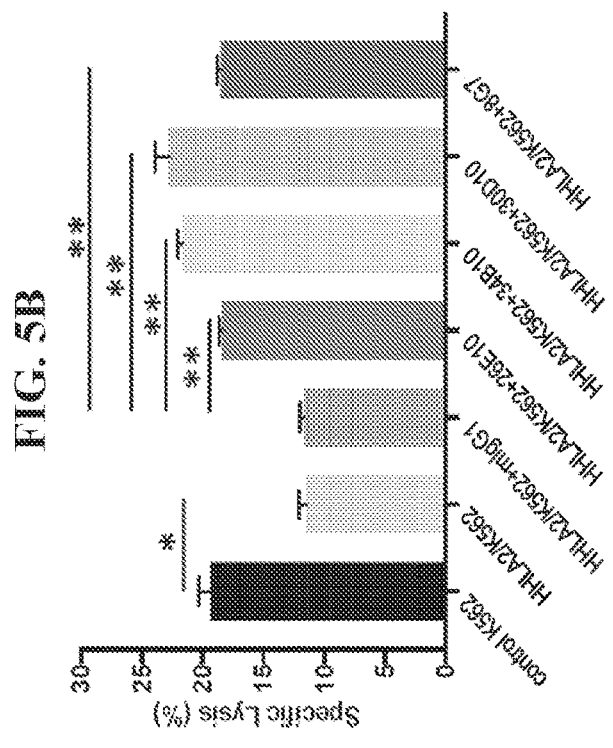
FIG. 5A
FIG. 5B

Percent of Expression Potential

| Homo sapiens (1425) | KIR3DL3 | samples | avg. expr. |
|---|---|---|---|
| DERL-2 | | 1 | 15.82 |
| My-La CD4+ | | 2 | 14.77 |
| HuT 78 | | 5 | 14.72 |
| DEL | | 1 | 14.56 |
| SR-786 | | 1 | 14.39 |
| IMC-1 | | 1 | 13.43 |
| DU4475 | | 3 | 13.30 |
| CCRF-CEM C7H2 | | 12 | 13.14 |
| NK-92 | | 1 | 12.97 |
| SNK-1 | | 1 | 12.97 |
| SR | | 7 | 12.29 |
| NCI-H1734 | | 2 | 12.14 |
| CCRF-CEM | | 23 | 12.10 |
| HANK1 | | 1 | 11.99 |
| Ki-JK | | 8 | 11.71 |
| CML-T1 | | 4 | 11.38 |
| OVCAR-8 RIIB | | 3 | 11.37 |
| KHYG-1 | | 1 | 11.30 |
| CRO-AP2 | | 3 | 11.28 |
| NK-YS | | 1 | 11.25 |
| SU-DHL-1 | | 9 | 11.25 |
| OVCAR-8 RIA | | 3 | 11.23 |
| Sez-4 | | 12 | 11.15 |
| CEM/C1 | | 3 | 11.06 |
| SNT-8 | | 1 | 11.05 |
| Tanoue | | 3 | 10.93 |
| Jurkat | | 25 | 10.88 |
| LCL (Xq12-q13.3 duplication) | | 2 | 10.86 |
| Jiyoye | | 3 | 10.85 |
| TOV-21G-con | | 2 | 10.79 |
| fibroblast (ESC) | | 3 | 10.79 |
| Peer | | 2 | 10.79 |
| P493-6 | | 4 | 10.78 |
| DG-75 | | 3 | 10.77 |
| PLB-985 | | 3 | 10.77 |
| DoTc2 4510 | | 3 | 10.76 |
| 1A2 | | 3 | 10.75 |
| YT | | 1 | 10.72 |
| KAI3 | | 1 | 10.70 |
| MES-SA | | 3 | 10.70 |

KIR3DL3 IS AN INHIBITORY RECEPTOR OF THE IMMUNE SYSTEM AND USES THEREOF

CROSS-REFERENCE TO RELATED APPLICATIONS

This application is a 371 of International Patent Application No. PCT/US2020/053857, filed Oct. 1, 2020, which claims the benefit of U.S. Provisional Patent Application No. 62/911,169 filed on Oct. 4, 2019, the content of which is incorporated by reference in its entirety.

STATEMENT OF GOVERNMENT SUPPORT

The present invention was made with government support under Grant Nos. R01CA175498 and R01DK100525 awarded by the National Institutes of Health. The Government has certain rights in the invention.

SEQUENCE LISTING

This application contains a Sequence Listing, which was submitted in ASCII format via USPTO Patent Center, and is hereby incorporated by reference in its entirety. The ASCII copy, created on Jul. 21, 2024, is named Einstein 129807.8002US01 replacement sequence listing_ST25 and is 162,663 bytes in size.

BACKGROUND

Killer-cell immunoglobulin-like receptor (KIR) proteins include either two (KIR2D) or three (KIR3D) immunoglobulin-like extracellular domains (Beziat 2017). KIR3DL3 is a member of the KIR family, but its functions were previously unknown (Beziat 2017). The present disclosure provides results demonstrating that KIR3DL3 is an inhibitory receptor of the immune system. The present disclosure further provides antibodies and immunogenic fragments thereof against KIR3DL3, or one or more epitopes thereof, and compositions and methods for using the same. According to certain embodiments provided herein, blocking KIR3DL3 function by antibodies or immunogenic fragments thereof, ligand fusion polypeptides, or small molecules can be used to treat cancers and infection, whereas stimulating KIR3DL3 function by antibodies or immunogenic fragments thereof, ligand fusion polypeptide, or small molecules can be used to treat autoimmune diseases and transplant.

Drugs that function to suppress immune response can be used to effectively treat patients having autoimmune diseases or to help prevent transplant rejection. For example, among currently available treatments for rheumatoid arthritis and kidney transplant are Abatacept (Orencia®) and Betacept (Nulojix®), modified antibody fusion polypeptides comprising the extracellular domain of human cytotoxic T-lymphocyte-associated antigen 4 (CTLA-4) linked to the Fc region of IgG1. Conversely, drugs that activate immune responses may be used to effectively treat diseases or disorders including cancers or infectious diseases. For example, ipilimumab (Yervoy®) is a monoclonal antibody that activates immune responses by targeting CTLA-4 and can be used to treat melanoma. Pembrolizumab (Keytruda®) is a humanized antibody against human programmed death receptor-1 (PD-1) and is prescribed as an anti-PD-1 immunotherapy against certain cancers. Nivolumab (Opdivo®) is another anti-PD-1 antibody used as an immunotherapy to treat certain cancers.

SUMMARY

In one aspect, the disclosure relates to an antibody or an immunogenic fragment thereof that specifically binds to KIR3DL3 protein (SEQ ID NO: 335). In certain embodiments, the disclosure relates to an antibody or an immunogenic fragment thereof that specifically binds to KIR3DL3 protein, wherein the antibody or the immunogenic fragment thereof specifically binds to a KIR3DL3 epitope comprising the whole extracellular domain or a portion thereof. In some embodiments, the antibody or the immunogenic fragment thereof binds to the KIR3DL3 D0 domain (SEQ ID NO: 337), the KIR3DL3 D1 domain (SEQ ID NO: 338), or KIR3DL3 D2 domain (SEQ ID NO: 339).

In one aspect, antibodies or immunogenic fragments thereof provided herein comprise a VH region comprising CDR1, CDR2, and CDR3, having an amino acid sequence of SEQ ID NOs: 7, 9, 11, 31, 33, 35, 54, 56, 76, 78, 80, 100, 102, 104, 124, 126, 128, 148, 150, 152, 172, 174, 176, 196, 198, 200, 220, 222, 224, 244, 246, 248, 268, 270, 272, 292, 294, 296, 316, 318, or 320.

In one aspect, antibodies or immunogenic fragments thereof provided herein comprise a VH region comprising at least one CDR that is 80% identical to an amino acid sequence selected from SEQ ID NOs: 7, 9, 11, 31, 33, 35, 54, 56, 76, 78, 80, 100, 102, 104, 124, 126, 128, 148, 150, 152, 172, 174, 176, 196, 198, 200, 220, 222, 224, 244, 246, 248, 268, 270, 272, 292, 294, 296, 316, 318, or 320.

In one aspect, antibodies or immunogenic fragments thereof provided herein comprise a VH region comprising at least two CDRs that are 80% identical to an amino acid sequence selected from SEQ ID NOs: 7, 9, 11, 31, 33, 35, 54, 56, 76, 78, 80, 100, 102, 104, 124, 126, 128, 148, 150, 152, 172, 174, 176, 196, 198, 200, 220, 222, 224, 244, 246, 248, 268, 270, 272, 292, 294, 296, 316, 318, or 320.

In one aspect, antibodies or immunogenic fragments thereof provided herein comprise a VH region comprising at least three CDRs that are 80% identical to an amino acid sequence selected from SEQ ID NOs: 7, 9, 11, 31, 33, 35, 54, 56, 76, 78, 80, 100, 102, 104, 124, 126, 128, 148, 150, 152, 172, 174, 176, 196, 198, 200, 220, 222, 224, 244, 246, 248, 268, 270, 272, 292, 294, 296, 316, 318, or 320.

In one aspect, antibodies or immunogenic fragments thereof provided herein comprise a VL region comprising CDR1, CDR2, and CDR3, having an amino acid sequence of SEQ ID NOs: 19, 21, 23, 43, 45, 47, 64, 66, 68, 88, 90, 92, 112, 114, 116, 136, 138, 140, 160, 162, 164, 184, 186, 188, 208, 210, 212, 232, 234, 236, 256, 258, 260, 280, 282, 284, 304, 306, 308, 328, 330, or 332.

In one aspect, antibodies or immunogenic fragments thereof provided herein comprise a VL region comprising at least one CDR that is 80% identical to an amino acid sequence selected from SEQ ID NOs: 19, 21, 23, 43, 45, 47, 64, 66, 68, 88, 90, 92, 112, 114, 116, 136, 138, 140, 160, 162, 164, 184, 186, 188, 208, 210, 212, 232, 234, 236, 256, 258, 260, 280, 282, 284, 304, 306, 308, 328, 330, or 332.

In one aspect, antibodies or immunogenic fragments thereof provided herein comprise a VL region comprising at least two CDRs that are 80% identical to an amino acid sequence selected from SEQ ID NOs: 19, 21, 23, 43, 45, 47, 64, 66, 68, 88, 90, 92, 112, 114, 116, 136, 138, 140, 160, 162, 164, 184, 186, 188, 208, 210, 212, 232, 234, 236, 256, 258, 260, 280, 282, 284, 304, 306, 308, 328, 330, or 332.

In one aspect, antibodies or immunogenic fragments thereof provided herein comprise a VL region comprising at least three CDRs that are 80% identical to an amino acid sequence selected from SEQ ID NOs: 19, 21, 23, 43, 45, 47, 64, 66, 68, 88, 90, 92, 112, 114, 116, 136, 138, 140, 160, 162, 164, 184, 186, 188, 208, 210, 212, 232, 234, 236, 256, 258, 260, 280, 282, 284, 304, 306, 308, 328, 330, or 332.

In certain aspects, antibodies or immunogenic fragments thereof provided herein comprise a monoclonal antibody.

In certain aspects, antibodies or immunogenic fragments thereof provided herein comprise a chimeric antibody, a human antibody, or a humanized antibody.

In one aspect, antibodies or immunogenic fragments thereof provided herein comprise an amino acid sequence selected from SEQ ID NOs: 7, 9, 11, 19, 21, 23, 31, 33, 35, 43, 45, 47, 54, 56, 64, 66, 68, 76, 78, 80, 88, 90, 92, 100, 102, 104, 112, 114, 116, 124, 126, 128, 136, 138, 140, 148, 150, 152, 160, 162, 164, 172, 174, 176, 184, 186, 188, 196, 198, 200, 208, 210, 212, 220, 222, 224, 232, 234, 236, 244, 246, 248, 256, 258, 260, 268, 270, 272, 280, 282, 284, 292, 294, 296, 304, 306, 308, 316, 318, 320, 328, 330, or 332.

In one aspect, antibodies or immunogenic fragments thereof are provided herein, wherein the antibody is monoclonal 8G7, monoclonal 26E10, monoclonal 26E2, monoclonal 31C4, monoclonal 34B10, monoclonal 37A3, monoclonal 12A10, monoclonal 3B7, monoclonal 11G8, monoclonal 14F8, monoclonal 15D2, monoclonal 29H7, monoclonal 30D10, or monoclonal 51C3.

In one aspect, antibodies or immunogenic fragments thereof are provided herein, wherein the antibody is humanized 8G7, humanized 26E10, humanized 26E2, humanized 31C4, humanized 34B10, humanized 37A3, humanized 12A10, humanized 3B7, humanized 11G8, humanized 14F8, humanized 15D2, humanized 29H7, humanized 30D10, or humanized 51C3.

In another aspect, fusion polypeptides comprising an antibody or an immunogenic fragment thereof according to the present disclosure are provided.

In certain aspects, compositions comprising an antibody or an immunogenic fragment thereof or fusion proteins according the present disclosure are provided.

In another aspect, compositions provided herein further comprise a pharmaceutically acceptable carrier.

n another aspect, compositions provided herein further comprise a pharmaceutically acceptable excipient.

In certain aspects, antibodies or immunogenic fragments thereof, fusion polypeptides, or compositions according to the present disclosure may be or comprise a component of a chimeric antigen receptor or an antibody-drug conjugate (e.g., an antibody or immunogenic fragment thereof attached to a cytotoxic agent or molecule).

In certain aspects, antibodies or immunogenic fragments thereof, fusion polypeptides, or compositions according to the present disclosure for use in a therapy are provided.

In certain aspects, antibodies or immunogenic fragments thereof, fusion polypeptides, or compositions according to the present disclosure for use in the production of a medicament are provided.

In another aspect, nucleic acids comprising a nucleic acid encoding an antibody or an immunogenic fragment thereof according to the present disclosure are provided.

In another aspect, nucleic acids comprising a nucleic acid encoding a fusion polypeptide according to the present disclosure are provided.

In certain aspects, methods of treating a subject having a condition, comprising administering to the subject a therapeutically effective amount of an antibody or an immunogenic fragment thereof, a fusion polypeptide, or a composition according to the present disclosure are provided.

In some aspects, methods of treating a subject having a condition comprising administering to the subject a therapeutically effective amount of an antibody or an immunogenic fragment thereof, a fusion polypeptide, or a composition according to the present disclosure are provided, wherein the subject has a condition and wherein the condition is cancer. In some embodiments, the cancer is selected from the group consisting of chronic lymphocytic leukemia (CLL), acute leukemia, acute lymphoid leukemia (ALL), B-cell acute lymphoid leukemia (B-ALL), T-cell lymphoma, B-cell lymphoma, T-cell acute lymphoid leukemia (T-ALL), chronic myelogenous leukemia (CML), B-cell prolymphocytic leukemia, T-cell lymphoma, Hodgkin's Disease, B-cell non-Hodgkin's lymphoma, blastic plasmacytoid dendritic cell neoplasm, Burkitt's lymphoma, diffuse large B-cell lymphoma, follicular lymphoma, hairy cell leukemia, small cell follicular lymphoma, large cell follicular lymphoma, malignant lymphoproliferative conditions, mucosa-associated lymphoid tissue (MALT) lymphoma, mantle cell lymphoma, marginal zone lymphoma, multiple myeloma, myelodysplasia and myelodysplastic syndrome, non-Hodgkin's lymphoma, Hodgkin's lymphoma, plasmablastic lymphoma, plasmacytoid dendritic cell neoplasm, Waldenström macroglobulinemia, or preleukemia. In other embodiments, the cancer is selected from the group consisting of colon cancer, rectal cancer, renal-cell carcinoma, liver cancer, lung cancer, kidney cancer, gastric cancer, gallbladder cancer, cancer of the small intestine, cancer of the esophagus, melanoma, bone cancer, pancreatic cancer, skin cancer, cancer of the head or neck, cutaneous or intraocular malignant melanoma, uterine cancer, ovarian cancer, rectal cancer, cancer of the anal region, stomach cancer, testicular cancer, uterine cancer, carcinoma of the fallopian tubes, carcinoma of the endometrium, carcinoma of the cervix, carcinoma of the vagina, carcinoma of the vulva, cancer of the endocrine system, cancer of the thyroid gland, cancer of the parathyroid gland, cancer of the adrenal gland, sarcoma of soft tissue, cancer of the urethra, cancer of the penis, solid tumors of childhood, cancer of the bladder, cancer of the kidney or ureter, carcinoma of the renal pelvis, neoplasm of the central nervous system (CNS), primary CNS lymphoma, tumor angiogenesis, spinal axis tumor, brain stem glioma, pituitary adenoma, Kaposi's sarcoma, epidermoid cancer, squamous cell cancer, environmentally induced cancers, combinations of the cancers, and metastatic lesions of the cancers. In other embodiments, the cancer is a human hematologic malignancy. In certain embodiments, the human hematologic malignancy is selected from myeloid neoplasm, acute myeloid leukemia (AML), AML with recurrent genetic abnormalities, AML with myelodysplasia-related changes, therapy-related AML, acute leukemias of ambiguous lineage, myeloproliferative neoplasm, essential thrombocythemia, polycythemia vera, myelofibrosis (MF), primary myelofibrosis, systemic mastocytosis, myelodysplastic syndromes (MDS), myeloproliferative/myelodysplastic syndromes, chronic myeloid leukemia, chronic neutrophilic leukemia, chronic eosinophilic leukemia, myelodysplastic syndromes (MDS), refractory anemia with ringed sideroblasts, refractory cytopenia with multilineage dysplasia, refractory anemia with excess blasts (type 1), refractory anemia with excess blasts (type 2), MDS with isolated del (5q), unclassifiable MDS, myeloproliferative/ myelodysplastic syndromes, chronic myelomonocytic leukemia, atypical chronic myeloid leukemia, juvenile myelomonocytic leukemia, unclassifiable myeloproliferative/ myelodysplatic syndromes, lymphoid neoplasms, precursor lymphoid neoplasms, B lymphoblastic leukemia, B lymphoblastic lymphoma, T lymphoblastic leukemia, T lymphoblastic lymphoma, mature B-cell neoplasms, diffuse large B-cell lymphoma, primary central nervous system lymphoma, primary mediastinal B-cell lymphoma, Burkitt's lymphoma/leukemia, follicular lymphoma, chronic lymphocytic leukemia, small lymphocytic lymphoma, B-cell prolymphocytic leukemia, lymphoplasmacytic lymphoma, Waldenstrom macroglobulinemia, mantle cell lymphoma, marginal zone lymphomas, post-transplant lymphoproliferative disorders, HIV-associated lymphomas, primary effusion lymphoma, intravascular large B-cell lymphoma, primary cutaneous B-cell lymphoma, hairy cell leukemia, multiple myeloma, monoclonal gammopathy of unknown significance (MGUS), smoldering multiple myeloma, or solitary plasmacytomas (solitary bone and extramedullary).

In some embodiments, the cancer is a metastatic cancer.

In some embodiments, methods of treating a subject having cancer comprising administering to the subject a therapeutically effective amount of an antibody or an immunogenic fragment thereof, a fusion polypeptide, or a composition according to the present disclosure further comprise subjecting the subject to one or more additional cancer therapies selected from chemotherapy, radiation therapy, immunotherapy, surgery and a combination thereof.

In some aspects, methods of treating a subject having a condition comprising administering to the subject a therapeutically effective amount of an antibody or an immunogenic fragment thereof, a fusion polypeptide, or a composition according to the present disclosure are provided, wherein the subject has a condition and wherein the condition is an infection. In certain embodiments, the infection is caused by a pathogen. In certain embodiments, the pathogen is a virus. In some embodiments, the virus is selected from the group consisting of human immunodeficiency viruses, influenza viruses, papillomaviruses, coronaviruses, hepatitis viruses, or herpesviruses. In other embodiments, the pathogen is a bacterium. In some embodiments, the bacterium is *Mycobacterium tuberculosis*. In other embodiments, the pathogen is a prion. In other embodiments, the pathogen is a fungus. In certain embodiments, the fungus is *Pneumocystis jirovecii* (PJP). In other embodiments, the pathogen is a parasite.

In some aspects, methods of treating a subject having a condition comprising administering to the subject a therapeutically effective amount of an antibody or an immunogenic fragment thereof, a fusion polypeptide, or a composition according to the present disclosure are provided, wherein the subject has a condition and wherein the condition is an autoimmune disease or disorder. In some embodiments, the autoimmune disease or disorder is selected from the group consisting of acute disseminated encephalomyelitis (ADEM), alopecia areata, antiphospholipid syndrome, autoimmune cardiomyopathy, autoimmune hemolytic anemia, autoimmune hepatitis, autoimmune inner ear disease, autoimmune lipoproliferative syndrome, autoimmune peripheral neuropathy, autoimmune pancreatitis, autoimmune polyendocrine syndrome, autoimmune progesterone dermatitis, autoimmune thrombocytopenia purpura, autoimmune urticarial, autoimmune uveitis, Behçet's disease, celiac disease, Chagas disease, cold agglutinin disease, Crohn's disease, dermatomyositis, diabetes mellitus type 1, eosinophilic fasciitis, gastrointestinal pemphigoid, Goodpasture's syndrome, Grave's syndrome, Guillain-Barre syndrome, Hashimoto's encephalopathy, Hashimoto's thyroiditis, lupus erythematosus, Miller-Fisher syndrome, mixed connective tissue disease, myasthenia gravis, pemphigus vulgaris, pernicious anemia, polymyositis, psoriasis, psoriatic arthritis, relapsing polychondritis, rheumatoid arthritis, rheumatic fever, Sjögren's syndrome, temporal arteritis, transverse myelitis, ulcerative colitis, undifferentiated connective tissue disease, vasculitis, and Wegener's granulomatosis. In certain embodiments, the autoimmune disease or disorder is adult rheumatoid arthritis.

In some aspects, methods of treating a subject having a condition comprising administering to the subject a therapeutically effective amount of an antibody or an immunogenic fragment thereof, a fusion polypeptide, or a composition according to the present disclosure are provided, wherein the subject has a condition and wherein the condition is a transplant. In some embodiments, the transplant is selected from a stem cell transplant or a bone marrow transplant. In some embodiments, the transplant is selected from the group consisting of a kidney transplant, a lung transplant, a heart transplant, a pancreas transplant, a cornea transplant, or a liver transplant.

In certain aspects, compositions comprising an antibody, an immunogenic fragment thereof, a fusion polypeptide, or a combination thereof according to the present technology for use in treating a subject having a condition are provided.

In some aspects, compositions comprising an antibody, an immunogenic fragment thereof, a fusion polypeptide, or a combination thereof according to the present technology for use in treating a subject having a condition are provided, wherein the condition is cancer. In some embodiments, the cancer is selected from the group consisting of chronic lymphocytic leukemia (CLL), acute leukemia, acute lymphoid leukemia (ALL), B-cell acute lymphoid leukemia (B-ALL), T-cell lymphoma, B-cell lymphoma, T-cell acute lymphoid leukemia (T-ALL), chronic myelogenous leukemia (CML), B-cell prolymphocytic leukemia, T-cell lymphoma, Hodgkin's Disease, B-cell non-Hodgkin's lymphoma, blastic plasmacytoid dendritic cell neoplasm, Burkitt's lymphoma, diffuse large B-cell lymphoma, follicular lymphoma, hairy cell leukemia, small cell follicular lymphoma, large cell follicular lymphoma, malignant lymphoproliferative conditions, mucosa-associated lymphoid tissue (MALT) lymphoma, mantle cell lymphoma, marginal zone lymphoma, multiple myeloma, myelodysplasia and myelodysplastic syndrome, non-Hodgkin's lymphoma, Hodgkin's lymphoma, plasmablastic lymphoma, plasmacytoid dendritic cell neoplasm, Waldenström macroglobulinemia, or preleukemia. In other embodiments, the cancer is selected from the group consisting of colon cancer, rectal cancer, renal-cell carcinoma, liver cancer, lung cancer, kidney cancer, gastric cancer, gallbladder cancer, cancer of the small intestine, cancer of the esophagus, melanoma, bone cancer, pancreatic cancer, skin cancer, cancer of the head or neck, cutaneous or intraocular malignant melanoma, uterine cancer, ovarian cancer, rectal cancer, cancer of the anal region, stomach cancer, testicular cancer, uterine cancer, carcinoma of the fallopian tubes, carcinoma of the endometrium, carcinoma of the cervix, carcinoma of the vagina, carcinoma of the vulva, cancer of the endocrine system, cancer of the thyroid gland, cancer of the parathyroid gland, cancer of the adrenal gland, sarcoma of soft tissue, cancer of the urethra, cancer of the penis, solid tumors of childhood, cancer of the bladder, cancer of the kidney or ureter, carcinoma of the renal pelvis, neoplasm of the central nervous system (CNS), primary CNS lymphoma, tumor angiogenesis, spinal axis tumor, brain stem glioma, pituitary adenoma, Kaposi's sarcoma, epidermoid cancer, squamous cell cancer, environmentally induced cancers, combinations of the cancers, and metastatic lesions of the cancers. In other embodiments, the cancer is a human hematologic malignancy. In certain embodiments, the human hematologic malignancy is selected from myeloid neoplasm, acute myeloid leukemia (AML), AML with recurrent genetic abnormalities, AML with myelodysplasia-related changes, therapy-related AML, acute leukemias of ambiguous lineage, myeloproliferative neoplasm, essential thrombocythemia, polycythemia vera, myelofibrosis (MF), primary myelofibrosis, systemic mastocytosis, myelodysplastic syndromes (MDS), myeloproliferative/myelodysplastic syndromes, chronic myeloid leukemia, chronic neutrophilic leukemia, chronic eosinophilic leukemia, myelodysplastic syndromes (MDS), refractory anemia with ringed sideroblasts, refractory cytopenia with multilineage dysplasia, refractory anemia with excess blasts (type 1), refractory anemia with excess blasts (type 2), MDS with isolated del (5q), unclassifiable MDS, myeloproliferative/myelodysplastic syndromes, chronic myelomonocytic leukemia, atypical chronic myeloid leukemia, juvenile myelomonocytic leukemia, unclassifiable myeloproliferative/myelodysplatic syndromes, lymphoid neoplasms, precursor lymphoid neoplasms, B lymphoblastic leukemia, B lymphoblastic lymphoma, T lymphoblastic leukemia, T lymphoblastic lymphoma, mature B-cell neoplasms, diffuse large B-cell lymphoma, primary central nervous system lymphoma, primary mediastinal B-cell lymphoma, Burkitt's lymphoma/leukemia, follicular lymphoma, chronic lymphocytic leukemia, small lymphocytic lymphoma, B-cell prolymphocytic leukemia, lymphoplasmacytic lymphoma, Waldenstrom macroglobulinemia, mantle cell lymphoma, marginal zone lymphomas, post-transplant lymphoproliferative disorders, HIV-associated lymphomas, primary effusion lymphoma, intravascular large B-cell lymphoma, primary cutaneous B-cell lymphoma, hairy cell leukemia, multiple myeloma, monoclonal gammopathy of unknown significance (MGUS), smoldering multiple myeloma, or solitary plasmacytomas (solitary bone and extramedullary).

In some embodiments, the cancer is a metastatic cancer.

In some embodiments, compositions comprising an antibody, an immunogenic fragment thereof, a fusion polypeptide, or a combination thereof according to the present technology for use in treating a subject having a condition are provided, wherein the compositions are co-administered to the subject with one or more additional cancer therapies selected from chemotherapy, radiation therapy, immunotherapy, surgery, or a combination thereof.

In some aspects, compositions comprising an antibody, an immunogenic fragment thereof, a fusion polypeptide, or a combination thereof according to the present technology for use in treating a subject having a condition are provided, wherein the condition is an infection. In certain embodiments, the infection is caused by a pathogen. In certain embodiments, the pathogen is a virus. In some embodiments, the virus is selected from the group consisting of human immunodeficiency viruses, influenza viruses, papillomaviruses, coronaviruses, hepatitis viruses, or herpesviruses. In other embodiments, the pathogen is a bacterium. In some embodiments, the bacterium is *Mycobacterium tuberculosis*. In other embodiments, the pathogen is a prion. In other embodiments, the pathogen is a fungus. In certain embodiments, the fungus is *Pneumocystis jirovecii* (PJP). In other embodiments, the pathogen is a parasite.

In some aspects, compositions comprising an antibody, an immunogenic fragment thereof, a fusion polypeptide, or a combination thereof according to the present technology for use in treating a subject having a condition are provided, wherein the condition is an autoimmune disease or disorder. In some embodiments, the autoimmune disease or disorder is selected from the group consisting of acute disseminated encephalomyelitis (ADEM), alopecia areata, antiphospholipid syndrome, autoimmune cardiomyopathy, autoimmune hemolytic anemia, autoimmune hepatitis, autoimmune inner ear disease, autoimmune lipoproliferative syndrome, autoimmune peripheral neuropathy, autoimmune pancreatitis, autoimmune polyendocrine syndrome, autoimmune progesterone dermatitis, autoimmune thrombocytopeniarpura, autoimmune urticarial, autoimmune uveitis, Behçet's disease, celiac disease, Chagas disease, cold agglutinin disease, Crohn's disease, dermatomyositis, diabetes mellitus type 1, eosinophilic fasciitis, gastrointestinal pemphigoid, Goodpasture's syndrome, Grave's syndrome, Guillain-Barre syndrome, Hashimoto's encephalopathy, Hashimoto's thyroiditis, lupus erythematosus, Miller-Fisher syndrome, mixed connective tissue disease, myasthenia gravis, pemphigus vulgaris, pernicious anemia, polymyositis, psoriasis, psoriatic arthritis, relapsing polychondritis, rheumatoid arthritis, rheumatic fever, Sjögren's syndrome, temporal arteritis, transverse myelitis, ulcerative colitis, undifferentiated connective tissue disease, vasculitis, and Wegener's granulomatosis. In certain embodiments, the autoimmune disease or disorder is adult rheumatoid arthritis.

In some aspects, compositions comprising an antibody, an immunogenic fragment thereof, a fusion polypeptide, or a combination thereof according to the present technology for use in treating a subject having a condition are provided, wherein the condition is a transplant. In some embodiments, the transplant is selected from a stem cell transplant or a bone marrow transplant. In some embodiments, the transplant is selected from the group consisting of a kidney transplant, a lung transplant, a heart transplant, a pancreas transplant, a cornea transplant, and liver transplant.

This listing is intended to be exemplary and illustrative rather than comprehensive and limiting. Additional aspects and embodiments may be set out in, or apparent from, the remainder of this technology and the claims.

DESCRIPTION OF THE DRAWINGS

Figures (FIGS. 1A-1B show that KIR3DL3 protein is expressed on the cell surface of human adaptive immune cells and innate immune cells.

FIG. 2A depicts histograms of 3T3 cell lines expressing KIR3DL1, KIR3DL2, or KIR3DL3 stained with HHLA2-Ig fusion polypeptide (open histograms) or control Ig (shaded histograms). FIG. 2B depicts a plot showing results of an intercellular conjugate assay that indicate 3T3 cell line expressing HHLA2 bound to 3T3 cell line expressing KIR3DL3, but not the control 3T3 cell line. FIG. 2C depicts histograms of a 3T3 cell line expressing HHLA2 bound by the DO domain (red) and the whole extracellular portion (red) of KIR3DL3.

FIG. 3A is a chart depicting mean fluorescent intensity (MFI) of 3T3 cells expressing HHLA2 that were incubated with TMIGD2-mIg fusion polypeptide or control mIgG at the indicated concentrations prior to staining with 10 μg/ml KIR3DL3-hIg followed by Allophycocyanin (APC)-conjugated anti-human IgG Fc. FIG. 3B is a chart depicting MFI of 3T3 cells expressing HHLA2 that were incubated with KIR3DL3-hIg fusion polypeptide or control hIgG at the indicated concentrations prior to staining with 10 μg/ml TMIGD2-mIg followed by APC anti-mouse IgG Fc.

FIG. 4A depicts plots of FACS analysis and charts quantifying specific lysis. KIR3DL3$^+$ or KIR3DL3$^-$ NK92 cells were sorted and KIR3DL3 expression was examined by FACS. Cytotoxicity assays were performed by incubating NK92 cells with target control K562 or HHLA2 expressing K562 (HHLA2/K562) at the indicated ratios of effector and target cells (E:T=1, 2, 5, 10). FIG. 4B is a chart depicting specific lysis percentages following a cytotoxicity assay in KIR3DL3$^+$ CD8$^+$ T cells (terminally differentiated effector cells) from PBMCs were sorted out by FACS and expanded with anti-CD3/CD28, IL-2, and feeder cells in vitro. Cytotoxicity assays were performed by incubating KIR3DL3$^+$ CD8$^+$ T cells with target control K562 or HHLA2/K562 at the indicated ratios of effector and target cells. *P<0.05; **P<0.01.

FIGS. 5A-5B show that anti-KIR3DL3 blocking monoclonal antibodies (mAbs) neutralize KIR3DL3-induced immune suppression. FIG. 5A depicts a series of histograms of KIR3DL3$^+$ NK92 cells pre-incubated with anti-KIR3DL3 mAbs (Clone 26E10, 34B10, 30D10, 8G7) for 45 min at room temperature (RT). FIG. 5B depicts a chart quantifying specific lysis percentages in the indicated cells following a cytotoxicity assay. Cytotoxicity assays were performed with target control K562 or HHLA2/K562 at an E:T ratio of 5:1. *P <0.05; **P<0.01.

FIG. 6A is a chart depicting the mean fluorescence intensity (MFI) of HHLA2 expressing 3T3 cells that were pre-incubated with anti-HHLA2 mAbs or control mouse IgG and then stained with KIR3DL3-Ig protein at different concentrations. The binding of KIR3DL3-Ig protein to HHLA2 was examined by FACS. FIG. 6B is a chart depicting specific lysis percentages following a toxicity assay in HHLA2/K562 target cells that were pre-incubated with anti-HHLA2 mAbs (Clone B5B5, A3H11, 566.1) or isotype mIgG1. Cytotoxicity assays were performed by incubating KIR3DL3$^+$ NK92 cells with control K562 or HHLA2/K562 at an E:T ratio of 5:1 at 37° C. for 4 hours. *P<0.05; **P<0.01.

FIG. 10A depicts wildtype (WT) KIR3DL3 (SEQ ID NO: 343) and ITIM mutant (Y381F) of KIR3DL3 with tyrosine (Y) to phenylalanine (F) mutation at the ITIM sequences (YAQL) (SEQ ID NO: 344), and their expression by flow cytometry. FIG. 10B depicts tyrosine phosphorylation of KIR3DL3 WT and Y381F mutant upon pervanadate treatment. FIG. 10C shows cytotoxicity assays performed by incubating KIR3DL3 WT or Y381F NK92 cells with K562 (top, control K562 or HHLA2/K562) or Raji (bottom, control Raji or HHLA2/Raji) at the indicated E:T ratios. One representative of 3 independent experiments is shown. *P<0.05, **P<0.01; NS, not significant. FIG. 10D depicts co-immunoprecipitation demonstrating that KIR3DL3 interacted with both SHP-1 and SHP-2.

FIGS. 12A-12B show intraperitoneal tumor mouse models treated by primary NK cells and anti-KIR3DL3 mAb. FIG. 12A depicts an outline of the experiment procedure. FIG. 12B depicts bioluminescence measurement of tumor growth in the 26E10 (blue line) and mIgG1 (black line) group. Data are mean±SEM of the total flux from ventral imaging for each mouse. FIGS. 12C-12D show lung metastasis tumor mouse models treated by primary NK cells and anti-KIR3DL3 mAb. FIG. 12C depicts an outline of the experiment procedure. FIG. 12D depicts bioluminescence measurement of tumor growth in the 26E10 (blue) and mIgG1 (black) group. Data are mean±SEM of the average of total flux from dorsal and ventral imaging for each mouse. P values two-way ANOVA. FIGS. 12E-12F show subcutaneous tumor mouse models treated with primary NK cells and anti-KIR3DL3 mAb. FIG. 12E depicts an outline of the experiment procedure. FIG. 12F depicts assessment of the tumor growth. Mean tumor volumes±SEM are shown. i.p., intraperitoneally. i.v., intravenously. s.c., subcutaneously.

DETAILED DESCRIPTION

Figure 1A:
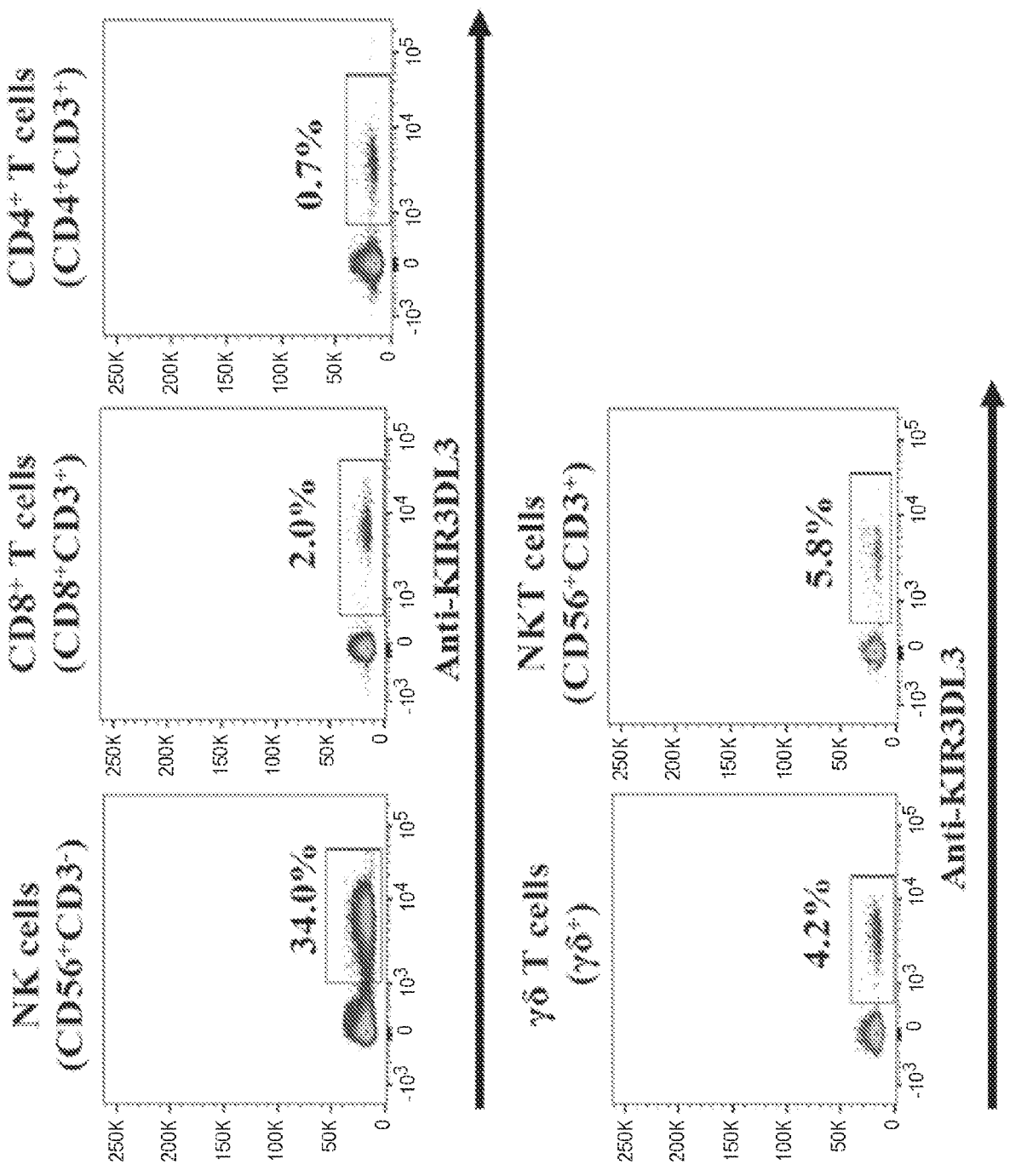
FIG. 1A depicts a series of plots showing Fluorescence-Activated Cell Sorting (FACS) analysis of peripheral blood mononuclear cells (PBMCs). FACS analysis showed that KIR3DL3 protein was detected on the cells surface of human innate immune cells, including natural killer (NK) cells, natural killer T (NKT) cells and yo T cells, and adaptive immune cells, including CD8+ T cells and CD4+ T cells.

Killer-cell immunoglobulin-like receptor (KIR) proteins include either two (KIR2D) or three (KIR3D) immunoglobulin-like extracellular domains (Beziat 2017). KIR3DL3 is a member of the KIR family, but its functions are yet unknown (Beziat 2017). KIR3DL3 protein is expressed on the surface of human adaptive immune cells and innate immune cells. According to results provided herein, KIR3DL3 inhibits functions of human immune cells. Consequently, blocking KIR3DL3 function by antibodies, ligand fusion polypeptides, or small molecules can be used to treat cancers or infections, whereas stimulating KIR3DL3 function by antibodies, ligand fusion polypeptides, or small molecules can be used to treat an autoimmune disease or transplant. KIR3DL3 is expressed in various human hematologic malignancies, therefore using antibodies and other molecules to kill KIR3DL3-positive tumor cells can be used to treat human hematologic malignancies. The present technology provides antibodies against KIR3DL3, or one or more epitopes thereof, and compositions and methods for using the same.

The present technology provides results demonstrating that KIR3DL3 inhibits immune cell function. Further, by administering anti-KIR3DL3 blocking mAbs, such as those provided herein, KIR3DL3-induced immune suppression is neutralized. As such, isolated antibodies against KIR3DL3, including monoclonal antibodies, antibodies against KIR3DL3 can act to block KIR3DL3 function, thereby enhancing immune cell function. Moreover, additional results provided herein demonstrate that HHLA2 binds KIR3DL3, but not its closet homologues KIR3DL1 and KIR3DL2. Thus, antibodies against the IgV1 domain of HHLA2 can block the binding of HHLA2 to KIR3DL3, thereby neutralizing KIR3DL3-induced immune suppression.

Definitions and Abbreviations

Unless otherwise specified, each of the following terms has the meaning set forth in this section.

The indefinite articles "a" and "an" denote at least one of the associated noun and are used interchangeably with the terms "at least one" and "one or more." For example, the phrase "a module" means at least one module, or one or more modules.

The conjunctions "or" and "and/or" are used interchangeably.

The term "antibody" as used herein is used to denote, in addition to natural antibodies, genetically engineered or otherwise modified forms of immunoglobulins, including chimeric antibodies, human antibodies, humanized antibodies, or synthetic antibodies. The antibodies disclosed herein may be monoclonal or polyclonal antibodies. In those embodiments wherein an antibody is an immunogenically active portion of an immunoglobulin molecule, the antibody may include, but are not limited to, a single chain Fv antibody (scFv), disulfide-linked Fv, single domain antibody (dAb), Fab, Fab', Fab fragment, F(ab')$_2$, or diabody. The antibodies disclosed herein, including those that comprise an immunogenically active portion of an immunoglobulin molecule, retain the ability to bind a specific antigen, for example, KIR3DL3, or one or more epitopes thereof.

"Domain" is used to describe a segment of a protein or nucleic acid. Unless otherwise indicated, a domain is not required to have any specific functional property.

"Subject" means a human, mouse, or non-human primate. A human subject can be any age (e.g., an infant, child, young adult, or adult), and may suffer from a disease, such as a cancer. In some embodiments, a subject is suffering from a relevant disease, disorder or condition. In some embodiments, a subject is susceptible to a disease, disorder, or condition. In some embodiments, a subject displays one or more symptoms or characteristics of a disease, disorder or condition. In some embodiments, a subject does not display any symptom or characteristic of a disease, disorder, or condition. In some embodiments, a subject is someone with one or more features characteristic of susceptibility to or risk of a disease, disorder, or condition. In some embodiments, a subject is a patient. In some embodiments, a subject is an individual to whom diagnosis and/or therapy is and/or has been administered.

"Treat," "treating," and "treatment" as used herein mean the treatment of a disease in a subject (e.g., a human subject), including one or more of inhibiting the disease, i.e., arresting or preventing its development or progression; relieving the disease, i.e., causing regression of the disease state; relieving one or more symptoms of the disease; and curing the disease.

"Prevent," "preventing," and "prevention" as used herein means the prevention of a disease in a subject, e.g., in a human, including (a) avoiding or precluding the disease; (b) affecting the predisposition toward the disease; (c) preventing or delaying the onset of and/or reduction in frequency and/or severity of at least one symptom of the disease.

The terms "polynucleotide," "nucleotide sequence," "nucleic acid," "nucleic acid molecule," "nucleic acid sequence," and "oligonucleotide" refer to a series of nucleotide bases (also called "nucleotides") in DNA and RNA and mean any chain of two or more nucleotides. The polynucleotides can be chimeric mixtures or derivatives or modified versions thereof, single-stranded or double-stranded. The oligonucleotide can be modified at the base moiety, sugar moiety, or phosphate backbone, for example, to improve stability of the molecule, its hybridization parameters, etc. A nucleotide sequence typically carries genetic information, including the information used by cellular machinery to make proteins and enzymes. These terms include double- or single-stranded genomic DNA, RNA, any synthetic and genetically manipulated polynucleotide, and both sense and antisense polynucleotides. This also includes nucleic acids containing modified bases.

Conventional IUPAC notation is used in nucleotide sequences presented herein, as shown in Table 1, below (see also Cornish-Bowden 1985, incorporated by reference herein). It should be noted, however, that "T" denotes "Thymine or Uracil" insofar as a given sequence (such as a gRNA sequence) may be encoded by either DNA or RNA.

TABLE 1

| IUPAC nucleic acid notation | |
|---|---|
| Character | Base |
| A | Adenine |
| T | Thymine |
| G | Guanine |
| C | Cytosine |
| U | Uracil |
| K | G or T/U |
| M | A or C |
| R | A or G |
| Y | C or T/U |
| S | C or G |
| W | A or T/U |
| B | C, G, or T/U |
| V | A, C, or G |
| H | A, C, or T/U |
| D | A, G, or T/U |
| N | A, C, G, or T/U |

The terms "protein," "peptide" and "polypeptide" are used interchangeably to refer to a sequential chain of amino acids linked together via peptide bonds. The terms include individual proteins, groups or complexes of proteins that associate together, as well as fragments, variants, derivatives and analogs of such proteins. Peptide sequences are presented using conventional notation, beginning with the amino or N-terminus on the left, and proceeding to the carboxyl or C-terminus on the right. Standard one-letter or three-letter abbreviations may be used.

Generation and Sequences of mAbs Against Human KIR3DL3

KIR3DL3 is a member of the KIR family, but its functions were previously unknown (Beziat 2017). The extracellular portion of KIR3DL3 is composed of three domains (D0, D1, and D2). According to embodiments provided herein, the following fusion polypeptides were generated: 1) KIR3DL3 D0-Ig fusion polypeptide by fusing the KIR3DL3 D0 coding region (Q26-A128) to a human IgG1 Fc tag; and 2) KIR3DL3 D0D1D2-Ig fusion polypeptide by fusing the KIR3DL3 D0D1D2 coding region (Q26-L325) to a human IgG1 Fc tag using previously reported methods (Zhao 2013). In some embodiments, the fusion polypeptides were expressed in a S2 system and then purified. Mice were immunized with KIR3DL3 D0 (Q26-A128)-Ig fusion polypeptide or KIR3DL3 D0(Q26-A128)-Ig fusion polypeptide and hybridomas were generated by standard techniques from splenocytes fused to NS0 myeloma cells. Human KIR3DL3 sequences are as shown below in Table 2.

TABLE 2

Human KIR3DL3 sequences

| Sequence | SEQ ID NO. |
|---|---|
| Open Reading Frame:<br>atgtcgctcatggtcgtcagcatggcgtgtgttgggttcttcttgctggagggccctggccacatgtggg<br>tggtcaggacaagcccttcctctctgcctggcccggcactgtggtgtctgaaggacaacatgtgactcttc<br>agtgtcgctctcgtcttgggtttaatgaattcagtctgtccaaagaagacgggatgcctgtccctgagctc<br>tacaacagaatattccggaacagctttctcatgggccctgtgacccagcacatgcagggacctacagatg<br>ttgcagttcacacccacactcccccactggtggtcggcaccagcaacctgtggtgatcatggtcacag<br>gagtccacagaaaaccttcctcctggcccacccaggtcccctggtgaaatcaggagagacggtcatcctg<br>caatgttggtcagatgtcaggtttgagcgcttccttctgcacagagaggggatcactgaggacccttgcg<br>cctcgttggacagctccacgatgcgggttcccaggtcaactattccatgggtcccatgacacctgcccttg<br>cagggacctacagatgctttggttctgtcactcacttaccctatgagttgtcggctcccagtgaccctctg<br>gacatcgtggtcgtaggtctatatgggaaaccttctctctcagcccagccggcccacggttcaggcagg<br>agagaatgtgaccttgtcctgcagctcccggagcttgtttgacatttaccatctatccaggaggcggagg<br>ccggtgaacttaggctcactgcagtgctgagggtcaatggaacattccaggccaacttcctctgggccct<br>gtgaccacggagggaactacagatgcttcggctcttccgtgccctgcccatgcgtggtcagacccgag<br>tgacccactgcccgttctgtcacaggtaactccagaaacctgcacgttctgattgggacctcagtggtca<br>tcatccccttgctatcctcctcttctttctcctcatcgctggtgtgccaacaaaaagaatgctgttgta<br>atggaccaagagcctgcagggaacagaacagtgaacagggaggactctgatgaacaagaccctcaggagt<br>gacatacgcacagttgaatcactgcgtttcacacagagaaaaatcactcgcccttctcagaggcccaaga<br>caccccaacagataccagcgtgtaa | SEQ ID NO: 334 |
| Protein:<br>MSLMVVSMACVGFFLLEGPWPHVGGQDKPFLSAWPGTVVSEGQHVTLQCRSRLGFNEFSLSKEDGMPVPEL<br>YNRIFRNSFLMGPVTPAHAGTYRCCSSHPHSPTGWSAPSNPVVIMVTGVHRKPSLLAHPGPLVKSGETVIL<br>QCWSDVRFERFLLHREGITEDPLRLVGQLHDAGSQVNYSMGPMTPALAGTYRCFGSVTHLPYELSAPSDPL<br>DIVVVGLYGKPSLSAQPGPTVQAGENVTLSCSSRSLFDIYHLSREAEAGELRLTAVLRVNGTFQANFPLGP<br>VTHGGNYRCFGSFRALPHAWSDPSDPLPVSVTGNSRNLHVLIGTSVVIIPFAILLFFLLHRWCANKKNAVV<br>MDQEPAGNRTVNREDSDEQDPQEVTYAQLNHCVFTQRKITRPSQRPKTPPTDTSV | SEQ ID NO: 335 |
| Signal Peptide:<br>MSLMVVSMACVGFFLLEGPWPHVGG | SEQ ID NO: 336 |
| D0 domain:<br>WPGTVVSEGQHVTLQCRSRLGFNEFSLSKEDGMPVPELYNRIFRNSFLMGPVTPAHAGTYRCCSSHPHSPT<br>GWSAPSNPVVIMVT | SEQ ID NO: 337 |
| D1 domain:<br>HPGPLVKSGETVILQCWSDVRFERFLLHREGITEDPLRLVGQLHDAGSQVNYSMGPMTPALAGTYRCFGSV<br>THLPYELSAPSDPLDIWV | SEQ ID NO: 338 |
| D2 domain:<br>QPGPTVQAGENVTLSCSSRSLFDIYHLSREAEAGELRLTAVLRVNGTFQANFPLGPVTHGGNYRCFGSFRA<br>LPHAWSDPSDPLPVSVTGNSRNLHVL | SEQ ID NO: 339 |
| Transmembrane region:<br>NLHVLIGTSVVIIPFAILLFFLL | SEQ ID NO: 340 |
| Cytoplasmic tail:<br>HRWCANKKNAVVMDQEPAGNRTVNREDSDEQDPQEVTYAQLNHCVFTQRKITRPSQRPKT | SEQ ID NO: 341 |
| Immunoreceptor tyrosine-based inhibition motif (ITIM):<br>VTYAQL | SEQ ID NO: 342 |
| Wildtype (WT) KIR3DL3<br>DEQDPQEVTYAQLNHCVFT | SEQ ID NO: 343 |
| ITIM mutant (Y381F) of KIR3DL3 with tyrosine (Y) to phenylanlanine (F) mutation at the ITIM sequence<br>DEQDPQEVTFAQLNHCVFT | SEQ ID NO: 344 |

In some embodiments, mAbs to KIR3DL3 protein were obtained from the hybridomas discussed above, and the binding affinity of each mAb was determined as shown below in Table 3.

TABLE 3 mAb binding affinities

| Clone | KD (nM) |
|---|---|
| 8G7 | 0.11 |
| 26E10 | 0.17 |
| 26E2 | 0.26 |
| 31C4 | 0.72 |
| 34B10 | 1.51 |
| 37A3 | 8.50 |
| 12A10 | 0.69 |
| 3B7 | 0.51 |

TABLE 3-continued mAb binding affinities

| Clone | KD (nM) |
|---|---|
| 11G8 | 0.29 |
| 14F8 | 0.69 |
| 15D2 | 0.56 |
| 29H7 | 1.13 |
| 30D10 | 0.16 |
| 51C3 | 0.19 |

In some embodiments, after assessing binding affinity, the hybridomas were sequenced. Sequencing revealed that each of the 14 mAbs generated had unique VH and VL sequences. Each VH or VL has three CDRs (CDR1, CDR2, and CDR3). These sequences are provided in SEQ ID NOs: 1-333 and annotated below in Table 4.

TABLE 4 mAb sequences

| Clone | Sequence | SEQ ID NO. |
|---|---|---|
| 8G7 | 8G7 heavy chain VH: DNA sequence:<br>Leader sequence-FR1-CDR1-FR2-CDR2-FR3-CDR3-FR4<br>atgaactttgggttgagattgattttccttgtccttgttttaaaaggtgtccagtgtgaagtgatgct<br>ggtggagtctggggaggcttagtgaagcctggagggtccctgaaactctcctgtgcagcctc<br>ggattcactttcagtacctatgccatgtctgggttcgccagactccggagaagaggctggagtgggtc<br>gcaaccattcttagtggtggtaattacacctactatccagaacagtgtgaaggggcgattcaccatct<br>ccagagacaatgccaagaacaccctgaacctgcaaatgagcagtctgaggtctgaggacacggccatg<br>tattactgtgtaatcccctatggtagtagtccttttgactatgggccaaggcaccactctcacagtc<br>tctcta | SEQ ID NO: 1 |
| | 8G7 heavy chain VH DNA sequence: CDR1<br>ggattcactttcagtacctatgccatgtct | SEQ ID NO: 2 |
| | 8G7 heavy chain VH DNA sequence: CDR2<br>attcttagtggtggtaattacacctactatccagacagtgtgaagggg | SEQ ID NO: 3 |
| | 8G7 heavy chain VH DNA sequence: CDR3<br>gtaatcccctatggtagtagtccttttgactat | SEQ ID NO: 4 |
| | 8G7 heavy chain VH: Amino acid sequence:<br>Leader sequence-FR1-CDR1-FR2-CDR2-FR3-CDR3-FR4<br>MNFGLRLIFLVLVLKGVQCEVMLVESGGGLVKPGGSLKLSCAASGFTFSTYAMSWVRQTPEKRLEWVA<br>TILSGGNYTYYPDSVKGRFTISRDNAKNTLNLQMSSLRSEDTAMYYCVIPYGSSPFDY<br>WGQGTTLTVS | SEQ ID NO: 5 |
| | 8G7 heavy chain VH: Amino acid sequence: FR1<br>EVMLVESGGGLVKPGGSLKLSCAAS | SEQ ID NO: 6 |
| | 8G7 heavy chain VH: Amino acid sequence: CDR1<br>GFTFSTYAMS | SEQ ID NO: 7 |
| | 8G7 heavy chain VH: Amino acids sequence: FR2<br>WVRQTPEKRLEWVA | SEQ ID NO: 8 |
| | 8G7 heavy chain VH: Amino acid sequence: CDR2<br>TILSGGNYTYYPDSVKG | SEQ ID NO: 9 |
| | 8G7 heavy chain VH: Amino acid sequence: FR3<br>RFTISRDNAKNTLNLQMSSLRSEDTAMYYC | SEQ ID NO: 10 |
| | 8G7 heavy chain VH: Amino acid sequence: CDR3<br>VIPYGSSPFDY | SEQ ID NO: 11 |
| | 8G7 heavy chain VH: Amino acid sequence: FR4<br>WGQGTTLTVS | SEQ ID NO: 12 |
| | 8G7 light chain VL: DNA sequence: Leader sequence-FR1-CDR1-FR2-CDR2-FR3-CDR3-FR4<br>ttattactagtcgacacgggcatcaagatgaagtcacagacccaggtcttcgtatttctactgctctg<br>tgtgtctggtgctcatgggagtattgtgatgacccagactcccaaattcctgcttgtatcagcaggag<br>acagggttaccataacctgcaaggccagtcagagtgtgagtaatgatgtagcttggtaccaacagaag<br>ccagggcagtctcctaaactgctgatatactattatgcatccaatcgctacactggagtccctgatcg<br>cttcactggcagtggatatgggacggatttcactttcaccatcagcactgtgcaggctgaagacctgg<br>cagtttatttctgtcagcaggattatagctctccgtggacgttcggtggaggcaccaagctggaaatc<br>aaacgggctgatgctgca | SEQ ID NO: 13 |
| | 8G7 light chain VL: DNA sequence: CDR1<br>aaggccagtcagagtgtgagtaatgat | SEQ ID NO: 14 |
| | 8G7 light chain VL: DNA sequence: CDR2<br>tatgcatccaatcgctacact | SEQ ID NO: 15 |
| | 8G7 light chain VL: DNA sequence: CDR3<br>cagcaggattatagctctccgtggacg | SEQ ID NO: 16 |
| | 8G7 light chain VL: Amino acid sequence: Leader sequence-FR1-CDR1-FR2-CDR2-FR3-CDR3-FR4<br>MKSQTQVFVFLLLCVSGAHGSIVMTQTPKFLLVSAGDRVTITCKASQSVSNDVAWYQQKPGQSPKLLI<br>YYASNRYTGVPDRFTGSGYGTDFTFTISTVQAEDLAVYFCQQDYSSPWTFGGGTKLEIK | SEQ ID NO: 17 |

TABLE 4-continued mAb sequences

| Clone | Sequence | SEQ ID NO. |
|---|---|---|
| | 8G7 light chain VL: Amino acid sequence: FR1<br>SIVMTQTPKFLLVSAGDRVTITC | SEQ ID NO: 18 |
| | 8G7 light chain VL: Amino acid sequence: CDR1<br>KASQSVSND | SEQ ID NO: 19 |
| | 8G7 light chain VL: Amino acid sequence: FR2<br>VAWYQQKPGQSPKLLIY | SEQ ID NO: 20 |
| | 8G7 light chain VL: Amino acid sequence: CDR2<br>YASNRYT | SEQ ID NO: 21 |
| | 8G7 light chain VL: Amino acid sequence: FR3<br>GVPDRFTGSGYGTDFTFTISTVQAEDLAVYFC | SEQ ID NO: 22 |
| | 8G7 light chain VL: Amino acid sequence: CDR3<br>QQDYSSPWT | SEQ ID NO: 23 |
| | 8G7 light chain VL: Amino acid sequence: FR4<br>FGGGTKLEIK | SEQ ID NO: 24 |
| 26E10 | 26E10 heavy chain VH: DNA sequence: Leader sequence-FR1-CDR1-FR2-<br>CDR2-FR3-CDR3-FR4<br>tggggaattcatggaatggagctgggttttctcttcctcctgtcaataactacaggtgtccactccc<br>aggcttatctacagcagtctggggctgagctggtgaggtctggggcctcagtgaagatgtcctgcaag<br>gcttct*ggctacacatttaccagttacaatatacac*gggtaaagcagacacctggacagggcctggaa<br>tggattgga*tatatttatcctggagatggtgttactaactacaatcagaagttcaaggc*aaggccaca<br>ttgactgcagacacatcctccagcacagcctacatgcagatcagcagcctgacatctgaagactctgc<br>ggtctatttctgtgcaag*atcgggcaactatggtaactacgaagggtttgcttac*ggggccaagggac<br>tctggtcactgtctctgca | SEQ ID NO: 25 |
| | 26E10 heavy chain VH: DNA sequence: CDR1<br>ggctacacatttaccagttacaatatacac | SEQ ID NO: 26 |
| | 26E10 heavy chain VH: DNA sequence: CDR2<br>tatatttatcctggagatggtgttactaactacaatcagaagttcaagggc | SEQ ID NO: 27 |
| | 26E10 heavy chain VH: DNA sequence: CDR3<br>atcgggcaactatggtaactacgaagggtttgcttac | SEQ ID NO: 28 |
| | 26E10 heavy chain VH: Amino acid sequence: Leader sequence-FR1-CDR1-<br>FR2-CDR2-FR3-CDR3-FR4<br>MEWSWVFLFLLSITTGVHS<u>QAYLQQSGAELVRSGASVKMSCKAS</u>*GYTFTSYNIH*<u>WVKQTPGQGLEWIG</u><br>*YIYPGDGVTNYNQKFKG*<u>KATLTADTSSSTAYMQISSLTSEDSAVYFCARXX</u>*SGNYGNYEGFAY*<u>WGQGT</u><br><u>LVTVSA</u> | SEQ ID NO: 29 |
| | 26E10 heavy chain VH: Amino acid sequence: FR1<br>QAYLQQSGAELVRSGASVKMSCKAS | SEQ ID NO: 30 |
| | 26E10 heavy chain VH: Amino acid sequence: CDR1<br>GYTFTSYNIH | SEQ ID NO: 31 |
| | 26E10 heavy chain VH: Amino acid sequence: FR2<br>WVKQTPGQGLEWIG | SEQ ID NO: 32 |
| | 26E10 heavy chain VH: Amino acid sequence: CDR2<br>YIYPGDGVTNYNQKFKG | SEQ ID NO: 33 |
| | 26E10 heavy chain VH: Amino acid sequence: FR3<br>KATLTADTSSSTAYMQISSLTSEDSAVYFCAR | SEQ ID NO: 34 |
| | 26E10 heavy chain VH: Amino acid sequence: CDR3<br>SGNYGNYEGFAY | SEQ ID NO: 35 |
| | 26E10 heavy chain VH: Amino acid sequence: FR4<br>WGQGTLVTVSA | SEQ ID NO: 36 |
| | 26E10 light chain VL: DNA sequence: FR1-CDR1-FR2-CDR2-FR3-CDR3-FR4<br>ttccatgtatgcatctctaggagagagagtcactatcacttgc*aaggcgagtcaggacactaatagc*<br>*tatttaagc*tggttccagcagaaaccagggaaatctcctaagaccctgatctat*cgtgcaaacagat*<br>*tggtagat*ggggtcccatcaaggttcagtggcagtggatctgggcaagattattctctcaccatcag<br>cagcctggagtatgaagatatgggaattattattgt*ctacagtatgatgagtttccgtacacg*ttc<br>ggagggggaccaagctggaaataaaac | SEQ ID NO: 37 |
| | 26E10 light chain VL: DNA sequence: CDR1<br>aaggcgagtcaggacactaatagctatttaagc | SEQ ID NO: 38 |
| | 26E10 light chain VL: DNA sequence: CDR2<br>cgtgcaaacagattggtagat | SEQ ID NO: 39 |
| | 26E10 light chain VL: DNA sequence: CDR3<br>ctacagtatgatgagtttccgtacacg | SEQ ID NO: 40 |
| | 26E10 light chain VL: Amino acid sequence: FR1-CDR1-FR2-CDR2-FR3-<br>CDR3-FR4<br><u>SMYASLGERVTITC</u>*KASQDTNAYLS*<u>WFQQKPGKSPKTLIY</u>*RANRLVD*<u>GVPSRFSGSGSGQDY</u><br><u>SLTISSLEYEDMGIYYC</u>*LQYDEFPYT*<u>FGGGTKLEIK</u> | SEQ ID NO: 41 |
| | 26E10 light chain VL: Amino acid sequence: FR1<br>SMYASLGERVTITC | SEQ ID NO: 42 |
| | 26E10 light chain VL: Amino acid sequence: CDR1<br>KASQDTNSYLS | SEQ ID NO: 43 |
| | 26E10 light chain VL: Amino acid sequence: FR2<br>WFQQKPGKSPKTLIY | SEQ ID NO: 44 |
| | 26E10 light chain VL: Amino acid sequence: CDR2<br>RANRLVD | SEQ ID NO: 45 |
| | 26E10 light chain VL: Amino acid sequence: FR3<br>GVPSRFSGSGSGQDYSLTISSLEYEDMGIYYC | SEQ ID NO: 46 |

TABLE 4-continued mAb sequences

| Clone | Sequence | SEQ ID NO. |
|---|---|---|
| | 26E10 light chain VL: Amino acid sequence: CDR3<br>LQYDEFPYT | SEQ ID NO: 47 |
| | 26E10 light chain VL: Amino acid sequence: FR4<br>FGGGTKLEIK | SEQ ID NO: 48 |
| 26E2 | 26E2 heavy chain VH: DNA sequence: FR2-CDR2-CFR-CDR3-FR4<br>gcgctgggtaaagcagacacctggacagggcctggaatggattgga*tatatttatcctggagatggtg*<br>*gtggtactaactgcaatcagaagttccaggg*aaggccacattgactgcagacacatcctccagcacag<br>cctacatgcagatcagcagcctgacatctgaagactctgcggtctatttctgtgcaaga*tcgggcaac*<br>*tatggtaactacgaagggtttgcttc*gggccaagggactctggtcactgtctctgcagc | SEQ ID NO: 49 |
| | 26E2 heavy chain VH: DNA sequence: CDR2<br>tatatttatcctggagatggtggtactaactgcaatcagaagttccagggc | SEQ ID NO: 50 |
| | 26E2 heavy chain VH: DNA sequence: CDR3<br>tcgggcaactatggtaactacgaagggtttgctttc | SEQ ID NO: 51 |
| | 26E2 heavy chain VH: Amino acid sequence:FR2-CDR3-FR3-CDR3-FR4<br>RWVKQTPGQGLEWIG*YIYPGDGGTNCNQKFQG*KATLTADTSSSTAYMQISSLTSEDSAVYFCAR<br>WGQGTLVTVSA | SEQ ID NO: 52 |
| | 26E2 heavy chain VH: Amino acids sequence: FR2<br>RWVKQTPGQGLEWIG | SEQ ID NO: 53 |
| | 26E2 heavy chain VH: Amino acid sequence: CDR2<br>YIYPGDGGTNCNQKFQG | SEQ ID NO: 54 |
| | 26E2 heavy chain VH: Amino acid sequence: FR3<br>KATLTADTSSSTAYMQISSLTSEDSAVYFCAR | SEQ ID NO: 55 |
| | 26E2 heavy chain VH: Amino acid sequence: CDR3<br>SGNYGNYEGFAF | SEQ ID NO: 56 |
| | 26E2 heavy chain VH: Amino acid sequence: FR4<br>WGQGTLVTVSA | SEQ ID NO: 57 |
| | 26E2 light chain VL: DNA sequence: Leader sequence-FR1-CDR1-FR2-<br>CDR2-FR3-CDR3-FR4<br>atgagggcccctgctcagttttttgggatcttgttgctctggtttccaggtatcaaatgtgacatcaa<br>gatgacccagtctctccatcctccatgtatgcatctctaggagagagagtcactatcacttgc*aaggcga*<br>*gtcaggacactaatagctatttaag*tggttccagcagaaaccagggaaatctcctaagaccctgatct<br>*atcgtgcaaacagattggtagat*ggggtcccatcaaggttcagtggcagtggatctgggcaagattat<br>tctctcaccatcagccgcctggagtatgaagatatcggaatttattattgt*ctacagtataatgagtt*<br>tccgtacagcttcggaggggggaccaagctggaaataaaacgggctgatgctg | SEQ ID NO: 58 |
| | 26E2 light chain VL: DNA sequence: CDR1<br>aaggcgagtcaggacactaatagctatttaagc | SEQ ID NO: 59 |
| | 26E2 light chain VL: DNA sequence: CDR2<br>cgtgcaaacagattggtagat | SEQ ID NO: 60 |
| | 26E2 light chain VL: DNA sequence: CDR3<br>ctacagtataatgagtttccgtacacg | SEQ ID NO: 61 |
| | 26E2 light chain VL: Amino acid sequence: Leader sequence-FR1-CDR1-<br>FR2-CDR2-FR3-CDR3-FR4<br>MRAPAQFFGILLLWFPGIKCDIKMTQSPSSMYASLGERVTITC*KASQDTNSYLS*WFQQKPGKSPKTLI<br>Y*ANRLVD*GVPSRFSGSGSGQDYSLTISRLEYEDMGIYYC*LQYNEFPYT*FGGGTKLEIKRADA | SEQ ID NO: 62 |
| | 26E2 light chain VL: Amino acid sequence: FR1<br>DIKMTQSPSSMYASLGERVTITC | SEQ ID NO: 63 |
| | 26E2 light chain VL: Amino acid sequence: CDR1<br>KASQDTNSYLS | SEQ ID NO: 64 |
| | 26E2 light chain VL: Amino acid sequence: FR2<br>WFQQKPGKSPKTLIY | SEQ ID NO: 65 |
| | 26E2 light chain VL: Amino acid sequence: CDR2<br>RANRLVD | SEQ ID NO: 66 |
| | Light chain VL: Amino acid sequence: FR3<br>GVPSRFSGSGSGQDYSLTISRLEYEDMGIYYC | SEQ ID NO: 67 |
| | 26E2 light chain VL: Amino acid sequence: CDR3<br>LQYNEFPYT | SEQ ID NO: 68 |
| | 26E2 light chain VL: Amino acid sequence: FR4<br>FGGGTKLEIKRADA | SEQ ID NO: 69 |
| 31C4 | 31C4 heavy chain VH: DNA sequence: Leader sequence-FR1-CDR1-FR2-<br>CDR2-FR3-CDR3-FR4<br>tgtggggaattccatggaatggagctgggttttctcttcctcctgtcaataactacaggtgtccact<br>cccaggcttatctacagcagtctgggcctgagctggtgaggctgggggcctcagtgaagatgtcctgc<br>aaggcttct*ggctacacatttaccagttacaatatgcac*tgggtaaagcagacacctggacagggcct<br>ggaatggattgga*tatattttcctggagatggtggtactaactacaatcagaagttcaaggg*aaggc<br>cacattgactgcagacacatcctccagcacagcctacatgcagatcagcagcctgacatctgaagact<br>ctgcggtctatttctgt*gcaagatcgggcaactatggtaactacgaagggtttgcttac*gggccaag<br>ggactctggtcactgtctctgctag | SEQ ID NO: 70 |
| | 31C4 heavy chain VH: DNA sequence: CDR1<br>ggctacacatttaccagttacaatatgcac | SEQ ID NO: 71 |
| | 31C4 heavy chain VH: DNA sequence: CDR2<br>tatattttcctggagatggtggtactaactacaatcagaagttcaagggc | SEQ ID NO: 72 |
| | 31C4 heavy chain VH: DNA sequence: CDR3<br>gcaagatcgggcaactatggtaactacgaagggtttgcttac | SEQ ID NO: 73 |

TABLE 4-continued mAb sequences

| Clone | Sequence | SEQ ID NO. |
|---|---|---|
| | 31C4 heavy chain VH: Amino acid sequence: Leader sequence-FR1-CDR1-FR2-CDR2-FR3-CDR3-FR4<br>MEWSWVFLFLLSITTGVHSQAYLQQSGAELVRSGASVKMSCKAS*GYTFTSYNMH*WVKQTPGQGLEWIG*YIFPGDGGTNYNQKFKG*KATLTADTSSSTAYMQISSLTSEDSAVYFC**AR*SGNYGNYEGFAY*WGQGTLVTVSA | SEQ ID NO: 74 |
| | 31C4 heavy chain VH: Amino acid sequence: FR1<br>QAYLQQSGAELVRSGASVKMSCKAS | SEQ ID NO: 75 |
| | 31C4 heavy chain VH: Amino acid sequence: CDR1<br>GYTFTSYNMH | SEQ ID NO: 76 |
| | 31C4 heavy chain VH: Amino acid sequence: FR2<br>WVKQTPGQGLEWIG | SEQ ID NO: 77 |
| | 31C4 heavy chain VH: Amino acid sequence: CDR2<br>YIFPGDGGTNYNQKFKG | SEQ ID NO: 78 |
| | 31C4 heavy chain VH: Amino acid sequence: FR3<br>KATLTADTSSSTAYMQISSLTSEDSAVYFC | SEQ ID NO: 79 |
| | 31C4 heavy chain VH: Amino acid sequence: CDR3<br>ARSGNYGNYEGFAY | SEQ ID NO: 80 |
| | 31C4 heavy chain VH: Amino acid sequence: FR4<br>WGQGTLVTVSA | SEQ ID NO: 81 |
| | 31C4 light chain VL: DNA sequence: Leader sequence-FR1-CDR1-FR2-CDR2-FR3-CDR3-FR4<br>tactagtcgacatgagggcccctgctcagttttttgggatcttgttctctggtttccaggtatcaaatgtgacatcaagatgacccagtctccatcttccatgtatgcatctctaggagagagtcactatcacttgc*aaggcgagtcaggacattaatagctatttaagc*tggttccagcagaaaccagggaaatctcctaagaccctgatctat*cgtgcaaacagattggtagatg*ggtcccatcaaggttcagtggcagtggatctggcaagattattctctcaccatcagcagcctggagtatgaagatatgggaatttattattgt*ctacagtatgatgaatttccgtacacg*ttcggagggggaccaagctggaaataaaacgggctgatgca | SEQ ID NO: 82 |
| | 31C4 light chain VL: DNA sequence: CDR1<br>aaggcgagtcaggacattaatagctatttaagc | SEQ ID NO: 83 |
| | 31C4 light chain VL: DNA sequence: CDR2<br>cgtgcaaacagattggtagatg | SEQ ID NO: 84 |
| | 31C4 light chain VL: DNA sequence: CDR3<br>ctacagtatgatgaatttccgtacacg | SEQ ID NO: 85 |
| | 31C4 light chain VL: Amino acid sequence: Leader sequence-FR1-CDR1-FR2-CDR2-FR3-CDR3-FR4<br>LVDMRPPAQFFGILLLWFPGIKCDIKMTQSPSSMYASLGERVTITK*ASQDINSYLS*WFQQKPGKSPKTLIY*RANRLVD*GVPSRFSGSGSGQDYSLTISSLEYEDMGIYYC*LQYDEFPYT*FGGGTKLEIKRADAA | SEQ ID NO: 86 |
| | 31C4 light chain VL: Amino acid sequence: FR1<br>DIKMTQSPSSMYASLGERVTITC | SEQ ID NO: 87 |
| | 31C4 light chain VL: Amino acid sequence: CDR1<br>KASQDINSYLS | SEQ ID NO: 88 |
| | 31C4 light chain VL: Amino acid sequence: FR2<br>WFQQKPGKSPKTLIY | SEQ ID NO: 89 |
| | 31C4 light chain VL: Amino acid sequence: CDR2<br>RANRLVD | SEQ ID NO: 90 |
| | 31C4 light chain VL: Amino acid sequence: FR3<br>GVPSRFSGSGSGQDYSLTISSLEYEDMGIYYC | SEQ ID NO: 91 |
| | 31C4 light chain VL: Amino acid sequence: CDR3<br>LQYDEFPYT | SEQ ID NO: 92 |
| | 31C4 light chain VL: Amino acid sequence: FR4<br>FGGGTKLEIKRADAA | SEQ ID NO: 93 |
| 34B10 | 34B10 heavy chain VH: DNA sequence: Leader sequence-FR1-CDR1-FR2-CDR2-FR3-CDR3-FR4<br>tggggaattcatggagttgggggttcagctggattttccttggaacacttttaaatggtatccagtgtgaggtgaagctggtggagtctggaggagtcttggtacagcctggggggttctctgagactctcctgtgcaacttct*ggattcaccttcactgattactacatgggc*tgggtccgccagcctccaggaaaggcgcttgagtggttggg*tttattagaaacaaagctaatggttacacaacagagtccagtgcatctgtgaagggt*cggttcaccatctccagagataattcccaaagcatcctctatctttcaaatgaacaccctgagagctgaggacagtgccacttatactgtgcaaga*gattactactccggtagtagccttgactac*ggggccaaggcacactctcacagtctcctca | SEQ ID NO: 94 |
| | 34B10 heavy chain VH: DNA sequence: CDR1<br>ggattcaccttcactgattactacatgggc | SEQ ID NO: 95 |
| | 34B10 heavy chain VH: DNA sequence: CDR2<br>tttattagaaacaaagctaatggttacacaacagagtccagtgcatctgtgaagggt | SEQ ID NO: 96 |
| | 34B10 heavy chain VH: DNA sequence: CDR3<br>gattactactccggtagtagccttgactac | SEQ ID NO: 97 |
| | 34B10 heavy chain VH: Amino acids sequence: Leader sequence-FR1-CDR1-FR2-CDR2-FR3-CDR3-FR4<br>MELGFSWIFLGTLLNGIQCEVKLVESGGVLVQPGGSLRLSCATS*GFTFTDYYMG*WVRQPPGKALEWLG*FIRNKANGYTTESSASVK*GRFTISRDNSQSILYLQMNTLRAEDSATYYCAR*DYYSGSSLDY*WGQGTTLTVSS | SEQ ID NO: 98 |
| | 34B10 heavy chain VH: Amino acids sequence: FR1<br>EVKLVESGGVLVQPGGSLRLSCATS | SEQ ID NO: 99 |

TABLE 4-continued mAb sequences

| Clone | Sequence | SEQ ID NO. |
|---|---|---|
| | 34B10 heavy chain VH: Amino acid sequence: CDR1<br>GFTFTDYYMG | SEQ ID NO: 100 |
| | 34B10 heavy chain VH: Amino acid sequence: FR2<br>WVRQPPGKALEWLG | SEQ ID NO: 101 |
| | 34B10 heavy chain VH: Amino acid sequence: CDR2<br>FIRNKANGYTTESSASVKG | SEQ ID NO: 102 |
| | 34B10 heavy chain VH: Amino acid sequence: FR3<br>RFTISRDNSQSILYLQMNTLRAEDSATYYCAR | SEQ ID NO: 103 |
| | 34B10 heavy chain VH: Amino acid sequence: CDR3<br>DYYSGSSLDY | SEQ ID NO: 104 |
| | 34B10 heavy chain VH: Amino acid sequence: FR4<br>WGQGTTLTVSS | SEQ ID NO: 105 |
| | 34B10 light chain VL: DNA sequence: Leader sequence-FR1-CDR1-FR2-<br>CDR2-FR3-CDR3-FR4<br>tctatactagtcgacaggaggaccccggctcagatttgtggtctcctgttgctcttttttcaaggtac<br>cagatgtgatatccagatgacacagactacatcctccctgtctgcctctctgggagacagagtcacca<br>tcagttgc*agggcaagtcaggacatttagcaattatttaaat*gttaaacctcctgatctac*tacacatcaagattacactca*ggagtcccatcaaggttcagtggcagtgg<br>gtctggaacagattattctctctccattagcaacctggagcaagaagatattgccacttacttttgc*c<br>aacagggttatacgcttccgtacacg*tcggaggggggaccaagcttgaaataaaacgggctgatg | SEQ ID NO: 106 |
| | 34B10 light chain VL: DNA sequence: CDR1<br>agggcaagtcaggacattagcaattatttaaat | SEQ ID NO: 107 |
| | 34B10 light chain VL: DNA sequence: CDR2<br>tacacatcaagattacactca | SEQ ID NO: 108 |
| | 34B10 light chain VL: DNA sequence: CDR3<br>caacagggttatacgcttccgtacacg | SEQ ID NO: 109 |
| | 34B10 light chain VL: Amino acid sequence: Leader sequence-FR1-CDR1-<br>FR2-CDR2-FR3-CDR3-FR4<br>SILVDRRTPAQICGLLLLFFQGTRC<u>DIQMTQTTSSLSASLGDRVTISC</u>*RASQDISNYLN*<u>WYQQKPDGTV</u><br><u>KLLIY</u>*YTSRLHS*<u>GVPSRFSGSGSGTDYSLSISNLEQEDIATYFC</u>*QQGYTLPYT*<u>FGGGTKLEIKRAD</u> | SEQ ID NO: 110 |
| | 34B10 light chain VL: Amino acid sequence: FR1<br>DIQMTQTTSSLSASLGDRVTISC | SEQ ID NO: 111 |
| | 34B10 light chain VL: Amino acid sequence: CDR1<br>RASQDISNYLN | SEQ ID NO: 112 |
| | 34B10 light chain VL: Amino acid sequence: FR2<br>WYQQKPDGTVKLLIY | SEQ ID NO: 113 |
| | 34B10 light chain VL: Amino acid sequence: CDR2<br>YTSRLHS | SEQ ID NO: 114 |
| | 34B10 light chain VL: Amino acid sequence: FR3<br>GVPSRFSGSGSGTDYSLSISNLEQEDIATYFC | SEQ ID NO: 115 |
| | 34B10 light chain VL: Amino acid sequence: CDR3<br>QQGYTLPYT | SEQ ID NO: 116 |
| | 34B10 light chain VL: Amino acid sequence: FR4<br>FGGGTKLEIKRAD | SEQ ID NO: 117 |
| 37A3 | 37A3 heavy chain VH: DNA sequence: Leader sequence-FR1-CDR1-FR2-<br>CDR2-FR3-CDR3-FR4<br>atgtacttgggactgagctgtgtatttcttgtggctcttttgaatggtgtccagtgtcaggtgcagct<br>gtagagaccggggaggcttggtgaggcctggaaattctctgaaactctcctgtgttacctcg*ggat<br>tcactttcagtaactaccggatgcact*ggcttcgccagcctccagggaagaggctggagtggattgc*g<br>taattacagtcaaatctgataattatggagcaaattttgcagagtctgtgaaagg*agattcactattt<br>caagagatgattcaaaaagcagtgtctacctgcagatgaacagattaagagaggaagacactgccact<br>tattattgt*agtagaggtagtggcccagggtttgcttac*tggggccaagggactctggtcactgtctc<br>t | SEQ ID NO: 118 |
| | 37A3 heavy chain VH: DNA sequence: CDR1<br>ggattcactttcagtaactaccggatgcac | SEQ ID NO: 119 |
| | 37A3 heavy chain VH: DNA sequence: CDR2<br>gtaattacagtcaaatctgataattatggagcaaattttgcagagtctgtgaaaggc | SEQ ID NO: 120 |
| | 37A3 heavy chain VH: DNA sequence: CDR3<br>agtagaggtagtggcccagggtttgcttac | SEQ ID NO: 121 |
| | 37A3 heavy chain VH: Amino acid sequence: Leader sequence-FR1-CDR1-<br>FR2-CDR2-FR3-CDR3-FR4<br>MYLGLSCVFLVALLNGVQC<u>QVQLVETGGGLVRPGNSLKLSCVTS</u>*GFTFSNYRMH*<u>WLRQPPGLEIKRA</u><br><u>DKRLEWIA</u>*VITVKSDNYGANFAESVKG*<u>RFTISRDDSKSSVYLQMNRLREEDTATYYC</u>*SRGSGPGFAY*<br><u>WGQGTLVTVS</u> | SEQ ID NO: 122 |
| | 37A3 heavy chain VH: Amino acids sequence: FR1<br>QVQLVETGGGLVRPGNSLKLSCVTS | SEQ ID NO: 123 |
| | 37A3 heavy chain VH: Amino acid sequence: CDR1<br>GFTFSNYRMH | SEQ ID NO: 124 |
| | 37A3 heavy chain VH: Amino acid sequence: FR2<br>WLRQPPGKRLEWIA | SEQ ID NO: 125 |
| | 37A3 heavy chain VH: Amino acid sequence: CDR2<br>VITVKSDNYGANFAESVKG | SEQ ID NO: 126 |
| | 37A3 heavy chain VH: Amino acid sequence: FR3<br>RFTISRDDSKSSVYLQMNRLREEDTATYYC | SEQ ID NO: 127 |

TABLE 4-continued mAb sequences

| Clone | Sequence | SEQ ID NO. |
|---|---|---|
| | 37A3 heavy chain VH: Amino acid sequence: CDR3<br>SRGSGPGFAY | SEQ ID NO: 128 |
| | 37A3 heavy chain VH: Amino acid sequence: FR4<br>WGQGTLVTVS | SEQ ID NO: 129 |
| | 37A3 light chain VL: DNA sequence: Leader sequence-FR1-CDR1-FR2-<br>CDR2-FR3-CDR3-FR4<br>atgggcttcaagatggagtcacagactcaggtcctcatctccttgctgttctgggtatctggtacctg<br>tggggacattgtgatgacacagtctccatcctccctgagtgtgtcagcaggagagaaggtcactatga<br>gctgc*aagtccagtcagagtctgttaaacagtggaaatcaaaagaactacttggcc*tggtaccagcag<br>aaaccagggcagcctcctaaactgttgatctac*gggcatccactagggaatct*ggggtccctgatcgc<br>ttcacaggcagtggatctggaaccgatttcactcttaccatcagcagtgtgcaggctgaagacctggc<br>agtttattactgt*cagaatgatcatagttatccattcacg*tcggctcggggacaaagttggaaataaa<br>a | SEQ ID NO: 130 |
| | 37A3 light chain VL: DNA sequence: CDR1<br>aagtccagtcagagtctgttaaacagtggaaatcaaaagaactacttggcc | SEQ ID NO: 131 |
| | 37A3 light chain VL: DNA sequence: CDR2<br>ggggcatccactagggaatct | SEQ ID NO: 132 |
| | 37A3 light chain VL: DNA sequence: CDR3<br>cagaatgatcatagttatccattcacg | SEQ ID NO: 133 |
| | 37A3 light chain VL: Amino acid sequence: Leader sequence-FR1-CDR1-<br>FR2-CDR2-FRR3-CDR3-FR4<br>MGFKMESQTQVLISLLFWVSGTCG<u>DIVMTQSPSSLSVSAGEKVTMSC</u>*KSSQSLLNSGNQKNYLA*<u>WYQQ</u><br><u>KPGQPPKLLIY</u>*GASTRES*<u>GVPDRFTGSGSGTDFTLTISSVQAEDLAVYYC</u>*QNDHSYPFT*<u>FGSG</u><br><u>TKLEIK</u> | SEQ ID NO: 134 |
| | 37A3 light chain VL: Amino acid sequence: FR1<br>DIVMTQSPSSLSVSAGEKVTMSC | SEQ ID NO: 135 |
| | 37A3 light chain VL: Amino acid sequence: CDR1<br>KSSQSLLNSGNQKNYLA | SEQ ID NO: 136 |
| | 37A3 light chain VL: Amino acid sequence: FR2<br>WYQQKPGQPPKLLIY | SEQ ID NO: 137 |
| | 37A3 light chain VL: Amino acid sequence: CDR2<br>GASTRES | SEQ ID NO: 138 |
| | 37A3 light chain VL: Amino acid sequence: FR3<br>GVPDRFTGSGSGTDFTLTISSVQAEDLAVYYC | SEQ ID NO: 139 |
| | 37A3 light chain VL: Amino acid sequence: CDR3<br>QNDHSYPFT | SEQ ID NO: 140 |
| | 37A3 light chain VL: Amino acid sequence: FR4<br>FGSGTKLEIK | SEQ ID NO: 141 |
| 12A10 | 12A10 heavy chain VH: DNA sequence: Leader sequence-FR1-CDR1-FR2-<br>CDR2-FR3-CDR3-FR4<br>tggggaattccatggaatggagctgggttttctcttcctcctgtcaataactacaggtgtccactcc<br>caggcttatctacagcagtctggggctgagctggtgaggtctggggcctcagtgaagatgtcctgcaa<br>ggcttct*ggctacacatttaccagttacaatatgcac*tgggtaaagcagacacctggacagggcctgg<br>aatggattgga*tatattttcctggagatggtggtactaactacaatcagaagttcaagggc*aaggcc<br>acattgactgcagacacatcctccagcacagcctacatgcagatcagcagcctgacatctgaagactc<br>tgcggtctatttctgt*gcaagatcgggctactatggtaactacgaagggtttgcttac*tggggccaag<br>ggactctggtcactgtctctgcag | SEQ ID NO: 142 |
| | 12A10 heavy chain VH: DNA sequence: CDR1<br>ggctacacatttaccagttacaatatgcac | SEQ ID NO: 143 |
| | 12A10 heavy chain VH: DNA sequence: CDR2<br>tatattttcctggagatggtggtactaactacaatcagaagttcaagggc | SEQ ID NO: 144 |
| | 12A10 heavy chain VH: DNA sequence: CDR3<br>gcaagatcgggctactatggtaactacgaagggtttgcttac | SEQ ID NO: 145 |
| | 12A10 heavy chain VH: Amino acid sequence: Leader sequence-FR1-CDR1-<br>FR2-CDR2-FR3-CDR3-FR4<br>MEWSWVFLFLLSITTGVHS<u>QAYLQQSGAELVRSGASVKMSCKAS</u>*GYTFTSYMH*<u>WVKQTPGQGLEWIG</u>Y<br>*IFPGDGGTNYNQKFKG*<u>KATLTADTSSSTAYMQISSLTSEDSAVYFCAR</u>*SGYYGNYEGFAY*<u>WGQGNTLV</u><br><u>TVSA</u> | SEQ ID NO: 146 |
| | 12A10 heavy chain VH: Amino acids sequence: FR1<br>QAYLQQSGAELVRSGASVKMSCKAS | SEQ ID NO: 147 |
| | 12A10 heavy chain VH: Amino acid sequence: CDR1<br>GYTFTSYNMH | SEQ ID NO: 148 |
| | 12A10 heavy chain VH: Amino acid sequence: FR2<br>WVKQTPGQGLEWIG | SEQ ID NO: 149 |
| | 12A10 heavy chain VH: Amino acid sequence: CDR2<br>YIFPGDGGTNYNQKFKG | SEQ ID NO: 150 |
| | 12A10 heavy chain VH: Amino acid sequence: FR3<br>KATLTADTSSSTAYMQISSLTSEDSAVYFC | SEQ ID NO: 151 |
| | 12A10 heavy chain VH: Amino acid sequence: CDR3<br>ARSGYYGNYEGFAY | SEQ ID NO: 152 |
| | 12A10 heavy chain VH: Amino acid sequence: FR4<br>WGQGTLVTVSA | SEQ ID NO: 153 |
| | 12A10 light chain VL: DNA sequence: Leader sequence-FR1-CDR1-FR2-<br>CDR2-FR3-CDR3-FR4<br>cttccatgtatgcatctctaggagagagagtcactatcacttgc*aaggcgagtcaggacattaatagc* | SEQ ID NO: 154 |

TABLE 4-continued mAb sequences

| Clone | Sequence | SEQ ID NO. |
|---|---|---|
| | *tatttaagc*ggttccagcagaaaccagggaaatctcctaagaccctgatctat*gctgcaaacagattg gtagat*ggggtcccatcaaggttcagtggcagtggatctgggcaagattattctctcaccatcagcag cctggaatatgaagatatgggaatttattattgt*ctacattatgctgagtttccgtacacg*ttcggag ggggggaccaagctggaaataaaacgggctg | |
| | 12A10 light chain VL: DNA sequence: CDR1<br>aaggcgagtcaggacattaatagctatttaagc | SEQ ID NO: 155 |
| | 12A10 light chain VL: DNA sequence: CDR2<br>cgtgcaaacagattggtagat | SEQ ID NO: 156 |
| | 12A10 light chain VL: DNA sequence: CDR3<br>ctacattatgctgagtttccgtacacg | SEQ ID NO: 157 |
| | 12A10 light chain VL: Amino acid sequence: FR1-CDR1-FR2-CDR2-FR3-CDR3-FR4<br>SMYASLGERVTITC*KASQDINSYLS*WFQQKPGKSPKTLIY*RANRLVD*GVPSRFSGSGSGQDYSLTISS<br>LEYEDMGIYYC*LHYAEFPYT*FGGGTKLEIKRA | SEQ ID NO: 158 |
| | 12A10 light chain VL: Amino acid sequence: FR1<br>SMYASLGERVTITC | SEQ ID NO: 159 |
| | 12A10 light chain VL: Amino acid sequence: CDR1<br>KASQDINSYLS | SEQ ID NO: 160 |
| | 12A10 light chain VL: Amino acid sequence: FR2<br>WFQQKPGKSPKTLIY | SEQ ID NO: 161 |
| | 12A10 light chain VL: Amino acid sequence: CDR2<br>RANRLVD | SEQ ID NO: 162 |
| | 12A10 light chain VL: Amino acid sequence: FR3<br>GVPSRFSGSGSGQDYSLTISSLEYEDMGIYYC | SEQ ID NO: 163 |
| | 12A10 light chain VL: Amino acid sequence: CDR3<br>LHYAEFPYT | SEQ ID NO: 164 |
| | 12A10 light chain VL: Amino acid sequence: FR4<br>FGGGTKLEIKRA | SEQ ID NO: 165 |
| 3B7 | 3B7 heavy chain VH: DNA sequence: Leader sequence-FR1-CDR1-FR2-CDR2-FR3-CDR3-FR4<br>tactagtcgacatgggatggagctgtatcatgttctttctggtagcaacagctacaggtgtgcactcc caggtccagctgcagcagtctgggcctgaggtggtgaggcctggggtctcagtgaagatttcctgcaa gggtcc*ggctacacattcagtgattatactatgcac*gggtgaagcagagtcatgcaaagagtctag agtggattgga*gttattagtactgacaatggtaatacaaactataaccagaagtttaagggc*aaggcc acaatgactgtagacaaatcctccagcactgcctatatggaacttgccagattgacatctgaggattc tgccatctattactgt*gcaagggaggcccgggactacggtagtatctatgctttggactac*tgggtc aaggaacctcagtcaccgtctcag | SEQ ID NO: 166 |
| | 3B7 heavy chain VH: DNA sequence: CDR1<br>ggctacacattcagtgattatactatgcac | SEQ ID NO: 167 |
| | 3B7 heavy chain VH: DNA sequence: CDR2<br>gttattagtactgacaatggtaatacaaactataaccagaagtttaagggc | SEQ ID NO: 168 |
| | 3B7 heavy chain VH: DNA sequence: CDR3<br>gcaagggaggcccgggactacggtagtatctatgctttggactac | SEQ ID NO: 169 |
| | 3B7 heavy chain VH: Amino acid sequence: Leader sequence-FR1-CDR1-FR2-CDR2-FR3-CDR3-FR4<br>MGWSCIMFFLVATATGVHSQVQLQQSGPEVVRPGVSVKISCKGS*GYTFSDYTMH*WVKQSHAKSLEWIG<br>*VISTDNGNTNYNQKFKG*KATMTVDKSSSTAYMELARLTSEDSAIYYC*AREARDYGSIYALDY*WGQGTS<br>VTVSQ | SEQ ID NO: 170 |
| | 3B7 heavy chain VH: Amino acids sequence: FR1<br>QVQLQQSGPEVVRPGVSVKISCKGS | SEQ ID NO: 171 |
| | 3B7 heavy chain VH: Amino acid sequence: CDR1<br>GYTFSDYTMH | SEQ ID NO: 172 |
| | 3B7 heavy chain VH: Amino acid sequence: FR2<br>WVKQSHAKSLEWIG | SEQ ID NO: 173 |
| | 3B7 heavy chain VH: Amino acid sequence: CFR2<br>VISTDNGNTNYNQKFKG | SEQ ID NO: 174 |
| | 3B7 heavy chain VH: Amino acid sequence: FR3<br>KATMTVDKSSSTAYMELARLTSEDSAIYYC | SEQ ID NO: 175 |
| | 3B7 heavy chain VH: Amino acid sequence: CDR3<br>AREARDYGSIYALDY | SEQ ID NO: 176 |
| | 3B7 heavy chain VH: Amino acid sequence: FR4<br>WGQGTSVTVS | SEQ ID NO: 177 |
| | 3B7 light chain VL: DNA sequence: Leader sequence-FR1-CDR1-FR2-CDR2-FR3-CDR3-FR4<br>tattactagtcgacatggttcttatgttgctgctgctatggcttacaggtgccagatgtgacatccag atgactcagtctccagcctcccatctgcatctgtgggagaaactgtcaccatcacatgt*cgagcaag tgggaatattcacaattatt*tagcatggtatcagcagaaacagggaaaatctcctcagctcctggtct ata*atgcaaaaaccttagcagat*ggtgtgccatcaaggttcagtggcagtggatcaggaacacaatat tctctcaagatcaacaatctgcagcctgaggatttgggaattattactgt*caacattttggagtac tccgtggacg*tcggtggaggcaccaagctggaaatcaaacgggctgatgctgca | SEQ ID NO: 178 |
| | 3B7 light chain VL: DNA sequence: CDR1<br>cgagcaagtgggaatattcacaattat | SEQ ID NO: 179 |
| | 3B7 light chain VL: DNA sequence: CDR2<br>aatgcaaaaaccttagcagat | SEQ ID NO: 180 |

TABLE 4-continued mAb sequences

| Clone | Sequence | SEQ ID NO. |
|---|---|---|
| | 3B7 light chain VL: DNA sequence: CDR3<br>caacatttttggagtactccgtggacg | SEQ ID NO: 181 |
| | 3B7 light chain VL: Amino acid sequence: Leader sequence-FR1-CDR1-<br>FR2-CDR2-FR3-CDR3-FR4<br>MVLMLLLLWLTGARCDIQMTQSPASLSASVGETVTITC*RASGNIHNY*LAWYQQKQGKSPQLLVY*NAKT<br>LAD*GVPSRFSGSGSGTQYSLKINNLQPEDFGNYYC*QHFWSTPWT*FGGGTKLEIKRADAA | SEQ ID NO: 182 |
| | 3B7 light chain VL: Amino acid sequence: FR1<br>DIQMTQSPASLSASVGETVTITC | SEQ ID NO: 183 |
| | 3B7 light chain VL: Amino acid sequence: CDR1<br>RASGNIHNY | SEQ ID NO: 184 |
| | 3B7 light chain VL: Amino acid sequence: FR2<br>LAWYQQKQGKSPQLLVY | SEQ ID NO: 185 |
| | 3B7 light chain VL: Amino acid sequence: CDR2<br>NAKTLAD | SEQ ID NO: 186 |
| | 3B7 light chain VL: Amino acid sequence: FR3<br>GVPSRFSGSGSGTQYSLKINNLQPEDFGNYYC | SEQ ID NO: 187 |
| | 3B7 light chain VL: Amino acid sequence: CDR3<br>QHFWSTPWT | SEQ ID NO: 188 |
| | 3B7 light chain VL: Amino acid sequence: FR4<br>FGGGTKLEIKRADAA | SEQ ID NO: 189 |
| 11G8 | 11G8 heavy chain VH: DNA sequence: Leader sequence-FR1-CDR1-FR2-<br>CDR2-FR3-CDR3-FR4<br>tactagtcgaatgggatggagctgtatcatgttctttctggtagctacagctacaggtgtgcactcc<br>aggtccagctgcagcagtctgggcctgacctggtgaggcctgggggtctcagtgaagatttcctgcaag<br>ggttcc*ggctacacattcactgattatgctatgcac*tgggtaaagcagagtcatgcaaagagtctaga<br>gtggattgga*ttattagtactgactctggtactacaaactacaaccagaagttt*aagggcaaggccac<br>aatgactgtagacaaatcctccagtacagcctatatggaccttgccagattgacatctgaggattct<br>ccatctattactgt*gcaagagacagctcgtactacgtgcgattttcttac*tggggccaaggaactctg<br>gtcactgtctctgcag | SEQ ID NO: 190 |
| | 11G8 heavy chain VH: DNA sequence: CDR1<br>ggctacacattcactgattatgctatgcac | SEQ ID NO: 191 |
| | 11G8 heavy chain VH: DNA sequence: CDR2<br>gttattagtactgactctggtactacaaactacaaccagaagttt | SEQ ID NO: 192 |
| | 11G8 heavy chain VH: DNA sequence: CDR3<br>gcaagagacagctcgtactacgtgcgattttcttac | SEQ ID NO: 193 |
| | 11G8 heavy chain VH: Amino acid sequence: Leader sequence-FR1-CDR1-<br>FR2-CDR2-FR3-CDR3-FR4<br>MGWSCIMFFLVATATGVHSQVQLQQSGPDLVRPGVSVKISCKGS*GYTFTDYAMH*WVKQSHAKSLEWIG<br>*VISTDSGTTYNYNQKF*KGKATMTVDKSSSTAYMDLARLTSEDSAIYYC*ARDSSYYVRFSY*WGQGTLVT<br>VSA | SEQ ID NO: 194 |
| | 11G8 heavy chain VH: Amino acids sequence: FR1<br>QVQLQQSGPDLVRPGVSVKISCKGS | SEQ ID NO: 195 |
| | 11G8 heavy chain VH: Amino acid sequence: CDR1<br>GYTFTDYAMH | SEQ ID NO: 196 |
| | 11G8 heavy chain VH: Amino acid sequence: FR2<br>WVKQSHAKSLEWIG | SEQ ID NO: 197 |
| | 11G8 heavy chain VH: Amino acid sequence: CDR2<br>VISTDSGTTYNYNQKF | SEQ ID NO: 198 |
| | 11G8 heavy chain VH: Amino acid sequence: FR3<br>KGKATMTVDKSSSTAYMDLARLTSEDSAIYYC | SEQ ID NO: 199 |
| | 11G8 heavy chain VH: Amino acid sequence: CDR3<br>ARDSSYYVRFSY | SEQ ID NO: 200 |
| | 11G8 heavy chain VH: Amino acid sequence: FR4<br>WGQGTLVTVSA | SEQ ID NO: 201 |
| | 11G8 light chain VL: DNA sequence: Leader sequence-FR1-CDR1-FR2-<br>CDR2-FR3-CDR3-FR4<br>tactagttgtatattggcttcaagatggagtcacagacccaggtcttcgtatttctactgctctgtgt<br>gtctggtgctcatggagtattgtgatgacccagactcccaaattcctgcttgtttcagtaggagaa<br>gggttaccataacctgt*aaggccagtcagagtgtgagtaatgat*gtagcttggtaccaacagaagcca<br>gggcagtctcctaaaactgctaatatac*tatgcatccaatcgctacact*ggagtccctgatcgcttcac<br>tggcagtggatatgggacggatttcactttcaccatcagcactgtgcaggctgaagacctggcagttt<br>atttctgtcagcaggattat*agttctccgtggacg*ttcggtggaggcaccaagctggaaatcaaacgg<br>gctgatgctgca | SEQ ID NO: 202 |
| | 11G8 light chain VL: DNA sequence: CDR1<br>aaggccagtcagagtgtgagtaatgat | SEQ ID NO: 203 |
| | 11G8 light chain VL: DNA sequence: CDR2<br>tatgcatccaatcgctacact | SEQ ID NO: 204 |
| | 11G8 light chain VL: DNA sequence: CDR3<br>agttctccgtggacg | SEQ ID NO: 205 |
| | 11G8 light chain VL: Amino acid sequence: Leader sequence-FR1-CDR1-<br>FR2-CDR2-FR3-CDR3-FR4<br>MESQTQVFVFLLLCVSGAHGSIVMTQTPKFLLSVGDRVTITC*KASQSVSNDV*AWYQQKPGQSPKLLI<br>YY*ASNRYT*GVPDRFTGSGYGTDFTFTISTVQAEDLAVYFC*QQDYSSPWT*FGGGTKLEIKRADAA | SEQ ID NO: 206 |
| | 11G8 light chain VL: Amino acid sequence: FR1<br>SIVMTQTPKFLLSVGDRVTITC | SEQ ID NO: 207 |

TABLE 4-continued mAb sequences

| Clone | Sequence | SEQ ID NO. |
|---|---|---|
| | 11G8 light chain VL: Amino acid sequence: CDR1<br>KASQSVSND | SEQ ID NO: 208 |
| | 11G8 light chain VL: Amino acid sequence: FR2<br>VAWYQQKPGQSPKLLIY | SEQ ID NO: 209 |
| | 11G8 light chain VL: Amino acid sequence: CDR2<br>YASNRYT | SEQ ID NO: 210 |
| | 11G8 light chain VL: Amino acid sequence: FR3<br>GVPDRFTGSGYGTDFTFTISTVQAEDLAVYFC | SEQ ID NO: 211 |
| | 11G8 light chain VL: Amino acid sequence: CDR3<br>QQDYSSPWT | SEQ ID NO: 212 |
| | 11G8 light chain VL: Amino acid sequence: FR4<br>FGGGTKLEIKRADAA | SEQ ID NO: 213 |
| 14F8 | 14F8 heavy chain VH: DNA sequence: Leader sequence-FR1-CDR1-FR2-CDR2-FR3-CDR3-FR4<br>tacttgtcgacatgggatggagctgtatcatgttctttctggtagcaacagctacaggtgtgcactcc<br>caggtccagctgcagcagtctgggcctgaggtggtgaggcctggggtctcagtgaagatttcctgcaa<br>gggttcc*ggctacacattcactgattatactatgcac*tgggtgaagcagagtcatgcaaagagtctag<br>agtggattgga*gttattagtacttacaatggtaatacaaactacaaccagaactttgagggc*aaggcc<br>acaatgactgtagacaaatcctccagcacagcctatatggaacttgccagattgacatctgaggattc<br>tgccatctattactgt*gcaagagagcggggggggggatggttactacagtgctgtggactac*tggggtc<br>aaggaacctcagtcaccgtctctcag | SEQ ID NO: 214 |
| | 14F8 heavy chain VH: DNA sequence: CDR1<br>ggctacacattcactgattatactatgcac | SEQ ID NO: 215 |
| | 14F8 heavy chain VH: DNA sequence: cdr2<br>gttattagtacttacaatggtaatacaaactacaaccagaactttgagggc | SEQ ID NO: 216 |
| | 14F8 heavy chain VH: DNA sequence: cdr3<br>gcaagagagcggggggggggatggttactacagtgctgtggactac | SEQ ID NO: 217 |
| | 14F8 heavy chain VH: Amino acid sequence: Leader sequence-FR1-CDR1-FR2-CDR2-FR3-CDR3-FR4<br>MGWSCIMFFLVATATGVHS<u>QVQLQQSGPEVVRPGVSVKISCKGS</u>*GYTFTDYTMH*<u>WVKQSHAKSLEWIG</u><br>*VISTYNGNTNYNQNFEG*<u>KATMTVDKSSSTAYMELARLTSEDSAIYYC</u>*ARERGGDYYSAVDY*<u>WGQGTS</u><br><u>VTVSQ</u> | SEQ ID NO: 218 |
| | 14F8 heavy chain VH: Amino acids sequence: FR1<br>QVQLQQSGPEVVRPGVSVKISCKGS | SEQ ID NO: 219 |
| | 14F8 heavy chain VH: Amino acid sequence: CDR1<br>GYTFTDYTMH | SEQ ID NO: 220 |
| | 14F8 heavy chain VH: Amino acid sequence: FR2<br>WVKQSHAKSLEWIG | SEQ ID NO: 221 |
| | 14F8 heavy chain VH: Amino acid sequence: CDR2<br>VISTYNGNTNYNQNFEG | SEQ ID NO: 222 |
| | 14F8 heavy chain VH: Amino acid sequence: FR3<br>KATMTVDKSSSTAYMELARLTSEDSAIYYC | SEQ ID NO: 223 |
| | 14F8 heavy chain VH: Amino acid sequence: CDR3<br>ARERGGDYYSAVDY | SEQ ID NO: 224 |
| | 14F8 heavy chain VH: Amino acid sequence: FR4<br>WGQGTSVTVS | SEQ ID NO: 225 |
| | 14F8 light chain VL: DNA sequence: FR1-CDR1-FR2-CDR2-FR3-CDR3-FR4<br>ccaaaattcctgcttgtatcagcaggagacaggttaccataacctgc*aaggccagtcagagtgtgatt*<br>*aatgat*gtagcttggtaccaacagaagcagggcagtcctcctaaactgctgatatac*tatgcatccaa*<br>*tacact*ggagtccctggagtcgcttcactggcagtggatatgggacggattctcactttccaccatcagc<br>tgtgcaggctgaagacctggcagtttatttctgt*cagcaggattatagctctccgtacacg*ttcggag<br>gggggaccaagctggaaataaaacgggctgatgctgc | SEQ ID NO: 226 |
| | 14F8 light chain VL: DNA sequence: CDR1<br>aaggccagtcagagtgtgattaatgat | SEQ ID NO: 227 |
| | 14F8 light chain VL: DNA sequence: CDR2<br>tatgcatccaatcgctacact | SEQ ID NO: 228 |
| | 14F8 light chain VL: DNA sequence: CDR3<br>cagcaggattatagctctccgtacacg | SEQ ID NO: 229 |
| | 14F8 light chain VL: Amino acid sequence: FR1-CDR1-FR2-CDR2-FR3-CDR3-FR4<br><u>KFLLVSAGDRVTITC</u>*KASQCVIND*<u>VAWYQQKPGQSPKLLIY</u>*YASNRYT*<u>GVPDRFTGSGYGTDFTFTIS</u><br><u>TVQAEDLAVYFC</u>*QQDYSSPYT*<u>FGGGTKLEIKRADA</u> | SEQ ID NO: 230 |
| | 14F8 light chain VL: Amino acid sequence: FR1<br>KFLLVSAGDRVTITC | SEQ ID NO: 231 |
| | 14F8 light chain VL: Amino acid sequence: CDR1<br>KASQSVIND | SEQ ID NO: 232 |
| | 14F8 light chain VL: Amino acid sequence: FR2<br>VAWYQQKPGQSPKLLIY | SEQ ID NO: 233 |
| | 14F8 light chain VL: Amino acid sequence: CDR2<br>YASNRYT | SEQ ID NO: 234 |
| | 14F8 light chain VL: Amino acid sequence: FR3<br>GVPDRFTGSGYGTDFTFTISTVQAEDLAVYFC | SEQ ID NO: 235 |
| | 14F8 light chain VL: Amino acid sequence: CDR3<br>QQDYSSPYT | SEQ ID NO: 236 |

TABLE 4-continued mAb sequences

| Clone | Sequence | SEQ ID NO. |
|---|---|---|
| | 14F8 light chain VL: Amino acid sequence: FR4<br>FGGGTKLEIKRADA | SEQ ID NO: 237 |
| 15D2 | 15D2 heavy chain VH: DNA sequence: Leader sequence-FR1-CDR1-FR2-<br>CDR2-FR3-CDR3-FR4<br>tggggaattcatggagttgggggttcagcttgattttccttgtccttgttttaaaaggtgtccagtgtg<br>aagtgatgctggtggagtctgggggaggcttagtgaagcctggagggtccctgaaactctcctgtgca<br>gcctct*ggattcactttcagtaactatgccatgtct*gggtcgccagactccggagaagaggctggag<br>tgggtcgca*acctctcttagtggtggtaattacacctactatccagacagtgtgaagggg*cgattcac<br>catctccagagacaatgccaagagcaccctgtacctgcaaatgagcagtctgaggtctgaggacacg<br>ccatgtattactgt*gtaatcccccaaggtagtagtccttttgactat*ggggccaaggcaccactctca<br>cagtctctcag | SEQ ID NO: 238 |
| | 15D2 heavy chain VH: DNA sequence: CDR1<br>ggattcactttcagtaactatgccatgtct | SEQ ID NO: 239 |
| | 15D2 heavy chain VH: DNA sequence: CDR2<br>acctctcttagtggtggtaattacacctactatccagacagtgtgaagggg | SEQ ID NO: 240 |
| | 15D2 heavy chain VH: DNA sequence: CDR3<br>gtaatcccccaaggtagtagtccttttgactat | SEQ ID NO: 241 |
| | 15D2 heavy chain VH: Amino acid sequence: Leader sequence-FR1-CDR1-<br>FR2-CDR2-FR3-CDR3-FR4<br>MELGFSLIFLVLVLKGVQC*EVMLVESGGGLVKPGGSLKLSCAAS*GFTFSNYAM*WVRQTPEKRLEWVAT<br>SLSGGNYTYYPDSVKG*RFTISRDNAKSTLYLQMSSLRSEDTAMYYC*VIPQGSSPFDY*WGQGTTLTVS* | SEQ ID NO: 242 |
| | 15D2 heavy chain VH: Amino acids sequence: FR1<br>EVMLVESGGGLVKPGGSLKLSCAAS | SEQ ID NO: 243 |
| | 15D2 heavy chain VH: Amino acid sequence: CDR1<br>GFTFSNYAMS | SEQ ID NO: 244 |
| | 15D2 heavy chain VH: Amino acid sequence: FR2<br>WVRQTPEKRLEWA | SEQ ID NO: 245 |
| | 15D2 heavy chain VH: Amino acid sequence: CDR2<br>TSLSGGNYTYYPDSVKG | SEQ ID NO: 246 |
| | 15D2 heavy chain VH: Amino acid sequence: FR3<br>RFTISRDNAKSTLYLQMSSLRSEDTAMYYC | SEQ ID NO: 247 |
| | 15D2 heavy chain VH: Amino acid sequence: CDR3<br>VIPQGSSPFDY | SEQ ID NO: 248 |
| | 15D2 heavy chain VH: Amino acid sequence: FR4<br>WGQGTTLTVS | SEQ ID NO: 249 |
| | 15D2 light chain VL: DNA sequence: Leader sequence-FR1-CDR1-FR2-<br>CDR2-FR3-CDR3-FR4<br>tactagtcgacatgggcttcaagatggagtcacagattcaggttttggtattttactgctctgtgtg<br>tgtggtggtcatgggagtattgtgatgacccagactcccaaattcccattgtttcagtaggagacag<br>ggttaccataacctgt*aaggccagtcagagtgtgaaaaatgatgtagca*tggtaccaacagaagcca<br>ggcagctctggtaaaatgttaatatat*tatgcatgcaatcgctacacg*gagtccttgatcgctcact<br>gtcagtggatatgtgacggatttcactttcaccatcaccactgtgcaggctgaagacctggcagttta<br>cttttgt*cagcaggatcatagttatccgtggacg*ttcggtgctgggaccaagctggagctgaaacggg<br>ctgatgctg | SEQ ID NO: 250 |
| | 15D2 light chain VL: DNA sequence: CDR1<br>aaggccagtcagagtgtgaaaaatgatgtagca | SEQ ID NO: 251 |
| | 15D2 light chain VL: DNA sequence: CDR2<br>tatgcatgcaatcgctacacg | SEQ ID NO: 252 |
| | 15D2 light chain VL: DNA sequence: CDR3<br>cagcaggatcatagttatccgtggacg | SEQ ID NO: 253 |
| | 15D2 light chain VL: Amino acid sequence: Leader sequence-FR1-CDR1-<br>FR2-CDR2-FR3-CDR3-FR4<br>MGFKMESQIQVLVLFLLLCVCGHGSIVMTQTPKFPIVSVGDRVTITC*KASQSVKNDVA*WYQQKPGQSG<br>KMLIY*YACNRYT*GVLDRFTVSGYVTDFTFTITTVQAEDLAVYFC*QQDHSYPWT*FGAGTKLELK* | SEQ ID NO: 254 |
| | 15D2 light chain VL: Amino acid sequence: FR1<br>SIVMTQTPKFPIVSVGDRVTITC | SEQ ID NO: 255 |
| | 15D2 light chain VL: Amino acid sequence: CDR1<br>KASQSVKNDVA | SEQ ID NO: 256 |
| | 15D2 light chain VL: Amino acid sequence: FR2<br>WYQQKPGQSGKMLIY | SEQ ID NO: 257 |
| | 15D2 light chain VL: Amino acid sequence: CDR2<br>YACNRYT | SEQ ID NO: 258 |
| | 15D2 light chain VL: Amino acid sequence: FR3<br>GVLDRFTVSGYVTDFTFTITTVQAEDLAVYFC | SEQ ID NO: 259 |
| | 15D2 light chain VL: Amino acid sequence: CDR3<br>QQDHSYPWT | SEQ ID NO: 260 |
| | 15D2 light chain VL: Amino acid sequence: FR4<br>FGAGTKLELK | SEQ ID NO: 261 |
| 29H47 | 29H7 heavy chain VH: DNA sequence: Leader sequence-FR1-CDR1-FR2-<br>CDR2-FR3-CDR3-FR4<br>tattactagtcgccatgggatggagctgtatcatgttcttctggtagcaacagctacaggtgtgcac<br>tcccaggtccagctgcagcagtctgggcctgaggtggtgaggcctggggtctcagtgaagatttcctg<br>caagggttcc*ggctacacattcactgattatgttatgcac*tgggtgaagcagagtcatggaaagagtc<br>tagagtggattgga*gttattagtacttacaatggtaatacaaactacaaccagaagttaagggc*aagg | SEQ ID NO: 262 |

TABLE 4-continued mAb sequences

| Clone | Sequence | SEQ ID NO. |
|---|---|---|
| | ccacaatgactgtagacaaatcctccagcacagcctatatggaacttgccagattgacatctgaggat<br>tctgccatctattactgt*gcaagagagagggggggggatggttactacagtgctatggactac*tgggg<br>tcaaggaaccctcagtcaccgtctcctcag | |
| | 29H7 heavy chain VH: DNA sequence: CDR1<br>ggctacacattcactgattatgttatgcac | SEQ ID NO: 263 |
| | 29H7 heavy chain VH: DNA sequence: CDR2<br>gttattagtacttacaatggtaatacaaactacaaccagaagtttaagggc | SEQ ID NO: 264 |
| | 29H7 heavy chain VH: DNA sequence: CDR3<br>gcaagagagggggggggatggttactacagtgctatggactac | SEQ ID NO: 265 |
| | 29H7 heavy chain VH: Amino acid sequence: Leader sequence-FR1-CDR1-<br>FR2-CDR2-FR3-CDR3-FR4<br>MGWSCIMFFLVATATGVHS<u>QVQLQQSGPEVVRPGVSVKISCKGS</u>*GYTFTDYVMH*<u>WVKQSHGKSLEWIG</u><br>*VISTYNGNTNYNQKFKG*<u>KATMTVDKSSSTAYMELARLTSEDSAIYYC</u>AR*ERGGDGYYSAMDY*<u>WGQGTS</u><br><u>VTVSS</u> | SEQ ID NO: 266 |

| Clone | Sequence | SEQ ID NO. |
|---|---|---|
| | 29H7 heavy chain VH: Amino acids sequence: FR1<br>QVQLQQSGPEVVRPGVSVKISCKGS | SEQ ID NO: 267 |
| | 29H7 heavy chain VH: Amino acid sequence: CDR1<br>GYTFTDYVMH | SEQ ID NO: 268 |
| | 29H7 heavy chain VH: Amino acid sequence: FR2<br>WVKQSHGKSLEWIG | SEQ ID NO: 269 |
| | 29H7 heavy chain VH: Amino acid sequence: CDR2<br>VISTYNGNTNYNQKFKG | SEQ ID NO: 270 |
| | 29H7 heavy chain VH: Amino acid sequence: FR3<br>KATMTVDKSSSTAYMELARLTSEDSAIYYC | SEQ ID NO: 271 |
| | 29H7 heavy chain VH: Amino acid sequence: CDR3<br>ARERGGDGYYSAMDY | SEQ ID NO: 272 |
| | 29H7 heavy chain VH: Amino acid sequence: FR4<br>WGQGTSVTVSS | SEQ ID NO: 273 |
| | 29H7 light chain VL: DNA sequence: Leader sequence-FR1-CDR1-FR2-<br>CDR2-FR3-CDR3-FR4<br>acaggagccgggtgttggtatttctactgctctgtgtgtctggtgctcatgggagtattgtgatgacc<br>cagactcccaaattcctgcttgtttcagcaggagacagggttaccatagcctgc*aaggccagtcagag*<br>*tgtgattaataat*gtagcttggtaccaacagaagccagggcagtctcctgaactgctgatatac*tatg*<br>*catccaatcgctacact*ggagtccctgatcgcttcactggcagtggatatgggacggatttcactttc<br>accatcaccactgtgcaggctgaagacctggcagtttatttctgt*cagcaggattatagctctccgta*<br>*cacacg*ttcggagggggaaccaagctggaaataaaacgggctgatgctcga | SEQ ID NO: 274 |
| | 29H7 light chain VL: DNA sequence: CDR1<br>aaggccagtcagagtgtgattaataat | SEQ ID NO: 275 |
| | 29H7 light chain VL: DNA sequence: CDR2<br>tatgcatccaatcgctacact | SEQ ID NO: 276 |
| | 29H7 light chain VL: DNA sequence: CDR3<br>cagcaggattatagctctccgtacacacg | SEQ ID NO: 277 |
| | 29H7 light chain VL: Amino acid sequence: Leader sequence-FR1-CDR1-<br>FR2-CDR2-FR3-CDR3-FR4<br>RSRVLVFLLLCVSGAHGS<u>IVMTQTPKFLLVSAGDRVTIAC</u>*KASQSVINN*<u>VAWYQQKPGQSPELLIYY</u><u>A</u><br>*SNRYT*<u>GVPDRFTGSGYGTDFTFTITTVQAEDLAVYFC</u>*QQDYSSPYT*<u>FGGGTKLEIKRADAA</u> | SEQ ID NO: 278 |
| | 29H7 light chain VL: Amino acid sequence: FR1<br>SIVMTQTPKFLLVSAGDRVTIAC | SEQ ID NO: 279 |
| | 29H7 light chain VL: Amino acid sequence: CDR1<br>KASQSVINN | SEQ ID NO: 280 |
| | 29H7 light chain VL: Amino acid sequence: FR2<br>VAWYQQKPGQSPELLIY | SEQ ID NO: 281 |
| | 29H7 light chain VL: Amino acid sequence: CDR2<br>YASNRYT | SEQ ID NO: 282 |
| | 29H7 light chain VL: Amino acid sequence: FR3<br>GVPDRFTGSGYGTDFTFTITTVQAEDLAVYFC | SEQ ID NO: 283 |
| | 29H7 light chain VL: Amino acid sequence: CDR3<br>QQDYSSPYT | SEQ ID NO: 284 |
| | 29H7 light chain VL: Amino acid sequence: FR4<br>FGGGTKLEIKRADAA | SEQ ID NO: 285 |
| 30D10 | 30D10 heavy chain VH: DNA sequence: Leader sequence-FR1-CDR1-FR2-<br>CDR2-FR3-CDR3-FR4<br>tggggaattccaggaatggagctgggttttctcttcctgatggcagtggttacaggggtcaattcag<br>aggttcagctgcagcagtctggggctgagcttgtgaggccagggcctagtcaagttgtcctgcaaa<br>gcttct*ggcttcaactttaaagactactttatgcac*tgggtgaagcagaggcctgaacagggcctgga<br>gtggattggatg*attgatcctgaaaatggtaatactatatatgaaccgaagttccaggg*aaggccag<br>tataacagcagacacatcctccaacacagcctacctgcagctcagcagcctgacatctgaggacactg<br>ccgtctattactgt*gctagagggggggtaggtcactggtacttcgatgtc*tgggcgcagggaccacg<br>gtcaccgtctctcag | SEQ ID NO: 286 |
| | 30D10 heavy chain VH: DNA sequence: CDR1<br>ggcttcaactttaaagactactttatgcac | SEQ ID NO: 287 |
| | 30D10 heavy chain VH: DNA sequence: CDR2<br>attgatcctgaaaatggtaatactatatatgaaccgaagttccaggc | SEQ ID NO: 288 |

TABLE 4-continued mAb sequences

| Clone | Sequence | SEQ ID NO. |
|---|---|---|
| | 30D10 heavy chain VH: DNA sequence: CDR3<br>gctagagggggggtaggtcactggtacttcgatgtc | SEQ ID NO: 289 |
| | 30D10 heavy chain VH: Amino acid sequence: Leader sequence-FR1-CDR1-FR2-CDR2-FR3-CDR3-FR4<br>GEFQEWSWVFLFLMAVVTGVNSEVQLQQSGAELVRPGALVKLSCKAS_GFNFKDYFMH_WVKQRPEQGLEWIGW_IDPENGNYIYEPKFQG_KASITADTSSNTAYLQLSSLTSEDTAVYYCAR_GGVGHWYFDV_WGAGTTVTVS | SEQ ID NO: 290 |
| | 30D10 heavy chain VH: Amino acids sequence: FR1<br>EVQLQQSGAELVRPGALVKLSCKAS | SEQ ID NO: 291 |
| | 30D10 heavy chain VH: Amino acid sequence: CDR1<br>GFNFKDYFMH | SEQ ID NO: 292 |
| | 30D10 heavy chain VH: Amino acid sequence: FR2<br>WVKQRPEQGLEWIGW | SEQ ID NO: 293 |
| | 30D10 heavy chain VH: Amino acid sequence: CDR2<br>IDPENGNTIYEPKFQG | SEQ ID NO: 294 |
| | 30D10 heavy chain VH: Amino acid sequence: FR3<br>KASITADTSSNTAYLQLSSLTSEDTAVYYC | SEQ ID NO: 295 |
| | 30D10 heavy chain VH: Amino acid sequence: CDR3<br>ARGGVGHWYFDV | SEQ ID NO: 296 |
| | 30D10 heavy chain VH: Amino acid sequence: FR4<br>WGAGTTVTVS | SEQ ID NO: 297 |
| | 30D10 light chain VL: DNA sequence: Leader sequence-FR1-CDR1-FR2-CDR2-FR3-CDR3-FR4<br>tgggaattcatggagacagacacactcctgctatgggtgctgctgctttgggttccaggctccactgg tgacattgtgctgacccaatctccagcttcttggctgtgtctctagggcagagggccaccatctctt gc_aaggccagccaaagtgttgattatgatggtgatagttat_atgaactggtaccaacagaaaccagga cagccacccaaactcctcatttat_gttgcatccaatctaaaatct_gggatcccagccaggtttagtgg cagtgggtgtgggacagacttcaccctcaacatccatcctgtggaggaggaggatggtgcaacctat actgt_cagcaaactaatgaggatccgtggacg_ttcggtggaggcaccaagctggaaatcaaacgggct gatgctgca | SEQ ID NO: 298 |
| | 30D10 light chain VL: DNA sequence: CDR1<br>aaggccagccaaagtgttgattatgatggtgatagttat | SEQ ID NO: 299 |
| | 30D10 light chain VL: DNA sequence: CDR2<br>gttgcatccaatctaaaatct | SEQ ID NO: 300 |
| | 30D10 light chain VL: DNA sequence: CDR3<br>cagcaaactaatgaggatccgtggacg | SEQ ID NO: 301 |
| | 30D10 light chain VL: Amino acid sequence: Leader sequence-FR1-CDR1-FR2-CDR2-FR3-CDR3-FR4<br>METDTLLLWVVLLLWVPGSTGDIVLTQSPASLAVSLGQRATISCK_ASQSVDYDGDSY_MNWYQQKPGQPPKLLIY_VASNLKS_GIPARFSGSGCGTDFTLNIHPVEEEDGATYYC_QQTNEDPWT_FGGGTKLEIK | SEQ ID NO: 302 |
| | 30D10 light chain VL: Amino acid sequence: FR1<br>DIVLTQSPASLAVSLGQRATISC | SEQ ID NO: 303 |
| | 30D10 light chain VL: Amino acid sequence: CDR1<br>KASQSVDYDGDSY | SEQ ID NO: 304 |
| | 30D10 light chain VL: Amino acid sequence: FR2<br>MNWYQQKPGQPPKLLIY | SEQ ID NO: 305 |
| | 30D10 light chain VL: Amino acid sequence: CDR2<br>VASNLKS | SEQ ID NO: 306 |
| | 30D10 light chain VL: Amino acid sequence: FR3<br>GIPARFSGSGCGTDFTLNIHPVEEEDGATYYC | SEQ ID NO: 307 |
| | 30D10 light chain VL: Amino acid sequence: CDR3<br>QQTNEDPWT | SEQ ID NO: 308 |
| | 30D10 light chain VL: Amino acid sequence: FR4<br>FGGGTKLEIK | SEQ ID NO: 309 |
| 51C3 | 51C3 heavy chain VH: DNA sequence: Leader sequence-FR1-CDR1-FR2-CDR2-FR3-CDR3-FR4<br>tggggaattcaggaatggagctgggttttctctttctcctgtcaggaactgcaggtgtcctctctga ggtccagctgcaacagtctggacctgagctggtgaagcctggggcttcagtgaagatatcctgcaaga ct_tctggatacacattcactgaatacatctagcac_tgggtgaaacagagccatggaaagagccttgag tggattgga_ggtattaatcctaataatggtggtactaactacaaccagaagtttaagggc_aaggccac attgactgtagacacgtcctccagcatagcctacatggaactccgcagcctgacatctgaagattct cagtctattattg_gcaagagacgatggttacatacgtaaagttcgattac_tggggccaagggactctg gtcactgtctctgcag | SEQ ID NO: 310 |
| | 51C3 heavy chain VH: DNA sequence: CDR1<br>tctggatacacattcactgaatacatcatgcac | SEQ ID NO: 311 |
| | 51C3 heavy chain VH: DNA sequence: CDR2<br>ggtattaatcctaataatggtggtactaactacaaccagaagtttaagggc | SEQ ID NO: 312 |
| | 51C3 heavy chain VH: DNA sequence: CDR3<br>gcaagagacgatggttactacgtaaagttcgcttac | SEQ ID NO: 313 |
| | 51C3 heavy chain VH: Amino acid sequence: Leader sequence-FR1-CDR1-FR2-CDR2-FR3-CDR3-FR4<br>WGIQEWSWVFLFLLSGTAGVLEVQLQQSGPELVKPGASVKISCKT_SGYTFTEYIMH_WVKQSHGKSLEWIGG_INPNNGGTNYNQKFKG_KATLTVDTSSSIAYMELRSLTSEDSAVYYCAR_DDGYYVKFAY_WGQGTLVTVSA | SEQ ID NO: 314 |

TABLE 4-continued mAb sequences

| Clone | Sequence | SEQ ID NO. |
|---|---|---|
| | 51C3 heavy chain VH: Amino acids sequence: FR1<br>EVQLQQSGPELVKPGASVKISCKT | SEQ ID NO: 315 |
| | 51C3 heavy chain VH: Amino acid sequence: CDR1<br>SGYTFTEYIMH | SEQ ID NO: 316 |
| | 51C3 heavy chain VH: Amino acid sequence: FR2<br>WVKQSHGKSLEWIG | SEQ ID NO: 317 |
| | 51C3 heavy chain VH: Amino acid sequence: CDR2<br>GINPNNGGTNYNQKFKG | SEQ ID NO: 318 |
| | 51C3 heavy chain VH: Amino acid sequence: FR3<br>KATLTVDTSSSIAYMELRSLTSEDSAVYYC | SEQ ID NO: 319 |
| | 51C3 heavy chain VH: Amino acid sequence: CDR3<br>ARDDGYYVKFAY | SEQ ID NO: 320 |
| | 51C3 heavy chain VH: Amino acid sequence: FR4<br>WGQGTLVTVSA | SEQ ID NO: 321 |
| | 51C3 light chain VL: DNA sequence: Leader sequence-FR1-CDR1-FR2-<br>CDR2-FR3-CDR3-FR4<br>tactagttgacatgggcttcaagatggagtcacagactcaggtcttcgtatttctactgctctgtgtg<br>tctggtgctcatgggagtattgtgatgacccagactcccaaattcctgcttgtatcagcaggagacag<br>ggttaccataacctgcaaggccagtcagagtgtgattaatgatgtagcttggtaccaacagaagccag<br>ggcagtctcctaaactgctgatatactatgcatccaatcgctacactggagtccctgatcgcttcact<br>ggcagtggatatgggacggatttcactttcaccatcagcactgtgcaggctgaagacctggcagttta<br>tttctgtcagcaggattatagctctccattcacgttcggctcggggacaaagttggaaataaaacggg<br>ctgatgctgca | SEQ ID NO: 322 |
| | 51C3 light chain VL: DNA sequence: CDR1<br>aaggccagtcagagtgtgattaatgat | SEQ ID NO: 323 |
| | 51C3 light chain VL: DNA sequence: CDR2<br>tatgcatccaatcgctacact | SEQ ID NO: 324 |
| | 51C3 light chain VL: DNA sequence: CDR3<br>cagcaggattatagctctccattcacg | SEQ ID NO: 325 |
| | 51C3 light chain VL: Amino acid sequence: Leader sequence-FR1-CDR1-<br>FR2-CDR2-FR3-CDR3-FR4<br>MGFKMESQTQVFVFLLLCVSGAHGSIVMTQTPKFLLVSAGDRVTITC*KASQSVIND*VAWYQQKPGQSP<br>KLLIY*YASNRYT*GVPDRFTGSGYGTDFTFTISTVQAEDLAVYFC*QQDYSSPFT*FGSGTKLEIKRADAA | SEQ ID NO: 326 |
| | 51C3 light chain VL: Amino acid sequence: FR1<br>SIVMTQTPKFLLVSAGDRVTITC | SEQ ID NO: 327 |
| | 51C3 light chain VL: Amino acid sequence: CDR1<br>KASQSVIND | SEQ ID NO: 328 |
| | 51C3 light chain VL: Amino acid sequence: FR2<br>VAWYQQKPGQSPKLLIY | SEQ ID NO: 329 |
| | 51C3 light chain VL: Amino acid sequence: CDR2<br>YASNRYT | SEQ ID NO: 330 |
| | 51C3 light chain VL: Amino acid sequence: FR3<br>GVPDRFTGSGYGTDFTFTISTVQAEDLAVYFC | SEQ ID NO: 331 |
| | 51C3 light chain VL: Amino acid sequence: CDR3<br>QQDYSSPFT | SEQ ID NO: 332 |
| | 51C3 light chain VL: Amino acid sequence: FR4<br>FGSGTKLEIKRADAA | SEQ ID NO: 333 |

In some embodiments, provided antibodies or immunogenic fragments thereof comprise a sequence that is at least 80% identical (e.g., at least 80%, 85%, 90%, 95%, 96%, 97%, 98%, 99% identical) to one or more complementarily-determining regions (CDRs) (e.g., CDR1, CDR2, or CDR3) listed in Table 4. In some embodiments, provided antibodies or immunogenic fragments thereof comprise a sequence that is at least 80% identical to one or more VH CDRs listed in Table 4. In some embodiments, provided antibodies or immunogenic fragments thereof comprise a sequence that is at least 80% identical to two or more VH CDRs listed in Table 4. In some embodiments, provided antibodies or immunogenic fragments thereof comprise a sequence that is at least 80% identical to three VH CDRs listed in Table 4. In some embodiments, provided antibodies or immunogenic fragments thereof comprise a sequence that is at least 80% identical to one or more VL CDRs listed in Table 4. In some embodiments, provided antibodies or immunogenic fragments thereof comprise a sequence that is at least 80% identical to two or more VL CDRs listed in Table 4. In some embodiments, provided antibodies or immunogenic fragments thereof comprise a sequence that is at least 80% identical to three VL CDRs listed in Table 4.

In some embodiments, an antibody is or comprises a humanized antibody. A "humanized" form of a non-human (e.g., rodent) antibody is a chimeric antibody including a sequence derived from a non-human antibody. In many cases, a humanized antibody is a human immunoglobulin in which a residue in a hypervariable domain of a subject species is substituted with a residue in a hypervariable domain of a non-human species (donor antibody) having a desired specificity, affinity and ability, for example, a mouse, a rat, a rabbit or a non-human primate. In some cases, a residue in a framework region (FR) of the human immunoglobulin is substituted with a corresponding non-human residue. In addition, a humanized antibody may include a residue that is not found in a recipient or donor antibody. In some embodiments, such modification may be performed to further improve antibody performance. Generally, a humanized antibody may include substantially at least one, or generally, both of the two variable domains, and here, all or substantially all hypervariable loops correspond to hypervariable loops of a non-human immunoglobulin, and all or substantially all FRs to FRs of a human immunoglobulin sequence. In addition, a humanized antibody may optionally include at least a part of an immunoglobulin constant domain (Fc), or generally, a human immunoglobulin constant domain. Techniques used to humanize a monoclonal antibody are well known to one of skill in the art and have been described previously. See, e.g., U.S. Pat. Nos. 4,816,567; 5,807,715; 5,866,692; 6,331,415; 5,530,101; 5,693,761; 5,693,762; 5,585,089; and 6,180,370; Jones 1986; Riechmann 1988; Vaswani & Hamilton 1998; Harris 1995; Hurle & Gross 1994. In certain aspects, the present technology provides a nucleic acid encoding a humanized antibody. Such a nucleic acid provided herein may be present in a cell, a cell lysate, in an isolated form, a partially purified form, or a substantially purified form. The nucleic acid is "isolated," "partially purified," or "substantially purified" when being separated from different cell components or other cell components, for example, nucleic acids or proteins of different cells by techniques known to one of skill in the art including, but not limited to, alkali/SDS treatment, CsCl banding, column chromatography, agarose gel electrophoresis, or any other suitable technique. A nucleic acid according to the present technology may be, for example, DNA or RNA, and may or may not include an intron sequence.

Nucleic Acids

The present technology includes nucleic acids comprising one or more nucleotide sequences encoding one or more heavy chains, heavy chain variable domains, heavy chain framework regions, heavy chain CDRs, heavy chain constant domains, light chains, light chain variable domains, light chain framework regions, light chain CDRs, light chain constant domains, or other immunoglobulin-like sequences, antibodies, or binding molecules disclosed herein. In some embodiments, such nucleotide sequences may be present in a vector (e.g., a plasmid or a viral vector). In some embodiments, such nucleotides may be present in the genome of a cell (e.g., a cell of a subject in need of treatment) or a cell for production of an antibody (e.g., a mammalian cell) for production of an antibody.

KIR3DL3 Protein Expression and Binding

Figure 1B:
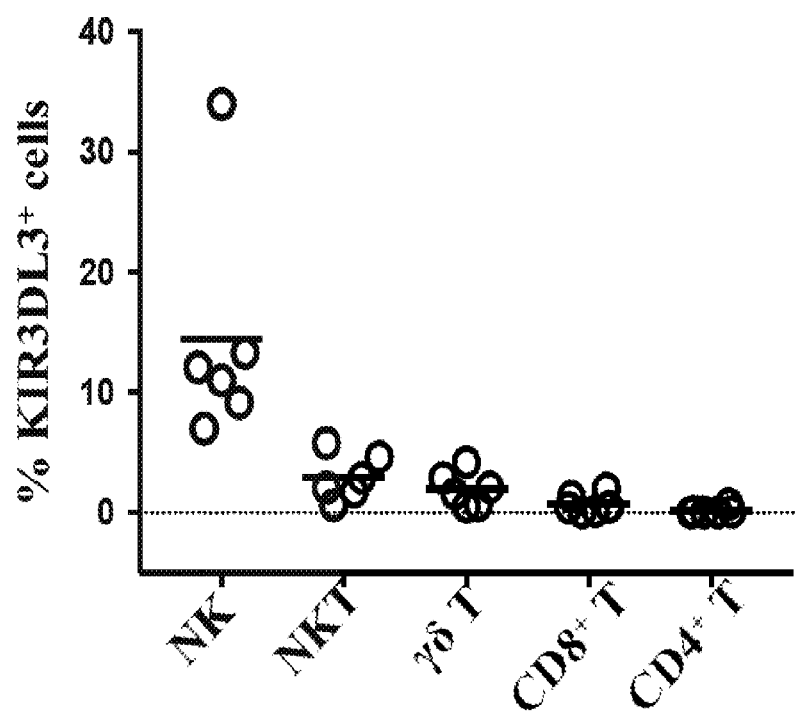
FIG. 1B is a chart depicting the percentage of KIR3DL3 positive cells in different populations of immune cells in PBMCs from six different donors.

Using Fluorescence-Activated Cell Sorting (FACS) analysis of PBMC using anti-KIR3DL3 mAbs provided herein, KIR3DL3 protein was shown to be widely expressed on the cells surface of innate immune cells (NK cells, NKT cells, γδT cells) and adaptive immune cells (CD8 T cells and CD4 T cells) (FIG. 1). In CD8 T cells, KIR3DL3 is mainly expressed on terminally differentiated effector CD8 T cells.

Figure 2A:
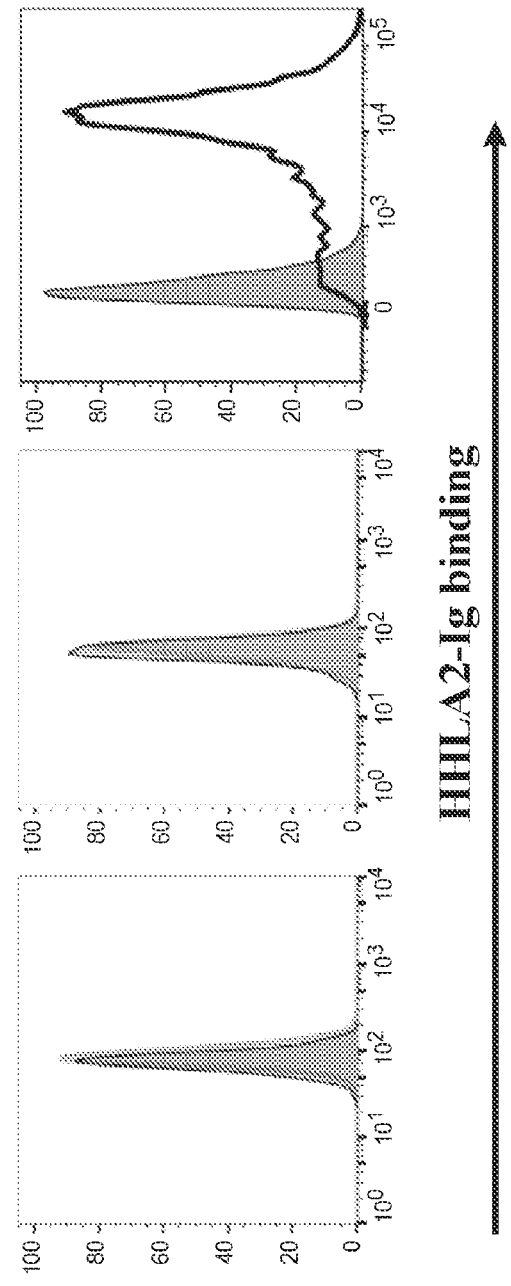
FIGS. 2A-2C show that HHLA2 binds KIR3DL3, but not its closest homologues KIR3DL1 and KIR3DL2, and that the DO domain and the whole extracellular portion of KIR3DL3 bind HHLA2.
Figure 2B:
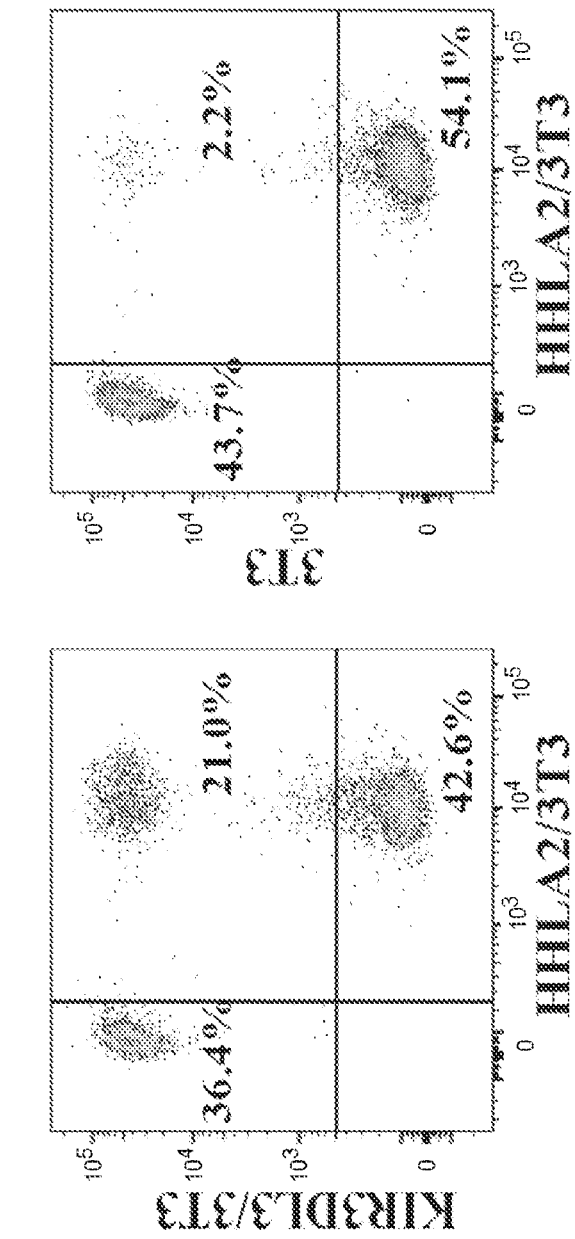

Previous studies discovered HHLA2 as the newest member of the B7 family and demonstrate that it is able to inhibit T cell proliferation and function (Zhao 2013; U.S. Pat. No. 10,093,737). Subsequent studies reported that HHLA2 is over-expressed in various types of human cancers (Cheng 2018; Cheng 2017; Koirala 2016; Janakiram 2015). To test the binding of HHLA2 to KIR3DL1, KIR3DL2, and KIR3DL3, 3T3 cell lines stable expressing cell surface KIR3DL1, KIR3DL2, or KIR3DL3 were generated. FACS assay results demonstrated that HHLA2 protein bound to KIR3DL3-expressing 3T3 cells, but not KIR3DL1-expressed or KIR3DL2-expressed 3T3 cells (FIG. 2A). Further, the intercellular conjugate assay shows that 3T3 cell line expressing HHLA2 bound to 3T3 cell line expressing KIR3DL3, but not the control 3T3 cell line (FIG. 2B). These results demonstrate HHLA2 binds KIR3DL3, but not its closet homologues KIR3DL1 and KIR3DL2.

Figure 2C:
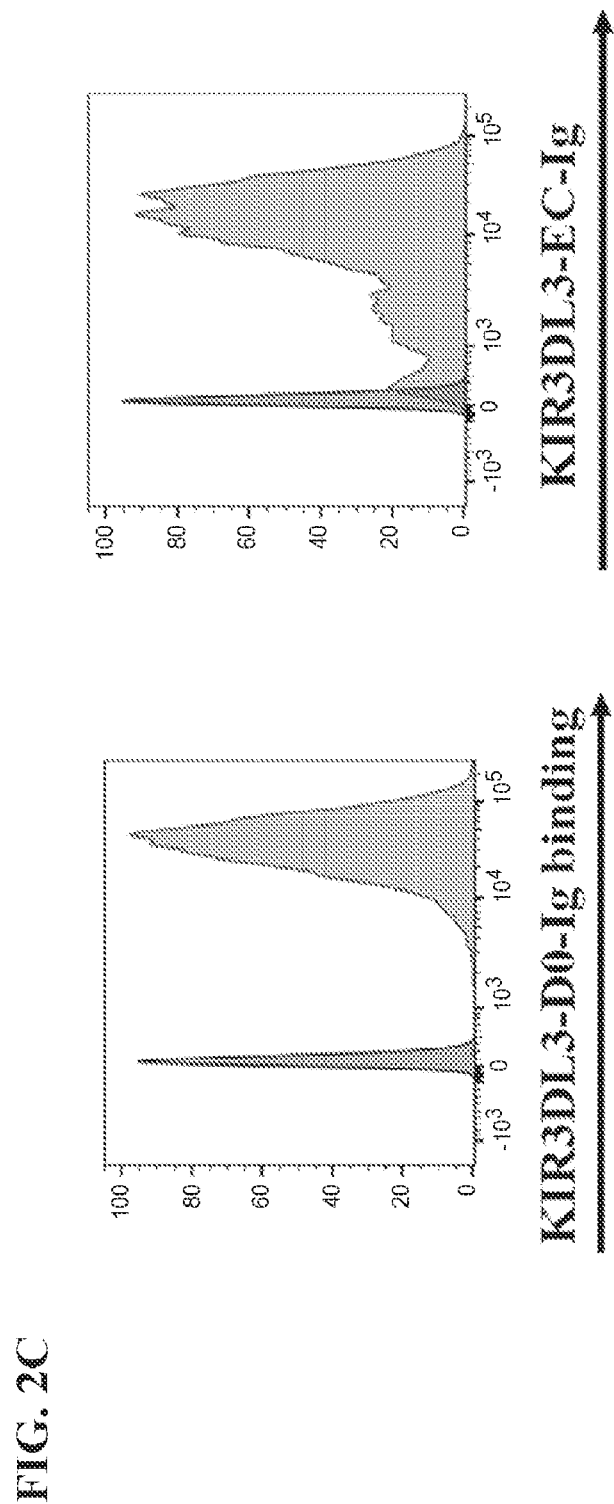

Results provided herein further demonstrate that the DO domain and the whole extracellular part of KIR3DL3 bind HHLA2 (FIG. 2C), suggesting the DO domain of KIR3DL3 is the functional domain in the interaction between KIR3DL3 and HHLA2.

Figure 3A:
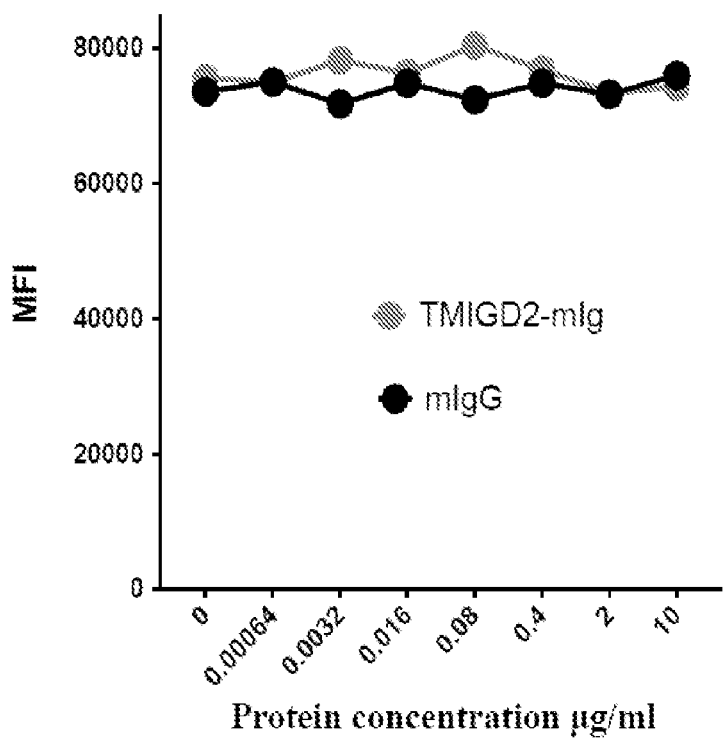
FIGS. 3A-3B show results indicating that TMIGD2 and KIR3DL3 bind non-overlapping sites on HHLA2.
Figure 3B:
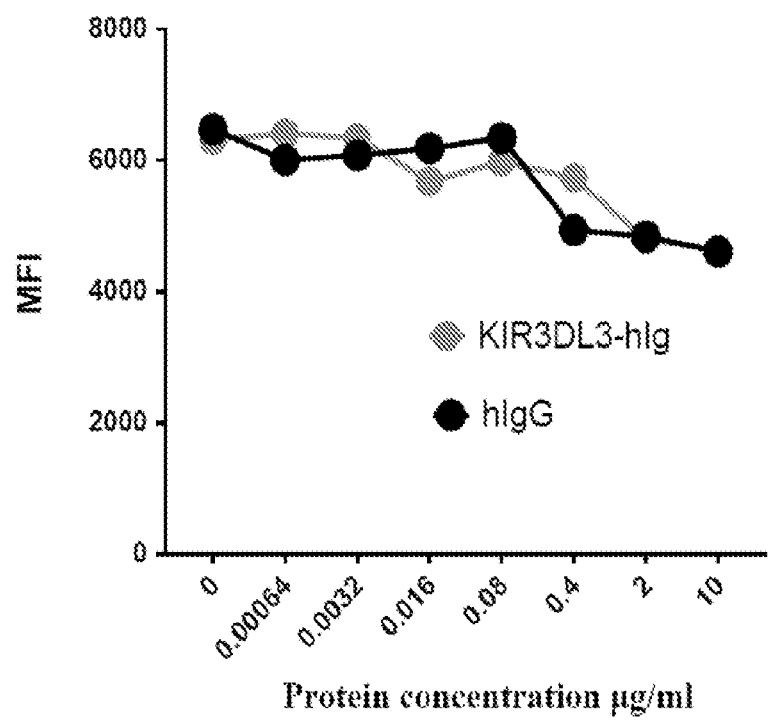

As HHLA2 can bind both KIR3DL3 and/or TMIGD2, competitive assays were performed with FACS and demonstrate that TMIGD2 could not inhibit the binding of KIR3DL3 to HHLA2 (FIG. 3A) and that KIR3DL3 could not inhibit the binding of TMIGD2 to HHLA2 (FIG. 3B), suggesting KIR3DL3 and TMIGD2 bind non-overlapping sites in HHLA2.

Figures 4A, 4B:
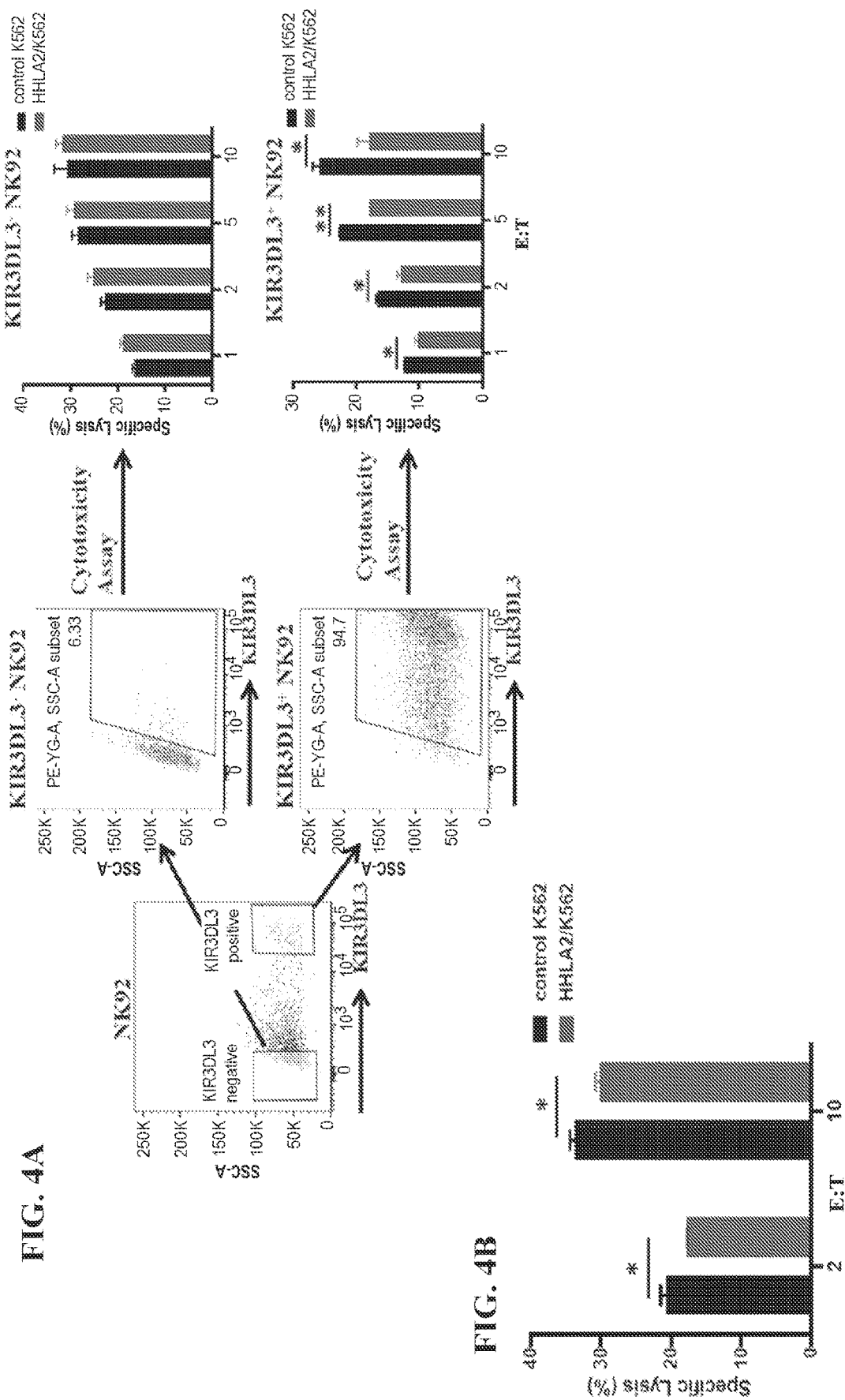
FIGS. 4A-4B show results indicating that KIR3DL3 inhibits functions of immune cells.

KIR3DL3 Inhibits Functions of Human Immune Cells and Anti-KIR3DL3 Blocking mAbs Neutralize KIR3DL3-Induced Immune Suppression In contrast to KIR3DL1 and KIR3DL2 that bind HLA-A and/or HLA-B, KIR3DL3 binds HHLA2, but the function of KIR3DL3 was previously unknown (Beziat 2017). To elucidate the function of KIR3DL3, experiments were performed using FACS to sort the human NK cell line NK92 into the KIR3DL3 positive population (KIR3DL3$^+$ NK92) and the KIR3DL3 negative population (KIR3DL3-NK92) for NK-mediated killing function. Results indicate that KIR3DL3; NK92 cells equally killed both HHLA2 positive K562 cells (HHLA2$^+$ K562) and HHLA2 negative K562 cells (HHLA2 K562) (FIG. 4A), but KIR3DL3$^+$ NK92 cells killed HHLA2 K562 cells much more efficiently than HHLA2$^+$ K562 cells (FIG. 4A). Next, FACS was used to sort out KIR3DL3+CD8 T cells (terminally differentiated effector cells) and expand those cells with anti-CD3/CD28, IL-2, and feeder cells in vitro to produce enough cells. Next, a CD8 T cell-mediated killing assay was performed which demonstrated that KIR3DL3$^+$ CD8 T cells killed K562 cells much more efficiently than HHLA2$^+$ K562 cells (FIG. 4B). These results demonstrate KIR3DL3 inhibits functions of immune cells when bound by HHLA2.

After demonstrating that KIR3DL3 induces immune suppression (FIGS. 4A-4B), experiments were performed to determine whether anti-KIR3DL3 mAbs (such as those provided herein) are able to block the function of KIR3DL3. To test this, KIR3DL3$^+$ NK92 cells were pre-incubated with either anti-KIR3DL3 mAbs or negative control mouse IgG1 antibodies. As proof of principle, four anti-KIR3DL3 mAbs were examined (26E10, 34B10, 30D10, 8G7). Following pre-incubation, cells were subjected to the NK cell-mediated killing assay employed in FIG. 4A. Following a cytotoxicity assay, cells pre-incubated with mouse IgG1 did not show an effect, whereas the cells pre-incubated with anti-KIR3DL3 mAbs (26E10, 34B10, 30D10, 8G7) exhibited significantly enhanced KIR3DL3$^+$ NK92 cell-mediated killing of targeted HHLA2$^+$ K562 cells (FIGS. 5A, 5B).

Figure 6A:
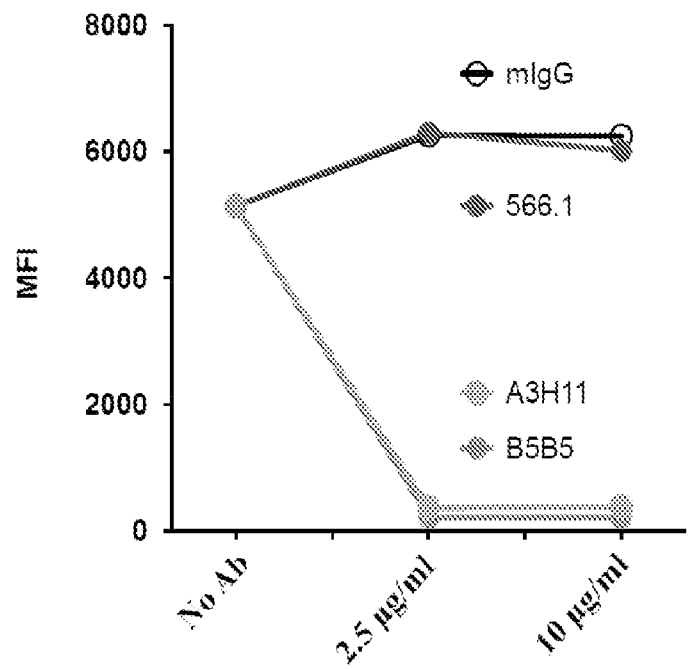
FIGS. 6A-6B show that monoclonal antibodies against the IgV1 domain of HHLA2 can block the binding of HHLA2 to KIR3DL3 and neutralize KIR3DL3-induced immune suppression.
Figure 6B:
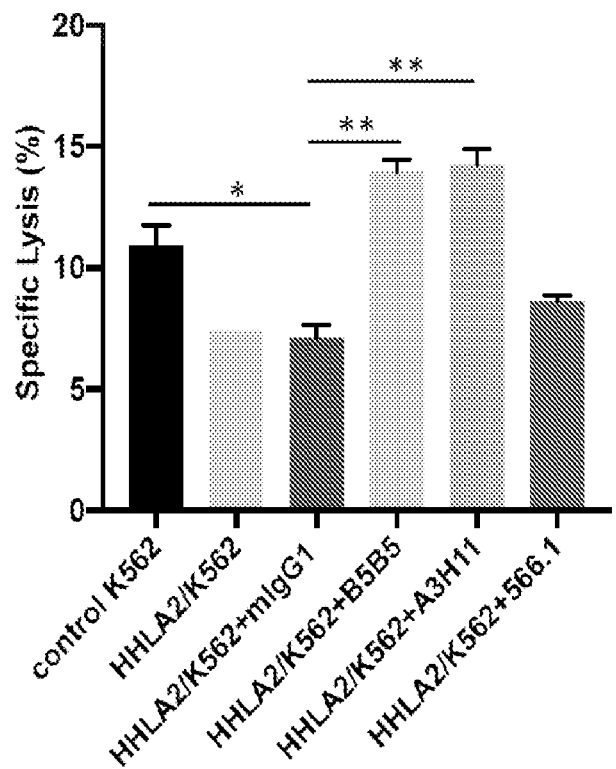

The extracellular portion of HHLA2 includes IgV1, IgC, and IgV2 domains (Zhao 2013). In previous work, an anti-HHLA2 mAb that recognizes IgCIgV2 parts was generated (566.1) (Zhao 2013). Subsequently, two additional anti-HHLA2 mAbs (A3H11 and B5B5) were generated. These two antibodies recognize the IgV1 domain. Here, a binding competitive assay revealed that A3H11 and B5B5, not 566.1, blocked the binding of KIR3DL3 protein to HHLA2 (FIG. 6A). Additionally, the A3H11 and B5B5 mAbs, but not 566.1, neutralized KIR3DL3-induced immune suppression in NK cell killing assays (FIG. 6B). These results demonstrate that the IgV1 domain of HHLA2 can bind to KIR3DL3, leading to the inhibition of immune cells and that mAbs against the IgV1 domain of HHLA2 are able to block the binding of HHLA2 to KIR3DL3 and neutralize KIR3DL3-induced immune suppression.

Figures 7, 8:
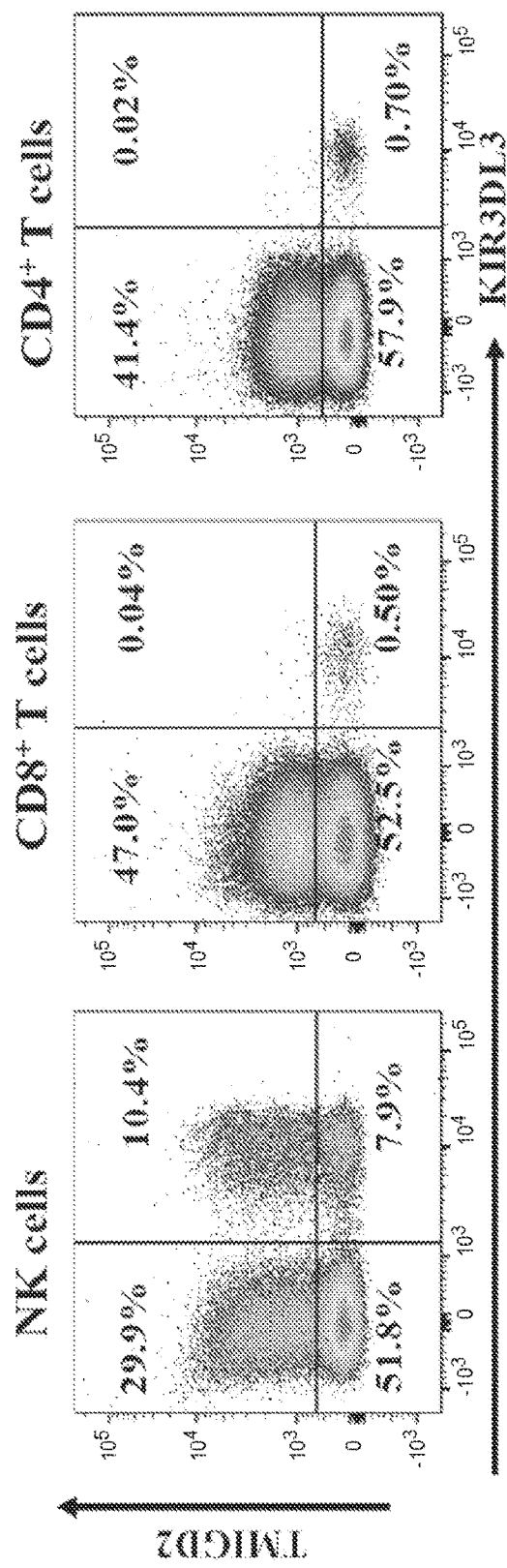
FIG. 7 depicts a series of FACS plots showing the expression patterns of two receptors KIR3DL3 and TMIGD2 on human NK cells, CD8$^+$ T cells and CD4$^+$ T cells.
FIG. 8 depicts two charts depicting histograms of 3T3 cell lines expressing TMIGD2 that were stained with HHLA2 EC-Ig-Fc fusion polypeptide (left, red histograms), HHLA2-IgV1-hIgG fusion polypeptide (right, red histograms) or control Ig (black histograms).

The different expression patterns between KIR3DL3 and TMIGD2 are unknown. Therefore, experiments were performed with FACS to examine the expression of these two receptors on human immune cells in PBMC. These experiments showed that KIR3DL3 positive CD8 and CD4 T cells are TMIGD2 negative, whereas NK cells can be KIR3DL3$^+$/TMIGD2$^+$, KIR3DL3$^+$/TMIGD2$^-$, KIR3DL3$^-$/TMIGD2$^+$, or KIR3DL3$^-$/TMIGD2$^-$ (FIG. 7). These results indicate that, although both are receptors for HHLA2, TMIGD2 and KIR3DL3 have different expression patterns.

To examine the binding of TMIGD2 to HHLA2, 3T3 cell lines expressing TMIGD2 were stained with a HHLA2 EC-Ig-Fc fusion polypeptide, a HHLA-2-IgV1-hIgG fusion polypeptide, or Ig (control) (FIG. 8). These results show that the IgV1 domain and the whole extracellular part of HHLA2 bound TMIGD2 (FIG. 8), suggesting the IgV1 domain of HHLA2 is the function domain in the interaction between HHLA2 and TMIGD2.

Figure 10A:
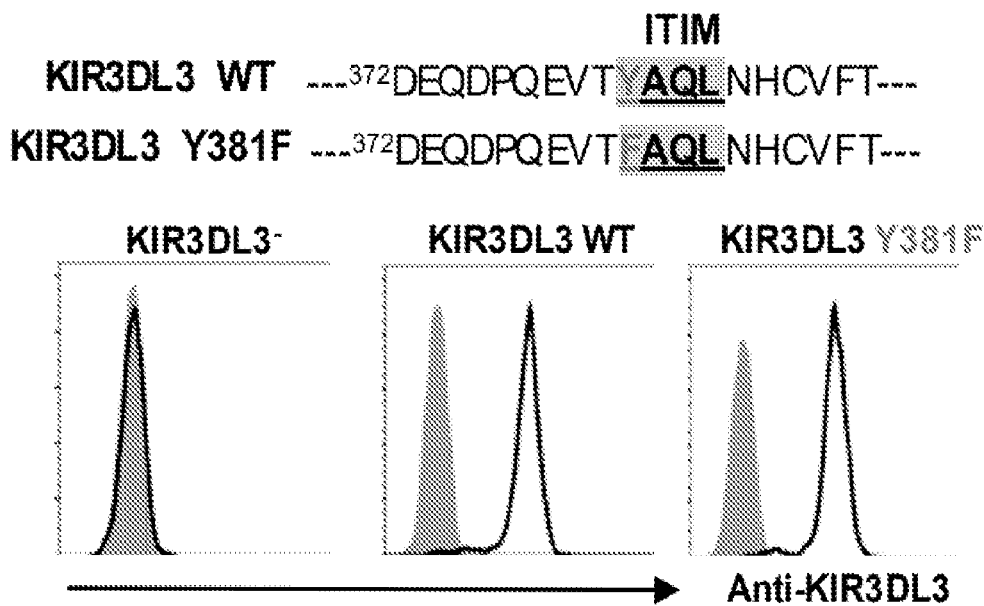
FIGS. 10A-10D show that the ITIM motif of KIR3DL3 mediates NK-cell suppression through recruiting SHR1/2.
Figure 10B:
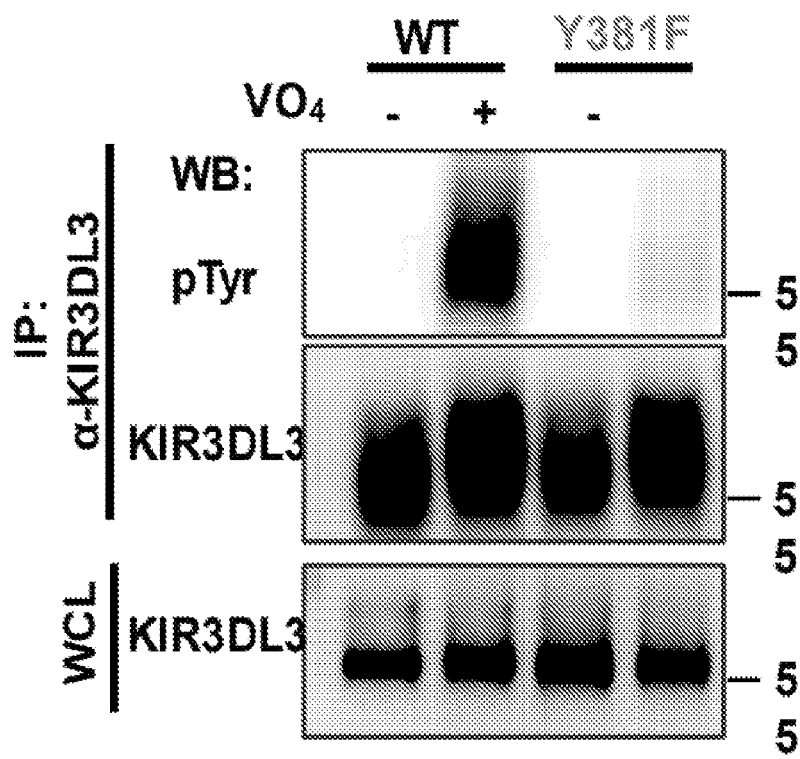

KIR3DL3 Inhibits Functions of Human Immune Cells by Recruiting SHP1/2 Through the ITIM Motif To further explore the mechanism through which KIR3DL3 mediates immune cell suppression, Y381F, a mutant of KIR3DL3, was generated by replacing the tyrosine (Y) residue at position 381 located at the YAQL sequence within the ITIM motif with the phenylalanine (F) residue (FIG. 10A). KIR3DL3-negative (KIR3DL3-) NK92 cells were transduced with WT KIR3DL3 or Y381F mutant constructs and examined for KIR3DL3 expression by flow cytometry. Expression of KIR3DL3 WT and Y381F was detected in the cells transduced with the respective construct (FIG. 10A). Next, tyrosine phosphorylation of KIR3DL3 WT and Y381F mutant was examined. Briefly, transfected NK92 cells were cultured in the presence (+) or absence (-) of pervanadate (VO$_4$, 1 mM) for 5 minutes at 37° C. Pervanadate is an inhibitor of the protein tyrosine phosphatase and functions to promote phosphorylation of proteins on tyrosine residues. Cell lysates were immunoprecipitated with anti-KIR3DL3 antibodies and examined for tyrosine phosphorylation by immunoblots using KIR3DL3 antibody and phosphorylated tyrosine antibody (4G10). Results for both whole-cell lysates (WCL) and immunoprecipitation (IP) samples are shown (FIG. 10B). As expected, tyrosine phosphorylation was detected in WT KIR3DL3, but not Y381F.

Figure 10C:
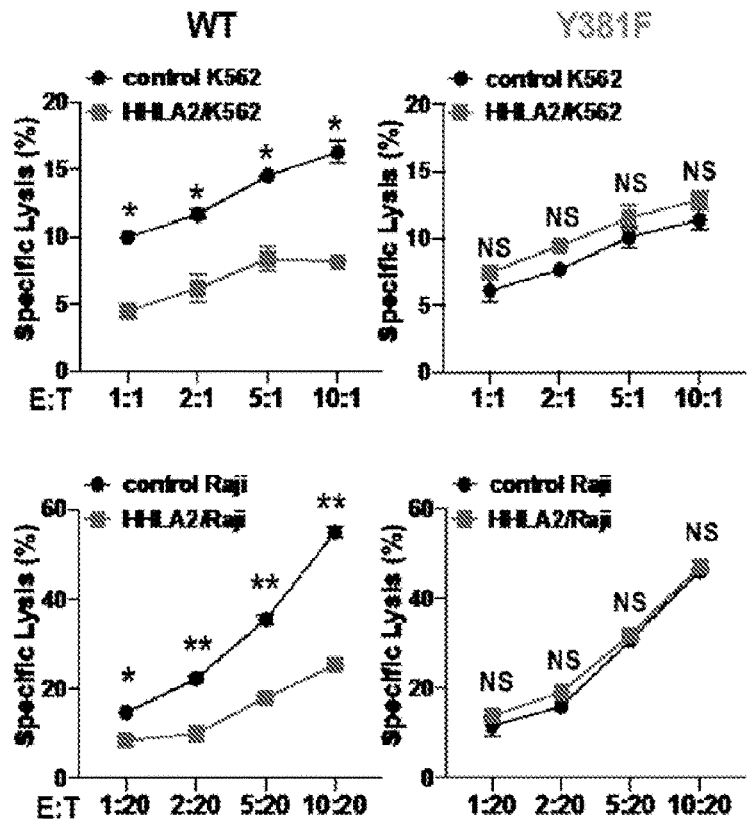

Next, cytotoxicity assays were performed by incubating NK92 cells expressing KIR3DL3 WT or Y381F with K562 cells or Raji cells expressing HHLA2 or control, at different effector to target (E:T) ratios (FIG. 10C). The percentage of specific lysis was calculated and plotted in function of the E:T ratio. As shown, in both K562 cells and Raji cells, a significant difference in cytotoxicity was detected in NK92 cells expressing KIR3DL3 WT incubated with HHLA2-expressing cells compared with control, consistent with the results observed before. However, no difference in cytotoxicity was observed in NK92 cells expressing KIR3DL3 Y381F, suggesting that the HHLA2-induced KIR3DL3 suppression of immune cell function acts through the ITIM motif of KIR3DL3.

Figure 10D:
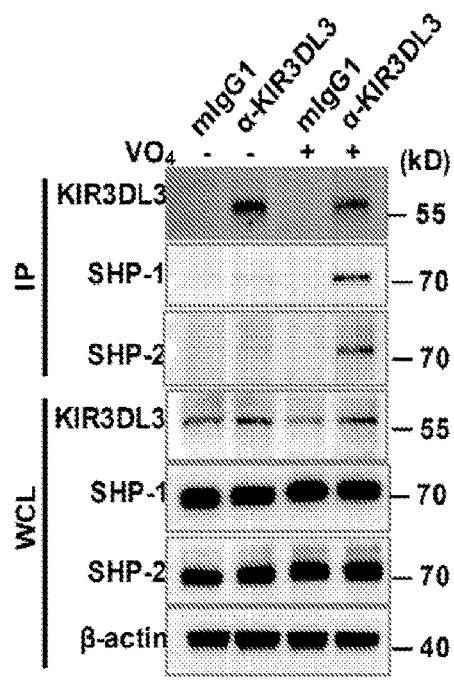

Finally, considering the importance of the tyrosine phosphorylation of the ITIM motif in KIR3DL3 functioning, and the role of protein tyrosine phosphatases SHP-1/SHP-2 play in immune cells, it was tested whether KIR3DL3 interacted with SHP-1 or SHP-2. Briefly, primary KIR3DL3+NK Cells ($35 \times 10^6$ cells) were treated with (+) or without (-) pervanadate (VO$_4$, 1 mM) for 5 minutes at 37° C. Anti-KIR3DL3 (lane 2, 4) or mIgG1 (lane 1, 3) immunoprecipitates (IP) and whole-cell lysates (WCL) were analyzed sequentially for KIR3LD3, SHP-1, and SHP-2 by Western blotting. As shown in FIG. 10D, co-immunoprecipitation experiments demonstrated that KIR3DL3 interacted with both SHP-1 and SHP-2, suggesting that KIR3DL3 inhibits functions of human immune cells by recruiting SHP1/2 through its ITIM motif.

Expression of KIR3DL3 in Cancer

Figure 9:
FIG. 9 depicts KIR3DL3 depicts a table including corresponding color-coded percent of expression potential of KIRDL3 mRNA levels in 1425 human tumor lines. KIR3DL3 mRNA was expressed in many tumor lines of human hematologic malignancies. The top 40 lines expressing the highest levels of KIR3DL3 mRNA are depicted in FIG. 9.

To examine KIR3DL3 mRNA expression levels in human tumors, Applicant searched 1,425 human tumor lines. The top 40 tumor lines expressing the highest levels of KIR3DL3 mRNA are shown in FIG. 9. Of the top 40 tumors examined (those exhibiting the highest KIR3DL3 mRNA levels), many tumor lines are human hematologic malignancies, suggesting a particular role for targeting KIR3DL3 in treating these conditions.

Figure 11:
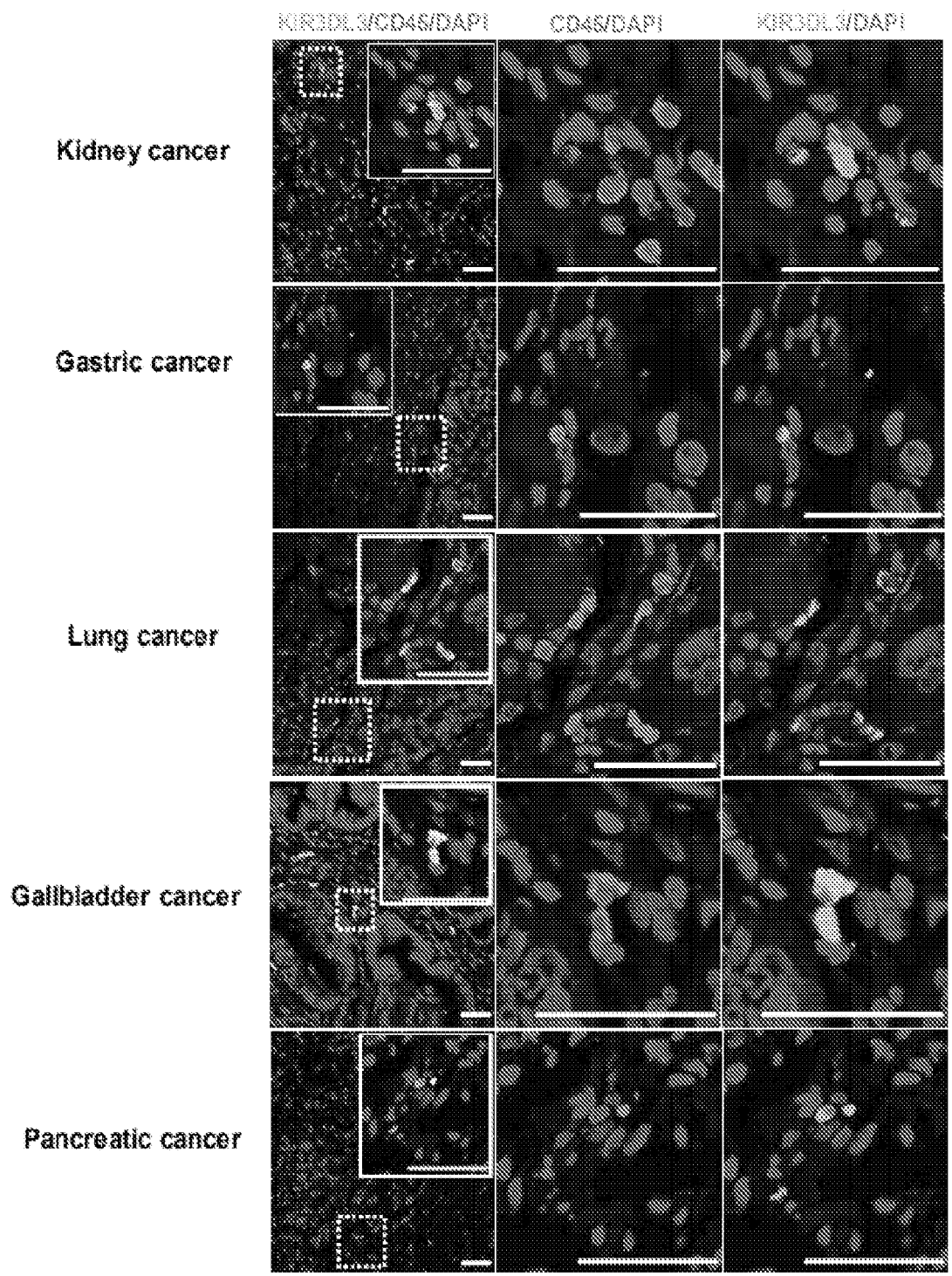
FIG. 11 shows that KIR3DL3 is expressed on tumor-infiltrating immune cells in various human cancers, including kidney, gastric, lung, gallbladder and pancreatic cancer. Representative images of indicated human cancer with co-expression of KIR3DL3 and CD45 (DAPI: blue, CD45: red, KIR3DL3: green). Left: overlay of all markers; Middle: CD45 and DAPI; Right: KIR3DL3 and DAPI. Scale bars, 50 μm.

KIR3DL3 expression at the protein level was also examined in human tumors, and it was found that KIR3DL3 is expressed on tumor-infiltrating immune cells in various human cancers, including kidney, gastric, lung, gallbladder, and pancreatic cancer (FIG. 11). Together, these data suggest that the KIR3DL3 pathway represents a novel immunosuppressive mechanism within the tumor microenvironment and an attractive target for human cancer therapy.

Compositions

In some aspects, the present technology provides compositions comprising an antibody, a fusion polypeptide, a nucleic acid, or a small molecule according to an embodiment disclosed and described herein.

In some embodiments, the composition n further comprises a pharmaceutically acceptable excipient. Non-limiting examples of pharmaceutically acceptable excipients include, for example, those described in "Remington: The Science and Practice of Pharmacy", 19th ed. (1995), or latest edition, Mack Publishing Co; A. Gennaro (2000) "Remington: The Science and Practice of Pharmacy", 20th ed., Lippincott, Williams, & Wilkins; Pharmaceutical Dosage Forms and Drug Delivery Systems (1999) H. C. Ansel et al., eds., 7th ed., Lippincott, Williams, & Wilkins; and Handbook of Pharmaceutical Excipients (2000) A. H. Kibbe et al., eds., 3rd ed. Amer. Pharmaceutical Assoc. In some embodiments, the composition is suitable for administration to a subject, for example, a sterile composition. In some embodiments, the composition is suitable for administration to a human subject, for example, the composition is sterile and is free of detectable pyrogens and/or other toxins.

In some embodiments, the composition comprises other components, such as pharmaceutical grades of mannitol, lactose, starch, magnesium stearate, sodium saccharin, talcum, cellulose, glucose, sucrose, magnesium, carbonate, and the like. In some embodiments, the compositions comprise a pharmaceutically acceptable auxiliary substance as required to approximate physiological conditions such as pH adjusting and buffering agents, toxicity adjusting agents and the like, for example, sodium acetate, sodium chloride, potassium chloride, calcium chloride, sodium lactate, hydrochloride, sulfate salts, solvates (e.g., mixed ionic salts, water, organics), hydrates (e.g., water), and the like.

In some embodiments, the compositions are in an aqueous solution, powder form, granules, tablets, pills, suppositories, capsules, suspensions, sprays, and the like. The composition may comprise a pharmaceutically acceptable excipient, a pharmaceutically acceptable salt, diluents, carriers, vehicles, and such other inactive agents well known to the skilled artisan. Vehicles and excipients commonly employed in pharmaceutical preparations include, for example, talc, gum Arabic, lactose, starch, magnesium stearate, cocoa butter, aqueous or non-aqueous solvents, oils, paraffin derivatives, glycols, etc. Solutions can be prepared using water or physiologically compatible organic solvents such as ethanol, 1,2-propylene glycol, polyglycols, dimethylsulfoxide, fatty alcohols, triglycerides, partial esters of glycerine, and the like. Parenteral compositions may be prepared using conventional techniques that may include sterile isotonic saline, water, 1,3-butanediol, ethanol, 1,2-propylene glycol, polyglycols mixed with water, Ringer's solution, etc. In one aspect, a coloring agent is added to facilitate in locating and properly placing the composition to the intended treatment site.

Compositions may include a preservative and/or a stabilizer. Non-limiting examples of preservatives include methyl-, ethyl-, propyl-parabens, sodium benzoate, benzoic acid, sorbic acid, potassium sorbate, propionic acid, benzalkonium chloride, benzyl alcohol, thimerosal, phenylmercurate salts, chlorhexidine, phenol, 3-cresol, quaternary ammonium compounds (QACs), chlorbutanol, 2-ethoxyethanol, and imidurea.

To control tonicity, the composition can comprise a physiological salt, such as a sodium salt. Sodium chloride (NaCl) is preferred, which may be present at between 1 and 20 mg/ml. Other salts that may be present include potassium chloride, potassium dihydrogen phosphate, disodium phosphate dehydrate, magnesium chloride and calcium chloride.

Compositions may include one or more buffers. Typical buffers include: a phosphate buffer; a Tris buffer; a borate buffer; a succinate buffer; a histidine buffer; or a citrate buffer. Buffers will typically be included at a concentration in the 5-20 mM range. The pH of a composition will generally be between 5 and 8, and more typically between 6 and 8, e.g., between 6.5 and 7.5, or between 7.0 and 7.8.

The composition can be administered by any appropriate route, which will be apparent to the skilled person depending on the disease or condition to be treated. Typical routes of administration include intravenous, intra-arterial, intramuscular, subcutaneous, intracranial, intranasal, or intraperitoneal.

In some embodiments, the composition may include a cryoprotectant agent. Non-limiting examples of cryoprotectant agents include a glycol (e.g., ethylene glycol, propylene glycol, and glycerol), dimethyl sulfoxide (DMSO), formamide, sucrose, trehalose, dextrose, and any combinations thereof.

The composition can comprise a pharmaceutically acceptable excipient, a pharmaceutically acceptable salt, diluents, carriers, vehicles, and such other inactive agents well known to the skilled artisan. Vehicles and excipients commonly employed in pharmaceutical preparations include, for example, talc, gum Arabic, lactose, starch, magnesium stearate, cocoa butter, aqueous or non-aqueous solvents, oils, paraffin derivatives, glycols, etc. Solutions can be prepared using water or physiologically compatible organic solvents such as ethanol, 1,2-propylene glycol, polyglycols, dimethylsulfoxide, fatty alcohols, triglycerides, partial esters of glycerine, and the like. Parenteral compositions may be prepared using conventional techniques that may include sterile isotonic saline, water, 1,3-butanediol, ethanol, 1,2-propylene glycol, polyglycols mixed with water, Ringer's solution, etc. In one aspect, a coloring agent is added to facilitate in locating and properly placing the composition to the intended treatment site.

In certain aspects, a nucleic acid molecule encoding antibodies or immunogenic fragments thereof are provided herein.

In one aspect, a vector encoding a nucleic acid molecule described herein is provided. In certain aspects, a host cell comprising a nucleic acid molecule described herein or a vector described herein is provided.

In certain embodiments, the antibody is humanized.

In one aspect, a kit of parts is provided comprising the above-mentioned composition. The kit may further comprise a document or instruction manual that describes a protocol for preparing the antibodies, fusion polypeptide, nucleic acids, and/or small molecules, and/or administering to a subject in need thereof.

Methods of Use and Treatment

Provided herein are methods of use and treatment of a subject in need thereof. In some embodiments, provided herein are antibodies, fusion polypeptide, nucleic acid, and/or small molecules for use in therapy. In other embodiments, provided herein are antibodies, fusion polypeptide, nucleic acids, and/or small molecules for use in the production of a medicament.

Also provided herein are methods of treating a subject, comprising administering to the subject a therapeutically effective amount of an antibody, a fusion polypeptide, a nucleic acid, and/or a small molecule according to an embodiment disclosed and described herein.

Also provided herein are compositions comprising an antibody, an immunogenic fragment thereof, a fusion polypeptide, or a combination thereof (e.g., in a chimeric antigen receptor and/or antibody-drug conjugate) according to embodiments disclosed and described herein for use in treating a subject having a condition.

In certain embodiments, administration of an antibody as described herein is achieved by administering to a subject a nucleic acid encoding the antibody. Nucleic acids encoding an antibody described herein can be incorporated into a gene construct to be used as a part of a gene therapy protocol to deliver nucleic acids that can be used to express and produce antibody within cells. Expression constructs of such components may be administered in any therapeutically effective carrier, for example, any formulation or composition capable of effectively delivering the component gene to cells in vivo. Approaches include insertion of a nucleic acid encoding an antibody described herein into viral vectors including recombinant retroviruses, adenovirus, adeno-associated virus, lentivirus, herpes simplex virus-1 (HSV-1), or recombinant bacterial or eukaryotic plasmids. Viral vectors can transfect cells directly; plasmid DNA can be delivered with the help of, for example, cationic liposomes (e.g., Lipofectin®), derivatization, polylysine conjugates, gramicidin S, artificial viral envelopes or other suitable intracellular carriers, direct injection, or $CaPO_4$ precipitation (see, e.g., WO04/060407). Examples of suitable retroviruses include, but are not limited to, pLJ, pZIP, pWE, and pEM which are known to those skilled in the art (see, e.g., Eglitis 1985; Danos & Mulligan 1988; Wilson 1988; Armentano 1990; Huber 1991; Ferry 1991; Chowdhury 1991; van Beusechem 1992; Kay 1992; Dai 1992; Hwu 1993; U.S. Pat. Nos. 4,868,116 and 4,980,286; and PCT Publ. Nos. WO89/07136; WO89/02468; WO89/05345; and WO92/07573). Another viral gene delivery system that may be used to deliver an antibody or a nucleic acid encoding an antibody according to the present technology utilizes adenovirus-derived vectors (see, e.g., Berkner 1988; Rosenfeld 1991; Rosenfeld 1992). Suitable adenoviral vectors derived from the adenovirus strain Ad type 5 dl324 or other strains of adenovirus (e.g., Ad2, Ad3, Ad7, etc.) are known to those skilled in the art. Yet another viral vector system that may be used to deliver an antibody or a nucleic acid encoding an antibody according to the present technology is the adeno-associated virus (AAV). See, e.g., Flotte 1992; Samulski 1989; and Mclaughlin 1988.

In some embodiments, the subject has a condition that would benefit from an enhanced immune response, such as an infection, a disease, or cancer. In these embodiments, compositions provided herein (including antibodies, fusion polypeptides, nucleic acids, and/or small molecules) may be used to block the function of KIR3DL3. In other embodiments, the subject has a condition that would benefit from suppressing an immune response, such as an autoimmune disease or transplant. In these embodiments, compositions provided herein (including antibodies, fusion polypeptides, nucleic acids, and/or small molecules) may be used to stimulate the function of KIR3DL3.

In some embodiments, the cancer is chronic lymphocytic leukemia (CLL), acute leukemia, acute lymphoid leukemia (ALL), B-cell acute lymphoid leukemia (B-ALL), T-cell acute lymphoid leukemia (T-ALL), T-cell lymphoma, B-cell lymphoma, chronic myelogenous leukemia (CML), acute myelogenous leukemia, B-cell prolymphocytic leukemia, blastic plasmacytoid dendritic cell neoplasm, Burkitt's lymphoma, diffuse large B-cell lymphoma, follicular lymphoma, hairy cell leukemia, small cell follicular lymphoma, large cell follicular lymphoma, malignant lymphoproliferative conditions, mucosa-associated lymphoid tissue (MALT) lymphoma, mantle cell lymphoma, marginal zone lymphoma, multiple myeloma, myelodysplasia and myelodysplastic syndrome, non-Hodgkin's lymphoma, Hodgkin's lymphoma, plasmablastic lymphoma, plasmacytoid dendritic cell neoplasm, Waldenström macroglobulinemia, or preleukemia.

In some embodiments, the cancer is a human hematologic malignancy. For example, in certain embodiments the human hematologic malignancy may be selected from myeloid neoplasm, acute myeloid leukemia (AML), AML with recurrent genetic abnormalities, AML with myelodysplasia-related changes, therapy-related AML, acute leukemias of ambiguous lineage, myeloproliferative neoplasm, essential thrombocythemia, polycythemia vera, myelofibrosis (MF), primary myelofibrosis, systemic mastocytosis, myelodysplastic syndromes (MDS), myeloproliferative/myelodysplastic syndromes, chronic myeloid leukemia, chronic neutrophilic leukemia, chronic eosinophilic leukemia, myelodysplastic syndromes (MDS), refractory anemia with ringed sideroblasts, refractory cytopenia with multilineage dysplasia, refractory anemia with excess blasts (type 1), refractory anemia with excess blasts (type 2), MDS with isolated del (5q), unclassifiable MDS, myeloproliferative/myelodysplastic syndromes, chronic myelomonocytic leukemia, atypical chronic myeloid leukemia, juvenile myelomonocytic leukemia, unclassifiable myeloproliferative/myelodysplatic syndromes, lymphoid neoplasms, precursor lymphoid neoplasms, B lymphoblastic leukemia, B lymphoblastic lymphoma, T lymphoblastic leukemia, T lymphoblastic lymphoma, mature B-cell neoplasms, diffuse large B-cell lymphoma, primary central nervous system lymphoma, primary mediastinal B-cell lymphoma, Burkitt's lymphoma/leukemia, follicular lymphoma, chronic lymphocytic leukemia, small lymphocytic lymphoma, B-cell prolymphocytic leukemia, lymphoplasmacytic lymphoma, Waldenström macroglobulinemia, mantle cell lymphoma, marginal zone lymphomas, post-transplant lymphoproliferative disorders, HIV-associated lymphomas, primary effusion lymphoma, intravascular large B-cell lymphoma, primary cutaneous B-cell lymphoma, hairy cell leukemia, multiple myeloma, monoclonal gammopathy of unknown significance (MGUS), smoldering multiple myeloma, or solitary plasmacytomas (solitary bone and extramedullary).

In some embodiments, the cancer is Adrenal Cancer, Anal Cancer, Basal and Squamous Cell Skin Cancer, Bile Duct Cancer, Bladder Cancer, Bone Cancer, Brain and Spinal Cord Tumors, Breast Cancer, Cervical Cancer, Colorectal Cancer, Endometrial Cancer, Esophagus Cancer, Ewing Family of Tumors, Eye Cancer (Ocular Melanoma), Gallbladder Cancer, Gastric Cancer, Gastrointestinal Neuroendocrine (Carcinoid) Tumors, Gastrointestinal Stromal Tumor (GIST), Gestational Trophoblastic Disease, Kaposi Sarcoma, Kidney Cancer, Laryngeal and Hypopharyngeal Cancer, Liver Cancer, Lung Cancer, Lung Carcinoid Tumor, Malignant Mesothelioma, Melanoma Skin Cancer, Merkel Cell Skin Cancer, Nasal Cavity and Paranasal Sinuses Cancer, Nasopharyngeal Cancer, Neuroblastoma, Non-Small Cell Lung Cancer, neoplasm of the central nervous system (CNS), Oral Cavity and Oropharyngeal Cancer, Osteosarcoma, Ovarian Cancer, Pancreatic Cancer, Pancreatic Neuroendocrine Tumor (NET), Penile Cancer, Pituitary Tumors, Prostate Cancer, Retinoblastoma, Rhabdomyosarcoma, Salivary Gland Cancer, Skin Cancer, Small Cell Lung Cancer, Small Intestine Cancer, Soft Tissue Sarcoma, Stomach Cancer, Testicular Cancer, Thymus Cancer, Thyroid Cancer, Uterine Sarcoma, Vaginal Cancer, Vulvar Cancer, Waldenström Macroglobulinemia, Wilms Tumor, squamous cell cancer, environmentally induced cancers, combinations of the cancers, and metastatic lesions of the cancers. In some embodiments, the cancer is leukemia or lymphoma, for example, lymphoblastic lymphoma or B-cell Non-Hodgkin's lymphoma. In some embodiments, the cancer is a metastatic cancer.

In some embodiments, the methods of treating a subject having cancer comprise administering to the subject a therapeutically effective amount of an antibody, a fusion polypeptide, a nucleic acid, and/or a small molecule according to an embodiment disclosed and described herein, in combination with one or more additional cancer therapies targeting a specific type of the cancer over an extended period of time to obtain improved or synergistic therapeutic effects. In some embodiments, the one or more additional cancer therapies are selected from chemotherapy, radiation therapy, immunotherapy, surgery, and a combination thereof. For example, the antibody, fusion polypeptide, nucleic acid, small molecule, and/or composition thereof can be administered in combination with one or more additional chemotherapy agents. For another example, the antibody, fusion polypeptide, nucleic acid, small molecule, and/or composition thereof can be administered in combination with one or more additional immunotherapy agents. Such methods may be used to treat any cancer or tumor type where KIR3DL3 plays a role in regulating the immune cell functions, including, but not limited to, primary, recurrent, and metastatic cancers as listed above.

A "therapeutically effective amount" of an antibody, a fusion polypeptide, a nucleic acid, and/or a small molecule as used herein is an amount of the antibody, fusion polypeptide, nucleic acid, and/or small molecule that produces a desired effect in a subject for treating and/or preventing a condition, e.g., a therapeutic effect. In certain embodiments, the therapeutically effective amount is an amount of the antibody, fusion polypeptide, nucleic acid, and/or small molecule that yields maximum therapeutic effect. In other embodiments, the therapeutically effective amount yields a therapeutic effect that is less than the maximum therapeutic effect. For example, a therapeutically effective amount may be an amount that produces a therapeutic effect while avoiding one or more side effects associated with a dosage that yields maximum therapeutic effect. A therapeutically effective amount for a particular composition will vary based on a variety of factors, including, but not limited to, the characteristics of the therapeutic composition (e.g., activity, pharmacokinetics, pharmacodynamics, and bioavailability), the physiological condition of the subject (e.g., age, body weight, sex, disease type and stage, medical history, general physical condition, responsiveness to a given dosage, and other present medications), the nature of any pharmaceutically acceptable carriers, excipients, and preservatives in the composition, and the route of administration. One skilled in the clinical and pharmacological arts will be able to determine a therapeutically effective amount through routine experimentation, namely, by monitoring a subject's response to administration of the antibody, fusion polypeptide, nucleic acid, and/or small molecule and adjusting the dosage accordingly. For additional guidance, see, for example, Remington: The Science and Practice of Pharmacy, 22nd ed., Pharmaceutical Press, London, 2012, and Goodman & Gilman's The Pharmacological Basis of Therapeutics, 12th ed., McGraw-Hill, New York, NY, 2011, the entire disclosures of which are incorporated by reference herein.

In some embodiments, a therapeutically effective amount of the antibody, fusion polypeptide, nucleic acid, and/or small molecule disclosed herein is in the range from about 10 mg/kg to about 150 mg/kg, from 30 mg/kg to about 120 mg/kg, from 60 mg/kg to about 90 mg/kg. In some embodiments, a therapeutically effective amount of the antibody, fusion polypeptide, nucleic acid, and/or small molecule disclosed herein is about 15 mg/kg, about 30 mg/kg, about 45 mg/kg, about 60 mg/kg, about 75 mg/kg, about 90 mg/kg, about 105 mg/kg, about 120 mg/kg, about 135 mg/kg, or about 150 mg/kg. A single dose or multiple doses of the antibody, fusion polypeptide, nucleic acid, and/or small molecule may be administered to a subject. In some embodiments, the antibody, fusion polypeptide, nucleic acid, and/or small molecule is administered once or multiple times a day.

Those of ordinary skill in the art will be aware of a variety of routes that may, in appropriate circumstances, be utilized for administration to a subject, for example a human. For example, in some embodiments, administration may be systemic or local. In some embodiments, administration may be enteral or parenteral. Further, it is within the purview of one of ordinary skill in the art to select a suitable administration route, such as oral administration, subcutaneous administration, intravenous administration, intramuscular administration, intradermal administration, intrathecal administration, or intraperitoneal administration. For treating a subject in need thereof, the antibody, fusion polypeptide, nucleic acid, and/or small molecule can be administered continuously or intermittently, for an immediate release, controlled release, or sustained release. Additionally, the antibody, fusion polypeptide, nucleic acid, and/or small molecule can be administered once a day, twice a day, three times a day, or four times a day for a period of 3 days, 5 days, 7 days, 10 days, 2 weeks, 3 weeks, 4 weeks, 8 weeks, or 12 weeks. In certain embodiments, the antibody, fusion polypeptide, nucleic acid, and/or small molecule can be administered every day, every other day, every third day, weekly, biweekly (i.e., every other week), every third week, monthly, every other month, or every third month. The antibody, fusion polypeptide, nucleic acid, and/or small molecule may be administered over a pre-determined time period. Alternatively, the antibody, fusion polypeptide, nucleic acid, and/or small molecule may be administered until a particular therapeutic benchmark is reached. In certain embodiments, the methods provided herein include a step of evaluating one or more therapeutic benchmarks, such as, but not limited to, the level of certain biomarkers in a biological sample, such as blood circulating tumor cells, a biopsy sample, or urine to determine whether to continue administration of the antibody, fusion polypeptide, nucleic acid, and/or small molecule. In certain embodiments involving cancer, the antibody, fusion polypeptide, nucleic acid, and/or small molecule may be administered until tumor growth is arrested or reversed, until one or more tumors are eliminated, or until the number of cancer cells are reduced to a specific level.

As demonstrated in the working examples, KIR3DL3 blockade using antibodies promotes anti-tumor immunity and suppress tumor growth in mouse models of lung adenocarcinoma. As standard of care, treatment of early stages of lung cancer, including non-small cell lung cancer (NSCLC), includes surgery, photodynamic therapy, laser therapy, brachytherapy, chemotherapy, and radiation therapy, and/or any combination thereof. For more advanced stages of lung cancer, the standard treatment includes chemotherapy, radiation therapy, immunotherapy, and/or any combination thereof. In certain embodiments, the chemotherapeutic agents for lung cancer include, but are not limited to, cisplatin (Platinol®), carboplatin (Paraplatin®), docetaxel (Taxotere®), gemcitabine (Gemzar®), paclitaxel (Taxol®), vinorelbine (Navelbine®), pemetrexed (Alimta®), albumin-bound paclitaxel (Abraxane®), etoposide (VePesid® or Etopophos®), doxorubicin (Adriamycin®), ifosfamide (Ifex®), irinotecan (Camptosar®), topotecan (Hycamtin®), vinblastine (Oncovir®) and vincristine (Oncovin®). In certain embodiments, the immunotherapy agents for lung cancer include, but are not limited to, pembrolizumab (Keytruda®), nivolumab (Opdivo®), ipilimumab (Yervoy®), bevacizumab (Avastin®), atezolizumab (Tecentriq®) and necitumumab (Portrazza®).

In some embodiments, the infection is caused by a pathogen. In certain embodiments, the pathogen may be a virus, a bacterium, a prion, a fungus, or a parasite. Non-limiting examples of viruses amenable to the present technology include human immunodeficiency viruses (HIV) (e.g., HIV-1 and HIV-2), influenza viruses (e.g., influenza A, B, and C viruses), papillomaviruses, coronaviruses (e.g., human respiratory coronavirus), hepatitis viruses (e.g., hepatitis viruses A-G), or herpesviruses (e.g., HSV 1-9), West Nile virus, Zika virus, Encephalomyocarditis virus, Dengue virus, or Ebolavirus. Non-limiting examples of bacterium amenable to the present technology include *Mycobacterium tuberculosis, Campylobacter jejuni, Staphylococcus aureus, Borrelia burgdorferi, Helicobacter pylori, Salmonella enterica, E. coli, Streptococcus pyogenes*, multiple drug resistant *S. aureus, Chlamydia pneumoniae, Clostridium botulinum, Vibrio vulnificus*, Parachlamydia, *Corynebacterium amycolatum, Klebsiella pneumoniae*, Linezolid-resistant enterococci (*E. faecalis* and *E. faecium*), and multiple drug resistant *Acinetobacter baumannii*. Non-limiting examples of fungi amenable to the present technology include *Pneumocystis jirovecii* (PJP), *Candida, Blastomyces, Coccidioides, Cryptococcus, Histoplasma, Paracoccidioides, Aspergillus, Talaromyces*, and *Sporothrix*. In certain embodiments, the infection may be HIV, *pneumocystis*, or *Mycobacterium tuberculosis*.

In some embodiments, the autoimmune disease is selected from the group consisting of acute disseminated encephalomyelitis (ADEM), alopecia areata, antiphospholipid syndrome, autoimmune cardiomyopathy, autoimmune hemolytic anemia, autoimmune hepatitis, autoimmune inner ear disease, autoimmune lipoproliferative syndrome, autoimmune peripheral neuropathy, autoimmune pancreatitis, autoimmune polyendocrine syndrome, autoimmune progesterone dermatitis, autoimmune thrombocytopenia purpura, autoimmune urticarial, autoimmune uveitis, Behçet's disease, celiac disease, Chagas disease, cold agglutinin disease, Crohn's disease, dermatomyositis, diabetes mellitus type 1, eosinophilic fasciitis, gastrointestinal pemphigoid, Goodpasture's syndrome, Grave's syndrome, Guillain-Barré syndrome, Hashimoto's encephalopathy, Hashimoto's thyroiditis, lupus erythematosus, Miller-Fisher syndrome, mixed connective tissue disease, myasthenia gravis, pemphigus polychondritis, rheumatoid arthritis, rheumatic fever, Sjögren's syndrome, temporal arteritis, transverse myelitis, ulcerative colitis, undifferentiated connective tissue disease, vasculitis, and Wegener's granulomatosis.

In one embodiment, the autoimmune disease treated is adult rheumatoid arthritis.

In some embodiments, the condition is a transplant. In these embodiments, compositions and methods provided herein may be used to suppress transplant rejection. In certain embodiments, the transplant is a stem cell or bone marrow transplant, for example, in a subject having graft versus host disease. In certain embodiments, the transplant is selected from the group consisting of a kidney transplant, a lung transplant, a heart transplant, a pancreas transplant, a cornea transplant, or a liver transplant.

In some embodiments, an antibody as described herein may be included in a course of treatment that further includes administration of at least one additional agent to a subject.

In some embodiments, methods provided herein may be performed in conjunction with an additional therapy, for example, a combination therapy. In certain embodiments, the additional therapy may be a therapy for an immune-associated disorder or condition, including those disclosed herein. For example, a composition disclosed herein may be administered to a subject at the same time, prior to, or after radiation treatment, chemotherapy, hormone therapy, cell therapy, and/or another anti-tumor or anti autoimmune therapy. In some embodiments, the composition can be administered to a subject at the same time, prior to, or after, an organ transplant.

In some embodiments, an additional agent administered in combination with an antibody as described herein may be administered at the same time as an antibody, on the same day as an antibody, or in the same week as an antibody. In some embodiments, an additional agent administered in combination with an antibody as described herein may be administered in a single formulation. In certain embodiments, an additional agent may be administered in a manner temporally separated from administration of an antibody as described herein, for example, one or more hours before or after, one or more days before or after, one or more weeks before or after, or one or more months before or after administration of a provided antibody. In various embodiments, the administration frequency of one or more additional agents may be the same as, similar to, or different from the administration frequency of an antibody as described herein.

In some embodiments, a combination therapy may be a treatment regimen that includes administration of two distinct antibodies as described herein and/or a treatment regimen that includes administration of an antibody as described herein by a plurality of formulations and/or routes of administration.

In some embodiments, an additional agent may be or comprise one or more drugs. For example, in some embodiments, an additional agent may be or comprise one or more drugs that function to suppress immune responses, for example, to effectively treat patients having autoimmune diseases, or to help prevent transplant rejection. For example, among currently available treatments for rheumatoid arthritis and kidney transplant are Abatacept (Orencia®) and Betacept (Nulojix®), modified antibody fusion polypeptides comprising the extracellular domain of human cytotoxic T-lymphocyte-associated antigen 4 (CTLA-4) linked to the Fc region of IgG1. Conversely, drugs that activate or inactivate immune responses may be used as additional agents to effectively treat diseases or disorders including cancers or infectious diseases. For example, ipilimumab (Yervoy®) is a monoclonal antibody that activates immune responses by targeting CTLA-4 and can be used to treat melanoma. Pembrolizumab (Keytruda®) is a humanized antibody against human programmed death receptor-1 (PD-1) and is prescribed as an anti-PD-1 immunotherapy against certain cancers. Nivolumab (Opdivo®) is another anti-PD-1 antibody used as an immunotherapy to treat certain cancers.

From the foregoing, it will be appreciated that specific embodiments of the invention have been described herein for purposes of illustration, but that various modifications may be made without deviating from the scope of the invention. Accordingly, the invention is not limited except as by the appended claims.

Example 1

Figure 12A:
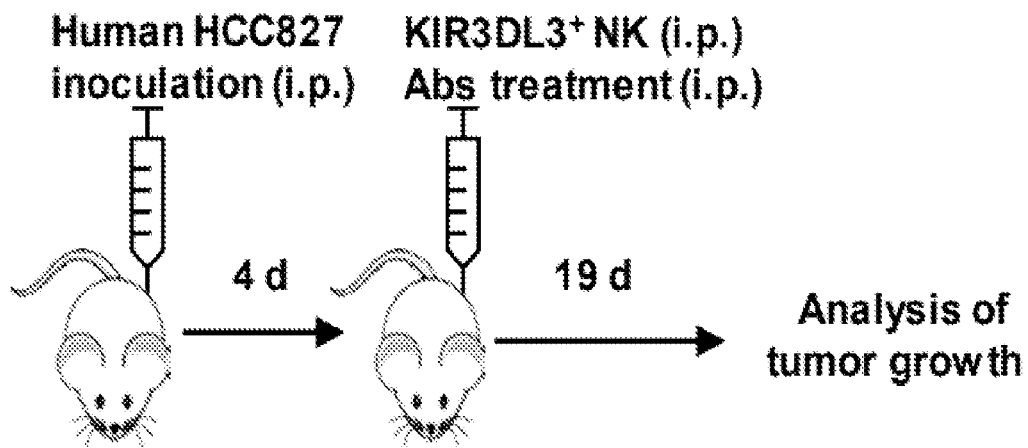
FIGS. 12A-12F show that KIR3DL3 blockade promotes anti-tumor immunity.
Figure 12B:
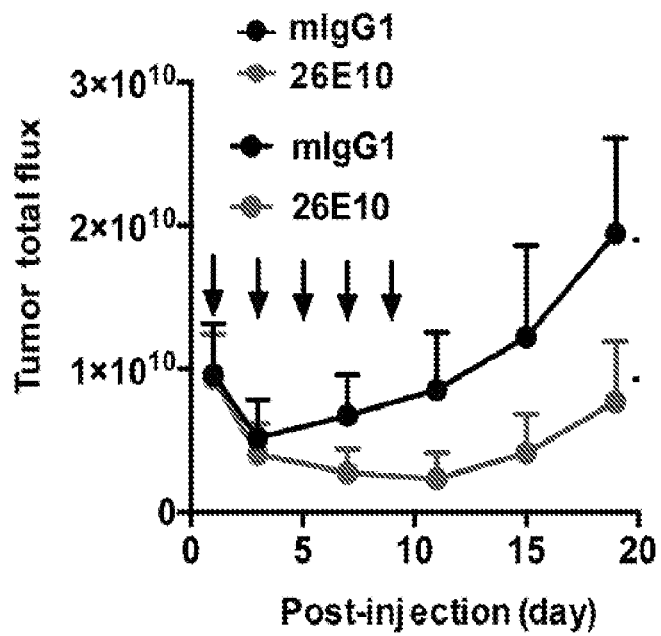

This working example demonstrates the efficacy of KIR3DL3 blockade using antibodies in promoting anti-tumor immunity and suppressing tumor growth in mouse models of lung adenocarcinoma (FIGS. 12A-12B). An intraperitoneal tumor mouse model was generated by intraperitoneally (i.p.) injecting $4\times10^6$ HHLA2+ HCC827 cells transduced with luciferase (Luc2-HCC827) into NSG mice (n=6 for each group) (FIG. 12A). Four days later, the mice were allocated to 26E10 (anti-KIR3DL3 mAb) or mIgG1 group based on baseline bioluminescence. Each mouse then received $1\times10^7$ expanded KIR3DL3+NK cells together with 1 ug IL-2, 1 ug IL-15 and 200 µg 26E10 (or mIgG1) i.p. every other day (5 times in total). Bioluminescence was measured by IVIS spectrum Imager (Capiler Perkin Elmer) with imaging beginning 5-10 minutes after i.p. injection of D-Luciferin (150 ug/g body weight) and analyzed with Living Image 3.0 software. Bioluminescence measurement of tumor growth shows that anti-KIR3DL3 monoclonal antibody reduced tumor growth compared with control (FIG. 12B), suggesting that targeting KIR3DL3-mediated immune suppression is an effective approach of cancer therapy through promotion of anti-tumor immunity.

Figure 12C:
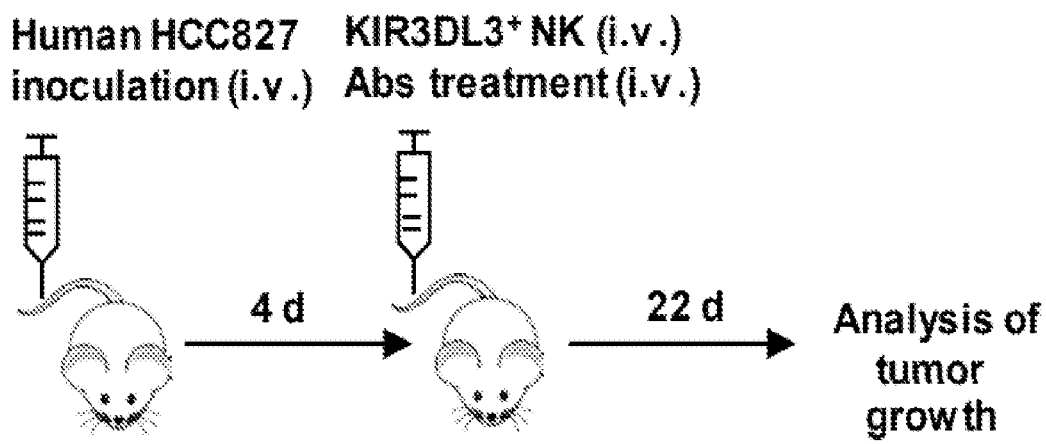
Figure 12D:
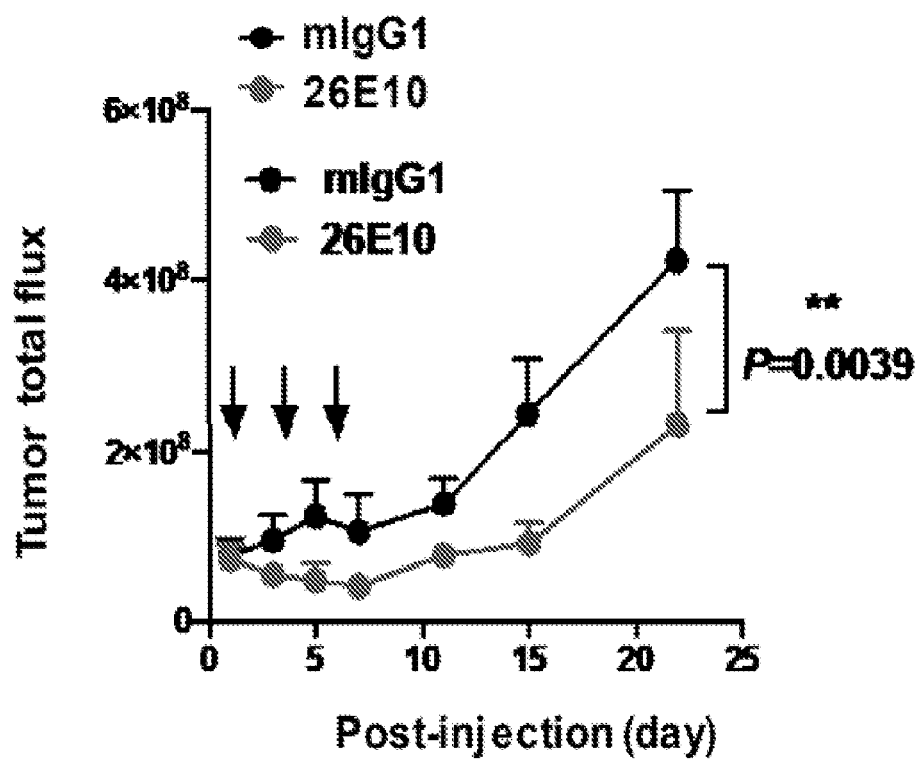

The efficacy of KIR3DL3 blockade by antibodies was also tested in mouse models of metastatic lung cancer (FIGS. 12C-12D). $5\times10^5$ Luc2-HCC827 cells were i.v. injected into NSG mice (n=4 for each group). Four days later, the mice were allocated to 26E10 (anti-KIR3DL3) or mIgG1 group based on baseline bioluminescence. Each mouse then received $7\times10^6$ KIR3DL3+NK cells together with 1 µg IL-2, 1 µg IL-15 and 200 µg 26E10 (or mIgG1) i.v. every other day (3 times in total). Bioluminescence was measured by IVIS spectrum Imager (Capiler Perkin Elmer) with imaging beginning 10-18 minutes after i.p. injection of D-Luciferin (150 µg/g body weight) and analyzed with Living Image 3.0 software (FIG. 12C). Again, it was observed that anti-KIR3DL3 monoclonal antibody significantly reduced tumor growth compared with control (FIG.

12D), suggesting that inhibition of KIR3DL3-mediated immune suppression and the resulting increase in anti-tumor immunity are effective at treating metastatic cancer as well.

Figure 12E:
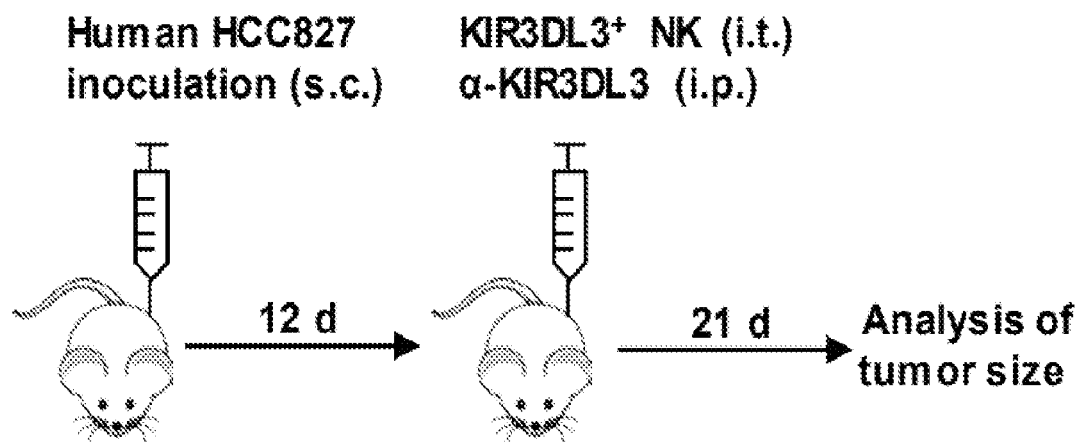
Figure 12F:
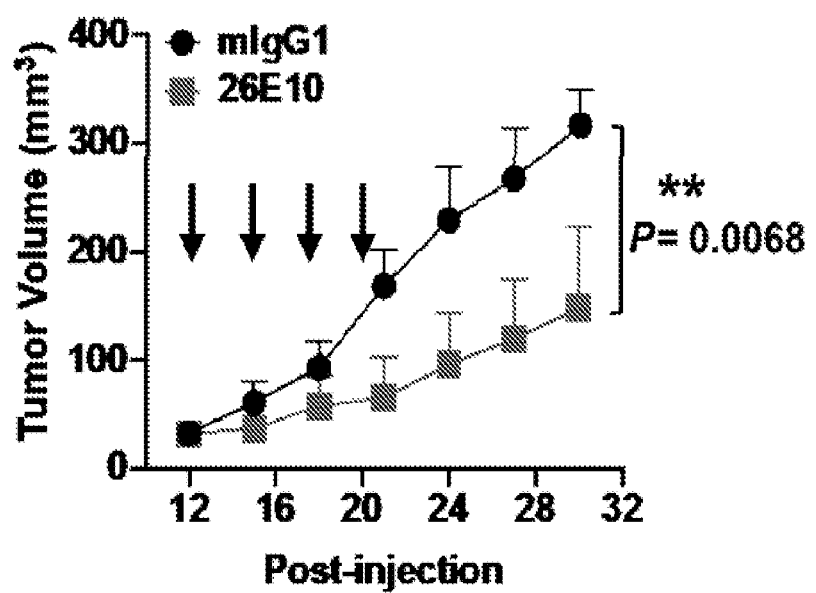

Finally, the efficacy of KIR3DL3 blockade was confirmed in subcutaneous tumor mouse models (FIGS. 12E-12F). Human lung adenocarcinoma HCC827 cells ($3 \times 10^6$) were subcutaneously injected into NSG mice. Twelve days later, tumor-bearing mice were randomized to 26E10 or mIgG1 groups (n=4 for each group) and then treated with KIR3DL3+NK cells ($10 \times 10^6$ cells), and 26E10 or isotype mIgG1 (200 µg) treated every other day for two weeks (FIG. 12E). Tumor growth was assessment as before. Consistent with prior observations, anti-KIR3DL3 monoclonal antibody significantly reduced tumor growth compared with control (FIG. 12F), confirming that KIR3DL3 is a potential novel target for immunotherapy of cancer treatment.

An antibody or an immunogenic fragment thereof that specifically binds to KIR3DL3 protein.

The antibody or the immunogenic fragment thereof of paragraph 129, wherein the antibody or the immunogenic fragment thereof specifically binds to a KIR3DL3 epitope comprising the whole extracellular domain or a portion thereof.

The antibody or the immunogenic fragment of paragraph 130, wherein the antibody or the immunogenic fragment thereof binds to the KIR3DL3 D0 domain, the KIR3DL3 D1 domain, or KIR3DL3 D2 domain.

The antibody or immunogenic fragment thereof of paragraph 129 or 130, comprising a VH region comprising CDR1, CDR2, and CDR3, having an amino acid sequence of SEQ ID NOs: 7, 9, 11, 31, 33, 35, 54, 56, 76, 78, 80, 100, 102, 104, 124, 126, 128, 148, 150, 152, 172, 174, 176, 196, 198, 200, 220, 222, 224, 244, 246, 248, 268, 270, 272, 292, 294, 296, 316, 318, or 320.

The antibody or immunogenic fragment thereof of paragraph 129 or 130, comprising a VH region comprising at least one CDR that is 80% identical to an amino acid sequence selected from SEQ ID NOs: 7, 9, 11, 31, 33, 35, 54, 56, 76, 78, 80, 100, 102, 104, 124, 126, 128, 148, 150, 152, 172, 174, 176, 196, 198, 200, 220, 222, 224, 244, 246, 248, 268, 270, 272, 292, 294, 296, 316, 318, or 320.

The antibody or immunogenic fragment thereof of paragraph 129 or 130, comprising a VH region comprising at least two CDRs that are 80% identical to an amino acid sequence selected from SEQ ID NOs: 7, 9, 11, 31, 33, 35, 54, 56, 76, 78, 80, 100, 102, 104, 124, 126, 128, 148, 150, 152, 172, 174, 176, 196, 198, 200, 220, 222, 224, 244, 246, 248, 268, 270, 272, 292, 294, 296, 316, 318, or 320.

The antibody or immunogenic fragment thereof of paragraph 129 or 130, comprising a VH region comprising at least three CDRs that are 80% identical to an amino acid sequence selected from SEQ ID NOs: 7, 9, 11, 31, 33, 35, 54, 56, 76, 78, 80, 100, 102, 104, 124, 126, 128, 148, 150, 152, 172, 174, 176, 196, 198, 200, 220, 222, 224, 244, 246, 248, 268, 270, 272, 292, 294, 296, 316, 318, or 320.

The antibody or immunogenic fragment thereof of paragraph 129 or 130, comprising a VL region comprising CDR1, CDR2, and CDR3, having an amino acid sequence of SEQ ID NOs: 19, 21, 23, 43, 45, 47, 64, 66, 68, 88, 90, 92, 112, 114, 116, 136, 138, 140, 160, 162, 164, 184, 186, 188, 208, 210, 212, 232, 234, 236, 256, 258, 260, 280, 282, 284, 304, 306, 308, 328, 330, or 332.

The antibody or immunogenic fragment thereof of paragraph 129 or 130, comprising a VL region comprising at least one CDR that is 80% identical to an amino acid sequence selected from SEQ ID NOs: 19, 21, 23, 43, 45, 47, 64, 66, 68, 88, 90, 92, 112, 114, 116, 136, 138, 140, 160, 162, 164, 184, 186, 188, 208, 210, 212, 232, 234, 236, 256, 258, 260, 280, 282, 284, 304, 306, 308, 328, 330, or 332.

The antibody or immunogenic fragment thereof of paragraph 129 or 130, comprising a VL region comprising at least two CDRs that are 80% identical to an amino acid sequence selected from SEQ ID NOs: 19, 21, 23, 43, 45, 47, 64, 66, 68, 88, 90, 92, 112, 114, 116, 136, 138, 140, 160, 162, 164, 184, 186, 188, 208, 210, 212, 232, 234, 236, 256, 258, 260, 280, 282, 284, 304, 306, 308, 328, 330, or 332.

The antibody or immunogenic fragment thereof of paragraph 129 or 130, comprising a VL region comprising at least three CDRs that are 80% identical to an amino acid sequence selected from SEQ ID NOs: 19, 21, 23, 43, 45, 47, 64, 66, 68, 88, 90, 92, 112, 114, 116, 136, 138, 140, 160, 162, 164, 184, 186, 188, 208, 210, 212, 232, 234, 236, 256, 258, 260, 280, 282, 284, 304, 306, 308, 328, 330, or 332.

The antibody of any one of paragraphs 129-139, wherein the antibody is a monoclonal antibody.

The antibody of any one of paragraphs 129-139, wherein the antibody is a chimeric antibody, a human antibody, or a humanized antibody.

The antibody or the immunogenic fragment thereof any one of paragraphs 128-138, comprising the amino acid sequence selected from SEQ ID NOs: 7, 9, 11, 19, 21, 23, 31, 33, 35, 43, 45, 47, 54, 56, 64, 66, 68, 76, 78, 80, 88, 90, 92, 100, 102, 104, 112, 114, 116, 124, 126, 128, 136, 138, 140, 148, 150, 152, 160, 162, 164, 172, 174, 176, 184, 186, 188, 196, 198, 200, 208, 210, 212, 220, 222, 224, 232, 234, 236, 244, 246, 248, 256, 258, 260, 268, 270, 272, 280, 282, 284, 292, 294, 296, 304, 306, 308, 316, 318, 320, 328, 330, or 332.

The antibody of paragraph 140, wherein the antibody is monoclonal 8G7, monoclonal 26E10, monoclonal 26E2, monoclonal 31C4, monoclonal 34B10, monoclonal 37A3, monoclonal 12A10, monoclonal 3B7, monoclonal 11G8, monoclonal 14F8, monoclonal 15D2, monoclonal 29H7, monoclonal 30D10, or monoclonal 51C3.

The antibody of paragraph 141, wherein the antibody is humanized 8G7, humanized 26E10, humanized 26E2, humanized 31C4, humanized 34B10, humanized 37A3, humanized 12A10, humanized 3B7, humanized 11G8, humanized 14F8, humanized 15D2, humanized 29H7, humanized 30D10, or humanized 51C3.

A fusion polypeptide comprising the antibody or the immunogenic fragment thereof of any one of paragraphs 129-144.

A composition comprising the antibody or the immunogenic fragment thereof according to any one of paragraphs 129-144 or the fusion polypeptide of paragraph 145.

The composition of paragraph 146, further comprising a pharmaceutically acceptable carrier.

The composition of paragraph 146 or 147, further comprising a pharmaceutically acceptable excipient.

The antibody or the immunogenic fragment thereof of any one of paragraphs 129-144, the fusion polypeptide of paragraph 145, or the composition of any one of paragraphs 146-148 for use in a therapy.

The antibody or the immunogenic fragment thereof of any one of paragraphs 129-144, the fusion polypeptide of paragraph 145, or the composition of any one of paragraphs 146-148 for use in the production of a medicament.

A nucleic acid comprising a nucleic acid encoding an antibody or an immunogenic fragment thereof, wherein the antibody or the immunogenic fragment thereof is the antibody or the immunogenic fragment thereof according to any one of paragraphs 129-144.

A nucleic acid comprising a nucleic acid encoding a fusion polypeptide, wherein the fusion polypeptide is the fusion polypeptide of paragraph 145.

A method of treating a subject having a condition, comprising administering to the subject a therapeutically effective amount of the antibody or the immunogenic fragment thereof of any one of paragraphs 129-144, the fusion polypeptide of paragraph 145, or the composition of any one of paragraphs 146-148.

The method of paragraph 153, wherein the condition is cancer.

The method of paragraph 154, wherein the cancer is selected from the group consisting of chronic lymphocytic leukemia (CLL), acute leukemia, acute lymphoid leukemia (ALL), B-cell acute lymphoid leukemia (B-ALL), T-cell lymphoma, B-cell lymphoma, T-cell acute lymphoid leukemia (T-ALL), chronic myelogenous leukemia (CML), B-cell prolymphocytic leukemia, T-cell lymphoma, Hodgkin's Disease, B-cell non-Hodgkin's lymphoma, blastic plasmacytoid dendritic cell neoplasm, Burkitt's lymphoma, diffuse large B-cell lymphoma, follicular lymphoma, hairy cell leukemia, small cell follicular lymphoma, large cell follicular lymphoma, malignant lymphoproliferative conditions, mucosa-associated lymphoid tissue (MALT) lymphoma, mantle cell lymphoma, marginal zone lymphoma, multiple myeloma, myelodysplasia and myelodysplastic syndrome, non-Hodgkin's lymphoma, Hodgkin's lymphoma, plasmablastic lymphoma, plasmacytoid dendritic cell neoplasm, Waldenström macroglobulinemia, or preleukemia.

The method of paragraph 154, wherein the cancer is selected from the group consisting of colon cancer, rectal cancer, renal-cell carcinoma, liver cancer, lung cancer, kidney cancer, gastric cancer, gallbladder cancer, cancer of the small intestine, cancer of the esophagus, melanoma, bone cancer, pancreatic cancer, skin cancer, cancer of the head or neck, cutaneous or intraocular malignant melanoma, uterine cancer, ovarian cancer, rectal cancer, cancer of the anal region, stomach cancer, testicular cancer, uterine cancer, carcinoma of the fallopian tubes, carcinoma of the endometrium, carcinoma of the cervix, carcinoma of the vagina, carcinoma of the vulva, cancer of the endocrine system, cancer of the thyroid gland, cancer of the parathyroid gland, cancer of the adrenal gland, sarcoma of soft tissue, cancer of the urethra, cancer of the penis, solid tumors of childhood, cancer of the bladder, cancer of the kidney or ureter, carcinoma of the renal pelvis, neoplasm of the central nervous system (CNS), primary CNS lymphoma, tumor angiogenesis, spinal axis tumor, brain stem glioma, pituitary adenoma, Kaposi's sarcoma, epidermoid cancer, squamous cell cancer, environmentally induced cancers, combinations of the cancers, and metastatic lesions of the cancers.

The method of paragraph 154, wherein the cancer is a human hematologic malignancy.

The method of paragraph 157, wherein the human hematologic malignancy is selected from myeloid neoplasm, acute myeloid leukemia (AML), AML with recurrent genetic abnormalities, AML with myelodysplasia-related changes, therapy-related AML, acute leukemias of ambiguous lineage, myeloproliferative neoplasm, essential thrombocythemia, polycythemia vera, myelofibrosis (MF), primary myelofibrosis, systemic mastocytosis, myelodysplastic syndromes (MDS), myeloproliferative/myelodysplastic syndromes, chronic myeloid leukemia, chronic neutrophilic leukemia, chronic eosinophilic leukemia, myelodysplastic syndromes (MDS), refractory anemia with ringed sideroblasts, refractory cytopenia with multilineage dysplasia, refractory anemia with excess blasts (type 1), refractory anemia with excess blasts (type 2), MDS with isolated del (5q), unclassifiable MDS, myeloproliferative/myelodysplastic syndromes, chronic myelomonocytic leukemia, atypical chronic myeloid leukemia, juvenile myelomonocytic leukemia, unclassifiable myeloproliferative/myelodysplatic syndromes, lymphoid neoplasms, precursor lymphoid neoplasms, B lymphoblastic leukemia, B lymphoblastic lymphoma, T lymphoblastic leukemia, T lymphoblastic lymphoma, mature B-cell neoplasms, diffuse large B-cell lymphoma, primary central nervous system lymphoma, primary mediastinal B-cell lymphoma, Burkitt's lymphoma/leukemia, follicular lymphoma, chronic lymphocytic leukemia, small lymphocytic lymphoma, B-cell prolymphocytic leukemia, lymphoplasmacytic lymphoma, Waldenström macroglobulinemia, mantle cell lymphoma, marginal zone lymphomas, post-transplant lymphoproliferative disorders, HIV-associated lymphomas, primary effusion lymphoma, intravascular large B-cell lymphoma, primary cutaneous B-cell lymphoma, hairy cell leukemia, multiple myeloma, monoclonal gammopathy of unknown significance (MGUS), smoldering multiple myeloma, or solitary plasmacytomas (solitary bone and extramedullary).

The method of paragraph 154, wherein the cancer is a metastatic cancer.

The method of paragraph 154, further comprising subjecting the subject to one or more additional cancer therapies selected from chemotherapy, radiation therapy, immunotherapy, surgery, and a combination thereof.

The method of paragraph 153, wherein the condition is an infection.

The method of paragraph 161, wherein the infection is caused by a pathogen.

The method of paragraph 162, wherein the pathogen is a virus.

The method of paragraph 163, wherein the virus is selected from the group consisting of human immunodeficiency viruses, influenza viruses, papillomaviruses, coronaviruses, hepatitis viruses, or herpesviruses.

The method of paragraph 162, wherein the pathogen is a bacterium.

The method of paragraph 165, wherein the bacterium is *Mycobacterium tuberculosis.*

The method of paragraph 162, wherein the pathogen is a prion.

The method of paragraph 162, wherein the pathogen is a fungus.

The method of paragraph 168, wherein the fungus is *Pneumocystis jirovecii* (PJP).

The method of paragraph 162, wherein the pathogen is a parasite.

The method of paragraph 153, wherein the condition is an autoimmune disease or disorder.

The method of paragraph 171, wherein the autoimmune disease or disorder is selected from the group consisting of acute disseminated encephalomyelitis (ADEM), alopecia areata, antiphospholipid syndrome, autoimmune cardiomyopathy, autoimmune hemolytic anemia, autoimmune hepatitis, autoimmune inner ear disease, autoimmune lipoproliferative syndrome, autoimmune peripheral neuropathy, autoimmune pancreatitis, autoimmune polyendocrine syndrome, autoimmune progesterone dermatitis, autoimmune thrombocytopenia purpura, autoimmune urticarial, autoimmune uveitis, Behçet's disease, celiac disease, Chagas disease, cold agglutinin disease, Crohn's disease, dermatomyositis, diabetes mellitus type 1, eosinophilic fasciitis, gastrointestinal pemphigoid, Goodpasture's syndrome, Grave's syndrome, Guillain-Barre syndrome, Hashimoto's encephalopathy, Hashimoto's thyroiditis, lupus erythematosus, Miller-Fisher syndrome, mixed connective tissue disease, myasthenia gravis, pemphigus polychondritis, rheumatoid arthritis, rheumatic fever, Sjögren's syndrome, temporal arteritis, transverse myelitis, ulcerative colitis, undifferentiated connective tissue disease, vasculitis, and Wegener's granulomatosis.

The method of paragraph 171, wherein the autoimmune disease or disorder is adult rheumatoid arthritis.

The method of paragraph 153, wherein the condition is a transplant.

The method of paragraph 174, wherein the transplant is selected from a stem cell transplant or a bone marrow transplant.

The method of paragraph 174, wherein the transplant is selected from the group consisting of a kidney transplant, a lung transplant, a heart transplant, a pancreas transplant, a cornea transplant, or a liver transplant.

The composition of any one of paragraphs 146-148 for use in a method of treating a subject having a condition.

The composition of paragraph 177, wherein the condition is cancer.

The composition of paragraph 178, wherein the cancer is selected from the group consisting of chronic lymphocytic leukemia (CLL), acute leukemia, acute lymphoid leukemia (ALL), B-cell acute lymphoid leukemia (B-ALL), T-cell lymphoma, B-cell lymphoma, T-cell acute lymphoid leukemia (T-ALL), chronic myelogenous leukemia (CML), B-cell prolymphocytic leukemia, T-cell lymphoma, Hodgkin's Disease, B-cell non-Hodgkin's lymphoma, blastic plasmacytoid dendritic cell neoplasm, Burkitt's lymphoma, diffuse large B-cell lymphoma, follicular lymphoma, hairy cell leukemia, small cell follicular lymphoma, large cell follicular lymphoma, malignant lymphoproliferative conditions, mucosa-associated lymphoid tissue (MALT) lymphoma, mantle cell lymphoma, marginal zone lymphoma, multiple myeloma, myelodysplasia and myelodysplastic syndrome, non-Hodgkin's lymphoma, Hodgkin's lymphoma, plasmablastic lymphoma, plasmacytoid dendritic cell neoplasm, Waldenström macroglobulinemia, or preleukemia.

The composition of paragraph 178, wherein the cancer is selected from the group consisting of colon cancer, rectal cancer, renal-cell carcinoma, liver cancer, lung cancer, kidney cancer, gastric cancer, gallbladder cancer, cancer of the small intestine, cancer of the esophagus, melanoma, bone cancer, pancreatic cancer, skin cancer, cancer of the head or neck, cutaneous or intraocular malignant melanoma, uterine cancer, ovarian cancer, rectal cancer, cancer of the anal region, stomach cancer, testicular cancer, uterine cancer, carcinoma of the fallopian tubes, carcinoma of the endometrium, carcinoma of the cervix, carcinoma of the vagina, carcinoma of the vulva, cancer of the endocrine system, cancer of the thyroid gland, cancer of the parathyroid gland, cancer of the adrenal gland, sarcoma of soft tissue, cancer of the urethra, cancer of the penis, solid tumors of childhood, cancer of the bladder, cancer of the kidney or ureter, carcinoma of the renal pelvis, neoplasm of the central nervous system (CNS), primary CNS lymphoma, tumor angiogenesis, spinal axis tumor, brain stem glioma, pituitary adenoma, Kaposi's sarcoma, epidermoid cancer, squamous cell cancer, environmentally induced cancers, combinations of the cancers, and metastatic lesions of the cancers.

The composition of paragraph 178, wherein the cancer is a human hematologic malignancy.

The composition of paragraph 181, wherein the human hematologic malignancy is selected from myeloid neoplasm, acute myeloid leukemia (AML), AML with recurrent genetic abnormalities, AML with myelodysplasia-related changes, therapy-related AML, acute leukemias of ambiguous lineage, myeloproliferative neoplasm, essential thrombocythemia, polycythemia vera, myelofibrosis (MF), primary myelofibrosis, systemic mastocytosis, myelodysplastic syndromes (MDS), myeloproliferative/myelodysplastic syndromes, chronic myeloid leukemia, chronic neutrophilic leukemia, chronic eosinophilic leukemia, myelodysplastic syndromes (MDS), refractory anemia with ringed sideroblasts, refractory cytopenia with multilineage dysplasia, refractory anemia with excess blasts (type 1), refractory anemia with excess blasts (type 2), MDS with isolated del (5q), unclassifiable MDS, myeloproliferative/myelodysplastic syndromes, chronic myelomonocytic leukemia, atypical chronic myeloid leukemia, juvenile myelomonocytic leukemia, unclassifiable myeloproliferative/myelodysplatic syndromes, lymphoid neoplasms, precursor lymphoid neoplasms, B lymphoblastic leukemia, B lymphoblastic lymphoma, T lymphoblastic leukemia, T lymphoblastic lymphoma, mature B-cell neoplasms, diffuse large B-cell lymphoma, primary central nervous system lymphoma, primary mediastinal B-cell lymphoma, Burkitt's lymphoma/leukemia, follicular lymphoma, chronic lymphocytic leukemia, small lymphocytic lymphoma, B-cell prolymphocytic leukemia, lymphoplasmacytic lymphoma, Waldenström macroglobulinemia, mantle cell lymphoma, marginal zone lymphomas, post-transplant lymphoproliferative disorders, HIV-associated lymphomas, primary effusion lymphoma, intravascular large B-cell lymphoma, primary cutaneous B-cell lymphoma, hairy cell leukemia, multiple myeloma, monoclonal gammopathy of unknown significance (MGUS), smoldering multiple myeloma, or solitary plasmacytomas (solitary bone and extramedullary).

The composition of paragraph 178, wherein the cancer is a metastatic cancer.

The composition of paragraph 178, wherein the composition is co-administered to the subject with one or more additional cancer therapies selected from chemotherapy, radiation therapy, immunotherapy, surgery, and a combination thereof.

The composition of paragraph 177, wherein the condition is an infection.

The composition of paragraph 185, wherein the infection is caused by a pathogen.

The composition of paragraph 186, wherein the pathogen is a virus.

The composition of paragraph 187, wherein the virus is selected from the group consisting of human immunodeficiency viruses, influenza viruses, papillomaviruses, coronaviruses, hepatitis viruses, or herpesviruses.

The composition of paragraph 186, wherein the pathogen is a bacterium.

The composition of paragraph 189, wherein the bacterium is *Mycobacterium tuberculosis*.

The composition of paragraph 186, wherein the pathogen is a prion.

The composition of paragraph 186, wherein the pathogen is a fungus.

The composition of paragraph 192, wherein the fungus is *Pneumocystis jirovecii* (PJP).

The composition of paragraph 186, wherein the pathogen is a parasite.

The composition of paragraph 177, wherein the condition is an autoimmune disease or disorder.

The composition of paragraph 195, wherein the autoimmune disease or disorder is selected from the group consisting of acute disseminated encephalomyelitis (ADEM), alopecia areata, antiphospholipid syndrome, autoimmune cardiomyopathy, autoimmune hemolytic anemia, autoimmune hepatitis, autoimmune inner ear disease, autoimmune lipoproliferative syndrome, autoimmune peripheral neuropathy, autoimmune pancreatitis, autoimmune polyendocrine e syndrome, autoimmune progesterone dermatitis, autoimmune thrombocytopenia purpura, autoimmune urticarial, autoimmune uveitis, Behçet's disease, celiac disease, Chagas disease, cold agglutinin disease, Crohn's disease, dermatomyositis, diabetes mellitus type 1, eosinophilic fasciitis, gastrointestinal pemphigoid, Goodpasture's syndrome, Grave's syndrome, Guillain-Barre syndrome, Hashimoto's encephalopathy, Hashimoto's thyroiditis, lupus erythematosus, Miller-Fisher syndrome, mixed connective tissue disease, myasthenia gravis, pemphigus vulgaris, pernicious anemia, polymyositis, psoriasis, psoriatic arthritis, relapsing polychondritis, rheumatoid arthritis, rheumatic fever, Sjögren's syndrome, temporal arteritis, transverse myelitis, ulcerative colitis, undifferentiated connective tissue disease, vasculitis, and Wegener's granulomatosis.

The composition of paragraph 195, wherein the autoimmune disease or disorder is adult rheumatoid arthritis.

The composition of paragraph 177, wherein the condition is a transplant.

The composition of paragraph 198, wherein the transplant is selected from a stem cell transplant or a bone marrow transplant.

The composition of paragraph 198, wherein the transplant is selected from the group consisting of a kidney transplant, a lung transplant, a heart transplant, a pancreas transplant, a cornea transplant, or a liver transplant.

REFERENCES

Armentano et al. Proc Natl Acad Sci USA 87 (16): 6141-6145 (1990)
Berkner Biotechniques 6 (7): 616-629 (1988)
Beziat et al. Immunology 150 (3): 248-264 (2017)
Cheng et al. Clin Cancer Res 24 (8): 1954-1964 (2018)
Cheng et al. Clin Cancer Res 23 (3): 825-832 (2017)
Chowdhury et al. Science 254 (5039): 1802-1805 (1991)
Dai et al. Proc Natl Acad Sci USA 89 (22): 10892-10895 (1992)
Danos & Mulligan Proc Natl Acad Sci USA 85 (17): 6460-6464 (1988)
Eglitis et al. Science 230 (4732): 1395-1398 (1985)
Ferry et al. Proc Natl Acad Sci USA 88 (19): 8377-8381 (1991)
Flotte et al. Am J Respir Cell Mol Biol 7 (3): 349-356 (1992)
Harris Biochem Soc Trans 23 (4): 1035-1038 (1995)
Huber et al. Proc Natl Acad Sci USA 88 (18): 8039-8043 (1991)
Hurle & Gross Curr Opin Biotechnol 5 (4): 428-433 (1994)
Hwu et al. J Immunol 150 (9): 4104-4115 (1993)
Janakiram et al. Clin Cancer Res 21 (10): 2359-2366 (2015)
Jones et al. Nature 321 (6069): 522-525 (1986)
Kay et al. Hum Gene Ther 3 (6): 641-647 (1992)
Koirala et al. Sci Rep 6:31154 (2016)
Mclaughlin et al. J Virol 62 (6): 1963-1973 (1988)
Presta Curr Opin Biotechnol 3 (4): 394-398 (1992)
Riechmann et al. Nature 332 (6162): 323-327 (1988)
Rosenfeld et al. Science 252 (5004): 431-434 (1991)
Rosenfeld et al. Cell 68 (1): 143-155 (1992)
Samulski et al. J Virol 63 (9): 3822-3828 (1989)
van Beusechem et al. Proc Natl Acad Sci USA 89 (16): 7640-7644 (1992)
Vaswani & Hamilton Ann Allergy Asthma Immunol 81 (2): 105-115 (1998)
Wilson et al. Proc Natl Acad Sci USA 85 (9): 3014-3018 (1988)
Zhao et al. Proc Natl Acad Sci USA 110 (24): 9879-9884 (2013)

What is claimed is:

1. An anti-KIR3DL3 antibody or an antigen-binding fragment thereof, wherein the anti-KIR3DL3 antibody or the antigen-binding fragment thereof comprises:
   a) a VH region comprising a VH CDR1 amino acid sequence of SEQ ID NO: 31, a VH CDR2 amino acid sequence of SEQ ID NO: 33, and a VH CDR3 amino acid sequence of SEQ ID NO: 35; and
   b) a VL region comprising a VL CDR1 amino acid sequence of SED ID NO: 43, a VL CDR2 amino acid sequence of SEQ ID NO: 45, and a VL CDR3 amino acid sequence of SEQ ID NO: 47.

2. The anti-KIR3DL3 antibody or antigen-binding fragment thereof of claim 1, wherein the anti-KIR3DL3 antibody is a monoclonal antibody.

3. The anti-KIR3DL3 antibody or antigen-binding fragment thereof of claim 1, wherein the anti-KIR3DL3 antibody is a chimeric antibody, a human antibody, or a humanized antibody.

4. The anti-KIR3DL3 antibody or antigen-binding fragment thereof of claim 1, wherein the anti-KIR3DL3 antibody is monoclonal 26E10.

5. The anti-KIR3DL3 antibody or antigen-binding fragment thereof of claim 3, wherein the antibody is humanized 26E10.

6. A fusion polypeptide or antibody-drug conjugate comprising the anti-KIR3DL3 antibody or antigen-binding fragment thereof of claim 1.

7. A pharmaceutical composition comprising the anti-KIR3DL3 antibody or antigen-binding fragment thereof of claim 1, and a pharmaceutically acceptable carrier or excipient.

8. A nucleic acid comprising a nucleic acid encoding the anti-KIR3DL3 antibody or antigen-binding fragment thereof of claim 1.

9. A method of treating a subject having a condition, comprising administering to the subject a therapeutically effective amount of the pharmaceutical composition of claim 7.

10. The method of claim 9, wherein the subject has cancer.

11. The method of claim 10, wherein the cancer is selected from the group consisting of chronic lymphocytic leukemia (CLL), acute leukemia, acute lymphoid leukemia (ALL), B-cell acute lymphoid leukemia (B-ALL), T-cell lymphoma, B-cell lymphoma, T-cell acute lymphoid leukemia (T-ALL), chronic myelogenous leukemia (CML), B-cell prolymphocytic leukemia, T-cell lymphoma, Hodgkin's Disease, B-cell non-Hodgkin's lymphoma, blastic plasmacytoid dendritic cell neoplasm, Burkitt's lymphoma, diffuse large B-cell lymphoma, follicular lymphoma, hairy cell leukemia, small cell follicular lymphoma, large cell follicular lymphoma, malignant lymphoproliferative conditions, mucosa-associated lymphoid tissue (MALT) lymphoma, mantle cell lymphoma, marginal zone lymphoma, multiple myeloma, myelodysplasia and myelodysplastic syndrome, non-Hodgkin's lymphoma, Hodgkin's lymphoma, plasmablastic lymphoma, plasmacytoid dendritic cell neoplasm, Waldenström macroglobulinemia, or preleukemia.

12. The method of claim 10, wherein the cancer is selected from the group consisting of colon cancer, rectal cancer, renal-cell carcinoma, liver cancer, lung cancer, kidney cancer, gastric cancer, gallbladder cancer, cancer of the small intestine, cancer of the esophagus, melanoma, bone cancer, pancreatic cancer, skin cancer, cancer of the head or neck, cutaneous or intraocular malignant melanoma, uterine cancer, ovarian cancer, rectal cancer, cancer of the anal region, stomach cancer, testicular cancer, uterine cancer, carcinoma of the fallopian tubes, carcinoma of the endometrium, carcinoma of the cervix, carcinoma of the vagina, carcinoma of the vulva, cancer of the endocrine system, cancer of the thyroid gland, cancer of the parathyroid gland, cancer of the adrenal gland, sarcoma of soft tissue, cancer of the urethra, cancer of the penis, solid tumors of childhood, cancer of the bladder, cancer of the kidney or ureter, carcinoma of the renal pelvis, neoplasm of the central nervous system (CNS), primary CNS lymphoma, tumor angiogenesis, spinal axis tumor, brain stem glioma, pituitary adenoma, Kaposi's sarcoma, epidermoid cancer, squamous cell cancer, environmentally induced cancers, combinations of the cancers, and metastatic lesions of the cancers.

13. The method of claim 10, wherein the cancer is a human hematologic malignancy.

14. The method of claim 13, wherein the human hematologic malignancy is selected from myeloid neoplasm, acute myeloid leukemia (AML), AML with recurrent genetic abnormalities, AML with myelodysplasia-related changes, therapy-related AML, acute leukemias of ambiguous lineage, myeloproliferative neoplasm, essential thrombocythemia, polycythemia vera, myelofibrosis (MF), primary myelofibrosis, systemic mastocytosis, myelodysplastic syndromes (MDS), myeloproliferative/myelodysplastic syndromes, chronic myeloid leukemia, chronic neutrophilic leukemia, chronic eosinophilic leukemia, myelodysplastic syndromes (MDS), refractory anemia with ringed sideroblasts, refractory cytopenia with multilineage dysplasia, refractory anemia with excess blasts (type 1), refractory anemia with excess blasts (type 2), MDS with isolated del (5q), unclassifiable MDS, myeloproliferative/myelodysplastic syndromes, chronic myelomonocytic leukemia, atypical chronic myeloid leukemia, juvenile myelomonocytic leukemia, unclassifiable myeloproliferative/myelodysplatic syndromes, lymphoid neoplasms, precursor lymphoid neoplasms, B lymphoblastic leukemia, B lymphoblastic lymphoma, T lymphoblastic leukemia, T lymphoblastic lymphoma, mature B-cell neoplasms, diffuse large B-cell lymphoma, primary central nervous system lymphoma, primary mediastinal B-cell lymphoma, Burkitt's lymphoma/leukemia, follicular lymphoma, chronic lymphocytic leukemia, small lymphocytic lymphoma, B-cell prolymphocytic leukemia, lymphoplasmacytic lymphoma, Waldenström macroglobulinemia, mantle cell lymphoma, marginal zone lymphomas, post-transplant lymphoproliferative disorders, HIV-associated lymphomas, primary effusion lymphoma, intravascular large B-cell lymphoma, primary cutaneous B-cell lymphoma, hairy cell leukemia, multiple myeloma, monoclonal gammopathy of unknown significance (MGUS), smoldering multiple myeloma, or solitary plasmacytomas (solitary bone and extramedullary).

15. The method of claim 10, wherein the cancer is a metastatic cancer.

16. The method of claim 10, further comprising subjecting the subject to one or more additional cancer therapies selected from chemotherapy, radiation therapy, immunotherapy, surgery, or a combination thereof.

* * * * *

SEQUENCE LISTING

```
<160> NUMBER OF SEQ ID NOS: 344

<210> SEQ ID NO 1
<211> LENGTH: 411
<212> TYPE: DNA
<213> ORGANISM: Artificial Sequence
<220> FEATURE:
<223> OTHER INFORMATION: 8G7 heavy chain VH
<220> FEATURE:
<221> NAME/KEY: misc_feature
<222> LOCATION: (1)..(57)
<223> OTHER INFORMATION: Leader sequence
<220> FEATURE:
<221> NAME/KEY: misc_feature
<222> LOCATION: (58)..(132)
<223> OTHER INFORMATION: FR1
<220> FEATURE:
<221> NAME/KEY: misc_feature
<222> LOCATION: (133)..(162)
<223> OTHER INFORMATION: CDR1
<220> FEATURE:
<221> NAME/KEY: misc_feature
<222> LOCATION: (163)..(207)
<223> OTHER INFORMATION: FR2
<220> FEATURE:
<221> NAME/KEY: misc_feature
<222> LOCATION: (208)..(255)
<223> OTHER INFORMATION: CDR2
```

```
<220> FEATURE:
<221> NAME/KEY: misc_feature
<222> LOCATION: (256)..(345)
<223> OTHER INFORMATION: FR3
<220> FEATURE:
<221> NAME/KEY: misc_feature
<222> LOCATION: (346)..(378)
<223> OTHER INFORMATION: CDR3
<220> FEATURE:
<221> NAME/KEY: misc_feature
<222> LOCATION: (379)..(408)
<223> OTHER INFORMATION: FR4

<400> SEQUENCE: 1
atgaactttg ggttgagatt gattttcctt gtccttgttt taaaaggtgt ccagtgtgaa    60
gtgatgctgg tggagtctgg gggaggctta gtgaagcctg agggtccct gaaactctcc    120 tgtgcagcct ctggattcac tttcagtacc tatgccatgt cttgggttcg ccagactccg    180
gagaagaggc tggagtgggt cgcaaccatt cttagtggtg gtaattacac ctactatcca    240
gacagtgtga agggcgatt caccatctcc agagacaatg ccaagaacac cctgaacctg    300
caaatgagca gtctgaggtc tgaggacacg gccatgtatt actgtgtaat cccctatggt    360
agtagtcctt tgactattg gggccaaggc accactctca cagtctctct a             411

<210> SEQ ID NO 2
<211> LENGTH: 30
<212> TYPE: DNA
<213> ORGANISM: Artificial Sequence
<220> FEATURE:
<223> OTHER INFORMATION: 8G7 heavy chain VH: CDR1

<400> SEQUENCE: 2
ggattcactt tcagtaccta tgccatgtct                                     30

<210> SEQ ID NO 3
<211> LENGTH: 48
<212> TYPE: DNA
<213> ORGANISM: Artificial Sequence
<220> FEATURE:
<223> OTHER INFORMATION: 8G7 heavy chain VH: CDR2

<400> SEQUENCE: 3
attcttagtg gtggtaatta cacctactat ccagacagtg tgaagggg                 48

<210> SEQ ID NO 4
<211> LENGTH: 33
<212> TYPE: DNA
<213> ORGANISM: Artificial Sequence
<220> FEATURE:
<223> OTHER INFORMATION: 8G7 heavy chain VH: CDR3

<400> SEQUENCE: 4
gtaatcccct atggtagtag tccttttgac tat                                 33

<210> SEQ ID NO 5
<211> LENGTH: 136
<212> TYPE: PRT
<213> ORGANISM: Artificial Sequence
<220> FEATURE:
<223> OTHER INFORMATION: 8G7 heavy chain VH
<220> FEATURE:
<221> NAME/KEY: MISC_FEATURE
<222> LOCATION: (1)..(19)
<223> OTHER INFORMATION: Leader sequence
<220> FEATURE:
<221> NAME/KEY: MISC_FEATURE
<222> LOCATION: (20)..(44)
```

```
<223> OTHER INFORMATION: FR1
<220> FEATURE:
<221> NAME/KEY: MISC_FEATURE
<222> LOCATION: (45)..(54)
<223> OTHER INFORMATION: CDR1
<220> FEATURE:
<221> NAME/KEY: MISC_FEATURE
<222> LOCATION: (55)..(68)
<223> OTHER INFORMATION: FR2
<220> FEATURE:
<221> NAME/KEY: MISC_FEATURE
<222> LOCATION: (69)..(85)
<223> OTHER INFORMATION: CDR2
<220> FEATURE:
<221> NAME/KEY: MISC_FEATURE
<222> LOCATION: (86)..(115)
<223> OTHER INFORMATION: FR3
<220> FEATURE:
<221> NAME/KEY: MISC_FEATURE
<222> LOCATION: (116)..(126)
<223> OTHER INFORMATION: CDR3
<220> FEATURE:
<221> NAME/KEY: MISC_FEATURE
<222> LOCATION: (127)..(136)
<223> OTHER INFORMATION: FR4

<400> SEQUENCE: 5

Met Asn Phe Gly Leu Arg Leu Ile Phe Leu Val Leu Val Leu Lys Gly
1               5                   10                  15

Val Gln Cys Glu Val Met Leu Val Glu Ser Gly Gly Gly Leu Val Lys
            20                  25                  30

Pro Gly Gly Ser Leu Lys Leu Ser Cys Ala Ala Ser Gly Phe Thr Phe
        35                  40                  45

Ser Thr Tyr Ala Met Ser Trp Val Arg Gln Thr Pro Glu Lys Arg Leu
    50                  55                  60

Glu Trp Val Ala Thr Ile Leu Ser Gly Gly Asn Tyr Thr Tyr Tyr Pro
65                  70                  75                  80

Asp Ser Val Lys Gly Arg Phe Thr Ile Ser Arg Asp Asn Ala Lys Asn
                85                  90                  95

Thr Leu Asn Leu Gln Met Ser Ser Leu Arg Ser Glu Asp Thr Ala Met
            100                 105                 110

Tyr Tyr Cys Val Ile Pro Tyr Gly Ser Ser Pro Phe Asp Tyr Trp Gly
        115                 120                 125

Gln Gly Thr Thr Leu Thr Val Ser
    130                 135

<210> SEQ ID NO 6
<211> LENGTH: 25
<212> TYPE: PRT
<213> ORGANISM: Artificial Sequence
<220> FEATURE:
<223> OTHER INFORMATION: 8G7 heavy chain VH: FR1

<400> SEQUENCE: 6

Glu Val Met Leu Val Glu Ser Gly Gly Gly Leu Val Lys Pro Gly Gly
1               5                   10                  15

Ser Leu Lys Leu Ser Cys Ala Ala Ser
            20                  25

<210> SEQ ID NO 7
<211> LENGTH: 10
<212> TYPE: PRT
<213> ORGANISM: Artificial Sequence
<220> FEATURE:
<223> OTHER INFORMATION: 8G7 heavy chain VH: CDR1
```

```
<400> SEQUENCE: 7

Gly Phe Thr Phe Ser Thr Tyr Ala Met Ser
1               5                   10

<210> SEQ ID NO 8
<211> LENGTH: 14
<212> TYPE: PRT
<213> ORGANISM: Artificial Sequence
<220> FEATURE:
<223> OTHER INFORMATION: 8G7 heavy chain VH: FR2

<400> SEQUENCE: 8

Trp Val Arg Gln Thr Pro Glu Lys Arg Leu Glu Trp Val Ala
1               5                   10

<210> SEQ ID NO 9
<211> LENGTH: 17
<212> TYPE: PRT
<213> ORGANISM: Artificial Sequence
<220> FEATURE:
<223> OTHER INFORMATION: 8G7 heavy chain VH: CDR2

<400> SEQUENCE: 9

Thr Ile Leu Ser Gly Gly Asn Tyr Thr Tyr Tyr Pro Asp Ser Val Lys
1               5                   10                  15

Gly

<210> SEQ ID NO 10
<211> LENGTH: 30
<212> TYPE: PRT
<213> ORGANISM: Artificial Sequence
<220> FEATURE:
<223> OTHER INFORMATION: 8G7 heavy chain VH: FR3

<400> SEQUENCE: 10

Arg Phe Thr Ile Ser Arg Asp Asn Ala Lys Asn Thr Leu Asn Leu Gln
1               5                   10                  15

Met Ser Ser Leu Arg Ser Glu Asp Thr Ala Met Tyr Tyr Cys
            20                  25                  30

<210> SEQ ID NO 11
<211> LENGTH: 11
<212> TYPE: PRT
<213> ORGANISM: Artificial Sequence
<220> FEATURE:
<223> OTHER INFORMATION: 8G7 heavy chain VH: CDR3

<400> SEQUENCE: 11

Val Ile Pro Tyr Gly Ser Ser Pro Phe Asp Tyr
1               5                   10

<210> SEQ ID NO 12
<211> LENGTH: 10
<212> TYPE: PRT
<213> ORGANISM: Artificial Sequence
<220> FEATURE:
<223> OTHER INFORMATION: 8G7 heavy chain VH: FR4

<400> SEQUENCE: 12

Trp Gly Gln Gly Thr Thr Leu Thr Val Ser
1               5                   10

<210> SEQ ID NO 13
<211> LENGTH: 423
<212> TYPE: DNA
```

<213> ORGANISM: Artificial Sequence
<220> FEATURE:
<223> OTHER INFORMATION: 8G7 light chain VL
<220> FEATURE:
<221> NAME/KEY: misc_feature
<222> LOCATION: (28)..(87)
<223> OTHER INFORMATION: Leader sequence
<220> FEATURE:
<221> NAME/KEY: misc_feature
<222> LOCATION: (88)..(156)
<223> OTHER INFORMATION: FR1
<220> FEATURE:
<221> NAME/KEY: misc_feature
<222> LOCATION: (157)..(183)
<223> OTHER INFORMATION: CDR1
<220> FEATURE:
<221> NAME/KEY: misc_feature
<222> LOCATION: (184)..(234)
<223> OTHER INFORMATION: FR2
<220> FEATURE:
<221> NAME/KEY: misc_feature
<222> LOCATION: (235)..(255)
<223> OTHER INFORMATION: CDR2
<220> FEATURE:
<221> NAME/KEY: misc_feature
<222> LOCATION: (256)..(352)
<223> OTHER INFORMATION: FR3
<220> FEATURE:
<221> NAME/KEY: misc_feature
<222> LOCATION: (353)..(378)
<223> OTHER INFORMATION: CDR3
<220> FEATURE:
<221> NAME/KEY: misc_feature
<222> LOCATION: (379)..(408)
<223> OTHER INFORMATION: FR4

<400> SEQUENCE: 13
ttattactag tcgacacggg catcaagatg aagtcacaga cccaggtctt cgtatttcta    60
ctgctctgtg tgtctggtgc tcatgggagt attgtgatga cccagactcc caaattcctg   120
cttgtatcag caggagacag ggttaccata acctgcaagg ccagtcagag tgtgagtaat   180
gatgtagctt ggtaccaaca gaagccaggg cagtctccta aactgctgat atactatgca   240
tccaatcgct acactggagt ccctgatcgc ttcactggca gtggatatgg gacggatttc   300
actttcacca tcagcactgt gcaggctgaa gacctggcag tttatttctg tcagcaggat   360
tatagctctc cgtggacgtt cggtggaggc accaagctgg aaatcaaacg ggctgatgct   420
gca                                                                 423

<210> SEQ ID NO 14
<211> LENGTH: 27
<212> TYPE: DNA
<213> ORGANISM: Artificial Sequence
<220> FEATURE:
<223> OTHER INFORMATION: 8G7 heavy chain VL: CDR1

<400> SEQUENCE: 14
aaggccagtc agagtgtgag taatgat                                        27

<210> SEQ ID NO 15
<211> LENGTH: 21
<212> TYPE: DNA
<213> ORGANISM: Artificial Sequence
<220> FEATURE:
<223> OTHER INFORMATION: 8G7 heavy chain VL: CDR2

<400> SEQUENCE: 15
tatgcatcca atcgctacac t                                              21

```
<210> SEQ ID NO 16
<211> LENGTH: 27
<212> TYPE: DNA
<213> ORGANISM: Artificial Sequence
<220> FEATURE:
<223> OTHER INFORMATION: 8G7 heavy chain VL: CDR3

<400> SEQUENCE: 16
cagcaggatt atagctctcc gtggacg                                              27

<210> SEQ ID NO 17
<211> LENGTH: 127
<212> TYPE: PRT
<213> ORGANISM: Artificial Sequence
<220> FEATURE:
<223> OTHER INFORMATION: 8G7 light chain VL
<220> FEATURE:
<221> NAME/KEY: MISC_FEATURE
<222> LOCATION: (1)..(20)
<223> OTHER INFORMATION: Leader sequence
<220> FEATURE:
<221> NAME/KEY: MISC_FEATURE
<222> LOCATION: (21)..(43)
<223> OTHER INFORMATION: FR1
<220> FEATURE:
<221> NAME/KEY: MISC_FEATURE
<222> LOCATION: (44)..(52)
<223> OTHER INFORMATION: CDR1
<220> FEATURE:
<221> NAME/KEY: MISC_FEATURE
<222> LOCATION: (53)..(69)
<223> OTHER INFORMATION: FR2
<220> FEATURE:
<221> NAME/KEY: MISC_FEATURE
<222> LOCATION: (70)..(76)
<223> OTHER INFORMATION: CDR2
<220> FEATURE:
<221> NAME/KEY: MISC_FEATURE
<222> LOCATION: (77)..(108)
<223> OTHER INFORMATION: FR3
<220> FEATURE:
<221> NAME/KEY: MISC_FEATURE
<222> LOCATION: (109)..(117)
<223> OTHER INFORMATION: CDR3
<220> FEATURE:
<221> NAME/KEY: MISC_FEATURE
<222> LOCATION: (118)..(127)
<223> OTHER INFORMATION: FR4

<400> SEQUENCE: 17

Met Lys Ser Gln Thr Gln Val Phe Val Phe Leu Leu Leu Cys Val Ser
1               5                   10                  15

Gly Ala His Gly Ser Ile Val Met Thr Gln Thr Pro Lys Phe Leu Leu
            20                  25                  30

Val Ser Ala Gly Asp Arg Val Thr Ile Thr Cys Lys Ala Ser Gln Ser
        35                  40                  45

Val Ser Asn Asp Val Ala Trp Tyr Gln Gln Lys Pro Gly Gln Ser Pro
    50                  55                  60

Lys Leu Leu Ile Tyr Tyr Ala Ser Asn Arg Tyr Thr Gly Val Pro Asp
65                  70                  75                  80

Arg Phe Thr Gly Ser Gly Tyr Gly Thr Asp Phe Thr Phe Thr Ile Ser
                85                  90                  95

Thr Val Gln Ala Glu Asp Leu Ala Val Tyr Phe Cys Gln Gln Asp Tyr
            100                 105                 110

Ser Ser Pro Trp Thr Phe Gly Gly Gly Thr Lys Leu Glu Ile Lys
        115                 120                 125

<210> SEQ ID NO 18
```

```
<211> LENGTH: 23
<212> TYPE: PRT
<213> ORGANISM: Artificial Sequence
<220> FEATURE:
<223> OTHER INFORMATION: 8G7 light chain VL: FR1

<400> SEQUENCE: 18

Ser Ile Val Met Thr Gln Thr Pro Lys Phe Leu Leu Val Ser Ala Gly
1               5                   10                  15

Asp Arg Val Thr Ile Thr Cys
            20

<210> SEQ ID NO 19
<211> LENGTH: 9
<212> TYPE: PRT
<213> ORGANISM: Artificial Sequence
<220> FEATURE:
<223> OTHER INFORMATION: 8G7 light chain VL: CDR1

<400> SEQUENCE: 19

Lys Ala Ser Gln Ser Val Ser Asn Asp
1               5

<210> SEQ ID NO 20
<211> LENGTH: 17
<212> TYPE: PRT
<213> ORGANISM: Artificial Sequence
<220> FEATURE:
<223> OTHER INFORMATION: 8G7 light chain VL: FR2

<400> SEQUENCE: 20

Val Ala Trp Tyr Gln Gln Lys Pro Gly Gln Ser Pro Lys Leu Leu Ile
1               5                   10                  15

Tyr

<210> SEQ ID NO 21
<211> LENGTH: 7
<212> TYPE: PRT
<213> ORGANISM: Artificial Sequence
<220> FEATURE:
<223> OTHER INFORMATION: 8G7 light chain VL: CDR2

<400> SEQUENCE: 21

Tyr Ala Ser Asn Arg Tyr Thr
1               5

<210> SEQ ID NO 22
<211> LENGTH: 32
<212> TYPE: PRT
<213> ORGANISM: Artificial Sequence
<220> FEATURE:
<223> OTHER INFORMATION: 8G7 light chain VL: FR3

<400> SEQUENCE: 22

Gly Val Pro Asp Arg Phe Thr Gly Ser Gly Tyr Gly Thr Asp Phe Thr
1               5                   10                  15

Phe Thr Ile Ser Thr Val Gln Ala Glu Asp Leu Ala Val Tyr Phe Cys
            20                  25                  30

<210> SEQ ID NO 23
<211> LENGTH: 9
<212> TYPE: PRT
<213> ORGANISM: Artificial Sequence
<220> FEATURE:
<223> OTHER INFORMATION: 8G7 light chain VL: CDR3
```

<400> SEQUENCE: 23

Gln Gln Asp Tyr Ser Ser Pro Trp Thr
1               5

<210> SEQ ID NO 24
<211> LENGTH: 10
<212> TYPE: PRT
<213> ORGANISM: Artificial Sequence
<220> FEATURE:
<223> OTHER INFORMATION: 8G7 light chain VL: FR4

<400> SEQUENCE: 24

Phe Gly Gly Gly Thr Lys Leu Glu Ile Lys
1               5                   10

<210> SEQ ID NO 25
<211> LENGTH: 431
<212> TYPE: DNA
<213> ORGANISM: Artificial Sequence
<220> FEATURE:
<223> OTHER INFORMATION: 26E10 heavy chain VH
<220> FEATURE:
<221> NAME/KEY: misc_feature
<222> LOCATION: (11)..(67)
<223> OTHER INFORMATION: Leader sequence
<220> FEATURE:
<221> NAME/KEY: misc_feature
<222> LOCATION: (68)..(142)
<223> OTHER INFORMATION: FR1
<220> FEATURE:
<221> NAME/KEY: misc_feature
<222> LOCATION: (143)..(172)
<223> OTHER INFORMATION: CDR1
<220> FEATURE:
<221> NAME/KEY: misc_feature
<222> LOCATION: (173)..(214)
<223> OTHER INFORMATION: FR2
<220> FEATURE:
<221> NAME/KEY: misc_feature
<222> LOCATION: (215)..(265)
<223> OTHER INFORMATION: CDR2
<220> FEATURE:
<221> NAME/KEY: misc_feature
<222> LOCATION: (266)..(361)
<223> OTHER INFORMATION: FR3
<220> FEATURE:
<221> NAME/KEY: misc_feature
<222> LOCATION: (362)..(397)
<223> OTHER INFORMATION: CDR3
<220> FEATURE:
<221> NAME/KEY: misc_feature
<222> LOCATION: (398)..(430)
<223> OTHER INFORMATION: FR4

<400> SEQUENCE: 25
tggggaattc atggaatgga gctgggtttt tctcttcctc ctgtcaataa ctacaggtgt    60
ccactcccag gcttatctac agcagtctgg ggctgagctg gtgaggtctg ggcctcagt   120 gaagatgtcc tgcaaggctt ctggctacac atttaccagt tacaatatac actgggtaaa   180
gcagacacct ggacagggcc tggaatggat tggatatatt tatcctggag atggtgttac   240
taactacaat cagaagttca aggcaaggc cacattgact gcagacacat cctccagcac   300
agcctacatg cagatcagca gcctgacatc tgaagactct gcggtctatt tctgtgcaag   360
atcgggcaac tatggtaact acgaagggtt tgcttactgg ggccaaggga ctctggtcac   420
tgtctctgct a                                                       431

<210> SEQ ID NO 26
<211> LENGTH: 30

```
<212> TYPE: DNA
<213> ORGANISM: Artificial Sequence
<220> FEATURE:
<223> OTHER INFORMATION: 26E10 heavy chain VH: CDR1

<400> SEQUENCE: 26
ggctacacat taccagtta caatatacac                                    30

<210> SEQ ID NO 27
<211> LENGTH: 51
<212> TYPE: DNA
<213> ORGANISM: Artificial Sequence
<220> FEATURE:
<223> OTHER INFORMATION: 26E10 heavy chain VH: CDR2

<400> SEQUENCE: 27
tatatttatc ctggagatgg tgttactaac tacaatcaga agttcaaggg c            51

<210> SEQ ID NO 28
<211> LENGTH: 36
<212> TYPE: DNA
<213> ORGANISM: Artificial Sequence
<220> FEATURE:
<223> OTHER INFORMATION: 26E10 heavy chain VH: CDR3

<400> SEQUENCE: 28
tcgggcaact atggtaacta cgaagggttt gcttac                            36

<210> SEQ ID NO 29
<211> LENGTH: 140
<212> TYPE: PRT
<213> ORGANISM: Artificial Sequence
<220> FEATURE:
<223> OTHER INFORMATION: 26E10 heavy chain VH
<220> FEATURE:
<221> NAME/KEY: MISC_FEATURE
<222> LOCATION: (1)..(19)
<223> OTHER INFORMATION: Leader sequence
<220> FEATURE:
<221> NAME/KEY: MISC_FEATURE
<222> LOCATION: (20)..(44)
<223> OTHER INFORMATION: FR1
<220> FEATURE:
<221> NAME/KEY: MISC_FEATURE
<222> LOCATION: (45)..(54)
<223> OTHER INFORMATION: CDR1
<220> FEATURE:
<221> NAME/KEY: MISC_FEATURE
<222> LOCATION: (55)..(68)
<223> OTHER INFORMATION: FR2
<220> FEATURE:
<221> NAME/KEY: MISC_FEATURE
<222> LOCATION: (69)..(85)
<223> OTHER INFORMATION: CDR2
<220> FEATURE:
<221> NAME/KEY: MISC_FEATURE
<222> LOCATION: (86)..(117)
<223> OTHER INFORMATION: FR3
<220> FEATURE:
<221> NAME/KEY: MISC_FEATURE
<222> LOCATION: (118)..(129)
<223> OTHER INFORMATION: CDR3
<220> FEATURE:
<221> NAME/KEY: MISC_FEATURE
<222> LOCATION: (130)..(140)
<223> OTHER INFORMATION: FR4

<400> SEQUENCE: 29

Met Glu Trp Ser Trp Val Phe Leu Phe Leu Leu Ser Ile Thr Thr Gly
1               5                   10                  15

Val His Ser Gln Ala Tyr Leu Gln Gln Ser Gly Ala Glu Leu Val Arg
```

-continued

```
                20                  25                  30
Ser Gly Ala Ser Val Lys Met Ser Cys Lys Ala Ser Gly Tyr Thr Phe
            35                  40                  45

Thr Ser Tyr Asn Ile His Trp Val Lys Gln Thr Pro Gly Gln Gly Leu
        50                  55                  60

Glu Trp Ile Gly Tyr Ile Tyr Pro Gly Asp Gly Val Thr Asn Tyr Asn
65                  70                  75                  80

Gln Lys Phe Lys Gly Lys Ala Thr Leu Thr Ala Asp Thr Ser Ser Ser
                85                  90                  95

Thr Ala Tyr Met Gln Ile Ser Ser Leu Thr Ser Glu Asp Ser Ala Val
            100                 105                 110

Tyr Phe Cys Ala Arg Ser Gly Asn Tyr Gly Asn Tyr Glu Gly Phe Ala
        115                 120                 125

Tyr Trp Gly Gln Gly Thr Leu Val Thr Val Ser Ala
130                 135                 140
```

<210> SEQ ID NO 30
<211> LENGTH: 25
<212> TYPE: PRT
<213> ORGANISM: Artificial Sequence
<220> FEATURE:
<223> OTHER INFORMATION: 26E10 heavy chain VH: FR1

<400> SEQUENCE: 30

```
Gln Ala Tyr Leu Gln Gln Ser Gly Ala Glu Leu Val Arg Ser Gly Ala
1               5                   10                  15

Ser Val Lys Met Ser Cys Lys Ala Ser
            20                  25
```

<210> SEQ ID NO 31
<211> LENGTH: 10
<212> TYPE: PRT
<213> ORGANISM: Artificial Sequence
<220> FEATURE:
<223> OTHER INFORMATION: 26E10 heavy chain VH: CDR1

<400> SEQUENCE: 31

```
Gly Tyr Thr Phe Thr Ser Tyr Asn Ile His
1               5                   10
```

<210> SEQ ID NO 32
<211> LENGTH: 14
<212> TYPE: PRT
<213> ORGANISM: Artificial Sequence
<220> FEATURE:
<223> OTHER INFORMATION: 26E10 heavy chain VH: FR2

<400> SEQUENCE: 32

```
Trp Val Lys Gln Thr Pro Gly Gln Gly Leu Glu Trp Ile Gly
1               5                   10
```

<210> SEQ ID NO 33
<211> LENGTH: 17
<212> TYPE: PRT
<213> ORGANISM: Artificial Sequence
<220> FEATURE:
<223> OTHER INFORMATION: 26E10 heavy chain VH: CDR2

<400> SEQUENCE: 33

```
Tyr Ile Tyr Pro Gly Asp Gly Val Thr Asn Tyr Asn Gln Lys Phe Lys
1               5                   10                  15

Gly
```

```
<210> SEQ ID NO 34
<211> LENGTH: 32
<212> TYPE: PRT
<213> ORGANISM: Artificial Sequence
<220> FEATURE:
<223> OTHER INFORMATION: 26E10 heavy chain VH: FR3

<400> SEQUENCE: 34

Lys Ala Thr Leu Thr Ala Asp Thr Ser Ser Thr Ala Tyr Met Gln
1               5                   10                  15

Ile Ser Ser Leu Thr Ser Glu Asp Ser Ala Val Tyr Phe Cys Ala Arg
            20                  25                  30

<210> SEQ ID NO 35
<211> LENGTH: 12
<212> TYPE: PRT
<213> ORGANISM: Artificial Sequence
<220> FEATURE:
<223> OTHER INFORMATION: 26E10 heavy chain VH: CDR3

<400> SEQUENCE: 35

Ser Gly Asn Tyr Gly Asn Tyr Glu Gly Phe Ala Tyr
1               5                   10

<210> SEQ ID NO 36
<211> LENGTH: 11
<212> TYPE: PRT
<213> ORGANISM: Artificial Sequence
<220> FEATURE:
<223> OTHER INFORMATION: 26E10 heavy chain VH: FR4

<400> SEQUENCE: 36

Trp Gly Gln Gly Thr Leu Val Thr Val Ser Ala
1               5                   10

<210> SEQ ID NO 37
<211> LENGTH: 296
<212> TYPE: DNA
<213> ORGANISM: Artificial Sequence
<220> FEATURE:
<223> OTHER INFORMATION: 26E10 light chain VL
<220> FEATURE:
<221> NAME/KEY: misc_feature
<222> LOCATION: (2)..(43)
<223> OTHER INFORMATION: FR1
<220> FEATURE:
<221> NAME/KEY: misc_feature
<222> LOCATION: (44)..(76)
<223> OTHER INFORMATION: CDR1
<220> FEATURE:
<221> NAME/KEY: misc_feature
<222> LOCATION: (77)..(121)
<223> OTHER INFORMATION: FR2
<220> FEATURE:
<221> NAME/KEY: misc_feature
<222> LOCATION: (122)..(142)
<223> OTHER INFORMATION: CDR2
<220> FEATURE:
<221> NAME/KEY: misc_feature
<222> LOCATION: (143)..(238)
<223> OTHER INFORMATION: FR3
<220> FEATURE:
<221> NAME/KEY: misc_feature
<222> LOCATION: (239)..(265)
<223> OTHER INFORMATION: CDR3
<220> FEATURE:
<221> NAME/KEY: misc_feature
<222> LOCATION: (266)..(295)
<223> OTHER INFORMATION: FR4
```

<400> SEQUENCE: 37

```
ttccatgtat gcatctctag gagagagagt cactatcact tgcaaggcga gtcaggacac      60
taatagctat ttaagctggt tccagcagaa accagggaaa tctcctaaga ccctgatcta     120
tcgtgcaaac agattggtag atggggtccc atcaaggttc agtggcagtg gatctgggca     180
agattattct ctcaccatca gcagcctgga gtatgaagat atgggaattt attattgtct     240
acagtatgat gagtttccgt acacgttcgg aggggggacc aagctggaaa taaaac         296
```

<210> SEQ ID NO 38
<211> LENGTH: 33
<212> TYPE: DNA
<213> ORGANISM: Artificial Sequence
<220> FEATURE:
<223> OTHER INFORMATION: 26E10 light chain VL: CDR1

<400> SEQUENCE: 38

```
aaggcgagtc aggacactaa tagctattta agc                                   33
```

<210> SEQ ID NO 39
<211> LENGTH: 21
<212> TYPE: DNA
<213> ORGANISM: Artificial Sequence
<220> FEATURE:
<223> OTHER INFORMATION: 26E10 light chain VL: CDR2

<400> SEQUENCE: 39

```
cgtgcaaaca gattggtaga t                                                21
```

<210> SEQ ID NO 40
<211> LENGTH: 27
<212> TYPE: DNA
<213> ORGANISM: Artificial Sequence
<220> FEATURE:
<223> OTHER INFORMATION: 26E10 light chain VL: CDR3

<400> SEQUENCE: 40

```
ctacagtatg atgagtttcc gtacacg                                          27
```

<210> SEQ ID NO 41
<211> LENGTH: 98
<212> TYPE: PRT
<213> ORGANISM: Artificial Sequence
<220> FEATURE:
<223> OTHER INFORMATION: 26E10 light chain VL
<220> FEATURE:
<221> NAME/KEY: MISC_FEATURE
<222> LOCATION: (1)..(14)
<223> OTHER INFORMATION: FR1
<220> FEATURE:
<221> NAME/KEY: MISC_FEATURE
<222> LOCATION: (15)..(25)
<223> OTHER INFORMATION: CDR1
<220> FEATURE:
<221> NAME/KEY: MISC_FEATURE
<222> LOCATION: (26)..(40)
<223> OTHER INFORMATION: FR2
<220> FEATURE:
<221> NAME/KEY: MISC_FEATURE
<222> LOCATION: (41)..(47)
<223> OTHER INFORMATION: CDR2
<220> FEATURE:
<221> NAME/KEY: MISC_FEATURE
<222> LOCATION: (48)..(79)
<223> OTHER INFORMATION: FR3
<220> FEATURE:
<221> NAME/KEY: MISC_FEATURE
<222> LOCATION: (80)..(88)
<223> OTHER INFORMATION: CDR3

```
<220> FEATURE:
<221> NAME/KEY: MISC_FEATURE
<222> LOCATION: (89)..(98)
<223> OTHER INFORMATION: FR4

<400> SEQUENCE: 41

Ser Met Tyr Ala Ser Leu Gly Glu Arg Val Thr Ile Thr Cys Lys Ala
1               5                   10                  15

Ser Gln Asp Thr Asn Ser Tyr Leu Ser Trp Phe Gln Gln Lys Pro Gly
            20                  25                  30

Lys Ser Pro Lys Thr Leu Ile Tyr Arg Ala Asn Arg Leu Val Asp Gly
        35                  40                  45

Val Pro Ser Arg Phe Ser Gly Ser Gly Ser Gly Gln Asp Tyr Ser Leu
    50                  55                  60

Thr Ile Ser Ser Leu Glu Tyr Glu Asp Met Gly Ile Tyr Tyr Cys Leu
65                  70                  75                  80

Gln Tyr Asp Glu Phe Pro Tyr Thr Phe Gly Gly Gly Thr Lys Leu Glu
                85                  90                  95

Ile Lys

<210> SEQ ID NO 42
<211> LENGTH: 14
<212> TYPE: PRT
<213> ORGANISM: Artificial Sequence
<220> FEATURE:
<223> OTHER INFORMATION: 26E10 light chain VL: FR1

<400> SEQUENCE: 42

Ser Met Tyr Ala Ser Leu Gly Glu Arg Val Thr Ile Thr Cys
1               5                   10

<210> SEQ ID NO 43
<211> LENGTH: 11
<212> TYPE: PRT
<213> ORGANISM: Artificial Sequence
<220> FEATURE:
<223> OTHER INFORMATION: 26E10 light chain VL: CDR1

<400> SEQUENCE: 43

Lys Ala Ser Gln Asp Thr Asn Ser Tyr Leu Ser
1               5                   10

<210> SEQ ID NO 44
<211> LENGTH: 15
<212> TYPE: PRT
<213> ORGANISM: Artificial Sequence
<220> FEATURE:
<223> OTHER INFORMATION: 26E10 light chain VL: FR2

<400> SEQUENCE: 44

Trp Phe Gln Gln Lys Pro Gly Lys Ser Pro Lys Thr Leu Ile Tyr
1               5                   10                  15

<210> SEQ ID NO 45
<211> LENGTH: 7
<212> TYPE: PRT
<213> ORGANISM: Artificial Sequence
<220> FEATURE:
<223> OTHER INFORMATION: 26E10 light chain VL: CDR2

<400> SEQUENCE: 45

Arg Ala Asn Arg Leu Val Asp
1               5
```

<210> SEQ ID NO 46
<211> LENGTH: 32
<212> TYPE: PRT
<213> ORGANISM: Artificial Sequence
<220> FEATURE:
<223> OTHER INFORMATION: 26E10 light chain VL: FR3

<400> SEQUENCE: 46

Gly Val Pro Ser Arg Phe Ser Gly Ser Gly Ser Gly Gln Asp Tyr Ser
1               5                   10                  15

Leu Thr Ile Ser Ser Leu Glu Tyr Glu Asp Met Gly Ile Tyr Tyr Cys
            20                  25                  30

<210> SEQ ID NO 47
<211> LENGTH: 9
<212> TYPE: PRT
<213> ORGANISM: Artificial Sequence
<220> FEATURE:
<223> OTHER INFORMATION: 26E10 light chain VL: CDR3

<400> SEQUENCE: 47

Leu Gln Tyr Asp Glu Phe Pro Tyr Thr
1               5

<210> SEQ ID NO 48
<211> LENGTH: 10
<212> TYPE: PRT
<213> ORGANISM: Artificial Sequence
<220> FEATURE:
<223> OTHER INFORMATION: 26E10 light chain VL: FR4

<400> SEQUENCE: 48

Phe Gly Gly Gly Thr Lys Leu Glu Ile Lys
1               5                   10

<210> SEQ ID NO 49
<211> LENGTH: 264
<212> TYPE: DNA
<213> ORGANISM: Artificial Sequence
<220> FEATURE:
<223> OTHER INFORMATION: 26E2 heavy chain VH
<220> FEATURE:
<221> NAME/KEY: misc_feature
<222> LOCATION: (2)..(46)
<223> OTHER INFORMATION: FR2
<220> FEATURE:
<221> NAME/KEY: misc_feature
<222> LOCATION: (47)..(97)
<223> OTHER INFORMATION: CDR2
<220> FEATURE:
<221> NAME/KEY: misc_feature
<222> LOCATION: (98)..(193)
<223> OTHER INFORMATION: FR3
<220> FEATURE:
<221> NAME/KEY: misc_feature
<222> LOCATION: (194)..(229)
<223> OTHER INFORMATION: CDR3
<220> FEATURE:
<221> NAME/KEY: misc_feature
<222> LOCATION: (230)..(262)
<223> OTHER INFORMATION: FR4

<400> SEQUENCE: 49
gcgctgggta aagcagacac ctggacaggg cctggaatgg attggatata tttatcctgg      60
agatggtggt actaactgca atcagaagtt ccagggcaag gccacattga ctgcagacac     120
atcctccagc acagcctaca tgcagatcag cagcctgaca tctgaagact ctgcggtcta     180
tttctgtgca agatcgggca actatggtaa ctacgaaggg tttgctttct ggggccaagg     240
gactctggtc actgtctctg cagc                                                  264

<210> SEQ ID NO 50
<211> LENGTH: 51
<212> TYPE: DNA
<213> ORGANISM: Artificial Sequence
<220> FEATURE:
<223> OTHER INFORMATION: 26E2 heavy chain VH: CDR2

<400> SEQUENCE: 50
tatatttatc ctggagatgg tggtactaac tgcaatcaga agttccaggg c                    51

<210> SEQ ID NO 51
<211> LENGTH: 36
<212> TYPE: DNA
<213> ORGANISM: Artificial Sequence
<220> FEATURE:
<223> OTHER INFORMATION: 26E2 heavy chain VH: CDR3

<400> SEQUENCE: 51
tcgggcaact atggtaacta cgaagggttt gctttc                                     36

<210> SEQ ID NO 52
<211> LENGTH: 87
<212> TYPE: PRT
<213> ORGANISM: Artificial Sequence
<220> FEATURE:
<223> OTHER INFORMATION: 26E2 heavy chain VH
<220> FEATURE:
<221> NAME/KEY: MISC_FEATURE
<222> LOCATION: (1)..(15)
<223> OTHER INFORMATION: FR2
<220> FEATURE:
<221> NAME/KEY: MISC_FEATURE
<222> LOCATION: (16)..(32)
<223> OTHER INFORMATION: CDR2
<220> FEATURE:
<221> NAME/KEY: MISC_FEATURE
<222> LOCATION: (33)..(64)
<223> OTHER INFORMATION: FR3
<220> FEATURE:
<221> NAME/KEY: MISC_FEATURE
<222> LOCATION: (65)..(76)
<223> OTHER INFORMATION: CDR3
<220> FEATURE:
<221> NAME/KEY: MISC_FEATURE
<222> LOCATION: (77)..(87)
<223> OTHER INFORMATION: FR4

<400> SEQUENCE: 52

Arg Trp Val Lys Gln Thr Pro Gly Gln Gly Leu Glu Trp Ile Gly Tyr
1               5                   10                  15

Ile Tyr Pro Gly Asp Gly Gly Thr Asn Cys Asn Gln Lys Phe Gln Gly
            20                  25                  30

Lys Ala Thr Leu Thr Ala Asp Thr Ser Ser Ser Thr Ala Tyr Met Gln
        35                  40                  45

Ile Ser Ser Leu Thr Ser Glu Asp Ser Ala Val Tyr Phe Cys Ala Arg
    50                  55                  60

Ser Gly Asn Tyr Gly Asn Tyr Glu Gly Phe Ala Phe Trp Gly Gln Gly
65                  70                  75                  80

Thr Leu Val Thr Val Ser Ala
                85

<210> SEQ ID NO 53
<211> LENGTH: 15
<212> TYPE: PRT

```
<213> ORGANISM: Artificial Sequence
<220> FEATURE:
<223> OTHER INFORMATION: 26E2 heavy chain VH: FR2

<400> SEQUENCE: 53

Arg Trp Val Lys Gln Thr Pro Gly Gln Gly Leu Glu Trp Ile Gly
1               5                   10                  15

<210> SEQ ID NO 54
<211> LENGTH: 17
<212> TYPE: PRT
<213> ORGANISM: Artificial Sequence
<220> FEATURE:
<223> OTHER INFORMATION: 26E2 heavy chain VH: CDR2

<400> SEQUENCE: 54

Tyr Ile Tyr Pro Gly Asp Gly Gly Thr Asn Cys Asn Gln Lys Phe Gln
1               5                   10                  15

Gly

<210> SEQ ID NO 55
<211> LENGTH: 32
<212> TYPE: PRT
<213> ORGANISM: Artificial Sequence
<220> FEATURE:
<223> OTHER INFORMATION: 26E2 heavy chain VH: FR3

<400> SEQUENCE: 55

Lys Ala Thr Leu Thr Ala Asp Thr Ser Ser Ser Thr Ala Tyr Met Gln
1               5                   10                  15

Ile Ser Ser Leu Thr Ser Glu Asp Ser Ala Val Tyr Phe Cys Ala Arg
            20                  25                  30

<210> SEQ ID NO 56
<211> LENGTH: 12
<212> TYPE: PRT
<213> ORGANISM: Artificial Sequence
<220> FEATURE:
<223> OTHER INFORMATION: 26E2 heavy chain VH: CDR3

<400> SEQUENCE: 56

Ser Gly Asn Tyr Gly Asn Tyr Glu Gly Phe Ala Phe
1               5                   10

<210> SEQ ID NO 57
<211> LENGTH: 11
<212> TYPE: PRT
<213> ORGANISM: Artificial Sequence
<220> FEATURE:
<223> OTHER INFORMATION: 26E2 heavy chain VH: FR4

<400> SEQUENCE: 57

Trp Gly Gln Gly Thr Leu Val Thr Val Ser Ala
1               5                   10

<210> SEQ ID NO 58
<211> LENGTH: 394
<212> TYPE: DNA
<213> ORGANISM: Artificial Sequence
<220> FEATURE:
<223> OTHER INFORMATION: 26E2 light chain VL
<220> FEATURE:
<221> NAME/KEY: misc_feature
<222> LOCATION: (1)..(60)
<223> OTHER INFORMATION: Leader sequence
<220> FEATURE:
<221> NAME/KEY: misc_feature
```

```
<222> LOCATION: (61)..(129)
<223> OTHER INFORMATION: FR1
<220> FEATURE:
<221> NAME/KEY: misc_feature
<222> LOCATION: (130)..(162)
<223> OTHER INFORMATION: CDR1
<220> FEATURE:
<221> NAME/KEY: misc_feature
<222> LOCATION: (163)..(207)
<223> OTHER INFORMATION: FR2
<220> FEATURE:
<221> NAME/KEY: misc_feature
<222> LOCATION: (208)..(228)
<223> OTHER INFORMATION: CDR2
<220> FEATURE:
<221> NAME/KEY: misc_feature
<222> LOCATION: (229)..(324)
<223> OTHER INFORMATION: FR3
<220> FEATURE:
<221> NAME/KEY: misc_feature
<222> LOCATION: (325)..(351)
<223> OTHER INFORMATION: CDR3
<220> FEATURE:
<221> NAME/KEY: misc_feature
<222> LOCATION: (352)..(393)
<223> OTHER INFORMATION: FR4

<400> SEQUENCE: 58
atgagggccc ctgctcagtt ttttgggatc ttgttgctct ggtttccagg tatcaaatgt    60
gacatcaaga tgacccagtc tccatcctcc atgtatgcat ctctaggaga gagagtcact   120
atcacttgca aggcgagtca ggacactaat agctatttaa gctggttcca gcagaaacca   180
gggaaatctc ctaagaccct gatctatcgt gcaaacagat tggtagatgg ggtcccatca   240
aggttcagtg gcagtggatc tgggcaagat tattctctca ccatcagccg cctggagtat   300
gaagatatgg gaatttatta ttgtctacag tataatgagt ttccgtacac gttcggaggg   360
gggaccaagc tggaaataaa acgggctgat gctg                               394

<210> SEQ ID NO 59
<211> LENGTH: 33
<212> TYPE: DNA
<213> ORGANISM: Artificial Sequence
<220> FEATURE:
<223> OTHER INFORMATION: 26E2 light chain VL: CDR1

<400> SEQUENCE: 59
aaggcgagtc aggacactaa tagctattta agc                                33

<210> SEQ ID NO 60
<211> LENGTH: 21
<212> TYPE: DNA
<213> ORGANISM: Artificial Sequence
<220> FEATURE:
<223> OTHER INFORMATION: 26E2 light chain VL: CDR2

<400> SEQUENCE: 60
cgtgcaaaca gattggtaga t                                             21

<210> SEQ ID NO 61
<211> LENGTH: 27
<212> TYPE: DNA
<213> ORGANISM: Artificial Sequence
<220> FEATURE:
<223> OTHER INFORMATION: 26E2 light chain VL: CDR3

<400> SEQUENCE: 61
ctacagtata atgagtttcc gtacacg                                       27
```

```
<210> SEQ ID NO 62
<211> LENGTH: 131
<212> TYPE: PRT
<213> ORGANISM: Artificial Sequence
<220> FEATURE:
<223> OTHER INFORMATION: 26E2 light chain VL
<220> FEATURE:
<221> NAME/KEY: MISC_FEATURE
<222> LOCATION: (1)..(20)
<223> OTHER INFORMATION: Leader sequence
<220> FEATURE:
<221> NAME/KEY: MISC_FEATURE
<222> LOCATION: (21)..(43)
<223> OTHER INFORMATION: FR1
<220> FEATURE:
<221> NAME/KEY: MISC_FEATURE
<222> LOCATION: (44)..(54)
<223> OTHER INFORMATION: CDR1
<220> FEATURE:
<221> NAME/KEY: MISC_FEATURE
<222> LOCATION: (55)..(69)
<223> OTHER INFORMATION: FR2
<220> FEATURE:
<221> NAME/KEY: MISC_FEATURE
<222> LOCATION: (70)..(76)
<223> OTHER INFORMATION: CDR2
<220> FEATURE:
<221> NAME/KEY: MISC_FEATURE
<222> LOCATION: (77)..(108)
<223> OTHER INFORMATION: FR3
<220> FEATURE:
<221> NAME/KEY: MISC_FEATURE
<222> LOCATION: (109)..(117)
<223> OTHER INFORMATION: CDR3
<220> FEATURE:
<221> NAME/KEY: MISC_FEATURE
<222> LOCATION: (118)..(131)
<223> OTHER INFORMATION: FR4

<400> SEQUENCE: 62

Met Arg Ala Pro Ala Gln Phe Phe Gly Ile Leu Leu Leu Trp Phe Pro
1               5                   10                  15

Gly Ile Lys Cys Asp Ile Lys Met Thr Gln Ser Pro Ser Ser Met Tyr
            20                  25                  30

Ala Ser Leu Gly Glu Arg Val Thr Ile Thr Cys Lys Ala Ser Gln Asp
        35                  40                  45

Thr Asn Ser Tyr Leu Ser Trp Phe Gln Gln Lys Pro Gly Lys Ser Pro
    50                  55                  60

Lys Thr Leu Ile Tyr Arg Ala Asn Arg Leu Val Asp Gly Val Pro Ser
65                  70                  75                  80

Arg Phe Ser Gly Ser Gly Ser Gly Gln Asp Tyr Ser Leu Thr Ile Ser
                85                  90                  95

Arg Leu Glu Tyr Glu Asp Met Gly Ile Tyr Tyr Cys Leu Gln Tyr Asn
            100                 105                 110

Glu Phe Pro Tyr Thr Phe Gly Gly Gly Thr Lys Leu Glu Ile Lys Arg
        115                 120                 125

Ala Asp Ala
    130

<210> SEQ ID NO 63
<211> LENGTH: 23
<212> TYPE: PRT
<213> ORGANISM: Artificial Sequence
<220> FEATURE:
<223> OTHER INFORMATION: 26E2 light chain VL: FR1

<400> SEQUENCE: 63
```

```
Asp Ile Lys Met Thr Gln Ser Pro Ser Ser Met Tyr Ala Ser Leu Gly
1               5                   10                  15

Glu Arg Val Thr Ile Thr Cys
            20
```

<210> SEQ ID NO 64
<211> LENGTH: 11
<212> TYPE: PRT
<213> ORGANISM: Artificial Sequence
<220> FEATURE:
<223> OTHER INFORMATION: 26E2 light chain VL: CDR1

<400> SEQUENCE: 64

```
Lys Ala Ser Gln Asp Thr Asn Ser Tyr Leu Ser
1               5                   10
```

<210> SEQ ID NO 65
<211> LENGTH: 15
<212> TYPE: PRT
<213> ORGANISM: Artificial Sequence
<220> FEATURE:
<223> OTHER INFORMATION: 26E2 light chain VL: FR2

<400> SEQUENCE: 65

```
Trp Phe Gln Gln Lys Pro Gly Lys Ser Pro Lys Thr Leu Ile Tyr
1               5                   10                  15
```

<210> SEQ ID NO 66
<211> LENGTH: 7
<212> TYPE: PRT
<213> ORGANISM: Artificial Sequence
<220> FEATURE:
<223> OTHER INFORMATION: 26E2 light chain VL: CDR2

<400> SEQUENCE: 66

```
Arg Ala Asn Arg Leu Val Asp
1               5
```

<210> SEQ ID NO 67
<211> LENGTH: 32
<212> TYPE: PRT
<213> ORGANISM: Artificial Sequence
<220> FEATURE:
<223> OTHER INFORMATION: 26E2 light chain VL: FR3

<400> SEQUENCE: 67

```
Gly Val Pro Ser Arg Phe Ser Gly Ser Gly Ser Gly Gln Asp Tyr Ser
1               5                   10                  15

Leu Thr Ile Ser Arg Leu Glu Tyr Glu Asp Met Gly Ile Tyr Tyr Cys
            20                  25                  30
```

<210> SEQ ID NO 68
<211> LENGTH: 9
<212> TYPE: PRT
<213> ORGANISM: Artificial Sequence
<220> FEATURE:
<223> OTHER INFORMATION: 26E2 light chain VL: CDR3

<400> SEQUENCE: 68

```
Leu Gln Tyr Asn Glu Phe Pro Tyr Thr
1               5
```

<210> SEQ ID NO 69
<211> LENGTH: 14
<212> TYPE: PRT
<213> ORGANISM: Artificial Sequence

```
<220> FEATURE:
<223> OTHER INFORMATION: 26E2 light chain VL: FR4

<400> SEQUENCE: 69

Phe Gly Gly Gly Thr Lys Leu Glu Ile Lys Arg Ala Asp Ala
1               5                   10

<210> SEQ ID NO 70
<211> LENGTH: 435
<212> TYPE: DNA
<213> ORGANISM: Artificial Sequence
<220> FEATURE:
<223> OTHER INFORMATION: 31C4 heavy chain VH
<220> FEATURE:
<221> NAME/KEY: misc_feature
<222> LOCATION: (14)..(70)
<223> OTHER INFORMATION: Leader sequence
<220> FEATURE:
<221> NAME/KEY: misc_feature
<222> LOCATION: (71)..(145)
<223> OTHER INFORMATION: FR1
<220> FEATURE:
<221> NAME/KEY: misc_feature
<222> LOCATION: (146)..(175)
<223> OTHER INFORMATION: CDR1
<220> FEATURE:
<221> NAME/KEY: misc_feature
<222> LOCATION: (176)..(217)
<223> OTHER INFORMATION: FR2
<220> FEATURE:
<221> NAME/KEY: misc_feature
<222> LOCATION: (218)..(268)
<223> OTHER INFORMATION: CDR2
<220> FEATURE:
<221> NAME/KEY: misc_feature
<222> LOCATION: (269)..(358)
<223> OTHER INFORMATION: FR3
<220> FEATURE:
<221> NAME/KEY: misc_feature
<222> LOCATION: (359)..(400)
<223> OTHER INFORMATION: CDR3
<220> FEATURE:
<221> NAME/KEY: misc_feature
<222> LOCATION: (401)..(433)
<223> OTHER INFORMATION: FR4

<400> SEQUENCE: 70 tgtgggaat  tccatggaat  ggagctgggt  ttttctcttc  ctcctgtcaa  taactacagg      60
tgtccactcc  caggcttatc  tacagcagtc  tggggctgag  ctggtgaggt  ctggggcctc    120
agtgaagatg  tcctgcaagg  cttctggcta  cacatttacc  agttacaata  tgcactgggt    180
aaagcagaca  cctggacagg  gcctggaatg  gattggatat  attttttcctg  gagatggtgg   240 tactaactac  aatcagaagt  tcaagggcaa  ggccacattg  actgcagaca  catcctccag    300
cacagcctac  atgcagatca  gcagcctgac  atctgaagac  tctgcggtct  atttctgtgc    360
aagatcgggc  aactatggta  actacgaagg  gtttgcttac  tggggccaag  ggactctggt    420
cactgtctct  gctag                                                        435

<210> SEQ ID NO 71
<211> LENGTH: 30
<212> TYPE: DNA
<213> ORGANISM: Artificial Sequence
<220> FEATURE:
<223> OTHER INFORMATION: 31C4 heavy chain VH: CDR1

<400> SEQUENCE: 71
ggctacacat  ttaccagtta  caatatgcac                                         30
```

<210> SEQ ID NO 72
<211> LENGTH: 51
<212> TYPE: DNA
<213> ORGANISM: Artificial Sequence
<220> FEATURE:
<223> OTHER INFORMATION: 31C4 heavy chain VH: CDR2

<400> SEQUENCE: 72
tatatttttc ctggagatgg tggtactaac tacaatcaga agttcaaggg c         51

<210> SEQ ID NO 73
<211> LENGTH: 42
<212> TYPE: DNA
<213> ORGANISM: Artificial Sequence
<220> FEATURE:
<223> OTHER INFORMATION: 31C4 heavy chain VH: CDR3

<400> SEQUENCE: 73
gcaagatcgg gcaactatgg taactacgaa gggtttgctt ac                   42

<210> SEQ ID NO 74
<211> LENGTH: 140
<212> TYPE: PRT
<213> ORGANISM: Artificial Sequence
<220> FEATURE:
<223> OTHER INFORMATION: 31C4 heavy chain VH
<220> FEATURE:
<221> NAME/KEY: MISC_FEATURE
<222> LOCATION: (1)..(19)
<223> OTHER INFORMATION: Leader sequence
<220> FEATURE:
<221> NAME/KEY: MISC_FEATURE
<222> LOCATION: (20)..(44)
<223> OTHER INFORMATION: FR1
<220> FEATURE:
<221> NAME/KEY: MISC_FEATURE
<222> LOCATION: (45)..(54)
<223> OTHER INFORMATION: CDR1
<220> FEATURE:
<221> NAME/KEY: MISC_FEATURE
<222> LOCATION: (55)..(68)
<223> OTHER INFORMATION: FR2
<220> FEATURE:
<221> NAME/KEY: MISC_FEATURE
<222> LOCATION: (69)..(85)
<223> OTHER INFORMATION: CDR2
<220> FEATURE:
<221> NAME/KEY: MISC_FEATURE
<222> LOCATION: (86)..(115)
<223> OTHER INFORMATION: FR3
<220> FEATURE:
<221> NAME/KEY: MISC_FEATURE
<222> LOCATION: (116)..(129)
<223> OTHER INFORMATION: CDR3
<220> FEATURE:
<221> NAME/KEY: MISC_FEATURE
<222> LOCATION: (130)..(140)
<223> OTHER INFORMATION: FR4

<400> SEQUENCE: 74

Met Glu Trp Ser Trp Val Phe Leu Phe Leu Leu Ser Ile Thr Thr Gly
1               5                   10                  15

Val His Ser Gln Ala Tyr Leu Gln Gln Ser Gly Ala Glu Leu Val Arg
            20                  25                  30

Ser Gly Ala Ser Val Lys Met Ser Cys Lys Ala Ser Gly Tyr Thr Phe
        35                  40                  45

Thr Ser Tyr Asn Met His Trp Val Lys Gln Thr Pro Gly Gln Gly Leu
    50                  55                  60

Glu Trp Ile Gly Tyr Ile Phe Pro Gly Asp Gly Gly Thr Asn Tyr Asn
65                  70                  75                  80

```
Gln Lys Phe Lys Gly Lys Ala Thr Leu Thr Ala Asp Thr Ser Ser
                85                  90                  95

Thr Ala Tyr Met Gln Ile Ser Ser Leu Thr Ser Glu Asp Ser Ala Val
            100                 105                 110

Tyr Phe Cys Ala Arg Ser Gly Asn Tyr Gly Asn Tyr Glu Gly Phe Ala
        115                 120                 125

Tyr Trp Gly Gln Gly Thr Leu Val Thr Val Ser Ala
    130                 135                 140

<210> SEQ ID NO 75
<211> LENGTH: 25
<212> TYPE: PRT
<213> ORGANISM: Artificial Sequence
<220> FEATURE:
<223> OTHER INFORMATION: 31C4 heavy chain VH: FR1

<400> SEQUENCE: 75

Gln Ala Tyr Leu Gln Gln Ser Gly Ala Glu Leu Val Arg Ser Gly Ala
1               5                   10                  15

Ser Val Lys Met Ser Cys Lys Ala Ser
            20                  25

<210> SEQ ID NO 76
<211> LENGTH: 10
<212> TYPE: PRT
<213> ORGANISM: Artificial Sequence
<220> FEATURE:
<223> OTHER INFORMATION: 31C4 heavy chain VH: CDR1

<400> SEQUENCE: 76

Gly Tyr Thr Phe Thr Ser Tyr Asn Met His
1               5                   10

<210> SEQ ID NO 77
<211> LENGTH: 14
<212> TYPE: PRT
<213> ORGANISM: Artificial Sequence
<220> FEATURE:
<223> OTHER INFORMATION: 31C4 heavy chain VH: FR2

<400> SEQUENCE: 77

Trp Val Lys Gln Thr Pro Gly Gln Gly Leu Glu Trp Ile Gly
1               5                   10

<210> SEQ ID NO 78
<211> LENGTH: 17
<212> TYPE: PRT
<213> ORGANISM: Artificial Sequence
<220> FEATURE:
<223> OTHER INFORMATION: 31C4 heavy chain VH: CDR2

<400> SEQUENCE: 78

Tyr Ile Phe Pro Gly Asp Gly Gly Thr Asn Tyr Asn Gln Lys Phe Lys
1               5                   10                  15

Gly

<210> SEQ ID NO 79
<211> LENGTH: 30
<212> TYPE: PRT
<213> ORGANISM: Artificial Sequence
<220> FEATURE:
<223> OTHER INFORMATION: 31C4 heavy chain VH: FR3

<400> SEQUENCE: 79
```

Lys Ala Thr Leu Thr Ala Asp Thr Ser Ser Thr Ala Tyr Met Gln
1               5                   10                  15

Ile Ser Ser Leu Thr Ser Glu Asp Ser Ala Val Tyr Phe Cys
            20                  25                  30

<210> SEQ ID NO 80
<211> LENGTH: 14
<212> TYPE: PRT
<213> ORGANISM: Artificial Sequence
<220> FEATURE:
<223> OTHER INFORMATION: 31C4 heavy chain VH: CDR3

<400> SEQUENCE: 80

Ala Arg Ser Gly Asn Tyr Gly Asn Tyr Glu Gly Phe Ala Tyr
1               5                   10

<210> SEQ ID NO 81
<211> LENGTH: 11
<212> TYPE: PRT
<213> ORGANISM: Artificial Sequence
<220> FEATURE:
<223> OTHER INFORMATION: 31C4 heavy chain VH: FR4

<400> SEQUENCE: 81

Trp Gly Gln Gly Thr Leu Val Thr Val Ser Ala
1               5                   10

<210> SEQ ID NO 82
<211> LENGTH: 407
<212> TYPE: DNA
<213> ORGANISM: Artificial Sequence
<220> FEATURE:
<223> OTHER INFORMATION: 31C4 light chain VL
<220> FEATURE:
<221> NAME/KEY: misc_feature
<222> LOCATION: (3)..(71)
<223> OTHER INFORMATION: Leader sequence
<220> FEATURE:
<221> NAME/KEY: misc_feature
<222> LOCATION: (72)..(140)
<223> OTHER INFORMATION: FR1
<220> FEATURE:
<221> NAME/KEY: misc_feature
<222> LOCATION: (141)..(173)
<223> OTHER INFORMATION: CDR1
<220> FEATURE:
<221> NAME/KEY: misc_feature
<222> LOCATION: (174)..(218)
<223> OTHER INFORMATION: FR2
<220> FEATURE:
<221> NAME/KEY: misc_feature
<222> LOCATION: (219)..(239)
<223> OTHER INFORMATION: CDR2
<220> FEATURE:
<221> NAME/KEY: misc_feature
<222> LOCATION: (240)..(335)
<223> OTHER INFORMATION: FR3
<220> FEATURE:
<221> NAME/KEY: misc_feature
<222> LOCATION: (336)..(362)
<223> OTHER INFORMATION: CDR3
<220> FEATURE:
<221> NAME/KEY: misc_feature
<222> LOCATION: (363)..(407)
<223> OTHER INFORMATION: FR4

<400> SEQUENCE: 82
tactagtcga catgaggccc cctgctcagt tttttgggat cttgttgctc tggtttccag    60
gtatcaaatg tgacatcaag atgacccagt ctccatcttc catgtatgca tctctaggag   120

-continued

```
agagagtcac tatcacttgc aaggcgagtc aggacattaa tagctattta agctggttcc    180
agcagaaacc agggaaatct cctaagaccc tgatctatcg tgcaaacaga ttggtagatg    240
gggtcccatc aaggttcagt ggcagtggat ctgggcaaga ttattctctc accatcagca    300
gcctggagta tgaagatatg ggaatttatt attgtctaca gtatgatgaa tttccgtaca    360
cgttcggagg ggggaccaag ctggaaataa aacgggctga tgctgca                  407
```

<210> SEQ ID NO 83
<211> LENGTH: 33
<212> TYPE: DNA
<213> ORGANISM: Artificial Sequence
<220> FEATURE:
<223> OTHER INFORMATION: 31C4 light chain VL: CDR1

<400> SEQUENCE: 83

```
aaggcgagtc aggacattaa tagctattta agc                                 33
```

<210> SEQ ID NO 84
<211> LENGTH: 21
<212> TYPE: DNA
<213> ORGANISM: Artificial Sequence
<220> FEATURE:
<223> OTHER INFORMATION: 31C4 light chain VL: CDR2

<400> SEQUENCE: 84

```
cgtgcaaaca gattggtaga t                                              21
```

<210> SEQ ID NO 85
<211> LENGTH: 27
<212> TYPE: DNA
<213> ORGANISM: Artificial Sequence
<220> FEATURE:
<223> OTHER INFORMATION: 31C4 light chain VL: CDR3

<400> SEQUENCE: 85

```
ctacagtatg atgaatttcc gtacacg                                        27
```

<210> SEQ ID NO 86
<211> LENGTH: 135
<212> TYPE: PRT
<213> ORGANISM: Artificial Sequence
<220> FEATURE:
<223> OTHER INFORMATION: 31C4 light chain VL
<220> FEATURE:
<221> NAME/KEY: MISC_FEATURE
<222> LOCATION: (1)..(23)
<223> OTHER INFORMATION: Leader sequence
<220> FEATURE:
<221> NAME/KEY: MISC_FEATURE
<222> LOCATION: (24)..(46)
<223> OTHER INFORMATION: FR1
<220> FEATURE:
<221> NAME/KEY: MISC_FEATURE
<222> LOCATION: (47)..(57)
<223> OTHER INFORMATION: CDR1
<220> FEATURE:
<221> NAME/KEY: MISC_FEATURE
<222> LOCATION: (58)..(72)
<223> OTHER INFORMATION: FR2
<220> FEATURE:
<221> NAME/KEY: MISC_FEATURE
<222> LOCATION: (73)..(79)
<223> OTHER INFORMATION: CDR2
<220> FEATURE:
<221> NAME/KEY: MISC_FEATURE
<222> LOCATION: (80)..(111)
<223> OTHER INFORMATION: FR3
<220> FEATURE:
<221> NAME/KEY: MISC_FEATURE

```
<222> LOCATION: (112)..(120)
<223> OTHER INFORMATION: CDR3
<220> FEATURE:
<221> NAME/KEY: MISC_FEATURE
<222> LOCATION: (121)..(135)
<223> OTHER INFORMATION: FR4

<400> SEQUENCE: 86

Leu Val Asp Met Arg Pro Pro Ala Gln Phe Phe Gly Ile Leu Leu Leu
1               5                   10                  15

Trp Phe Pro Gly Ile Lys Cys Asp Ile Lys Met Thr Gln Ser Pro Ser
            20                  25                  30

Ser Met Tyr Ala Ser Leu Gly Glu Arg Val Thr Ile Thr Cys Lys Ala
        35                  40                  45

Ser Gln Asp Ile Asn Ser Tyr Leu Ser Trp Phe Gln Gln Lys Pro Gly
    50                  55                  60

Lys Ser Pro Lys Thr Leu Ile Tyr Arg Ala Asn Arg Leu Val Asp Gly
65                  70                  75                  80

Val Pro Ser Arg Phe Ser Gly Ser Gly Ser Gly Gln Asp Tyr Ser Leu
                85                  90                  95

Thr Ile Ser Ser Leu Glu Tyr Glu Asp Met Gly Ile Tyr Tyr Cys Leu
            100                 105                 110

Gln Tyr Asp Glu Phe Pro Tyr Thr Phe Gly Gly Gly Thr Lys Leu Glu
        115                 120                 125

Ile Lys Arg Ala Asp Ala Ala
    130                 135

<210> SEQ ID NO 87
<211> LENGTH: 23
<212> TYPE: PRT
<213> ORGANISM: Artificial Sequence
<220> FEATURE:
<223> OTHER INFORMATION: 31C4 light chain VL: FR1

<400> SEQUENCE: 87

Asp Ile Lys Met Thr Gln Ser Pro Ser Ser Met Tyr Ala Ser Leu Gly
1               5                   10                  15

Glu Arg Val Thr Ile Thr Cys
            20

<210> SEQ ID NO 88
<211> LENGTH: 11
<212> TYPE: PRT
<213> ORGANISM: Artificial Sequence
<220> FEATURE:
<223> OTHER INFORMATION: 31C4 light chain VL: CDR1

<400> SEQUENCE: 88

Lys Ala Ser Gln Asp Ile Asn Ser Tyr Leu Ser
1               5                   10

<210> SEQ ID NO 89
<211> LENGTH: 15
<212> TYPE: PRT
<213> ORGANISM: Artificial Sequence
<220> FEATURE:
<223> OTHER INFORMATION: 31C4 light chain VL: FR2

<400> SEQUENCE: 89

Trp Phe Gln Gln Lys Pro Gly Lys Ser Pro Lys Thr Leu Ile Tyr
1               5                   10                  15
```

-continued

```
<210> SEQ ID NO 90
<211> LENGTH: 7
<212> TYPE: PRT
<213> ORGANISM: Artificial Sequence
<220> FEATURE:
<223> OTHER INFORMATION: 31C4 light chain VL: CDR2

<400> SEQUENCE: 90

Arg Ala Asn Arg Leu Val Asp
1               5

<210> SEQ ID NO 91
<211> LENGTH: 32
<212> TYPE: PRT
<213> ORGANISM: Artificial Sequence
<220> FEATURE:
<223> OTHER INFORMATION: 31C4 light chain VL: FR3

<400> SEQUENCE: 91

Gly Val Pro Ser Arg Phe Ser Gly Ser Gly Ser Gly Gln Asp Tyr Ser
1               5                   10                  15

Leu Thr Ile Ser Ser Leu Glu Tyr Glu Asp Met Gly Ile Tyr Tyr Cys
            20                  25                  30

<210> SEQ ID NO 92
<211> LENGTH: 9
<212> TYPE: PRT
<213> ORGANISM: Artificial Sequence
<220> FEATURE:
<223> OTHER INFORMATION: 31C4 light chain VL: CDR3

<400> SEQUENCE: 92

Leu Gln Tyr Asp Glu Phe Pro Tyr Thr
1               5

<210> SEQ ID NO 93
<211> LENGTH: 15
<212> TYPE: PRT
<213> ORGANISM: Artificial Sequence
<220> FEATURE:
<223> OTHER INFORMATION: 31C4 light chain VL: FR4

<400> SEQUENCE: 93

Phe Gly Gly Gly Thr Lys Leu Glu Ile Lys Arg Ala Asp Ala Ala
1               5                   10                  15

<210> SEQ ID NO 94
<211> LENGTH: 430
<212> TYPE: DNA
<213> ORGANISM: Artificial Sequence
<220> FEATURE:
<223> OTHER INFORMATION: 34B10 heavy chain VH
<220> FEATURE:
<221> NAME/KEY: misc_feature
<222> LOCATION: (11)..(67)
<223> OTHER INFORMATION: Leader sequence
<220> FEATURE:
<221> NAME/KEY: misc_feature
<222> LOCATION: (68)..(142)
<223> OTHER INFORMATION: FR1
<220> FEATURE:
<221> NAME/KEY: misc_feature
<222> LOCATION: (143)..(172)
<223> OTHER INFORMATION: CDR1
<220> FEATURE:
<221> NAME/KEY: misc_feature
<222> LOCATION: (173)..(214)
<223> OTHER INFORMATION: FR2
<220> FEATURE:
<221> NAME/KEY: misc_feature
```

```
<222> LOCATION: (215)..(271)
<223> OTHER INFORMATION: CDR2
<220> FEATURE:
<221> NAME/KEY: misc_feature
<222> LOCATION: (272)..(367)
<223> OTHER INFORMATION: FR3
<220> FEATURE:
<221> NAME/KEY: misc_feature
<222> LOCATION: (368)..(397)
<223> OTHER INFORMATION: CDR3
<220> FEATURE:
<221> NAME/KEY: misc_feature
<222> LOCATION: (398)..(430)
<223> OTHER INFORMATION: FR4

<400> SEQUENCE: 94
tggggaattc atggagttgg ggttcagctg gattttcctt ggaacacttt taaatggtat      60
ccagtgtgag gtgaagctgg tggagtctgg aggagtcttg gtacagcctg ggggttctct    120
gagactctcc tgtgcaactt ctggattcac cttcactgat tactacatgg gctgggtccg    180
ccagcctcca ggaaaggcgc ttgagtggtt gggtttatt agaaacaaag ctaatggtta    240
cacaacagag tccagtgcat ctgtgaaggg tcggttcacc atctccagag ataattccca    300
aagcatcctc tatcttcaaa tgaacaccct gagagctgag gacagtgcca cttattactg    360
tgcaagagat tactactccg gtagtagcct tgactactgg ggccaaggca ccactctcac    420
agtctcctca                                                          430

<210> SEQ ID NO 95
<211> LENGTH: 30
<212> TYPE: DNA
<213> ORGANISM: Artificial Sequence
<220> FEATURE:
<223> OTHER INFORMATION: 34B10 heavy chain VH: CDR1

<400> SEQUENCE: 95
ggattcacct tcactgatta ctacatgggc                                      30

<210> SEQ ID NO 96
<211> LENGTH: 57
<212> TYPE: DNA
<213> ORGANISM: Artificial Sequence
<220> FEATURE:
<223> OTHER INFORMATION: 34B10 heavy chain VH: CDR2

<400> SEQUENCE: 96
tttattagaa acaaagctaa tggttacaca acagagtcca gtgcatctgt gaagggt        57

<210> SEQ ID NO 97
<211> LENGTH: 30
<212> TYPE: DNA
<213> ORGANISM: Artificial Sequence
<220> FEATURE:
<223> OTHER INFORMATION: 34B10 heavy chain VH: CDR3

<400> SEQUENCE: 97
gattactact ccggtagtag ccttgactac                                      30

<210> SEQ ID NO 98
<211> LENGTH: 140
<212> TYPE: PRT
<213> ORGANISM: Artificial Sequence
<220> FEATURE:
<223> OTHER INFORMATION: 34B10 heavy chain VH
<220> FEATURE:
<221> NAME/KEY: MISC_FEATURE
<222> LOCATION: (1)..(19)
```

```
<223> OTHER INFORMATION: Leader sequence
<220> FEATURE:
<221> NAME/KEY: MISC_FEATURE
<222> LOCATION: (20)..(44)
<223> OTHER INFORMATION: FR1
<220> FEATURE:
<221> NAME/KEY: MISC_FEATURE
<222> LOCATION: (45)..(54)
<223> OTHER INFORMATION: CDR1
<220> FEATURE:
<221> NAME/KEY: MISC_FEATURE
<222> LOCATION: (55)..(68)
<223> OTHER INFORMATION: FR2
<220> FEATURE:
<221> NAME/KEY: MISC_FEATURE
<222> LOCATION: (69)..(87)
<223> OTHER INFORMATION: CDR2
<220> FEATURE:
<221> NAME/KEY: MISC_FEATURE
<222> LOCATION: (88)..(119)
<223> OTHER INFORMATION: FR3
<220> FEATURE:
<221> NAME/KEY: MISC_FEATURE
<222> LOCATION: (120)..(129)
<223> OTHER INFORMATION: CDR3
<220> FEATURE:
<221> NAME/KEY: MISC_FEATURE
<222> LOCATION: (130)..(140)
<223> OTHER INFORMATION: FR4

<400> SEQUENCE: 98

Met Glu Leu Gly Phe Ser Trp Ile Phe Leu Gly Thr Leu Leu Asn Gly
1               5                   10                  15

Ile Gln Cys Glu Val Lys Leu Val Glu Ser Gly Gly Val Leu Val Gln
            20                  25                  30

Pro Gly Gly Ser Leu Arg Leu Ser Cys Ala Thr Ser Gly Phe Thr Phe
        35                  40                  45

Thr Asp Tyr Tyr Met Gly Trp Val Arg Gln Pro Pro Gly Lys Ala Leu
    50                  55                  60

Glu Trp Leu Gly Phe Ile Arg Asn Lys Ala Asn Gly Tyr Thr Thr Glu
65                  70                  75                  80

Ser Ser Ala Ser Val Lys Gly Arg Phe Thr Ile Ser Arg Asp Asn Ser
                85                  90                  95

Gln Ser Ile Leu Tyr Leu Gln Met Asn Thr Leu Arg Ala Glu Asp Ser
            100                 105                 110

Ala Thr Tyr Tyr Cys Ala Arg Asp Tyr Tyr Ser Gly Ser Ser Leu Asp
        115                 120                 125

Tyr Trp Gly Gln Gly Thr Thr Leu Thr Val Ser Ser
    130                 135                 140

<210> SEQ ID NO 99
<211> LENGTH: 25
<212> TYPE: PRT
<213> ORGANISM: Artificial Sequence
<220> FEATURE:
<223> OTHER INFORMATION: 34B10 heavy chain VH: FR1

<400> SEQUENCE: 99

Glu Val Lys Leu Val Glu Ser Gly Gly Val Leu Val Gln Pro Gly Gly
1               5                   10                  15

Ser Leu Arg Leu Ser Cys Ala Thr Ser
            20                  25

<210> SEQ ID NO 100
<211> LENGTH: 10
<212> TYPE: PRT
```

```
<213> ORGANISM: Artificial Sequence
<220> FEATURE:
<223> OTHER INFORMATION: 34B10 heavy chain VH: CDR1

<400> SEQUENCE: 100

Gly Phe Thr Phe Thr Asp Tyr Tyr Met Gly
1               5                   10

<210> SEQ ID NO 101
<211> LENGTH: 14
<212> TYPE: PRT
<213> ORGANISM: Artificial Sequence
<220> FEATURE:
<223> OTHER INFORMATION: 34B10 heavy chain VH: FR2

<400> SEQUENCE: 101

Trp Val Arg Gln Pro Pro Gly Lys Ala Leu Glu Trp Leu Gly
1               5                   10

<210> SEQ ID NO 102
<211> LENGTH: 19
<212> TYPE: PRT
<213> ORGANISM: Artificial Sequence
<220> FEATURE:
<223> OTHER INFORMATION: 34B10 heavy chain VH: CDR2

<400> SEQUENCE: 102

Phe Ile Arg Asn Lys Ala Asn Gly Tyr Thr Thr Glu Ser Ser Ala Ser
1               5                   10                  15

Val Lys Gly

<210> SEQ ID NO 103
<211> LENGTH: 32
<212> TYPE: PRT
<213> ORGANISM: Artificial Sequence
<220> FEATURE:
<223> OTHER INFORMATION: 34B10 heavy chain VH: FR3

<400> SEQUENCE: 103

Arg Phe Thr Ile Ser Arg Asp Asn Ser Gln Ser Ile Leu Tyr Leu Gln
1               5                   10                  15

Met Asn Thr Leu Arg Ala Glu Asp Ser Ala Thr Tyr Tyr Cys Ala Arg
            20                  25                  30

<210> SEQ ID NO 104
<211> LENGTH: 10
<212> TYPE: PRT
<213> ORGANISM: Artificial Sequence
<220> FEATURE:
<223> OTHER INFORMATION: 34B10 heavy chain VH: CDR3

<400> SEQUENCE: 104

Asp Tyr Tyr Ser Gly Ser Ser Leu Asp Tyr
1               5                   10

<210> SEQ ID NO 105
<211> LENGTH: 11
<212> TYPE: PRT
<213> ORGANISM: Artificial Sequence
<220> FEATURE:
<223> OTHER INFORMATION: 34B10 heavy chain VH: FR4

<400> SEQUENCE: 105

Trp Gly Gln Gly Thr Thr Leu Thr Val Ser Ser
1               5                   10
```

```
<210> SEQ ID NO 106
<211> LENGTH: 406
<212> TYPE: DNA
<213> ORGANISM: Artificial Sequence
<220> FEATURE:
<223> OTHER INFORMATION: 34B10 light chain VL
<220> FEATURE:
<221> NAME/KEY: misc_feature
<222> LOCATION: (1)..(75)
<223> OTHER INFORMATION: Leader sequence
<220> FEATURE:
<221> NAME/KEY: misc_feature
<222> LOCATION: (76)..(144)
<223> OTHER INFORMATION: FR1
<220> FEATURE:
<221> NAME/KEY: misc_feature
<222> LOCATION: (145)..(177)
<223> OTHER INFORMATION: CDR1
<220> FEATURE:
<221> NAME/KEY: misc_feature
<222> LOCATION: (178)..(222)
<223> OTHER INFORMATION: FR2
<220> FEATURE:
<221> NAME/KEY: misc_feature
<222> LOCATION: (223)..(243)
<223> OTHER INFORMATION: CDR2
<220> FEATURE:
<221> NAME/KEY: misc_feature
<222> LOCATION: (244)..(339)
<223> OTHER INFORMATION: FR3
<220> FEATURE:
<221> NAME/KEY: misc_feature
<222> LOCATION: (340)..(366)
<223> OTHER INFORMATION: CDR3
<220> FEATURE:
<221> NAME/KEY: misc_feature
<222> LOCATION: (367)..(405)
<223> OTHER INFORMATION: FR4

<400> SEQUENCE: 106
tctatactag tcgacaggag gaccccggct cagatttgtg gtctcctgtt gctctttttt      60
caaggtacca gatgtgatat ccagatgaca cagactacat cctccctgtc tgcctctctg     120
ggagacagag tcaccatcag ttgcagggca agtcaggaca ttagcaatta tttaaattgg     180
tatcagcaga accagatgg aactgttaaa ctcctgatct actacacatc aagattacac     240
tcaggagtcc catcaaggtt cagtggcagt gggtctggaa cagattattc tctctccatt     300
agcaacctgg agcaagaaga tattgccact tactttgcc aacagggtta tacgcttccg     360
tacacgttcg gaggggggac caagcttgaa ataaaacggg ctgatg                    406

<210> SEQ ID NO 107
<211> LENGTH: 33
<212> TYPE: DNA
<213> ORGANISM: Artificial Sequence
<220> FEATURE:
<223> OTHER INFORMATION: 34B10 light chain VL: CDR1

<400> SEQUENCE: 107
agggcaagtc aggacattag caattattta aat                                   33

<210> SEQ ID NO 108
<211> LENGTH: 21
<212> TYPE: DNA
<213> ORGANISM: Artificial Sequence
<220> FEATURE:
<223> OTHER INFORMATION: 34B10 light chain VL: CDR2

<400> SEQUENCE: 108
tacacatcaa gattacactc a                                                21
```

<210> SEQ ID NO 109
<211> LENGTH: 27
<212> TYPE: DNA
<213> ORGANISM: Artificial Sequence
<220> FEATURE:
<223> OTHER INFORMATION: 34B10 light chain VL: CDR3

<400> SEQUENCE: 109
caacagggtt atacgcttcc gtacacg                                27

<210> SEQ ID NO 110
<211> LENGTH: 135
<212> TYPE: PRT
<213> ORGANISM: Artificial Sequence
<220> FEATURE:
<223> OTHER INFORMATION: 34B10 light chain VL
<220> FEATURE:
<221> NAME/KEY: MISC_FEATURE
<222> LOCATION: (1)..(25)
<223> OTHER INFORMATION: Leader sequence
<220> FEATURE:
<221> NAME/KEY: MISC_FEATURE
<222> LOCATION: (26)..(48)
<223> OTHER INFORMATION: FR1
<220> FEATURE:
<221> NAME/KEY: MISC_FEATURE
<222> LOCATION: (49)..(59)
<223> OTHER INFORMATION: CDR1
<220> FEATURE:
<221> NAME/KEY: MISC_FEATURE
<222> LOCATION: (60)..(74)
<223> OTHER INFORMATION: FR2
<220> FEATURE:
<221> NAME/KEY: MISC_FEATURE
<222> LOCATION: (75)..(81)
<223> OTHER INFORMATION: CDR2
<220> FEATURE:
<221> NAME/KEY: MISC_FEATURE
<222> LOCATION: (82)..(113)
<223> OTHER INFORMATION: FR3
<220> FEATURE:
<221> NAME/KEY: MISC_FEATURE
<222> LOCATION: (114)..(122)
<223> OTHER INFORMATION: CDR3
<220> FEATURE:
<221> NAME/KEY: MISC_FEATURE
<222> LOCATION: (123)..(135)
<223> OTHER INFORMATION: FR4

<400> SEQUENCE: 110

Ser Ile Leu Val Asp Arg Arg Thr Pro Ala Gln Ile Cys Gly Leu Leu
1               5                   10                  15

Leu Leu Phe Phe Gln Gly Thr Arg Cys Asp Ile Gln Met Thr Gln Thr
            20                  25                  30

Thr Ser Ser Leu Ser Ala Ser Leu Gly Asp Arg Val Thr Ile Ser Cys
        35                  40                  45

Arg Ala Ser Gln Asp Ile Ser Asn Tyr Leu Asn Trp Tyr Gln Gln Lys
    50                  55                  60

Pro Asp Gly Thr Val Lys Leu Leu Ile Tyr Tyr Thr Ser Arg Leu His
65                  70                  75                  80

Ser Gly Val Pro Ser Arg Phe Ser Gly Ser Gly Ser Gly Thr Asp Tyr
                85                  90                  95

Ser Leu Ser Ile Ser Asn Leu Glu Gln Glu Asp Ile Ala Thr Tyr Phe
            100                 105                 110

Cys Gln Gln Gly Tyr Thr Leu Pro Tyr Thr Phe Gly Gly Gly Thr Lys
        115                 120                 125

Leu Glu Ile Lys Arg Ala Asp
    130                 135

<210> SEQ ID NO 111
<211> LENGTH: 23
<212> TYPE: PRT
<213> ORGANISM: Artificial Sequence
<220> FEATURE:
<223> OTHER INFORMATION: 34B10 light chain VL: FR1

<400> SEQUENCE: 111

Asp Ile Gln Met Thr Gln Thr Thr Ser Ser Leu Ser Ala Ser Leu Gly
1               5                   10                  15

Asp Arg Val Thr Ile Ser Cys
            20

<210> SEQ ID NO 112
<211> LENGTH: 11
<212> TYPE: PRT
<213> ORGANISM: Artificial Sequence
<220> FEATURE:
<223> OTHER INFORMATION: 34B10 light chain VL: CDR1

<400> SEQUENCE: 112

Arg Ala Ser Gln Asp Ile Ser Asn Tyr Leu Asn
1               5                   10

<210> SEQ ID NO 113
<211> LENGTH: 15
<212> TYPE: PRT
<213> ORGANISM: Artificial Sequence
<220> FEATURE:
<223> OTHER INFORMATION: 34B10 light chain VL: FR2

<400> SEQUENCE: 113

Trp Tyr Gln Gln Lys Pro Asp Gly Thr Val Lys Leu Leu Ile Tyr
1               5                   10                  15

<210> SEQ ID NO 114
<211> LENGTH: 7
<212> TYPE: PRT
<213> ORGANISM: Artificial Sequence
<220> FEATURE:
<223> OTHER INFORMATION: 34B10 light chain VL: CDR2

<400> SEQUENCE: 114

Tyr Thr Ser Arg Leu His Ser
1               5

<210> SEQ ID NO 115
<211> LENGTH: 32
<212> TYPE: PRT
<213> ORGANISM: Artificial Sequence
<220> FEATURE:
<223> OTHER INFORMATION: 34B10 light chain VL: FR3

<400> SEQUENCE: 115

Gly Val Pro Ser Arg Phe Ser Gly Ser Gly Ser Gly Thr Asp Tyr Ser
1               5                   10                  15

Leu Ser Ile Ser Asn Leu Glu Gln Glu Asp Ile Ala Thr Tyr Phe Cys
            20                  25                  30

<210> SEQ ID NO 116
<211> LENGTH: 9
<212> TYPE: PRT
<213> ORGANISM: Artificial Sequence

```
<220> FEATURE:
<223> OTHER INFORMATION: 34B10 light chain VL: CDR3

<400> SEQUENCE: 116

Gln Gln Gly Tyr Thr Leu Pro Tyr Thr
1               5

<210> SEQ ID NO 117
<211> LENGTH: 13
<212> TYPE: PRT
<213> ORGANISM: Artificial Sequence
<220> FEATURE:
<223> OTHER INFORMATION: 34B10 light chain VL: FR4

<400> SEQUENCE: 117

Phe Gly Gly Gly Thr Lys Leu Glu Ile Lys Arg Ala Asp
1               5                   10

<210> SEQ ID NO 118
<211> LENGTH: 411
<212> TYPE: DNA
<213> ORGANISM: Artificial Sequence
<220> FEATURE:
<223> OTHER INFORMATION: 37A3 heavy chain VH
<220> FEATURE:
<221> NAME/KEY: misc_feature
<222> LOCATION: (1)..(57)
<223> OTHER INFORMATION: Leader sequence
<220> FEATURE:
<221> NAME/KEY: misc_feature
<222> LOCATION: (58)..(132)
<223> OTHER INFORMATION: FR1
<220> FEATURE:
<221> NAME/KEY: misc_feature
<222> LOCATION: (133)..(162)
<223> OTHER INFORMATION: CDR1
<220> FEATURE:
<221> NAME/KEY: misc_feature
<222> LOCATION: (163)..(204)
<223> OTHER INFORMATION: FR2
<220> FEATURE:
<221> NAME/KEY: misc_feature
<222> LOCATION: (205)..(261)
<223> OTHER INFORMATION: CDR2
<220> FEATURE:
<221> NAME/KEY: misc_feature
<222> LOCATION: (262)..(351)
<223> OTHER INFORMATION: FR3
<220> FEATURE:
<221> NAME/KEY: misc_feature
<222> LOCATION: (352)..(381)
<223> OTHER INFORMATION: CDR3
<220> FEATURE:
<221> NAME/KEY: misc_feature
<222> LOCATION: (382)..(411)
<223> OTHER INFORMATION: FR4

<400> SEQUENCE: 118
atgtacttgg gactgagctg tgtatttctt gtggctcttt tgaatggtgt ccagtgtcag    60
gtgcagcttg tagagaccgg gggaggcttg gtgaggcctg gaaattctct gaaactctcc   120
tgtgttacct cgggattcac tttcagtaac taccggatgc actggcttcg ccagcctcca   180
gggaagaggc tggagtggat tgctgtaatt acagtcaaat ctgataatta tggagcaaat   240
tttgcagagt ctgtgaaagg cagattcact atttcaagag atgattcaaa aagcagtgtc   300
tacctgcaga tgaacagatt aagagaggaa gacactgcca cttattattg tagtagaggt   360
agtggcccag ggtttgctta ctggggccaa gggactctgg tcactgtctc t           411

<210> SEQ ID NO 119
```

```
<211> LENGTH: 30
<212> TYPE: DNA
<213> ORGANISM: Artificial Sequence
<220> FEATURE:
<223> OTHER INFORMATION: 37A3 heavy chain VH: CDR1

<400> SEQUENCE: 119
ggattcactt tcagtaacta ccggatgcac                                            30

<210> SEQ ID NO 120
<211> LENGTH: 57
<212> TYPE: DNA
<213> ORGANISM: Artificial Sequence
<220> FEATURE:
<223> OTHER INFORMATION: 37A3 heavy chain VH: CDR2

<400> SEQUENCE: 120
gtaattacag tcaaatctga taattatgga gcaaattttg cagagtctgt gaaaggc              57

<210> SEQ ID NO 121
<211> LENGTH: 30
<212> TYPE: DNA
<213> ORGANISM: Artificial Sequence
<220> FEATURE:
<223> OTHER INFORMATION: 37A3 heavy chain VH: CDR3

<400> SEQUENCE: 121
agtagaggta gtggcccagg gtttgcttac                                            30

<210> SEQ ID NO 122
<211> LENGTH: 137
<212> TYPE: PRT
<213> ORGANISM: Artificial Sequence
<220> FEATURE:
<223> OTHER INFORMATION: 37A3 heavy chain VH
<220> FEATURE:
<221> NAME/KEY: MISC_FEATURE
<222> LOCATION: (1)..(19)
<223> OTHER INFORMATION: Leader sequence
<220> FEATURE:
<221> NAME/KEY: MISC_FEATURE
<222> LOCATION: (20)..(44)
<223> OTHER INFORMATION: FR1
<220> FEATURE:
<221> NAME/KEY: MISC_FEATURE
<222> LOCATION: (45)..(54)
<223> OTHER INFORMATION: CDR1
<220> FEATURE:
<221> NAME/KEY: MISC_FEATURE
<222> LOCATION: (55)..(68)
<223> OTHER INFORMATION: FR2
<220> FEATURE:
<221> NAME/KEY: MISC_FEATURE
<222> LOCATION: (69)..(87)
<223> OTHER INFORMATION: CDR2
<220> FEATURE:
<221> NAME/KEY: MISC_FEATURE
<222> LOCATION: (88)..(117)
<223> OTHER INFORMATION: FR3
<220> FEATURE:
<221> NAME/KEY: MISC_FEATURE
<222> LOCATION: (118)..(127)
<223> OTHER INFORMATION: CDR3
<220> FEATURE:
<221> NAME/KEY: MISC_FEATURE
<222> LOCATION: (128)..(137)
<223> OTHER INFORMATION: FR4

<400> SEQUENCE: 122

Met Tyr Leu Gly Leu Ser Cys Val Phe Leu Val Ala Leu Leu Asn Gly
1               5                   10                  15
```

Val Gln Cys Gln Val Gln Leu Val Glu Thr Gly Gly Gly Leu Val Arg
            20                  25                  30

Pro Gly Asn Ser Leu Lys Leu Ser Cys Val Thr Ser Gly Phe Thr Phe
                35                  40                  45

Ser Asn Tyr Arg Met His Trp Leu Arg Gln Pro Pro Gly Lys Arg Leu
    50                  55                  60

Glu Trp Ile Ala Val Ile Thr Val Lys Ser Asp Asn Tyr Gly Ala Asn
65                  70                  75                  80

Phe Ala Glu Ser Val Lys Gly Arg Phe Thr Ile Ser Arg Asp Asp Ser
                85                  90                  95

Lys Ser Ser Val Tyr Leu Gln Met Asn Arg Leu Arg Glu Glu Asp Thr
            100                 105                 110

Ala Thr Tyr Tyr Cys Ser Arg Gly Ser Gly Pro Gly Phe Ala Tyr Trp
        115                 120                 125

Gly Gln Gly Thr Leu Val Thr Val Ser
    130                 135

<210> SEQ ID NO 123
<211> LENGTH: 25
<212> TYPE: PRT
<213> ORGANISM: Artificial Sequence
<220> FEATURE:
<223> OTHER INFORMATION: 37A3 heavy chain VH: FR1

<400> SEQUENCE: 123

Gln Val Gln Leu Val Glu Thr Gly Gly Gly Leu Val Arg Pro Gly Asn
1               5                   10                  15

Ser Leu Lys Leu Ser Cys Val Thr Ser
            20                  25

<210> SEQ ID NO 124
<211> LENGTH: 10
<212> TYPE: PRT
<213> ORGANISM: Artificial Sequence
<220> FEATURE:
<223> OTHER INFORMATION: 37A3 heavy chain VH: CDR1

<400> SEQUENCE: 124

Gly Phe Thr Phe Ser Asn Tyr Arg Met His
1               5                   10

<210> SEQ ID NO 125
<211> LENGTH: 14
<212> TYPE: PRT
<213> ORGANISM: Artificial Sequence
<220> FEATURE:
<223> OTHER INFORMATION: 37A3 heavy chain VH: FR2

<400> SEQUENCE: 125

Trp Leu Arg Gln Pro Pro Gly Lys Arg Leu Glu Trp Ile Ala
1               5                   10

<210> SEQ ID NO 126
<211> LENGTH: 19
<212> TYPE: PRT
<213> ORGANISM: Artificial Sequence
<220> FEATURE:
<223> OTHER INFORMATION: 37A3 heavy chain VH: CDR2

<400> SEQUENCE: 126

Val Ile Thr Val Lys Ser Asp Asn Tyr Gly Ala Asn Phe Ala Glu Ser
1               5                   10                  15

Val Lys Gly

<210> SEQ ID NO 127
<211> LENGTH: 30
<212> TYPE: PRT
<213> ORGANISM: Artificial Sequence
<220> FEATURE:
<223> OTHER INFORMATION: 37A3 heavy chain VH: FR3

<400> SEQUENCE: 127

Arg Phe Thr Ile Ser Arg Asp Asp Ser Lys Ser Ser Val Tyr Leu Gln
1               5                   10                  15

Met Asn Arg Leu Arg Glu Glu Asp Thr Ala Thr Tyr Tyr Cys
            20                  25                  30

<210> SEQ ID NO 128
<211> LENGTH: 10
<212> TYPE: PRT
<213> ORGANISM: Artificial Sequence
<220> FEATURE:
<223> OTHER INFORMATION: 37A3 heavy chain VH: CDR3

<400> SEQUENCE: 128

Ser Arg Gly Ser Gly Pro Gly Phe Ala Tyr
1               5                   10

<210> SEQ ID NO 129
<211> LENGTH: 10
<212> TYPE: PRT
<213> ORGANISM: Artificial Sequence
<220> FEATURE:
<223> OTHER INFORMATION: 37A3 heavy chain VH: FR4

<400> SEQUENCE: 129

Trp Gly Gln Gly Thr Leu Val Thr Val Ser
1               5                   10

<210> SEQ ID NO 130
<211> LENGTH: 411
<212> TYPE: DNA
<213> ORGANISM: Artificial Sequence
<220> FEATURE:
<223> OTHER INFORMATION: 37A3 light chain VL
<220> FEATURE:
<221> NAME/KEY: misc_feature
<222> LOCATION: (1)..(72)
<223> OTHER INFORMATION: Leader sequence
<220> FEATURE:
<221> NAME/KEY: misc_feature
<222> LOCATION: (73)..(141)
<223> OTHER INFORMATION: FR1
<220> FEATURE:
<221> NAME/KEY: misc_feature
<222> LOCATION: (142)..(192)
<223> OTHER INFORMATION: CDR1
<220> FEATURE:
<221> NAME/KEY: misc_feature
<222> LOCATION: (193)..(237)
<223> OTHER INFORMATION: FR2
<220> FEATURE:
<221> NAME/KEY: misc_feature
<222> LOCATION: (238)..(258)
<223> OTHER INFORMATION: CDR2
<220> FEATURE:
<221> NAME/KEY: misc_feature
<222> LOCATION: (259)..(354)
<223> OTHER INFORMATION: FR3
<220> FEATURE:
<221> NAME/KEY: misc_feature
<222> LOCATION: (355)..(381)
<223> OTHER INFORMATION: CDR3

```
<220> FEATURE:
<221> NAME/KEY: misc_feature
<222> LOCATION: (382)..(411)
<223> OTHER INFORMATION: FR4

<400> SEQUENCE: 130
atgggcttca agatggagtc acagactcag gtcctcatct ccttgctgtt ctgggtatct      60
ggtacctgtg gggacattgt gatgacacag tctccatcct ccctgagtgt gtcagcagga    120
gagaaggtca ctatgagctg caagtccagt cagagtctgt aaacagtgg aaatcaaaag     180 aactacttgg cctggtacca gcagaaacca gggcagcctc ctaaactgtt gatctacggg    240
gcatccacta gggaatctgg ggtccctgat cgcttcacag gcagtggatc tggaaccgat    300
ttcactctta ccatcagcag tgtgcaggct gaagacctgg cagtttatta ctgtcagaat    360
gatcatagtt atccattcac gttcggctcg gggacaaagt tggaaataaa a             411

<210> SEQ ID NO 131
<211> LENGTH: 51
<212> TYPE: DNA
<213> ORGANISM: Artificial Sequence
<220> FEATURE:
<223> OTHER INFORMATION: 37A3 light chain VL: CDR1

<400> SEQUENCE: 131
aagtccagtc agagtctgtt aaacagtgga atcaaaaga actacttggc c               51

<210> SEQ ID NO 132
<211> LENGTH: 21
<212> TYPE: DNA
<213> ORGANISM: Artificial Sequence
<220> FEATURE:
<223> OTHER INFORMATION: 37A3 light chain VL: CDR2

<400> SEQUENCE: 132
ggggcatcca ctagggaatc t                                               21

<210> SEQ ID NO 133
<211> LENGTH: 27
<212> TYPE: DNA
<213> ORGANISM: Artificial Sequence
<220> FEATURE:
<223> OTHER INFORMATION: 37A3 light chain VL: CDR3

<400> SEQUENCE: 133
cagaatgatc atagttatcc attcacg                                         27

<210> SEQ ID NO 134
<211> LENGTH: 137
<212> TYPE: PRT
<213> ORGANISM: Artificial Sequence
<220> FEATURE:
<223> OTHER INFORMATION: 37A3 light chain VL
<220> FEATURE:
<221> NAME/KEY: MISC_FEATURE
<222> LOCATION: (1)..(24)
<223> OTHER INFORMATION: Leader sequence
<220> FEATURE:
<221> NAME/KEY: MISC_FEATURE
<222> LOCATION: (25)..(47)
<223> OTHER INFORMATION: FR1
<220> FEATURE:
<221> NAME/KEY: MISC_FEATURE
<222> LOCATION: (48)..(64)
<223> OTHER INFORMATION: CDR1
<220> FEATURE:
<221> NAME/KEY: MISC_FEATURE
<222> LOCATION: (65)..(79)
```

```
<223> OTHER INFORMATION: FR2
<220> FEATURE:
<221> NAME/KEY: MISC_FEATURE
<222> LOCATION: (80)..(86)
<223> OTHER INFORMATION: CDR2
<220> FEATURE:
<221> NAME/KEY: MISC_FEATURE
<222> LOCATION: (87)..(118)
<223> OTHER INFORMATION: FR3
<220> FEATURE:
<221> NAME/KEY: MISC_FEATURE
<222> LOCATION: (119)..(127)
<223> OTHER INFORMATION: CDR3
<220> FEATURE:
<221> NAME/KEY: MISC_FEATURE
<222> LOCATION: (128)..(137)
<223> OTHER INFORMATION: FR4

<400> SEQUENCE: 134

Met Gly Phe Lys Met Glu Ser Gln Thr Gln Val Leu Ile Ser Leu Leu
1               5                   10                  15

Phe Trp Val Ser Gly Thr Cys Gly Asp Ile Val Met Thr Gln Ser Pro
            20                  25                  30

Ser Ser Leu Ser Val Ser Ala Gly Glu Lys Val Thr Met Ser Cys Lys
        35                  40                  45

Ser Ser Gln Ser Leu Leu Asn Ser Gly Asn Gln Lys Asn Tyr Leu Ala
    50                  55                  60

Trp Tyr Gln Gln Lys Pro Gly Gln Pro Pro Lys Leu Leu Ile Tyr Gly
65                  70                  75                  80

Ala Ser Thr Arg Glu Ser Gly Val Pro Asp Arg Phe Thr Gly Ser Gly
                85                  90                  95

Ser Gly Thr Asp Phe Thr Leu Thr Ile Ser Ser Val Gln Ala Glu Asp
            100                 105                 110

Leu Ala Val Tyr Tyr Cys Gln Asn Asp His Ser Tyr Pro Phe Thr Phe
        115                 120                 125

Gly Ser Gly Thr Lys Leu Glu Ile Lys
    130                 135

<210> SEQ ID NO 135
<211> LENGTH: 23
<212> TYPE: PRT
<213> ORGANISM: Artificial Sequence
<220> FEATURE:
<223> OTHER INFORMATION: 37A3 light chain VL: FR1

<400> SEQUENCE: 135

Asp Ile Val Met Thr Gln Ser Pro Ser Ser Leu Ser Val Ser Ala Gly
1               5                   10                  15

Glu Lys Val Thr Met Ser Cys
            20

<210> SEQ ID NO 136
<211> LENGTH: 17
<212> TYPE: PRT
<213> ORGANISM: Artificial Sequence
<220> FEATURE:
<223> OTHER INFORMATION: 37A3 light chain VL: CDR1

<400> SEQUENCE: 136

Lys Ser Ser Gln Ser Leu Leu Asn Ser Gly Asn Gln Lys Asn Tyr Leu
1               5                   10                  15

Ala
```

```
<210> SEQ ID NO 137
<211> LENGTH: 15
<212> TYPE: PRT
<213> ORGANISM: Artificial Sequence
<220> FEATURE:
<223> OTHER INFORMATION: 37A3 light chain VL: FR2

<400> SEQUENCE: 137

Trp Tyr Gln Gln Lys Pro Gly Gln Pro Pro Lys Leu Leu Ile Tyr
1               5                   10                  15

<210> SEQ ID NO 138
<211> LENGTH: 7
<212> TYPE: PRT
<213> ORGANISM: Artificial Sequence
<220> FEATURE:
<223> OTHER INFORMATION: 37A3 light chain VL: CDR2

<400> SEQUENCE: 138

Gly Ala Ser Thr Arg Glu Ser
1               5

<210> SEQ ID NO 139
<211> LENGTH: 32
<212> TYPE: PRT
<213> ORGANISM: Artificial Sequence
<220> FEATURE:
<223> OTHER INFORMATION: 37A3 light chain VL: FR3

<400> SEQUENCE: 139

Gly Val Pro Asp Arg Phe Thr Gly Ser Gly Ser Gly Thr Asp Phe Thr
1               5                   10                  15

Leu Thr Ile Ser Ser Val Gln Ala Glu Asp Leu Ala Val Tyr Tyr Cys
            20                  25                  30

<210> SEQ ID NO 140
<211> LENGTH: 9
<212> TYPE: PRT
<213> ORGANISM: Artificial Sequence
<220> FEATURE:
<223> OTHER INFORMATION: 37A3 light chain VL: CDR3

<400> SEQUENCE: 140

Gln Asn Asp His Ser Tyr Pro Phe Thr
1               5

<210> SEQ ID NO 141
<211> LENGTH: 10
<212> TYPE: PRT
<213> ORGANISM: Artificial Sequence
<220> FEATURE:
<223> OTHER INFORMATION: 37A3 light chain VL: FR4

<400> SEQUENCE: 141

Phe Gly Ser Gly Thr Lys Leu Glu Ile Lys
1               5                   10

<210> SEQ ID NO 142
<211> LENGTH: 432
<212> TYPE: DNA
<213> ORGANISM: Artificial Sequence
<220> FEATURE:
<223> OTHER INFORMATION: 12A10 heavy chain VH
<220> FEATURE:
<221> NAME/KEY: misc_feature
<222> LOCATION: (12)..(68)
<223> OTHER INFORMATION: Leader sequence
<220> FEATURE:
```

```
<221> NAME/KEY: misc_feature
<222> LOCATION: (69)..(143)
<223> OTHER INFORMATION: FR1
<220> FEATURE:
<221> NAME/KEY: misc_feature
<222> LOCATION: (144)..(173)
<223> OTHER INFORMATION: CDR1
<220> FEATURE:
<221> NAME/KEY: misc_feature
<222> LOCATION: (174)..(215)
<223> OTHER INFORMATION: FR2
<220> FEATURE:
<221> NAME/KEY: misc_feature
<222> LOCATION: (216)..(266)
<223> OTHER INFORMATION: CDR2
<220> FEATURE:
<221> NAME/KEY: misc_feature
<222> LOCATION: (267)..(356)
<223> OTHER INFORMATION: FR3
<220> FEATURE:
<221> NAME/KEY: misc_feature
<222> LOCATION: (357)..(398)
<223> OTHER INFORMATION: CDR3
<220> FEATURE:
<221> NAME/KEY: misc_feature
<222> LOCATION: (399)..(431)
<223> OTHER INFORMATION: FR4

<400> SEQUENCE: 142
tggggaattc catggaatgg agctgggttt ttctcttcct cctgtcaata actacaggtg      60
tccactccca ggcttatcta cagcagtctg gggctgagct ggtgaggtct ggggcctcag     120
tgaagatgtc ctgcaaggct tctggctaca catttaccag ttacaatatg cactgggtaa     180
agcagacacc tggacagggc ctggaatgga ttggatatat ttttcctgga gatggtggta     240
ctaactacaa tcagaagttc aagggcaagg ccacattgac tgcagacaca tcctccagca     300
cagcctacat gcagatcagc agcctgacat ctgaagactc tgcggtctat ttctgtgcaa     360
gatcgggcta ctatggtaac tacgaagggt ttgcttactg gggccaaggg actctggtca     420
ctgtctctgc ag                                                        432

<210> SEQ ID NO 143
<211> LENGTH: 30
<212> TYPE: DNA
<213> ORGANISM: Artificial Sequence
<220> FEATURE:
<223> OTHER INFORMATION: 12A10 heavy chain VH: CDR1

<400> SEQUENCE: 143
ggctacacat ttaccagtta caatatgcac                                      30

<210> SEQ ID NO 144
<211> LENGTH: 51
<212> TYPE: DNA
<213> ORGANISM: Artificial Sequence
<220> FEATURE:
<223> OTHER INFORMATION: 12A10 heavy chain VH: CDR2

<400> SEQUENCE: 144 tatattttc ctggagatgg tggtactaac tacaatcaga agttcaaggg c                51

<210> SEQ ID NO 145
<211> LENGTH: 42
<212> TYPE: DNA
<213> ORGANISM: Artificial Sequence
<220> FEATURE:
<223> OTHER INFORMATION: 12A10 heavy chain VH: CDR3

<400> SEQUENCE: 145
```
gcaagatcgg gctactatgg taactacgaa gggtttgctt ac                        42

<210> SEQ ID NO 146
<211> LENGTH: 140
<212> TYPE: PRT
<213> ORGANISM: Artificial Sequence
<220> FEATURE:
<223> OTHER INFORMATION: 12A10 heavy chain VH
<220> FEATURE:
<221> NAME/KEY: MISC_FEATURE
<222> LOCATION: (1)..(19)
<223> OTHER INFORMATION: Leader sequence
<220> FEATURE:
<221> NAME/KEY: MISC_FEATURE
<222> LOCATION: (20)..(44)
<223> OTHER INFORMATION: FR1
<220> FEATURE:
<221> NAME/KEY: MISC_FEATURE
<222> LOCATION: (45)..(54)
<223> OTHER INFORMATION: CDR1
<220> FEATURE:
<221> NAME/KEY: MISC_FEATURE
<222> LOCATION: (55)..(68)
<223> OTHER INFORMATION: FR2
<220> FEATURE:
<221> NAME/KEY: MISC_FEATURE
<222> LOCATION: (69)..(85)
<223> OTHER INFORMATION: CDR2
<220> FEATURE:
<221> NAME/KEY: MISC_FEATURE
<222> LOCATION: (86)..(115)
<223> OTHER INFORMATION: FR3
<220> FEATURE:
<221> NAME/KEY: MISC_FEATURE
<222> LOCATION: (116)..(129)
<223> OTHER INFORMATION: CDR3
<220> FEATURE:
<221> NAME/KEY: MISC_FEATURE
<222> LOCATION: (130)..(140)
<223> OTHER INFORMATION: FR4

<400> SEQUENCE: 146

Met Glu Trp Ser Trp Val Phe Leu Phe Leu Leu Ser Ile Thr Thr Gly
1               5                   10                  15

Val His Ser Gln Ala Tyr Leu Gln Gln Ser Gly Ala Glu Leu Val Arg
            20                  25                  30

Ser Gly Ala Ser Val Lys Met Ser Cys Lys Ala Ser Gly Tyr Thr Phe
        35                  40                  45

Thr Ser Tyr Asn Met His Trp Val Lys Gln Thr Pro Gly Gln Gly Leu
    50                  55                  60

Glu Trp Ile Gly Tyr Ile Phe Pro Gly Asp Gly Gly Thr Asn Tyr Asn
65                  70                  75                  80

Gln Lys Phe Lys Gly Lys Ala Thr Leu Thr Ala Asp Thr Ser Ser Ser
                85                  90                  95

Thr Ala Tyr Met Gln Ile Ser Ser Leu Thr Ser Glu Asp Ser Ala Val
            100                 105                 110

Tyr Phe Cys Ala Arg Ser Gly Tyr Tyr Gly Asn Tyr Glu Gly Phe Ala
        115                 120                 125

Tyr Trp Gly Gln Gly Thr Leu Val Thr Val Ser Ala
    130                 135                 140

<210> SEQ ID NO 147
<211> LENGTH: 25
<212> TYPE: PRT
<213> ORGANISM: Artificial Sequence
<220> FEATURE:
<223> OTHER INFORMATION: 12A10 heavy chain VH: FR1

```
<400> SEQUENCE: 147

Gln Ala Tyr Leu Gln Gln Ser Gly Ala Glu Leu Val Arg Ser Gly Ala
1               5                   10                  15

Ser Val Lys Met Ser Cys Lys Ala Ser
            20                  25

<210> SEQ ID NO 148
<211> LENGTH: 10
<212> TYPE: PRT
<213> ORGANISM: Artificial Sequence
<220> FEATURE:
<223> OTHER INFORMATION: 12A10 heavy chain VH: CDR1

<400> SEQUENCE: 148

Gly Tyr Thr Phe Thr Ser Tyr Asn Met His
1               5                   10

<210> SEQ ID NO 149
<211> LENGTH: 14
<212> TYPE: PRT
<213> ORGANISM: Artificial Sequence
<220> FEATURE:
<223> OTHER INFORMATION: 12A10 heavy chain VH: FR2

<400> SEQUENCE: 149

Trp Val Lys Gln Thr Pro Gly Gln Gly Leu Glu Trp Ile Gly
1               5                   10

<210> SEQ ID NO 150
<211> LENGTH: 17
<212> TYPE: PRT
<213> ORGANISM: Artificial Sequence
<220> FEATURE:
<223> OTHER INFORMATION: 12A10 heavy chain VH: CDR2

<400> SEQUENCE: 150

Tyr Ile Phe Pro Gly Asp Gly Gly Thr Asn Tyr Asn Gln Lys Phe Lys
1               5                   10                  15

Gly

<210> SEQ ID NO 151
<211> LENGTH: 30
<212> TYPE: PRT
<213> ORGANISM: Artificial Sequence
<220> FEATURE:
<223> OTHER INFORMATION: 12A10 heavy chain VH: FR3

<400> SEQUENCE: 151

Lys Ala Thr Leu Thr Ala Asp Thr Ser Ser Ser Thr Ala Tyr Met Gln
1               5                   10                  15

Ile Ser Ser Leu Thr Ser Glu Asp Ser Ala Val Tyr Phe Cys
            20                  25                  30

<210> SEQ ID NO 152
<211> LENGTH: 14
<212> TYPE: PRT
<213> ORGANISM: Artificial Sequence
<220> FEATURE:
<223> OTHER INFORMATION: 12A10 heavy chain VH: CDR3

<400> SEQUENCE: 152

Ala Arg Ser Gly Tyr Tyr Gly Asn Tyr Glu Gly Phe Ala Tyr
1               5                   10
```

```
<210> SEQ ID NO 153
<211> LENGTH: 11
<212> TYPE: PRT
<213> ORGANISM: Artificial Sequence
<220> FEATURE:
<223> OTHER INFORMATION: 12A10 heavy chain VH: FR4

<400> SEQUENCE: 153

Trp Gly Gln Gly Thr Leu Val Thr Val Ser Ala
1               5                   10

<210> SEQ ID NO 154
<211> LENGTH: 303
<212> TYPE: DNA
<213> ORGANISM: Artificial Sequence
<220> FEATURE:
<223> OTHER INFORMATION: 12A10 light chain VL
<220> FEATURE:
<221> NAME/KEY: misc_feature
<222> LOCATION: (3)..(44)
<223> OTHER INFORMATION: FR1
<220> FEATURE:
<221> NAME/KEY: misc_feature
<222> LOCATION: (45)..(77)
<223> OTHER INFORMATION: CDR1
<220> FEATURE:
<221> NAME/KEY: misc_feature
<222> LOCATION: (78)..(122)
<223> OTHER INFORMATION: FR2
<220> FEATURE:
<221> NAME/KEY: misc_feature
<222> LOCATION: (123)..(143)
<223> OTHER INFORMATION: CDR2
<220> FEATURE:
<221> NAME/KEY: misc_feature
<222> LOCATION: (144)..(239)
<223> OTHER INFORMATION: FR3
<220> FEATURE:
<221> NAME/KEY: misc_feature
<222> LOCATION: (240)..(266)
<223> OTHER INFORMATION: CDR3
<220> FEATURE:
<221> NAME/KEY: misc_feature
<222> LOCATION: (267)..(302)
<223> OTHER INFORMATION: FR4

<400> SEQUENCE: 154
cttccatgta tgcatctcta ggagagagag tcactatcac ttgcaaggcg agtcaggaca      60
ttaatagcta tttaagctgg ttccagcaga accagggaa atctcctaag accctgatct     120
atcgtgcaaa cagattggta gatggggtcc catcaaggtt cagtggcagt ggatctgggc    180
aagattattc tctcaccatc agcagcctgg aatatgaaga tatgggaatt tattattgtc    240
tacattatgc tgagtttccg tacacgttcg gaggggggac caagctggaa ataaaacggg    300
ctg                                                                  303

<210> SEQ ID NO 155
<211> LENGTH: 33
<212> TYPE: DNA
<213> ORGANISM: Artificial Sequence
<220> FEATURE:
<223> OTHER INFORMATION: 12A10 light chain VL: CDR1

<400> SEQUENCE: 155
aaggcgagtc aggacattaa tagctattta agc                                  33

<210> SEQ ID NO 156
<211> LENGTH: 21
<212> TYPE: DNA
```

```
<213> ORGANISM: Artificial Sequence
<220> FEATURE:
<223> OTHER INFORMATION: 12A10 light chain VL: CDR2

<400> SEQUENCE: 156
cgtgcaaaca gattggtaga t                                          21

<210> SEQ ID NO 157
<211> LENGTH: 27
<212> TYPE: DNA
<213> ORGANISM: Artificial Sequence
<220> FEATURE:
<223> OTHER INFORMATION: 12A10 light chain VL: CDR3

<400> SEQUENCE: 157
ctacattatg ctgagtttcc gtacacg                                    27

<210> SEQ ID NO 158
<211> LENGTH: 100
<212> TYPE: PRT
<213> ORGANISM: Artificial Sequence
<220> FEATURE:
<223> OTHER INFORMATION: 12A10 light chain VL
<220> FEATURE:
<221> NAME/KEY: MISC_FEATURE
<222> LOCATION: (1)..(14)
<223> OTHER INFORMATION: FR1
<220> FEATURE:
<221> NAME/KEY: MISC_FEATURE
<222> LOCATION: (15)..(25)
<223> OTHER INFORMATION: CDR1
<220> FEATURE:
<221> NAME/KEY: MISC_FEATURE
<222> LOCATION: (26)..(40)
<223> OTHER INFORMATION: FR2
<220> FEATURE:
<221> NAME/KEY: MISC_FEATURE
<222> LOCATION: (41)..(47)
<223> OTHER INFORMATION: CDR2
<220> FEATURE:
<221> NAME/KEY: MISC_FEATURE
<222> LOCATION: (48)..(79)
<223> OTHER INFORMATION: FR3
<220> FEATURE:
<221> NAME/KEY: MISC_FEATURE
<222> LOCATION: (80)..(88)
<223> OTHER INFORMATION: CDR3
<220> FEATURE:
<221> NAME/KEY: MISC_FEATURE
<222> LOCATION: (89)..(100)
<223> OTHER INFORMATION: FR4

<400> SEQUENCE: 158

Ser Met Tyr Ala Ser Leu Gly Glu Arg Val Thr Ile Thr Cys Lys Ala
1               5                   10                  15

Ser Gln Asp Ile Asn Ser Tyr Leu Ser Trp Phe Gln Gln Lys Pro Gly
            20                  25                  30

Lys Ser Pro Lys Thr Leu Ile Tyr Arg Ala Asn Arg Leu Val Asp Gly
        35                  40                  45

Val Pro Ser Arg Phe Ser Gly Ser Gly Ser Gly Gln Asp Tyr Ser Leu
    50                  55                  60

Thr Ile Ser Ser Leu Glu Tyr Glu Asp Met Gly Ile Tyr Tyr Cys Leu
65                  70                  75                  80

His Tyr Ala Glu Phe Pro Tyr Thr Phe Gly Gly Gly Thr Lys Leu Glu
                85                  90                  95

Ile Lys Arg Ala
            100
```

```
<210> SEQ ID NO 159
<211> LENGTH: 14
<212> TYPE: PRT
<213> ORGANISM: Artificial Sequence
<220> FEATURE:
<223> OTHER INFORMATION: 12A10 light chain VL: FR1

<400> SEQUENCE: 159

Ser Met Tyr Ala Ser Leu Gly Glu Arg Val Thr Ile Thr Cys
1               5                   10

<210> SEQ ID NO 160
<211> LENGTH: 11
<212> TYPE: PRT
<213> ORGANISM: Artificial Sequence
<220> FEATURE:
<223> OTHER INFORMATION: 12A10 light chain VL: CDR1

<400> SEQUENCE: 160

Lys Ala Ser Gln Asp Ile Asn Ser Tyr Leu Ser
1               5                   10

<210> SEQ ID NO 161
<211> LENGTH: 15
<212> TYPE: PRT
<213> ORGANISM: Artificial Sequence
<220> FEATURE:
<223> OTHER INFORMATION: 12A10 light chain VL: FR2

<400> SEQUENCE: 161

Trp Phe Gln Gln Lys Pro Gly Lys Ser Pro Lys Thr Leu Ile Tyr
1               5                   10                  15

<210> SEQ ID NO 162
<211> LENGTH: 7
<212> TYPE: PRT
<213> ORGANISM: Artificial Sequence
<220> FEATURE:
<223> OTHER INFORMATION: 12A10 light chain VL: CDR2

<400> SEQUENCE: 162

Arg Ala Asn Arg Leu Val Asp
1               5

<210> SEQ ID NO 163
<211> LENGTH: 32
<212> TYPE: PRT
<213> ORGANISM: Artificial Sequence
<220> FEATURE:
<223> OTHER INFORMATION: 12A10 light chain VL: FR3

<400> SEQUENCE: 163

Gly Val Pro Ser Arg Phe Ser Gly Ser Gly Ser Gly Gln Asp Tyr Ser
1               5                   10                  15

Leu Thr Ile Ser Ser Leu Glu Tyr Glu Asp Met Gly Ile Tyr Tyr Cys
                20                  25                  30

<210> SEQ ID NO 164
<211> LENGTH: 9
<212> TYPE: PRT
<213> ORGANISM: Artificial Sequence
<220> FEATURE:
<223> OTHER INFORMATION: 12A10 light chain VL: CDR3

<400> SEQUENCE: 164

Leu His Tyr Ala Glu Phe Pro Tyr Thr
```

<210> SEQ ID NO 165
<211> LENGTH: 12
<212> TYPE: PRT
<213> ORGANISM: Artificial Sequence
<220> FEATURE:
<223> OTHER INFORMATION: 12A10 light chain VL: FR4

<400> SEQUENCE: 165

Phe Gly Gly Gly Thr Lys Leu Glu Ile Lys Arg Ala
1               5                   10

<210> SEQ ID NO 166
<211> LENGTH: 434
<212> TYPE: DNA
<213> ORGANISM: Artificial Sequence
<220> FEATURE:
<223> OTHER INFORMATION: 3B7 heavy chain VH
<220> FEATURE:
<221> NAME/KEY: misc_feature
<222> LOCATION: (12)..(68)
<223> OTHER INFORMATION: Leader sequence
<220> FEATURE:
<221> NAME/KEY: misc_feature
<222> LOCATION: (69)..(143)
<223> OTHER INFORMATION: FR1
<220> FEATURE:
<221> NAME/KEY: misc_feature
<222> LOCATION: (144)..(173)
<223> OTHER INFORMATION: CDR1
<220> FEATURE:
<221> NAME/KEY: misc_feature
<222> LOCATION: (174)..(215)
<223> OTHER INFORMATION: FR2
<220> FEATURE:
<221> NAME/KEY: misc_feature
<222> LOCATION: (216)..(266)
<223> OTHER INFORMATION: CDR2
<220> FEATURE:
<221> NAME/KEY: misc_feature
<222> LOCATION: (267)..(356)
<223> OTHER INFORMATION: FR3
<220> FEATURE:
<221> NAME/KEY: misc_feature
<222> LOCATION: (357)..(401)
<223> OTHER INFORMATION: CDR3
<220> FEATURE:
<221> NAME/KEY: misc_feature
<222> LOCATION: (402)..(431)
<223> OTHER INFORMATION: FR4

<400> SEQUENCE: 166
tactagtcga catgggatgg agctgtatca tgttctttct ggtagcaaca gctacaggtg      60
tgcactccca ggtccagctg cagcagtctg gcctgaggt ggtgaggcct ggggtctcag     120
tgaagatttc ctgcaagggt tccggctaca cattcagtga ttatactatg cactgggtga     180
agcagagtca tgcaaagagt ctagagtgga ttggagttat tagtactgac aatggtaata     240
caaactataa ccagaagttt aagggcaagg ccacaatgac tgtagacaaa tcctccagca     300
ctgcctatat ggaacttgcc agattgacat ctgaggattc tgccatctat tactgtgcaa     360
gggaggcccg ggactacggt agtatctatg ctttggacta ctggggtcaa ggaacctcag     420
tcaccgtctc tcag                                                      434

<210> SEQ ID NO 167
<211> LENGTH: 30
<212> TYPE: DNA
<213> ORGANISM: Artificial Sequence
<220> FEATURE:

<223> OTHER INFORMATION: 3B7 heavy chain VH: CDR1

<400> SEQUENCE: 167
ggctacacat tcagtgatta tactatgcac                                         30

<210> SEQ ID NO 168
<211> LENGTH: 51
<212> TYPE: DNA
<213> ORGANISM: Artificial Sequence
<220> FEATURE:
<223> OTHER INFORMATION: 3B7 heavy chain VH: CDR2

<400> SEQUENCE: 168
gttattagta ctgacaatgg taatacaaac tataaccaga agtttaaggg c                 51

<210> SEQ ID NO 169
<211> LENGTH: 45
<212> TYPE: DNA
<213> ORGANISM: Artificial Sequence
<220> FEATURE:
<223> OTHER INFORMATION: 3B7 heavy chain VH: CDR3

<400> SEQUENCE: 169
gcaagggagg cccgggacta cggtagtatc tatgctttgg actac                        45

<210> SEQ ID NO 170
<211> LENGTH: 140
<212> TYPE: PRT
<213> ORGANISM: Artificial Sequence
<220> FEATURE:
<223> OTHER INFORMATION: 3B7 heavy chain VH
<220> FEATURE:
<221> NAME/KEY: MISC_FEATURE
<222> LOCATION: (1)..(19)
<223> OTHER INFORMATION: Leader sequence
<220> FEATURE:
<221> NAME/KEY: MISC_FEATURE
<222> LOCATION: (20)..(44)
<223> OTHER INFORMATION: FR1
<220> FEATURE:
<221> NAME/KEY: MISC_FEATURE
<222> LOCATION: (45)..(54)
<223> OTHER INFORMATION: CDR1
<220> FEATURE:
<221> NAME/KEY: MISC_FEATURE
<222> LOCATION: (55)..(68)
<223> OTHER INFORMATION: FR2
<220> FEATURE:
<221> NAME/KEY: MISC_FEATURE
<222> LOCATION: (69)..(85)
<223> OTHER INFORMATION: CDR2
<220> FEATURE:
<221> NAME/KEY: MISC_FEATURE
<222> LOCATION: (86)..(115)
<223> OTHER INFORMATION: FR3
<220> FEATURE:
<221> NAME/KEY: MISC_FEATURE
<222> LOCATION: (116)..(130)
<223> OTHER INFORMATION: CDR3
<220> FEATURE:
<221> NAME/KEY: MISC_FEATURE
<222> LOCATION: (131)..(140)
<223> OTHER INFORMATION: FR4

<400> SEQUENCE: 170

Met Gly Trp Ser Cys Ile Met Phe Phe Leu Val Ala Thr Ala Thr Gly
1               5                   10                  15

Val His Ser Gln Val Gln Leu Gln Gln Ser Gly Pro Glu Val Val Arg
            20                  25                  30

Pro Gly Val Ser Val Lys Ile Ser Cys Lys Gly Ser Gly Tyr Thr Phe

```
                35                  40                  45
Ser Asp Tyr Thr Met His Trp Val Lys Gln Ser His Ala Lys Ser Leu
 50                  55                  60
Glu Trp Ile Gly Val Ile Ser Thr Asp Asn Gly Asn Thr Asn Tyr Asn
 65                  70                  75                  80
Gln Lys Phe Lys Gly Lys Ala Thr Met Thr Val Asp Lys Ser Ser Ser
                 85                  90                  95
Thr Ala Tyr Met Glu Leu Ala Arg Leu Thr Ser Glu Asp Ser Ala Ile
                100                 105                 110
Tyr Tyr Cys Ala Arg Glu Ala Arg Asp Tyr Gly Ser Ile Tyr Ala Leu
            115                 120                 125
Asp Tyr Trp Gly Gln Gly Thr Ser Val Thr Val Ser
130                 135                 140

<210> SEQ ID NO 171
<211> LENGTH: 25
<212> TYPE: PRT
<213> ORGANISM: Artificial Sequence
<220> FEATURE:
<223> OTHER INFORMATION: 3B7 heavy chain VH: FR1

<400> SEQUENCE: 171

Gln Val Gln Leu Gln Gln Ser Gly Pro Glu Val Val Arg Pro Gly Val
 1               5                  10                  15
Ser Val Lys Ile Ser Cys Lys Gly Ser
                20                  25

<210> SEQ ID NO 172
<211> LENGTH: 10
<212> TYPE: PRT
<213> ORGANISM: Artificial Sequence
<220> FEATURE:
<223> OTHER INFORMATION: 3B7 heavy chain VH: CDR1

<400> SEQUENCE: 172

Gly Tyr Thr Phe Ser Asp Tyr Thr Met His
 1               5                  10

<210> SEQ ID NO 173
<211> LENGTH: 14
<212> TYPE: PRT
<213> ORGANISM: Artificial Sequence
<220> FEATURE:
<223> OTHER INFORMATION: 3B7 heavy chain VH: FR2

<400> SEQUENCE: 173

Trp Val Lys Gln Ser His Ala Lys Ser Leu Glu Trp Ile Gly
 1               5                  10

<210> SEQ ID NO 174
<211> LENGTH: 17
<212> TYPE: PRT
<213> ORGANISM: Artificial Sequence
<220> FEATURE:
<223> OTHER INFORMATION: 3B7 heavy chain VH: CDR2

<400> SEQUENCE: 174

Val Ile Ser Thr Asp Asn Gly Asn Thr Asn Tyr Asn Gln Lys Phe Lys
 1               5                  10                  15
Gly

<210> SEQ ID NO 175
```

```
<211> LENGTH: 30
<212> TYPE: PRT
<213> ORGANISM: Artificial Sequence
<220> FEATURE:
<223> OTHER INFORMATION: 3B7 heavy chain VH: FR3

<400> SEQUENCE: 175

Lys Ala Thr Met Thr Val Asp Lys Ser Ser Thr Ala Tyr Met Glu
1               5                   10                  15

Leu Ala Arg Leu Thr Ser Glu Asp Ser Ala Ile Tyr Tyr Cys
            20                  25                  30

<210> SEQ ID NO 176
<211> LENGTH: 15
<212> TYPE: PRT
<213> ORGANISM: Artificial Sequence
<220> FEATURE:
<223> OTHER INFORMATION: 3B7 heavy chain VH: CDR3

<400> SEQUENCE: 176

Ala Arg Glu Ala Arg Asp Tyr Gly Ser Ile Tyr Ala Leu Asp Tyr
1               5                   10                  15

<210> SEQ ID NO 177
<211> LENGTH: 10
<212> TYPE: PRT
<213> ORGANISM: Artificial Sequence
<220> FEATURE:
<223> OTHER INFORMATION: 3B7 heavy chain VH: FR4

<400> SEQUENCE: 177

Trp Gly Gln Gly Thr Ser Val Thr Val Ser
1               5                   10

<210> SEQ ID NO 178
<211> LENGTH: 395
<212> TYPE: DNA
<213> ORGANISM: Artificial Sequence
<220> FEATURE:
<223> OTHER INFORMATION: 3B7 light chain VL
<220> FEATURE:
<221> NAME/KEY: misc_feature
<222> LOCATION: (15)..(59)
<223> OTHER INFORMATION: Leader sequence
<220> FEATURE:
<221> NAME/KEY: misc_feature
<222> LOCATION: (60)..(128)
<223> OTHER INFORMATION: FR1
<220> FEATURE:
<221> NAME/KEY: misc_feature
<222> LOCATION: (129)..(155)
<223> OTHER INFORMATION: CDR1
<220> FEATURE:
<221> NAME/KEY: misc_feature
<222> LOCATION: (156)..(206)
<223> OTHER INFORMATION: FR2
<220> FEATURE:
<221> NAME/KEY: misc_feature
<222> LOCATION: (207)..(227)
<223> OTHER INFORMATION: CDR2
<220> FEATURE:
<221> NAME/KEY: misc_feature
<222> LOCATION: (228)..(323)
<223> OTHER INFORMATION: FR3
<220> FEATURE:
<221> NAME/KEY: misc_feature
<222> LOCATION: (324)..(350)
<223> OTHER INFORMATION: CDR3
<220> FEATURE:
<221> NAME/KEY: misc_feature
<222> LOCATION: (351)..(395)
<223> OTHER INFORMATION: FR4
```

<400> SEQUENCE: 178

```
tattactagt cgacatggtt cttatgttgc tgctgctatg cttacaggt gccagatgtg      60 acatccagat gactcagtct ccagcctccc tatctgcatc tgtgggagaa actgtcacca    120
tcacatgtcg agcaagtggg aatattcaca attatttagc atggtatcag cagaaacagg   180
gaaaatctcc tcagctcctg gtctataatg caaaaacctt agcagatggt gtgccatcaa   240
ggttcagtgg cagtggatca ggaacacaat attctctcaa gatcaacaac ctgcagcctg   300
aggattttgg gaattattac tgtcaacatt tttggagtac tccgtggacg ttcggtggag   360
gcaccaagct ggaaatcaaa cgggctgatg ctgca                                395
```

<210> SEQ ID NO 179
<211> LENGTH: 27
<212> TYPE: DNA
<213> ORGANISM: Artificial Sequence
<220> FEATURE:
<223> OTHER INFORMATION: 3B7 light chain VL: CDR1

<400> SEQUENCE: 179

```
cgagcaagtg ggaatattca caattat                                          27
```

<210> SEQ ID NO 180
<211> LENGTH: 21
<212> TYPE: DNA
<213> ORGANISM: Artificial Sequence
<220> FEATURE:
<223> OTHER INFORMATION: 3B7 light chain VL: CDR2

<400> SEQUENCE: 180

```
aatgcaaaaa ccttagcaga t                                                21
```

<210> SEQ ID NO 181
<211> LENGTH: 27
<212> TYPE: DNA
<213> ORGANISM: Artificial Sequence
<220> FEATURE:
<223> OTHER INFORMATION: 3B7 light chain VL: CDR3

<400> SEQUENCE: 181

```
caacattttt ggagtactcc gtggacg                                          27
```

<210> SEQ ID NO 182
<211> LENGTH: 127
<212> TYPE: PRT
<213> ORGANISM: Artificial Sequence
<220> FEATURE:
<223> OTHER INFORMATION: 3B7 light chain VL
<220> FEATURE:
<221> NAME/KEY: MISC_FEATURE
<222> LOCATION: (1)..(15)
<223> OTHER INFORMATION: Leader sequence
<220> FEATURE:
<221> NAME/KEY: MISC_FEATURE
<222> LOCATION: (16)..(38)
<223> OTHER INFORMATION: FR1
<220> FEATURE:
<221> NAME/KEY: MISC_FEATURE
<222> LOCATION: (39)..(47)
<223> OTHER INFORMATION: CDR1
<220> FEATURE:
<221> NAME/KEY: MISC_FEATURE
<222> LOCATION: (48)..(64)
<223> OTHER INFORMATION: FR2
<220> FEATURE:
<221> NAME/KEY: MISC_FEATURE
<222> LOCATION: (65)..(71)

```
<223> OTHER INFORMATION: CDR2
<220> FEATURE:
<221> NAME/KEY: MISC_FEATURE
<222> LOCATION: (72)..(103)
<223> OTHER INFORMATION: FR3
<220> FEATURE:
<221> NAME/KEY: MISC_FEATURE
<222> LOCATION: (104)..(112)
<223> OTHER INFORMATION: CDR3
<220> FEATURE:
<221> NAME/KEY: MISC_FEATURE
<222> LOCATION: (113)..(127)
<223> OTHER INFORMATION: FR4

<400> SEQUENCE: 182

Met Val Leu Met Leu Leu Leu Trp Leu Thr Gly Ala Arg Cys Asp
 1               5                  10                  15

Ile Gln Met Thr Gln Ser Pro Ala Ser Leu Ser Ala Ser Val Gly Glu
            20                  25                  30

Thr Val Thr Ile Thr Cys Arg Ala Ser Gly Asn Ile His Asn Tyr Leu
        35                  40                  45

Ala Trp Tyr Gln Gln Lys Gln Gly Lys Ser Pro Gln Leu Leu Val Tyr
    50                  55                  60

Asn Ala Lys Thr Leu Ala Asp Gly Val Pro Ser Arg Phe Ser Gly Ser
65                  70                  75                  80

Gly Ser Gly Thr Gln Tyr Ser Leu Lys Ile Asn Asn Leu Gln Pro Glu
                85                  90                  95

Asp Phe Gly Asn Tyr Tyr Cys Gln His Phe Trp Ser Thr Pro Trp Thr
            100                 105                 110

Phe Gly Gly Gly Thr Lys Leu Glu Ile Lys Arg Ala Asp Ala Ala
        115                 120                 125

<210> SEQ ID NO 183
<211> LENGTH: 23
<212> TYPE: PRT
<213> ORGANISM: Artificial Sequence
<220> FEATURE:
<223> OTHER INFORMATION: 3B7 light chain VL: FR1

<400> SEQUENCE: 183

Asp Ile Gln Met Thr Gln Ser Pro Ala Ser Leu Ser Ala Ser Val Gly
 1               5                  10                  15

Glu Thr Val Thr Ile Thr Cys
            20

<210> SEQ ID NO 184
<211> LENGTH: 9
<212> TYPE: PRT
<213> ORGANISM: Artificial Sequence
<220> FEATURE:
<223> OTHER INFORMATION: 3B7 light chain VL: CDR1

<400> SEQUENCE: 184

Arg Ala Ser Gly Asn Ile His Asn Tyr
 1               5

<210> SEQ ID NO 185
<211> LENGTH: 17
<212> TYPE: PRT
<213> ORGANISM: Artificial Sequence
<220> FEATURE:
<223> OTHER INFORMATION: 3B7 light chain VL: FR2

<400> SEQUENCE: 185
```

```
Leu Ala Trp Tyr Gln Gln Lys Gln Gly Lys Ser Pro Gln Leu Leu Val
1               5                   10                  15

Tyr

<210> SEQ ID NO 186
<211> LENGTH: 7
<212> TYPE: PRT
<213> ORGANISM: Artificial Sequence
<220> FEATURE:
<223> OTHER INFORMATION: 3B7 light chain VL: CDR2

<400> SEQUENCE: 186

Asn Ala Lys Thr Leu Ala Asp
1               5

<210> SEQ ID NO 187
<211> LENGTH: 32
<212> TYPE: PRT
<213> ORGANISM: Artificial Sequence
<220> FEATURE:
<223> OTHER INFORMATION: 3B7 light chain VL: FR3

<400> SEQUENCE: 187

Gly Val Pro Ser Arg Phe Ser Gly Ser Gly Ser Gly Thr Gln Tyr Ser
1               5                   10                  15

Leu Lys Ile Asn Asn Leu Gln Pro Glu Asp Phe Gly Asn Tyr Tyr Cys
            20                  25                  30

<210> SEQ ID NO 188
<211> LENGTH: 9
<212> TYPE: PRT
<213> ORGANISM: Artificial Sequence
<220> FEATURE:
<223> OTHER INFORMATION: 3B7 light chain VL: CDR3

<400> SEQUENCE: 188

Gln His Phe Trp Ser Thr Pro Trp Thr
1               5

<210> SEQ ID NO 189
<211> LENGTH: 15
<212> TYPE: PRT
<213> ORGANISM: Artificial Sequence
<220> FEATURE:
<223> OTHER INFORMATION: 3B7 light chain VL: FR4

<400> SEQUENCE: 189

Phe Gly Gly Gly Thr Lys Leu Glu Ile Lys Arg Ala Asp Ala Ala
1               5                   10                  15

<210> SEQ ID NO 190
<211> LENGTH: 425
<212> TYPE: DNA
<213> ORGANISM: Artificial Sequence
<220> FEATURE:
<223> OTHER INFORMATION: 11G8 heavy chain VH
<220> FEATURE:
<221> NAME/KEY: misc_feature
<222> LOCATION: (11)..(67)
<223> OTHER INFORMATION: Leader sequence
<220> FEATURE:
<221> NAME/KEY: misc_feature
<222> LOCATION: (68)..(142)
<223> OTHER INFORMATION: FR1
<220> FEATURE:
<221> NAME/KEY: misc_feature
<222> LOCATION: (143)..(172)
<223> OTHER INFORMATION: CDR1
```

<220> FEATURE:
<221> NAME/KEY: misc_feature
<222> LOCATION: (173)..(214)
<223> OTHER INFORMATION: FR2
<220> FEATURE:
<221> NAME/KEY: misc_feature
<222> LOCATION: (215)..(259)
<223> OTHER INFORMATION: CDR2
<220> FEATURE:
<221> NAME/KEY: misc_feature
<222> LOCATION: (260)..(355)
<223> OTHER INFORMATION: FR3
<220> FEATURE:
<221> NAME/KEY: misc_feature
<222> LOCATION: (356)..(391)
<223> OTHER INFORMATION: CDR3
<220> FEATURE:
<221> NAME/KEY: misc_feature
<222> LOCATION: (392)..(424)
<223> OTHER INFORMATION: FR4

<400> SEQUENCE: 190

```
tactagtcga atgggatgga gctgtatcat gttctttctg gtagctacag ctacaggtgt      60
gcactcccag gtccagctgc agcagtctgg gcctgacctg gtgaggcctg ggtctcagt     120 gaagatttcc tgcaagggtt ccggctacac attcactgat tatgctatgc actgggtaaa    180
gcagagtcat gcaaagagtc tagagtggat tggagttatt agtactgact ctggtactac    240
aaactacaac cagaagttta agggcaaggc cacaatgact gtagacaaat cctccagtac    300
agcctatatg gaccttgcca gattgacatc tgaggattct gccatctatt actgtgcaag    360
agacagctcg tactacgtgc gattttctta ctggggccaa ggaactctgg tcactgtctc    420
tgcag                                                                425
```

<210> SEQ ID NO 191
<211> LENGTH: 30
<212> TYPE: DNA
<213> ORGANISM: Artificial Sequence
<220> FEATURE:
<223> OTHER INFORMATION: 11G8 heavy chain VH: CDR1

<400> SEQUENCE: 191

```
ggctacacat tcactgatta tgctatgcac                                       30
```

<210> SEQ ID NO 192
<211> LENGTH: 45
<212> TYPE: DNA
<213> ORGANISM: Artificial Sequence
<220> FEATURE:
<223> OTHER INFORMATION: 11G8 heavy chain VH: CDR2

<400> SEQUENCE: 192

```
gttattagta ctgactctgg tactacaaac tacaaccaga gttt                       45
```

<210> SEQ ID NO 193
<211> LENGTH: 36
<212> TYPE: DNA
<213> ORGANISM: Artificial Sequence
<220> FEATURE:
<223> OTHER INFORMATION: 11G8 heavy chain VH: CDR3

<400> SEQUENCE: 193

```
gcaagagaca gctcgtacta cgtgcgattt tcttac                                36
```

<210> SEQ ID NO 194
<211> LENGTH: 138
<212> TYPE: PRT

```
<213> ORGANISM: Artificial Sequence
<220> FEATURE:
<223> OTHER INFORMATION: 11G8 heavy chain VH
<220> FEATURE:
<221> NAME/KEY: MISC_FEATURE
<222> LOCATION: (1)..(19)
<223> OTHER INFORMATION: Leader sequence
<220> FEATURE:
<221> NAME/KEY: MISC_FEATURE
<222> LOCATION: (20)..(44)
<223> OTHER INFORMATION: FR1
<220> FEATURE:
<221> NAME/KEY: MISC_FEATURE
<222> LOCATION: (45)..(54)
<223> OTHER INFORMATION: CDR1
<220> FEATURE:
<221> NAME/KEY: MISC_FEATURE
<222> LOCATION: (55)..(68)
<223> OTHER INFORMATION: FR2
<220> FEATURE:
<221> NAME/KEY: MISC_FEATURE
<222> LOCATION: (69)..(83)
<223> OTHER INFORMATION: CDR2
<220> FEATURE:
<221> NAME/KEY: MISC_FEATURE
<222> LOCATION: (84)..(115)
<223> OTHER INFORMATION: FR3
<220> FEATURE:
<221> NAME/KEY: MISC_FEATURE
<222> LOCATION: (116)..(127)
<223> OTHER INFORMATION: CDR3
<220> FEATURE:
<221> NAME/KEY: MISC_FEATURE
<222> LOCATION: (128)..(138)
<223> OTHER INFORMATION: FR4

<400> SEQUENCE: 194

Met Gly Trp Ser Cys Ile Met Phe Phe Leu Val Ala Thr Ala Thr Gly
1               5                   10                  15

Val His Ser Gln Val Gln Leu Gln Gln Ser Gly Pro Asp Leu Val Arg
            20                  25                  30

Pro Gly Val Ser Val Lys Ile Ser Cys Lys Gly Ser Gly Tyr Thr Phe
        35                  40                  45

Thr Asp Tyr Ala Met His Trp Val Lys Gln Ser His Ala Lys Ser Leu
    50                  55                  60

Glu Trp Ile Gly Val Ile Ser Thr Asp Ser Gly Thr Thr Asn Tyr Asn
65                  70                  75                  80

Gln Lys Phe Lys Gly Lys Ala Thr Met Thr Val Asp Lys Ser Ser Ser
                85                  90                  95

Thr Ala Tyr Met Asp Leu Ala Arg Leu Thr Ser Glu Asp Ser Ala Ile
            100                 105                 110

Tyr Tyr Cys Ala Arg Asp Ser Ser Tyr Tyr Val Arg Phe Ser Tyr Trp
        115                 120                 125

Gly Gln Gly Thr Leu Val Thr Val Ser Ala
    130                 135

<210> SEQ ID NO 195
<211> LENGTH: 25
<212> TYPE: PRT
<213> ORGANISM: Artificial Sequence
<220> FEATURE:
<223> OTHER INFORMATION: 11G8 heavy chain VH: FR1

<400> SEQUENCE: 195

Gln Val Gln Leu Gln Gln Ser Gly Pro Asp Leu Val Arg Pro Gly Val
1               5                   10                  15

Ser Val Lys Ile Ser Cys Lys Gly Ser
            20                  25
```

```
<210> SEQ ID NO 196
<211> LENGTH: 10
<212> TYPE: PRT
<213> ORGANISM: Artificial Sequence
<220> FEATURE:
<223> OTHER INFORMATION: 11G8 heavy chain VH: CDR1

<400> SEQUENCE: 196

Gly Tyr Thr Phe Thr Asp Tyr Ala Met His
1               5                   10

<210> SEQ ID NO 197
<211> LENGTH: 14
<212> TYPE: PRT
<213> ORGANISM: Artificial Sequence
<220> FEATURE:
<223> OTHER INFORMATION: 11G8 heavy chain VH: FR2

<400> SEQUENCE: 197

Trp Val Lys Gln Ser His Ala Lys Ser Leu Glu Trp Ile Gly
1               5                   10

<210> SEQ ID NO 198
<211> LENGTH: 15
<212> TYPE: PRT
<213> ORGANISM: Artificial Sequence
<220> FEATURE:
<223> OTHER INFORMATION: 11G8 heavy chain VH: CDR2

<400> SEQUENCE: 198

Val Ile Ser Thr Asp Ser Gly Thr Thr Asn Tyr Asn Gln Lys Phe
1               5                   10                  15

<210> SEQ ID NO 199
<211> LENGTH: 32
<212> TYPE: PRT
<213> ORGANISM: Artificial Sequence
<220> FEATURE:
<223> OTHER INFORMATION: 11G8 heavy chain VH: FR3

<400> SEQUENCE: 199

Lys Gly Lys Ala Thr Met Thr Val Asp Lys Ser Ser Ser Thr Ala Tyr
1               5                   10                  15
Met Asp Leu Ala Arg Leu Thr Ser Glu Asp Ser Ala Ile Tyr Tyr Cys
                20                  25                  30

<210> SEQ ID NO 200
<211> LENGTH: 12
<212> TYPE: PRT
<213> ORGANISM: Artificial Sequence
<220> FEATURE:
<223> OTHER INFORMATION: 11G8 heavy chain VH: CDR3

<400> SEQUENCE: 200

Ala Arg Asp Ser Ser Tyr Tyr Val Arg Phe Ser Tyr
1               5                   10

<210> SEQ ID NO 201
<211> LENGTH: 11
<212> TYPE: PRT
<213> ORGANISM: Artificial Sequence
<220> FEATURE:
<223> OTHER INFORMATION: 11G8 heavy chain VH: FR4

<400> SEQUENCE: 201
```

Trp Gly Gln Gly Thr Leu Val Thr Val Ser Ala
1               5                   10

<210> SEQ ID NO 202
<211> LENGTH: 420
<212> TYPE: DNA
<213> ORGANISM: Artificial Sequence
<220> FEATURE:
<223> OTHER INFORMATION: 11G8 light chain VL
<220> FEATURE:
<221> NAME/KEY: misc_feature
<222> LOCATION: (25)..(84)
<223> OTHER INFORMATION: Leader sequence
<220> FEATURE:
<221> NAME/KEY: misc_feature
<222> LOCATION: (85)..(153)
<223> OTHER INFORMATION: FR1
<220> FEATURE:
<221> NAME/KEY: misc_feature
<222> LOCATION: (154)..(180)
<223> OTHER INFORMATION: CDR1
<220> FEATURE:
<221> NAME/KEY: misc_feature
<222> LOCATION: (181)..(231)
<223> OTHER INFORMATION: FR2
<220> FEATURE:
<221> NAME/KEY: misc_feature
<222> LOCATION: (232)..(252)
<223> OTHER INFORMATION: CDR2
<220> FEATURE:
<221> NAME/KEY: misc_feature
<222> LOCATION: (253)..(360)
<223> OTHER INFORMATION: FR3
<220> FEATURE:
<221> NAME/KEY: misc_feature
<222> LOCATION: (361)..(375)
<223> OTHER INFORMATION: CDR3
<220> FEATURE:
<221> NAME/KEY: misc_feature
<222> LOCATION: (376)..(420)
<223> OTHER INFORMATION: FR4

<400> SEQUENCE: 202
tactagttgt atattggctt caagatggag tcacagaccc aggtcttcgt atttctactg      60
ctctgtgtgt ctggtgctca tgggagtatt gtgatgaccc agactcccaa attcctgctt    120
gtttcagtag agacagggt taccataacc tgtaaggcca gtcagagtgt gagtaatgat      180
gtagcttggt accaacagaa gccagggcag tctcctaaac tgctaatata ctatgcatcc    240
aatcgctaca ctggagtccc tgatcgcttc actggcagtg gatatgggac ggatttcact    300
ttcaccatca gcactgtgca ggctgaagac ctggcagttt atttctgtca gcaggattat    360
agttctccgt ggacgttcgg tggaggcacc aagctggaaa tcaaacgggc tgatgctgca    420

<210> SEQ ID NO 203
<211> LENGTH: 27
<212> TYPE: DNA
<213> ORGANISM: Artificial Sequence
<220> FEATURE:
<223> OTHER INFORMATION: 11G8 light chain VL: CDR1

<400> SEQUENCE: 203
aaggccagtc agagtgtgag taatgat                                         27

<210> SEQ ID NO 204
<211> LENGTH: 21
<212> TYPE: DNA
<213> ORGANISM: Artificial Sequence
<220> FEATURE:
<223> OTHER INFORMATION: 11G8 light chain VL: CDR2

<400> SEQUENCE: 204
tatgcatcca atcgctacac t                                                    21

<210> SEQ ID NO 205
<211> LENGTH: 15
<212> TYPE: DNA
<213> ORGANISM: Artificial Sequence
<220> FEATURE:
<223> OTHER INFORMATION: 11G8 light chain VL: CDR3

<400> SEQUENCE: 205
agttctccgt ggacg                                                           15

<210> SEQ ID NO 206
<211> LENGTH: 132
<212> TYPE: PRT
<213> ORGANISM: Artificial Sequence
<220> FEATURE:
<223> OTHER INFORMATION: 11G8 light chain VL
<220> FEATURE:
<221> NAME/KEY: MISC_FEATURE
<222> LOCATION: (1)..(20)
<223> OTHER INFORMATION: Leader sequence
<220> FEATURE:
<221> NAME/KEY: MISC_FEATURE
<222> LOCATION: (21)..(43)
<223> OTHER INFORMATION: FR1
<220> FEATURE:
<221> NAME/KEY: MISC_FEATURE
<222> LOCATION: (44)..(52)
<223> OTHER INFORMATION: CDR1
<220> FEATURE:
<221> NAME/KEY: MISC_FEATURE
<222> LOCATION: (53)..(69)
<223> OTHER INFORMATION: FR2
<220> FEATURE:
<221> NAME/KEY: MISC_FEATURE
<222> LOCATION: (70)..(76)
<223> OTHER INFORMATION: CDR2
<220> FEATURE:
<221> NAME/KEY: MISC_FEATURE
<222> LOCATION: (77)..(108)
<223> OTHER INFORMATION: FR3
<220> FEATURE:
<221> NAME/KEY: MISC_FEATURE
<222> LOCATION: (109)..(117)
<223> OTHER INFORMATION: CDR3
<220> FEATURE:
<221> NAME/KEY: MISC_FEATURE
<222> LOCATION: (118)..(132)
<223> OTHER INFORMATION: FR4

<400> SEQUENCE: 206

Met Glu Ser Gln Thr Gln Val Phe Val Phe Leu Leu Leu Cys Val Ser
1               5                   10                  15

Gly Ala His Gly Ser Ile Val Met Thr Gln Thr Pro Lys Phe Leu Leu
            20                  25                  30

Val Ser Val Gly Asp Arg Val Thr Ile Thr Cys Lys Ala Ser Gln Ser
        35                  40                  45

Val Ser Asn Asp Val Ala Trp Tyr Gln Gln Lys Pro Gly Gln Ser Pro
    50                  55                  60

Lys Leu Leu Ile Tyr Tyr Ala Ser Asn Arg Tyr Thr Gly Val Pro Asp
65                  70                  75                  80

Arg Phe Thr Gly Ser Gly Tyr Gly Thr Asp Phe Thr Phe Thr Ile Ser
                85                  90                  95

Thr Val Gln Ala Glu Asp Leu Ala Val Tyr Phe Cys Gln Gln Asp Tyr
            100                 105                 110

Ser Ser Pro Trp Thr Phe Gly Gly Gly Thr Lys Leu Glu Ile Lys Arg
        115                 120                 125

Ala Asp Ala Ala
    130

<210> SEQ ID NO 207
<211> LENGTH: 23
<212> TYPE: PRT
<213> ORGANISM: Artificial Sequence
<220> FEATURE:
<223> OTHER INFORMATION: 11G8 light chain VL: FR1

<400> SEQUENCE: 207

Ser Ile Val Met Thr Gln Thr Pro Lys Phe Leu Leu Val Ser Val Gly
1               5                   10                  15

Asp Arg Val Thr Ile Thr Cys
            20

<210> SEQ ID NO 208
<211> LENGTH: 9
<212> TYPE: PRT
<213> ORGANISM: Artificial Sequence
<220> FEATURE:
<223> OTHER INFORMATION: 11G8 light chain VL: CDR1

<400> SEQUENCE: 208

Lys Ala Ser Gln Ser Val Ser Asn Asp
1               5

<210> SEQ ID NO 209
<211> LENGTH: 17
<212> TYPE: PRT
<213> ORGANISM: Artificial Sequence
<220> FEATURE:
<223> OTHER INFORMATION: 11G8 light chain VL: FR2

<400> SEQUENCE: 209

Val Ala Trp Tyr Gln Gln Lys Pro Gly Gln Ser Pro Lys Leu Leu Ile
1               5                   10                  15

Tyr

<210> SEQ ID NO 210
<211> LENGTH: 7
<212> TYPE: PRT
<213> ORGANISM: Artificial Sequence
<220> FEATURE:
<223> OTHER INFORMATION: 11G8 light chain VL: CDR2

<400> SEQUENCE: 210

Tyr Ala Ser Asn Arg Tyr Thr
1               5

<210> SEQ ID NO 211
<211> LENGTH: 32
<212> TYPE: PRT
<213> ORGANISM: Artificial Sequence
<220> FEATURE:
<223> OTHER INFORMATION: 11G8 light chain VL: FR3

<400> SEQUENCE: 211

Gly Val Pro Asp Arg Phe Thr Gly Ser Gly Tyr Gly Thr Asp Phe Thr
1               5                   10                  15

Phe Thr Ile Ser Thr Val Gln Ala Glu Asp Leu Ala Val Tyr Phe Cys
            20                  25                  30

<210> SEQ ID NO 212
<211> LENGTH: 9
<212> TYPE: PRT
<213> ORGANISM: Artificial Sequence
<220> FEATURE:
<223> OTHER INFORMATION: 11G8 light chain VL: CDR3

<400> SEQUENCE: 212

Gln Gln Asp Tyr Ser Ser Pro Trp Thr
1               5

<210> SEQ ID NO 213
<211> LENGTH: 15
<212> TYPE: PRT
<213> ORGANISM: Artificial Sequence
<220> FEATURE:
<223> OTHER INFORMATION: 11G8 light chain VL: FR4

<400> SEQUENCE: 213

Phe Gly Gly Gly Thr Lys Leu Glu Ile Lys Arg Ala Asp Ala Ala
1               5                   10                  15

<210> SEQ ID NO 214
<211> LENGTH: 434
<212> TYPE: DNA
<213> ORGANISM: Artificial Sequence
<220> FEATURE:
<223> OTHER INFORMATION: 14F8 heavy chain VH
<220> FEATURE:
<221> NAME/KEY: misc_feature
<222> LOCATION: (12)..(68)
<223> OTHER INFORMATION: Leader sequence
<220> FEATURE:
<221> NAME/KEY: misc_feature
<222> LOCATION: (69)..(143)
<223> OTHER INFORMATION: FR1
<220> FEATURE:
<221> NAME/KEY: misc_feature
<222> LOCATION: (144)..(173)
<223> OTHER INFORMATION: CDR1
<220> FEATURE:
<221> NAME/KEY: misc_feature
<222> LOCATION: (174)..(215)
<223> OTHER INFORMATION: FR2
<220> FEATURE:
<221> NAME/KEY: misc_feature
<222> LOCATION: (216)..(266)
<223> OTHER INFORMATION: CDR2
<220> FEATURE:
<221> NAME/KEY: misc_feature
<222> LOCATION: (267)..(356)
<223> OTHER INFORMATION: FR3
<220> FEATURE:
<221> NAME/KEY: misc_feature
<222> LOCATION: (357)..(401)
<223> OTHER INFORMATION: CDR3
<220> FEATURE:
<221> NAME/KEY: misc_feature
<222> LOCATION: (402)..(431)
<223> OTHER INFORMATION: FR4

<400> SEQUENCE: 214
tacttgtcga catgggatgg agctgtatca tgttctttct ggtagcaaca gctacaggtg      60
tgcactccca ggtccagctg cagcagtctg ggcctgaggt ggtgaggcct ggggtctcag     120
tgaagatttc ctgcaagggt tccggctaca cattcactga ttatactatg cactgggtga     180
agcagagtca tgcaaagagt ctagagtgga ttggagttat tagtacttac aatggtaata     240
caaactacaa ccagaacttt gagggcaagg ccacaatgac tgtagacaaa tcctccagca     300

```
cagcctatat ggaacttgcc agattgacat ctgaggattc tgccatctat tactgtgcaa    360
gagagagggg gggggatggt tactacagtg ctgtggacta ctggggtcaa ggaacctcag    420
tcaccgtctc tcag                                                      434
```

<210> SEQ ID NO 215
<211> LENGTH: 30
<212> TYPE: DNA
<213> ORGANISM: Artificial Sequence
<220> FEATURE:
<223> OTHER INFORMATION: 14F8 heavy chain VH: CDR1

<400> SEQUENCE: 215

```
ggctacacat tcactgatta tactatgcac                                      30
```

<210> SEQ ID NO 216
<211> LENGTH: 51
<212> TYPE: DNA
<213> ORGANISM: Artificial Sequence
<220> FEATURE:
<223> OTHER INFORMATION: 14F8 heavy chain VH: CDR2

<400> SEQUENCE: 216

```
gttattagta cttacaatgg taatacaaac tacaaccaga actttgaggg c              51
```

<210> SEQ ID NO 217
<211> LENGTH: 45
<212> TYPE: DNA
<213> ORGANISM: Artificial Sequence
<220> FEATURE:
<223> OTHER INFORMATION: 14F8 heavy chain VH: CDR3

<400> SEQUENCE: 217

```
gcaagagaga ggggggggga tggttactac agtgctgtgg actac                     45
```

<210> SEQ ID NO 218
<211> LENGTH: 140
<212> TYPE: PRT
<213> ORGANISM: Artificial Sequence
<220> FEATURE:
<223> OTHER INFORMATION: 14F8 heavy chain VH
<220> FEATURE:
<221> NAME/KEY: MISC_FEATURE
<222> LOCATION: (1)..(19)
<223> OTHER INFORMATION: Leader sequence
<220> FEATURE:
<221> NAME/KEY: MISC_FEATURE
<222> LOCATION: (20)..(44)
<223> OTHER INFORMATION: FR1
<220> FEATURE:
<221> NAME/KEY: MISC_FEATURE
<222> LOCATION: (45)..(54)
<223> OTHER INFORMATION: CDR1
<220> FEATURE:
<221> NAME/KEY: MISC_FEATURE
<222> LOCATION: (55)..(68)
<223> OTHER INFORMATION: FR2
<220> FEATURE:
<221> NAME/KEY: MISC_FEATURE
<222> LOCATION: (69)..(85)
<223> OTHER INFORMATION: CDR2
<220> FEATURE:
<221> NAME/KEY: MISC_FEATURE
<222> LOCATION: (86)..(115)
<223> OTHER INFORMATION: FR3
<220> FEATURE:
<221> NAME/KEY: MISC_FEATURE
<222> LOCATION: (116)..(130)
<223> OTHER INFORMATION: CDR3
<220> FEATURE:
<221> NAME/KEY: MISC_FEATURE

<222> LOCATION: (131)..(140)
<223> OTHER INFORMATION: FR4

<400> SEQUENCE: 218

Met Gly Trp Ser Cys Ile Met Phe Phe Leu Val Ala Thr Ala Thr Gly
1               5                   10                  15

Val His Ser Gln Val Gln Leu Gln Gln Ser Gly Pro Glu Val Val Arg
            20                  25                  30

Pro Gly Val Ser Val Lys Ile Ser Cys Lys Gly Ser Gly Tyr Thr Phe
        35                  40                  45

Thr Asp Tyr Thr Met His Trp Val Lys Gln Ser His Ala Lys Ser Leu
    50                  55                  60

Glu Trp Ile Gly Val Ile Ser Thr Tyr Asn Gly Asn Thr Asn Tyr Asn
65                  70                  75                  80

Gln Asn Phe Glu Gly Lys Ala Thr Met Thr Val Asp Lys Ser Ser Ser
                85                  90                  95

Thr Ala Tyr Met Glu Leu Ala Arg Leu Thr Ser Glu Asp Ser Ala Ile
            100                 105                 110

Tyr Tyr Cys Ala Arg Glu Arg Gly Gly Asp Gly Tyr Tyr Ser Ala Val
        115                 120                 125

Asp Tyr Trp Gly Gln Gly Thr Ser Val Thr Val Ser
    130                 135                 140

<210> SEQ ID NO 219
<211> LENGTH: 25
<212> TYPE: PRT
<213> ORGANISM: Artificial Sequence
<220> FEATURE:
<223> OTHER INFORMATION: 14F8 heavy chain VH: FR1

<400> SEQUENCE: 219

Gln Val Gln Leu Gln Gln Ser Gly Pro Glu Val Val Arg Pro Gly Val
1               5                   10                  15

Ser Val Lys Ile Ser Cys Lys Gly Ser
            20                  25

<210> SEQ ID NO 220
<211> LENGTH: 10
<212> TYPE: PRT
<213> ORGANISM: Artificial Sequence
<220> FEATURE:
<223> OTHER INFORMATION: 14F8 heavy chain VH: CDR1

<400> SEQUENCE: 220

Gly Tyr Thr Phe Thr Asp Tyr Thr Met His
1               5                   10

<210> SEQ ID NO 221
<211> LENGTH: 14
<212> TYPE: PRT
<213> ORGANISM: Artificial Sequence
<220> FEATURE:
<223> OTHER INFORMATION: 14F8 heavy chain VH: FR2

<400> SEQUENCE: 221

Trp Val Lys Gln Ser His Ala Lys Ser Leu Glu Trp Ile Gly
1               5                   10

<210> SEQ ID NO 222
<211> LENGTH: 17
<212> TYPE: PRT
<213> ORGANISM: Artificial Sequence

```
<220> FEATURE:
<223> OTHER INFORMATION: 14F8 heavy chain VH: CDR2

<400> SEQUENCE: 222

Val Ile Ser Thr Tyr Asn Gly Asn Thr Asn Tyr Asn Gln Asn Phe Glu
1               5                   10                  15
Gly

<210> SEQ ID NO 223
<211> LENGTH: 30
<212> TYPE: PRT
<213> ORGANISM: Artificial Sequence
<220> FEATURE:
<223> OTHER INFORMATION: 14F8 heavy chain VH: FR3

<400> SEQUENCE: 223

Lys Ala Thr Met Thr Val Asp Lys Ser Ser Ser Thr Ala Tyr Met Glu
1               5                   10                  15
Leu Ala Arg Leu Thr Ser Glu Asp Ser Ala Ile Tyr Tyr Cys
            20                  25                  30

<210> SEQ ID NO 224
<211> LENGTH: 15
<212> TYPE: PRT
<213> ORGANISM: Artificial Sequence
<220> FEATURE:
<223> OTHER INFORMATION: 14F8 heavy chain VH: CDR3

<400> SEQUENCE: 224

Ala Arg Glu Arg Gly Gly Asp Gly Tyr Tyr Ser Ala Val Asp Tyr
1               5                   10                  15

<210> SEQ ID NO 225
<211> LENGTH: 10
<212> TYPE: PRT
<213> ORGANISM: Artificial Sequence
<220> FEATURE:
<223> OTHER INFORMATION: 14F8 heavy chain VH: FR4

<400> SEQUENCE: 225

Trp Gly Gln Gly Thr Ser Val Thr Val Ser
1               5                   10

<210> SEQ ID NO 226
<211> LENGTH: 313
<212> TYPE: DNA
<213> ORGANISM: Artificial Sequence
<220> FEATURE:
<223> OTHER INFORMATION: 14F8 light chain VL
<220> FEATURE:
<221> NAME/KEY: misc_feature
<222> LOCATION: (3)..(47)
<223> OTHER INFORMATION: FR1
<220> FEATURE:
<221> NAME/KEY: misc_feature
<222> LOCATION: (48)..(74)
<223> OTHER INFORMATION: CDR1
<220> FEATURE:
<221> NAME/KEY: misc_feature
<222> LOCATION: (75)..(125)
<223> OTHER INFORMATION: FR2
<220> FEATURE:
<221> NAME/KEY: misc_feature
<222> LOCATION: (126)..(146)
<223> OTHER INFORMATION: CDR2
<220> FEATURE:
<221> NAME/KEY: misc_feature
<222> LOCATION: (147)..(242)
<223> OTHER INFORMATION: FR3
```

```
<220> FEATURE:
<221> NAME/KEY: misc_feature
<222> LOCATION: (243)..(269)
<223> OTHER INFORMATION: CDR3
<220> FEATURE:
<221> NAME/KEY: misc_feature
<222> LOCATION: (270)..(311)
<223> OTHER INFORMATION: FR4

<400> SEQUENCE: 226
ccaaattcct gcttgtatca gcaggagaca gggttaccat aacctgcaag gccagtcaga      60
gtgtgattaa tgatgtagct tggtaccaac agaagccagg gcagtctcct aaactgctga     120
tatactatgc atccaatcgc tacactggag tccctgatcg cttcactggc agtggatatg     180
ggacggattt cactttcacc atcagcactg tgcaggctga agacctggca gtttatttct     240
gtcagcagga ttatagctct ccgtacacgt tcggagggg gaccaagctg gaaataaaac      300
gggctgatgc tgc                                                        313

<210> SEQ ID NO 227
<211> LENGTH: 27
<212> TYPE: DNA
<213> ORGANISM: Artificial Sequence
<220> FEATURE:
<223> OTHER INFORMATION: 14F8 light chain VL: CDR1

<400> SEQUENCE: 227
aaggccagtc agagtgtgat taatgat                                          27

<210> SEQ ID NO 228
<211> LENGTH: 21
<212> TYPE: DNA
<213> ORGANISM: Artificial Sequence
<220> FEATURE:
<223> OTHER INFORMATION: 14F8 light chain VL: CDR2

<400> SEQUENCE: 228
tatgcatcca atcgctacac t                                                21

<210> SEQ ID NO 229
<211> LENGTH: 27
<212> TYPE: DNA
<213> ORGANISM: Artificial Sequence
<220> FEATURE:
<223> OTHER INFORMATION: 14F8 light chain VL: CDR3

<400> SEQUENCE: 229
cagcaggatt atagctctcc gtacacg                                          27

<210> SEQ ID NO 230
<211> LENGTH: 103
<212> TYPE: PRT
<213> ORGANISM: Artificial Sequence
<220> FEATURE:
<223> OTHER INFORMATION: 14F8 light chain VL
<220> FEATURE:
<221> NAME/KEY: MISC_FEATURE
<222> LOCATION: (1)..(15)
<223> OTHER INFORMATION: FR1
<220> FEATURE:
<221> NAME/KEY: MISC_FEATURE
<222> LOCATION: (16)..(24)
<223> OTHER INFORMATION: CDR1
<220> FEATURE:
<221> NAME/KEY: MISC_FEATURE
<222> LOCATION: (25)..(41)
<223> OTHER INFORMATION: FR2
<220> FEATURE:
```

-continued

```
<221> NAME/KEY: MISC_FEATURE
<222> LOCATION: (42)..(48)
<223> OTHER INFORMATION: CDR2
<220> FEATURE:
<221> NAME/KEY: MISC_FEATURE
<222> LOCATION: (49)..(80)
<223> OTHER INFORMATION: FR3
<220> FEATURE:
<221> NAME/KEY: MISC_FEATURE
<222> LOCATION: (81)..(89)
<223> OTHER INFORMATION: CDR3
<220> FEATURE:
<221> NAME/KEY: MISC_FEATURE
<222> LOCATION: (90)..(103)
<223> OTHER INFORMATION: FR4

<400> SEQUENCE: 230

Lys Phe Leu Leu Val Ser Ala Gly Asp Arg Val Thr Ile Thr Cys Lys
1               5                   10                  15

Ala Ser Gln Ser Val Ile Asn Asp Val Ala Trp Tyr Gln Gln Lys Pro
            20                  25                  30

Gly Gln Ser Pro Lys Leu Leu Ile Tyr Tyr Ala Ser Asn Arg Tyr Thr
        35                  40                  45

Gly Val Pro Asp Arg Phe Thr Gly Ser Gly Tyr Gly Thr Asp Phe Thr
    50                  55                  60

Phe Thr Ile Ser Thr Val Gln Ala Glu Asp Leu Ala Val Tyr Phe Cys
65                  70                  75                  80

Gln Gln Asp Tyr Ser Ser Pro Tyr Thr Phe Gly Gly Gly Thr Lys Leu
                85                  90                  95

Glu Ile Lys Arg Ala Asp Ala
            100

<210> SEQ ID NO 231
<211> LENGTH: 15
<212> TYPE: PRT
<213> ORGANISM: Artificial Sequence
<220> FEATURE:
<223> OTHER INFORMATION: 14F8 light chain VL: FR1

<400> SEQUENCE: 231

Lys Phe Leu Leu Val Ser Ala Gly Asp Arg Val Thr Ile Thr Cys
1               5                   10                  15

<210> SEQ ID NO 232
<211> LENGTH: 9
<212> TYPE: PRT
<213> ORGANISM: Artificial Sequence
<220> FEATURE:
<223> OTHER INFORMATION: 14F8 light chain VL: CDR1

<400> SEQUENCE: 232

Lys Ala Ser Gln Ser Val Ile Asn Asp
1               5

<210> SEQ ID NO 233
<211> LENGTH: 17
<212> TYPE: PRT
<213> ORGANISM: Artificial Sequence
<220> FEATURE:
<223> OTHER INFORMATION: 14F8 light chain VL: FR2

<400> SEQUENCE: 233

Val Ala Trp Tyr Gln Gln Lys Pro Gly Gln Ser Pro Lys Leu Leu Ile
1               5                   10                  15

Tyr
```

<210> SEQ ID NO 234
<211> LENGTH: 7
<212> TYPE: PRT
<213> ORGANISM: Artificial Sequence
<220> FEATURE:
<223> OTHER INFORMATION: 14F8 light chain VL: CDR2

<400> SEQUENCE: 234

Tyr Ala Ser Asn Arg Tyr Thr
1               5

<210> SEQ ID NO 235
<211> LENGTH: 32
<212> TYPE: PRT
<213> ORGANISM: Artificial Sequence
<220> FEATURE:
<223> OTHER INFORMATION: 14F8 light chain VL: FR3

<400> SEQUENCE: 235

Gly Val Pro Asp Arg Phe Thr Gly Ser Gly Tyr Gly Thr Asp Phe Thr
1               5                   10                  15

Phe Thr Ile Ser Thr Val Gln Ala Glu Asp Leu Ala Val Tyr Phe Cys
            20                  25                  30

<210> SEQ ID NO 236
<211> LENGTH: 9
<212> TYPE: PRT
<213> ORGANISM: Artificial Sequence
<220> FEATURE:
<223> OTHER INFORMATION: 14F8 light chain VL: CDR3

<400> SEQUENCE: 236

Gln Gln Asp Tyr Ser Ser Pro Tyr Thr
1               5

<210> SEQ ID NO 237
<211> LENGTH: 14
<212> TYPE: PRT
<213> ORGANISM: Artificial Sequence
<220> FEATURE:
<223> OTHER INFORMATION: 14F8 light chain VL: FR4

<400> SEQUENCE: 237

Phe Gly Gly Gly Thr Lys Leu Glu Ile Lys Arg Ala Asp Ala
1               5                   10

<210> SEQ ID NO 238
<211> LENGTH: 421
<212> TYPE: DNA
<213> ORGANISM: Artificial Sequence
<220> FEATURE:
<223> OTHER INFORMATION: 15D2 heavy chain VH
<220> FEATURE:
<221> NAME/KEY: misc_feature
<222> LOCATION: (11)..(67)
<223> OTHER INFORMATION: Leader sequence
<220> FEATURE:
<221> NAME/KEY: misc_feature
<222> LOCATION: (68)..(142)
<223> OTHER INFORMATION: FR1
<220> FEATURE:
<221> NAME/KEY: misc_feature
<222> LOCATION: (143)..(172)
<223> OTHER INFORMATION: CDR1
<220> FEATURE:
<221> NAME/KEY: misc_feature
<222> LOCATION: (173)..(214)
<223> OTHER INFORMATION: FR2

<220> FEATURE:
<221> NAME/KEY: misc_feature
<222> LOCATION: (215)..(265)
<223> OTHER INFORMATION: CDR2
<220> FEATURE:
<221> NAME/KEY: misc_feature
<222> LOCATION: (266)..(355)
<223> OTHER INFORMATION: FR3
<220> FEATURE:
<221> NAME/KEY: misc_feature
<222> LOCATION: (356)..(388)
<223> OTHER INFORMATION: CDR3
<220> FEATURE:
<221> NAME/KEY: misc_feature
<222> LOCATION: (389)..(418)
<223> OTHER INFORMATION: FR4

<400> SEQUENCE: 238

```
tggggaattc atggagttgg ggttcagctt gattttcctt gtccttgttt taaaaggtgt    60
ccagtgtgaa gtgatgctgg tggagtctgg gggaggctta gtgaagcctg gagggtccct   120
gaaactctcc tgtgcagcct ctggattcac tttcagtaac tatgccatgt cttgggttcg   180
ccagactccg gagaagaggc tggagtgggt cgcaacctct cttagtggtg gtaattacac   240
ctactatcca gacagtgtga aggggcgatt caccatctcc agagacaatg ccaagagcac   300
cctgtacctg caaatgagca gtctgaggtc tgaggacacg gccatgtatt actgtgtaat   360
cccccaaggt agtagtcctt ttgactattg gggccaaggc accactctca cagtctctca   420
g                                                                   421
```

<210> SEQ ID NO 239
<211> LENGTH: 30
<212> TYPE: DNA
<213> ORGANISM: Artificial Sequence
<220> FEATURE:
<223> OTHER INFORMATION: 15D2 heavy chain VH: CDR1

<400> SEQUENCE: 239

```
ggattcactt tcagtaacta tgccatgtct                                     30
```

<210> SEQ ID NO 240
<211> LENGTH: 51
<212> TYPE: DNA
<213> ORGANISM: Artificial Sequence
<220> FEATURE:
<223> OTHER INFORMATION: 15D2 heavy chain VH: CDR2

<400> SEQUENCE: 240

```
acctctctta gtggtggtaa ttacacctac tatccagaca gtgtgaaggg g             51
```

<210> SEQ ID NO 241
<211> LENGTH: 33
<212> TYPE: DNA
<213> ORGANISM: Artificial Sequence
<220> FEATURE:
<223> OTHER INFORMATION: 15D2 heavy chain VH: CDR3

<400> SEQUENCE: 241

```
gtaatccccc aaggtagtag tccttttgac tat                                 33
```

<210> SEQ ID NO 242
<211> LENGTH: 136
<212> TYPE: PRT
<213> ORGANISM: Artificial Sequence
<220> FEATURE:
<223> OTHER INFORMATION: 15D2 heavy chain VH
<220> FEATURE:

```
<221> NAME/KEY: MISC_FEATURE
<222> LOCATION: (1)..(19)
<223> OTHER INFORMATION: Leader sequence
<220> FEATURE:
<221> NAME/KEY: MISC_FEATURE
<222> LOCATION: (20)..(44)
<223> OTHER INFORMATION: FR1
<220> FEATURE:
<221> NAME/KEY: MISC_FEATURE
<222> LOCATION: (45)..(54)
<223> OTHER INFORMATION: CDR1
<220> FEATURE:
<221> NAME/KEY: MISC_FEATURE
<222> LOCATION: (55)..(68)
<223> OTHER INFORMATION: FR2
<220> FEATURE:
<221> NAME/KEY: MISC_FEATURE
<222> LOCATION: (69)..(85)
<223> OTHER INFORMATION: CDR2
<220> FEATURE:
<221> NAME/KEY: MISC_FEATURE
<222> LOCATION: (86)..(115)
<223> OTHER INFORMATION: FR3
<220> FEATURE:
<221> NAME/KEY: MISC_FEATURE
<222> LOCATION: (116)..(126)
<223> OTHER INFORMATION: CDR3
<220> FEATURE:
<221> NAME/KEY: MISC_FEATURE
<222> LOCATION: (127)..(136)
<223> OTHER INFORMATION: FR4

<400> SEQUENCE: 242

Met Glu Leu Gly Phe Ser Leu Ile Phe Leu Val Leu Val Leu Lys Gly
1               5                   10                  15

Val Gln Cys Glu Val Met Leu Val Glu Ser Gly Gly Gly Leu Val Lys
            20                  25                  30

Pro Gly Gly Ser Leu Lys Leu Ser Cys Ala Ala Ser Gly Phe Thr Phe
        35                  40                  45

Ser Asn Tyr Ala Met Ser Trp Val Arg Gln Thr Pro Glu Lys Arg Leu
    50                  55                  60

Glu Trp Val Ala Thr Ser Leu Ser Gly Gly Asn Tyr Thr Tyr Tyr Pro
65                  70                  75                  80

Asp Ser Val Lys Gly Arg Phe Thr Ile Ser Arg Asp Asn Ala Lys Ser
                85                  90                  95

Thr Leu Tyr Leu Gln Met Ser Ser Leu Arg Ser Glu Asp Thr Ala Met
            100                 105                 110

Tyr Tyr Cys Val Ile Pro Gln Gly Ser Ser Pro Phe Asp Tyr Trp Gly
        115                 120                 125

Gln Gly Thr Thr Leu Thr Val Ser
    130                 135

<210> SEQ ID NO 243
<211> LENGTH: 25
<212> TYPE: PRT
<213> ORGANISM: Artificial Sequence
<220> FEATURE:
<223> OTHER INFORMATION: 15D2 heavy chain VH: FR1

<400> SEQUENCE: 243

Glu Val Met Leu Val Glu Ser Gly Gly Gly Leu Val Lys Pro Gly Gly
1               5                   10                  15

Ser Leu Lys Leu Ser Cys Ala Ala Ser
            20                  25

<210> SEQ ID NO 244
```

```
<211> LENGTH: 10
<212> TYPE: PRT
<213> ORGANISM: Artificial Sequence
<220> FEATURE:
<223> OTHER INFORMATION: 15D2 heavy chain VH: CDR1

<400> SEQUENCE: 244

Gly Phe Thr Phe Ser Asn Tyr Ala Met Ser
1               5                   10

<210> SEQ ID NO 245
<211> LENGTH: 14
<212> TYPE: PRT
<213> ORGANISM: Artificial Sequence
<220> FEATURE:
<223> OTHER INFORMATION: 15D2 heavy chain VH: FR2

<400> SEQUENCE: 245

Trp Val Arg Gln Thr Pro Glu Lys Arg Leu Glu Trp Val Ala
1               5                   10

<210> SEQ ID NO 246
<211> LENGTH: 17
<212> TYPE: PRT
<213> ORGANISM: Artificial Sequence
<220> FEATURE:
<223> OTHER INFORMATION: 15D2 heavy chain VH: CDR2

<400> SEQUENCE: 246

Thr Ser Leu Ser Gly Gly Asn Tyr Thr Tyr Tyr Pro Asp Ser Val Lys
1               5                   10                  15

Gly

<210> SEQ ID NO 247
<211> LENGTH: 30
<212> TYPE: PRT
<213> ORGANISM: Artificial Sequence
<220> FEATURE:
<223> OTHER INFORMATION: 15D2 heavy chain VH: FR3

<400> SEQUENCE: 247

Arg Phe Thr Ile Ser Arg Asp Asn Ala Lys Ser Thr Leu Tyr Leu Gln
1               5                   10                  15

Met Ser Ser Leu Arg Ser Glu Asp Thr Ala Met Tyr Tyr Cys
            20                  25                  30

<210> SEQ ID NO 248
<211> LENGTH: 11
<212> TYPE: PRT
<213> ORGANISM: Artificial Sequence
<220> FEATURE:
<223> OTHER INFORMATION: 15D2 heavy chain VH: CDR3

<400> SEQUENCE: 248

Val Ile Pro Gln Gly Ser Ser Pro Phe Asp Tyr
1               5                   10

<210> SEQ ID NO 249
<211> LENGTH: 10
<212> TYPE: PRT
<213> ORGANISM: Artificial Sequence
<220> FEATURE:
<223> OTHER INFORMATION: 15D2 heavy chain VH: FR4

<400> SEQUENCE: 249

Trp Gly Gln Gly Thr Thr Leu Thr Val Ser
```

<210> SEQ ID NO 250
<211> LENGTH: 417
<212> TYPE: DNA
<213> ORGANISM: Artificial Sequence
<220> FEATURE:
<223> OTHER INFORMATION: 15D2 light chain VL
<220> FEATURE:
<221> NAME/KEY: misc_feature
<222> LOCATION: (12)..(83)
<223> OTHER INFORMATION: Leader sequence
<220> FEATURE:
<221> NAME/KEY: misc_feature
<222> LOCATION: (84)..(152)
<223> OTHER INFORMATION: FR1
<220> FEATURE:
<221> NAME/KEY: misc_feature
<222> LOCATION: (153)..(185)
<223> OTHER INFORMATION: CDR1
<220> FEATURE:
<221> NAME/KEY: misc_feature
<222> LOCATION: (186)..(230)
<223> OTHER INFORMATION: FR2
<220> FEATURE:
<221> NAME/KEY: misc_feature
<222> LOCATION: (231)..(251)
<223> OTHER INFORMATION: CDR2
<220> FEATURE:
<221> NAME/KEY: misc_feature
<222> LOCATION: (252)..(347)
<223> OTHER INFORMATION: FR3
<220> FEATURE:
<221> NAME/KEY: misc_feature
<222> LOCATION: (348)..(374)
<223> OTHER INFORMATION: CDR3
<220> FEATURE:
<221> NAME/KEY: misc_feature
<222> LOCATION: (375)..(404)
<223> OTHER INFORMATION: FR4

<400> SEQUENCE: 250

```
tactagtcga catgggcttc aagatggagt cacagattca ggttttggta tttttactgc    60
tctgtgtgtg tggtggtcat gggagtattg tgatgaccca gactcccaaa ttccctattg   120
tttcagtagg agacagggtt accataacct gtaaggccag tcagagtgtg aaaaatgatg   180
tagcatggta ccaacagaag ccagggcagt ctggtaaaat gttaatatat tatgcatgca   240
atcgctacac gggagtcctt gatcgcttca ctgtcagtgg atatgtgacg gatttcactt   300
tcaccatcac cactgtgcag gctgaagacc tggcagttta cttttgtcag caggatcata   360
gttatccgtg gacgttcggt gctgggacca agctggagct gaaacgggct gatgctg      417
```

<210> SEQ ID NO 251
<211> LENGTH: 33
<212> TYPE: DNA
<213> ORGANISM: Artificial Sequence
<220> FEATURE:
<223> OTHER INFORMATION: 15D2 light chain VL: CDR1

<400> SEQUENCE: 251

```
aaggccagtc agagtgtgaa aaatgatgta gca                                 33
```

<210> SEQ ID NO 252
<211> LENGTH: 21
<212> TYPE: DNA
<213> ORGANISM: Artificial Sequence
<220> FEATURE:
<223> OTHER INFORMATION: 15D2 light chain VL: CDR2

<400> SEQUENCE: 252

-continued

```
tatgcatgca atcgctacac g                              21

<210> SEQ ID NO 253
<211> LENGTH: 27
<212> TYPE: DNA
<213> ORGANISM: Artificial Sequence
<220> FEATURE:
<223> OTHER INFORMATION: 15D2 light chain VL: CDR3

<400> SEQUENCE: 253
cagcaggatc atagttatcc gtggacg                        27

<210> SEQ ID NO 254
<211> LENGTH: 131
<212> TYPE: PRT
<213> ORGANISM: Artificial Sequence
<220> FEATURE:
<223> OTHER INFORMATION: 15D2 light chain VL
<220> FEATURE:
<221> NAME/KEY: MISC_FEATURE
<222> LOCATION: (1)..(24)
<223> OTHER INFORMATION: Leader sequence
<220> FEATURE:
<221> NAME/KEY: MISC_FEATURE
<222> LOCATION: (25)..(47)
<223> OTHER INFORMATION: FR1
<220> FEATURE:
<221> NAME/KEY: MISC_FEATURE
<222> LOCATION: (48)..(58)
<223> OTHER INFORMATION: CDR1
<220> FEATURE:
<221> NAME/KEY: MISC_FEATURE
<222> LOCATION: (59)..(73)
<223> OTHER INFORMATION: FR2
<220> FEATURE:
<221> NAME/KEY: MISC_FEATURE
<222> LOCATION: (74)..(80)
<223> OTHER INFORMATION: CDR2
<220> FEATURE:
<221> NAME/KEY: MISC_FEATURE
<222> LOCATION: (81)..(112)
<223> OTHER INFORMATION: FR3
<220> FEATURE:
<221> NAME/KEY: MISC_FEATURE
<222> LOCATION: (113)..(121)
<223> OTHER INFORMATION: CDR3
<220> FEATURE:
<221> NAME/KEY: MISC_FEATURE
<222> LOCATION: (122)..(131)
<223> OTHER INFORMATION: FR4

<400> SEQUENCE: 254

Met Gly Phe Lys Met Glu Ser Gln Ile Gln Val Leu Val Phe Leu Leu
1               5                   10                  15

Leu Cys Val Cys Gly His Gly Ser Ile Val Met Thr Gln Thr Pro
            20                  25                  30

Lys Phe Pro Ile Val Ser Val Gly Asp Arg Val Thr Ile Thr Cys Lys
        35                  40                  45

Ala Ser Gln Ser Val Lys Asn Asp Val Ala Trp Tyr Gln Gln Lys Pro
    50                  55                  60

Gly Gln Ser Gly Lys Met Leu Ile Tyr Tyr Ala Cys Asn Arg Tyr Thr
65                  70                  75                  80

Gly Val Leu Asp Arg Phe Thr Val Ser Gly Tyr Val Thr Asp Phe Thr
                85                  90                  95

Phe Thr Ile Thr Thr Val Gln Ala Glu Asp Leu Ala Val Tyr Phe Cys
                100                 105                 110

Gln Gln Asp His Ser Tyr Pro Trp Thr Phe Gly Ala Gly Thr Lys Leu
```

Glu Leu Lys
    130

<210> SEQ ID NO 255
<211> LENGTH: 23
<212> TYPE: PRT
<213> ORGANISM: Artificial Sequence
<220> FEATURE:
<223> OTHER INFORMATION: 15D2 light chain VL: FR1

<400> SEQUENCE: 255

Ser Ile Val Met Thr Gln Thr Pro Lys Phe Pro Ile Val Ser Val Gly
1               5                   10                  15

Asp Arg Val Thr Ile Thr Cys
            20

<210> SEQ ID NO 256
<211> LENGTH: 11
<212> TYPE: PRT
<213> ORGANISM: Artificial Sequence
<220> FEATURE:
<223> OTHER INFORMATION: 15D2 light chain VL: CDR1

<400> SEQUENCE: 256

Lys Ala Ser Gln Ser Val Lys Asn Asp Val Ala
1               5                   10

<210> SEQ ID NO 257
<211> LENGTH: 15
<212> TYPE: PRT
<213> ORGANISM: Artificial Sequence
<220> FEATURE:
<223> OTHER INFORMATION: 15D2 light chain VL: FR2

<400> SEQUENCE: 257

Trp Tyr Gln Gln Lys Pro Gly Gln Ser Gly Lys Met Leu Ile Tyr
1               5                   10                  15

<210> SEQ ID NO 258
<211> LENGTH: 7
<212> TYPE: PRT
<213> ORGANISM: Artificial Sequence
<220> FEATURE:
<223> OTHER INFORMATION: 15D2 light chain VL: CDR2

<400> SEQUENCE: 258

Tyr Ala Cys Asn Arg Tyr Thr
1               5

<210> SEQ ID NO 259
<211> LENGTH: 32
<212> TYPE: PRT
<213> ORGANISM: Artificial Sequence
<220> FEATURE:
<223> OTHER INFORMATION: 15D2 light chain VL: FR3

<400> SEQUENCE: 259

Gly Val Leu Asp Arg Phe Thr Val Ser Gly Tyr Val Thr Asp Phe Thr
1               5                   10                  15

Phe Thr Ile Thr Thr Val Gln Ala Glu Asp Leu Ala Val Tyr Phe Cys
            20                  25                  30

<210> SEQ ID NO 260
<211> LENGTH: 9

```
<212> TYPE: PRT
<213> ORGANISM: Artificial Sequence
<220> FEATURE:
<223> OTHER INFORMATION: 15D2 light chain VL: CDR3

<400> SEQUENCE: 260

Gln Gln Asp His Ser Tyr Pro Trp Thr
1               5

<210> SEQ ID NO 261
<211> LENGTH: 10
<212> TYPE: PRT
<213> ORGANISM: Artificial Sequence
<220> FEATURE:
<223> OTHER INFORMATION: 15D2 light chain VL: FR4

<400> SEQUENCE: 261

Phe Gly Ala Gly Thr Lys Leu Glu Leu Lys
1               5                   10

<210> SEQ ID NO 262
<211> LENGTH: 438
<212> TYPE: DNA
<213> ORGANISM: Artificial Sequence
<220> FEATURE:
<223> OTHER INFORMATION: 29H7 heavy chain VH
<220> FEATURE:
<221> NAME/KEY: misc_feature
<222> LOCATION: (15)..(71)
<223> OTHER INFORMATION: Leader sequence
<220> FEATURE:
<221> NAME/KEY: misc_feature
<222> LOCATION: (72)..(146)
<223> OTHER INFORMATION: FR1
<220> FEATURE:
<221> NAME/KEY: misc_feature
<222> LOCATION: (147)..(176)
<223> OTHER INFORMATION: CDR1
<220> FEATURE:
<221> NAME/KEY: misc_feature
<222> LOCATION: (177)..(218)
<223> OTHER INFORMATION: FR2
<220> FEATURE:
<221> NAME/KEY: misc_feature
<222> LOCATION: (219)..(269)
<223> OTHER INFORMATION: CDR2
<220> FEATURE:
<221> NAME/KEY: misc_feature
<222> LOCATION: (270)..(359)
<223> OTHER INFORMATION: FR3
<220> FEATURE:
<221> NAME/KEY: misc_feature
<222> LOCATION: (360)..(404)
<223> OTHER INFORMATION: CDR3
<220> FEATURE:
<221> NAME/KEY: misc_feature
<222> LOCATION: (405)..(437)
<223> OTHER INFORMATION: FR4

<400> SEQUENCE: 262
tattactagt cgccatggga tggagctgta tcatgttctt tctggtagca acagctacag      60
gtgtgcactc ccaggtccag ctgcagcagt ctgggcctga ggtggtgagg cctggggtct     120
cagtgaagat ttcctgcaag ggttccggct acacattcac tgattatgtt atgcactggg     180
tgaagcagag tcatggaaag agtctagagt ggattggagt tattagtact tacaatggta     240
atacaaacta caaccagaag tttaagggca aggccacaat gactgtagac aaatcctcca     300
gcacagccta tatggaactt gccagattga catctgagga ttctgccatc tattactgtg     360
caagagagag ggggggggat ggttactaca gtgctatgga ctactgggt caaggaacct      420
```
cagtcaccgt ctcctcag                                                      438

<210> SEQ ID NO 263
<211> LENGTH: 30
<212> TYPE: DNA
<213> ORGANISM: Artificial Sequence
<220> FEATURE:
<223> OTHER INFORMATION: 29H7 heavy chain VH: CDR1

<400> SEQUENCE: 263
ggctacacat tcactgatta tgttatgcac                                          30

<210> SEQ ID NO 264
<211> LENGTH: 51
<212> TYPE: DNA
<213> ORGANISM: Artificial Sequence
<220> FEATURE:
<223> OTHER INFORMATION: 29H7 heavy chain VH: CDR2

<400> SEQUENCE: 264
gttattagta cttacaatgg taatacaaac tacaaccaga agtttaaggg c                  51

<210> SEQ ID NO 265
<211> LENGTH: 45
<212> TYPE: DNA
<213> ORGANISM: Artificial Sequence
<220> FEATURE:
<223> OTHER INFORMATION: 29H7 heavy chain VH: CDR3

<400> SEQUENCE: 265
gcaagagaga ggggggggga tggttactac agtgctatgg actac                         45

<210> SEQ ID NO 266
<211> LENGTH: 141
<212> TYPE: PRT
<213> ORGANISM: Artificial Sequence
<220> FEATURE:
<223> OTHER INFORMATION: 29H7 heavy chain VH
<220> FEATURE:
<221> NAME/KEY: MISC_FEATURE
<222> LOCATION: (1)..(19)
<223> OTHER INFORMATION: Leader sequence
<220> FEATURE:
<221> NAME/KEY: MISC_FEATURE
<222> LOCATION: (20)..(44)
<223> OTHER INFORMATION: FR1
<220> FEATURE:
<221> NAME/KEY: MISC_FEATURE
<222> LOCATION: (45)..(54)
<223> OTHER INFORMATION: CDR1
<220> FEATURE:
<221> NAME/KEY: MISC_FEATURE
<222> LOCATION: (55)..(68)
<223> OTHER INFORMATION: FR2
<220> FEATURE:
<221> NAME/KEY: MISC_FEATURE
<222> LOCATION: (69)..(85)
<223> OTHER INFORMATION: CDR2
<220> FEATURE:
<221> NAME/KEY: MISC_FEATURE
<222> LOCATION: (86)..(115)
<223> OTHER INFORMATION: FR3
<220> FEATURE:
<221> NAME/KEY: MISC_FEATURE
<222> LOCATION: (116)..(130)
<223> OTHER INFORMATION: CDR3
<220> FEATURE:
<221> NAME/KEY: MISC_FEATURE
<222> LOCATION: (131)..(141)
<223> OTHER INFORMATION: FR4

<400> SEQUENCE: 266

```
Met Gly Trp Ser Cys Ile Met Phe Phe Leu Val Ala Thr Ala Thr Gly
1               5                   10                  15

Val His Ser Gln Val Gln Leu Gln Gln Ser Gly Pro Glu Val Val Arg
            20                  25                  30

Pro Gly Val Ser Val Lys Ile Ser Cys Lys Gly Ser Gly Tyr Thr Phe
        35                  40                  45

Thr Asp Tyr Val Met His Trp Val Lys Gln Ser His Gly Lys Ser Leu
    50                  55                  60

Glu Trp Ile Gly Val Ile Ser Thr Tyr Asn Gly Asn Thr Asn Tyr Asn
65                  70                  75                  80

Gln Lys Phe Lys Gly Lys Ala Thr Met Thr Val Asp Lys Ser Ser Ser
                85                  90                  95

Thr Ala Tyr Met Glu Leu Ala Arg Leu Thr Ser Glu Asp Ser Ala Ile
            100                 105                 110

Tyr Tyr Cys Ala Arg Glu Arg Gly Gly Asp Gly Tyr Tyr Ser Ala Met
        115                 120                 125

Asp Tyr Trp Gly Gln Gly Thr Ser Val Thr Val Ser Ser
    130                 135                 140

<210> SEQ ID NO 267
<211> LENGTH: 25
<212> TYPE: PRT
<213> ORGANISM: Artificial Sequence
<220> FEATURE:
<223> OTHER INFORMATION: 29H7 heavy chain VH: FR1

<400> SEQUENCE: 267

Gln Val Gln Leu Gln Gln Ser Gly Pro Glu Val Val Arg Pro Gly Val
1               5                   10                  15

Ser Val Lys Ile Ser Cys Lys Gly Ser
            20                  25

<210> SEQ ID NO 268
<211> LENGTH: 10
<212> TYPE: PRT
<213> ORGANISM: Artificial Sequence
<220> FEATURE:
<223> OTHER INFORMATION: 29H7 heavy chain VH: CDR1

<400> SEQUENCE: 268

Gly Tyr Thr Phe Thr Asp Tyr Val Met His
1               5                   10

<210> SEQ ID NO 269
<211> LENGTH: 14
<212> TYPE: PRT
<213> ORGANISM: Artificial Sequence
<220> FEATURE:
<223> OTHER INFORMATION: 29H7 heavy chain VH: FR2

<400> SEQUENCE: 269

Trp Val Lys Gln Ser His Gly Lys Ser Leu Glu Trp Ile Gly
1               5                   10

<210> SEQ ID NO 270
<211> LENGTH: 17
<212> TYPE: PRT
<213> ORGANISM: Artificial Sequence
<220> FEATURE:
<223> OTHER INFORMATION: 29H7 heavy chain VH: CDR2

<400> SEQUENCE: 270
```

Val Ile Ser Thr Tyr Asn Gly Asn Thr Asn Tyr Asn Gln Lys Phe Lys
1               5                   10                  15

Gly

<210> SEQ ID NO 271
<211> LENGTH: 30
<212> TYPE: PRT
<213> ORGANISM: Artificial Sequence
<220> FEATURE:
<223> OTHER INFORMATION: 29H7 heavy chain VH: FR3

<400> SEQUENCE: 271

Lys Ala Thr Met Thr Val Asp Lys Ser Ser Thr Ala Tyr Met Glu
1               5                   10                  15

Leu Ala Arg Leu Thr Ser Glu Asp Ser Ala Ile Tyr Tyr Cys
            20                  25                  30

<210> SEQ ID NO 272
<211> LENGTH: 15
<212> TYPE: PRT
<213> ORGANISM: Artificial Sequence
<220> FEATURE:
<223> OTHER INFORMATION: 29H7 heavy chain VH: CDR3

<400> SEQUENCE: 272

Ala Arg Glu Arg Gly Gly Asp Gly Tyr Tyr Ser Ala Met Asp Tyr
1               5                   10                  15

<210> SEQ ID NO 273
<211> LENGTH: 11
<212> TYPE: PRT
<213> ORGANISM: Artificial Sequence
<220> FEATURE:
<223> OTHER INFORMATION: 29H7 heavy chain VH: FR4

<400> SEQUENCE: 273

Trp Gly Gln Gly Thr Ser Val Thr Val Ser Ser
1               5                   10

<210> SEQ ID NO 274
<211> LENGTH: 389
<212> TYPE: DNA
<213> ORGANISM: Artificial Sequence
<220> FEATURE:
<223> OTHER INFORMATION: 29H7 light chain VL
<220> FEATURE:
<221> NAME/KEY: misc_feature
<222> LOCATION: (3)..(53)
<223> OTHER INFORMATION: Leader sequence
<220> FEATURE:
<221> NAME/KEY: misc_feature
<222> LOCATION: (54)..(122)
<223> OTHER INFORMATION: FR1
<220> FEATURE:
<221> NAME/KEY: misc_feature
<222> LOCATION: (123)..(149)
<223> OTHER INFORMATION: CDR1
<220> FEATURE:
<221> NAME/KEY: misc_feature
<222> LOCATION: (150)..(200)
<223> OTHER INFORMATION: FR2
<220> FEATURE:
<221> NAME/KEY: misc_feature
<222> LOCATION: (201)..(221)
<223> OTHER INFORMATION: CDR2
<220> FEATURE:
<221> NAME/KEY: misc_feature
<222> LOCATION: (222)..(317)
<223> OTHER INFORMATION: FR3

<220> FEATURE:
<221> NAME/KEY: misc_feature
<222> LOCATION: (318)..(344)
<223> OTHER INFORMATION: CDR3
<220> FEATURE:
<221> NAME/KEY: misc_feature
<222> LOCATION: (345)..(389)
<223> OTHER INFORMATION: FR4

<400> SEQUENCE: 274

```
acaggagccg ggtgttggta tttctactgc tctgtgtgtc tggtgctcat gggagtattg    60
tgatgaccca gactcccaaa ttcctgcttg tttcagcagg agacagggtt accatagcct   120
gcaaggccag tcagagtgtg attaataatg tagcttggta ccaacagaag ccagggcagt   180
ctcctgaact gctgatatac tatgcatcca atcgctacac tggagtccct gatcgcttca   240
ctggcagtgg atatgggacg gatttcactt tcaccatcac cactgtgcag gctgaagacc   300
tggcagttta tttctgtcag caggattata gctctccgta cacgttcgga gggggaccca   360
agctggaaat aaaacgggct gatgctgca                                     389
```

<210> SEQ ID NO 275
<211> LENGTH: 27
<212> TYPE: DNA
<213> ORGANISM: Artificial Sequence
<220> FEATURE:
<223> OTHER INFORMATION: 29H7 light chain VL: CDR1

<400> SEQUENCE: 275

```
aaggccagtc agagtgtgat taataat                                        27
```

<210> SEQ ID NO 276
<211> LENGTH: 21
<212> TYPE: PRT
<213> ORGANISM: Artificial Sequence
<220> FEATURE:
<223> OTHER INFORMATION: 29H7 light chain VL: CDR2

<400> SEQUENCE: 276

Thr Ala Thr Gly Cys Ala Thr Cys Cys Ala Ala Thr Cys Gly Cys Thr
1               5                   10                  15

Ala Cys Ala Cys Thr
            20

<210> SEQ ID NO 277
<211> LENGTH: 27
<212> TYPE: PRT
<213> ORGANISM: Artificial Sequence
<220> FEATURE:
<223> OTHER INFORMATION: 29H7 light chain VL: CDR3

<400> SEQUENCE: 277

Cys Ala Gly Cys Ala Gly Gly Ala Thr Thr Ala Thr Ala Gly Cys Thr
1               5                   10                  15

Cys Thr Cys Cys Gly Thr Ala Cys Ala Cys Gly
            20                  25

<210> SEQ ID NO 278
<211> LENGTH: 129
<212> TYPE: PRT
<213> ORGANISM: Artificial Sequence
<220> FEATURE:
<223> OTHER INFORMATION: 29H7 light chain VL
<220> FEATURE:
<221> NAME/KEY: MISC_FEATURE
<222> LOCATION: (1)..(17)

```
<223> OTHER INFORMATION: Leader sequence
<220> FEATURE:
<221> NAME/KEY: MISC_FEATURE
<222> LOCATION: (18)..(40)
<223> OTHER INFORMATION: FR1
<220> FEATURE:
<221> NAME/KEY: MISC_FEATURE
<222> LOCATION: (41)..(49)
<223> OTHER INFORMATION: CDR1
<220> FEATURE:
<221> NAME/KEY: MISC_FEATURE
<222> LOCATION: (50)..(66)
<223> OTHER INFORMATION: FR2
<220> FEATURE:
<221> NAME/KEY: MISC_FEATURE
<222> LOCATION: (67)..(73)
<223> OTHER INFORMATION: CDR2
<220> FEATURE:
<221> NAME/KEY: MISC_FEATURE
<222> LOCATION: (74)..(105)
<223> OTHER INFORMATION: FR3
<220> FEATURE:
<221> NAME/KEY: MISC_FEATURE
<222> LOCATION: (106)..(114)
<223> OTHER INFORMATION: CDR3
<220> FEATURE:
<221> NAME/KEY: MISC_FEATURE
<222> LOCATION: (115)..(129)
<223> OTHER INFORMATION: FR4

<400> SEQUENCE: 278

Arg Ser Arg Val Leu Val Phe Leu Leu Cys Val Ser Gly Ala His
1               5                   10                  15

Gly Ser Ile Val Met Thr Gln Thr Pro Lys Phe Leu Leu Val Ser Ala
            20                  25                  30

Gly Asp Arg Val Thr Ile Ala Cys Lys Ala Ser Gln Ser Val Ile Asn
        35                  40                  45

Asn Val Ala Trp Tyr Gln Gln Lys Pro Gly Gln Ser Pro Glu Leu Leu
    50                  55                  60

Ile Tyr Tyr Ala Ser Asn Arg Tyr Thr Gly Val Pro Asp Arg Phe Thr
65                  70                  75                  80

Gly Ser Gly Tyr Gly Thr Asp Phe Thr Phe Thr Ile Thr Thr Val Gln
                85                  90                  95

Ala Glu Asp Leu Ala Val Tyr Phe Cys Gln Gln Asp Tyr Ser Ser Pro
            100                 105                 110

Tyr Thr Phe Gly Gly Gly Thr Lys Leu Glu Ile Lys Arg Ala Asp Ala
                115                 120                 125

Ala

<210> SEQ ID NO 279
<211> LENGTH: 23
<212> TYPE: PRT
<213> ORGANISM: Artificial Sequence
<220> FEATURE:
<223> OTHER INFORMATION: 29H7 light chain VL: FR1

<400> SEQUENCE: 279

Ser Ile Val Met Thr Gln Thr Pro Lys Phe Leu Leu Val Ser Ala Gly
1               5                   10                  15

Asp Arg Val Thr Ile Ala Cys
            20

<210> SEQ ID NO 280
<211> LENGTH: 9
<212> TYPE: PRT
<213> ORGANISM: Artificial Sequence
```

```
<220> FEATURE:
<223> OTHER INFORMATION: 29H7 light chain VL: CDR1

<400> SEQUENCE: 280

Lys Ala Ser Gln Ser Val Ile Asn Asn
1               5

<210> SEQ ID NO 281
<211> LENGTH: 17
<212> TYPE: PRT
<213> ORGANISM: Artificial Sequence
<220> FEATURE:
<223> OTHER INFORMATION: 29H7 light chain VL: FR2

<400> SEQUENCE: 281

Val Ala Trp Tyr Gln Gln Lys Pro Gly Gln Ser Pro Glu Leu Leu Ile
1               5                   10                  15

Tyr

<210> SEQ ID NO 282
<211> LENGTH: 7
<212> TYPE: PRT
<213> ORGANISM: Artificial Sequence
<220> FEATURE:
<223> OTHER INFORMATION: 29H7 light chain VL: CDR2

<400> SEQUENCE: 282

Tyr Ala Ser Asn Arg Tyr Thr
1               5

<210> SEQ ID NO 283
<211> LENGTH: 32
<212> TYPE: PRT
<213> ORGANISM: Artificial Sequence
<220> FEATURE:
<223> OTHER INFORMATION: 29H7 light chain VL: FR3

<400> SEQUENCE: 283

Gly Val Pro Asp Arg Phe Thr Gly Ser Gly Tyr Gly Thr Asp Phe Thr
1               5                   10                  15

Phe Thr Ile Thr Thr Val Gln Ala Glu Asp Leu Ala Val Tyr Phe Cys
            20                  25                  30

<210> SEQ ID NO 284
<211> LENGTH: 9
<212> TYPE: PRT
<213> ORGANISM: Artificial Sequence
<220> FEATURE:
<223> OTHER INFORMATION: 29H7 light chain VL: CDR3

<400> SEQUENCE: 284

Gln Gln Asp Tyr Ser Ser Pro Tyr Thr
1               5

<210> SEQ ID NO 285
<211> LENGTH: 15
<212> TYPE: PRT
<213> ORGANISM: Artificial Sequence
<220> FEATURE:
<223> OTHER INFORMATION: 29H7 light chain VL: FR4

<400> SEQUENCE: 285

Phe Gly Gly Gly Thr Lys Leu Glu Ile Lys Arg Ala Asp Ala Ala
1               5                   10                  15
```

```
<210> SEQ ID NO 286
<211> LENGTH: 424
<212> TYPE: DNA
<213> ORGANISM: Artificial Sequence
<220> FEATURE:
<223> OTHER INFORMATION: 30D10 heavy chain VH
<220> FEATURE:
<221> NAME/KEY: misc_feature
<222> LOCATION: (2)..(67)
<223> OTHER INFORMATION: Leader sequence
<220> FEATURE:
<221> NAME/KEY: misc_feature
<222> LOCATION: (68)..(142)
<223> OTHER INFORMATION: FR1
<220> FEATURE:
<221> NAME/KEY: misc_feature
<222> LOCATION: (143)..(172)
<223> OTHER INFORMATION: CDR1
<220> FEATURE:
<221> NAME/KEY: misc_feature
<222> LOCATION: (173)..(217)
<223> OTHER INFORMATION: FR2
<220> FEATURE:
<221> NAME/KEY: misc_feature
<222> LOCATION: (218)..(265)
<223> OTHER INFORMATION: CDR2
<220> FEATURE:
<221> NAME/KEY: misc_feature
<222> LOCATION: (266)..(355)
<223> OTHER INFORMATION: FR3
<220> FEATURE:
<221> NAME/KEY: misc_feature
<222> LOCATION: (356)..(391)
<223> OTHER INFORMATION: CDR3
<220> FEATURE:
<221> NAME/KEY: misc_feature
<222> LOCATION: (392)..(421)
<223> OTHER INFORMATION: FR4

<400> SEQUENCE: 286
tggggaattc caggaatgga gctgggtttt tctcttcctg atggcagtgg ttacaggggt    60
caattcagag gttcagctgc agcagtctgg ggctgagctt gtgaggccag ggccttagt    120 caagttgtcc tgcaaagctt ctggcttcaa ctttaaagac tactttatgc actgggtgaa    180
gcagaggcct gaacagggcc tggagtggat tggatggatt gatcctgaaa atggtaatac    240
tatatatgaa ccgaagttcc agggcaaggc cagtataaca gcagacacat cctccaacac    300
agcctacctg cagctcagca gcctgacatc tgaggacact gccgtctatt actgtgctag    360
agggggggta ggtcactggt acttcgatgt ctggggcgca gggaccacgg tcaccgtctc    420
tcag                                                                 424

<210> SEQ ID NO 287
<211> LENGTH: 30
<212> TYPE: DNA
<213> ORGANISM: Artificial Sequence
<220> FEATURE:
<223> OTHER INFORMATION: 30D10 heavy chain VH: CDR1

<400> SEQUENCE: 287
ggcttcaact ttaaagacta ctttatgcac                                      30

<210> SEQ ID NO 288
<211> LENGTH: 48
<212> TYPE: DNA
<213> ORGANISM: Artificial Sequence
<220> FEATURE:
<223> OTHER INFORMATION: 30D10 heavy chain VH: CDR2

<400> SEQUENCE: 288
```

```
attgatcctg aaaatggtaa tactatatat gaaccgaagt tccagggc                    48
```

```
<210> SEQ ID NO 289
<211> LENGTH: 36
<212> TYPE: DNA
<213> ORGANISM: Artificial Sequence
<220> FEATURE:
<223> OTHER INFORMATION: 30D10 heavy chain VH: CDR3

<400> SEQUENCE: 289
gctagagggg gggtaggtca ctggtacttc gatgtc                                 36

<210> SEQ ID NO 290
<211> LENGTH: 140
<212> TYPE: PRT
<213> ORGANISM: Artificial Sequence
<220> FEATURE:
<223> OTHER INFORMATION: 30D10 heavy chain VH
<220> FEATURE:
<221> NAME/KEY: MISC_FEATURE
<222> LOCATION: (1)..(22)
<223> OTHER INFORMATION: Leader sequence
<220> FEATURE:
<221> NAME/KEY: MISC_FEATURE
<222> LOCATION: (23)..(47)
<223> OTHER INFORMATION: FR1
<220> FEATURE:
<221> NAME/KEY: MISC_FEATURE
<222> LOCATION: (48)..(57)
<223> OTHER INFORMATION: CDR1
<220> FEATURE:
<221> NAME/KEY: MISC_FEATURE
<222> LOCATION: (58)..(72)
<223> OTHER INFORMATION: FR2
<220> FEATURE:
<221> NAME/KEY: MISC_FEATURE
<222> LOCATION: (73)..(88)
<223> OTHER INFORMATION: CDR2
<220> FEATURE:
<221> NAME/KEY: MISC_FEATURE
<222> LOCATION: (89)..(118)
<223> OTHER INFORMATION: FR3
<220> FEATURE:
<221> NAME/KEY: MISC_FEATURE
<222> LOCATION: (119)..(130)
<223> OTHER INFORMATION: CDR3
<220> FEATURE:
<221> NAME/KEY: MISC_FEATURE
<222> LOCATION: (131)..(140)
<223> OTHER INFORMATION: FR4

<400> SEQUENCE: 290

Gly Glu Phe Gln Glu Trp Ser Trp Val Phe Leu Phe Leu Met Ala Val
 1               5                  10                  15

Val Thr Gly Val Asn Ser Glu Val Gln Leu Gln Gln Ser Gly Ala Glu
             20                  25                  30

Leu Val Arg Pro Gly Ala Leu Val Lys Leu Ser Cys Lys Ala Ser Gly
         35                  40                  45

Phe Asn Phe Lys Asp Tyr Phe Met His Trp Val Lys Gln Arg Pro Glu
     50                  55                  60

Gln Gly Leu Glu Trp Ile Gly Trp Ile Asp Pro Glu Asn Gly Asn Thr
 65                  70                  75                  80

Ile Tyr Glu Pro Lys Phe Gln Gly Lys Ala Ser Ile Thr Ala Asp Thr
                 85                  90                  95

Ser Ser Asn Thr Ala Tyr Leu Gln Leu Ser Ser Leu Thr Ser Glu Asp
            100                 105                 110

Thr Ala Val Tyr Tyr Cys Ala Arg Gly Gly Val Gly His Trp Tyr Phe
        115                 120                 125
```

```
Asp Val Trp Gly Ala Gly Thr Thr Val Thr Val Ser
    130                 135                 140

<210> SEQ ID NO 291
<211> LENGTH: 25
<212> TYPE: PRT
<213> ORGANISM: Artificial Sequence
<220> FEATURE:
<223> OTHER INFORMATION: 30D10 heavy chain VH: FR1

<400> SEQUENCE: 291

Glu Val Gln Leu Gln Gln Ser Gly Ala Glu Leu Val Arg Pro Gly Ala
1               5                   10                  15

Leu Val Lys Leu Ser Cys Lys Ala Ser
            20                  25

<210> SEQ ID NO 292
<211> LENGTH: 10
<212> TYPE: PRT
<213> ORGANISM: Artificial Sequence
<220> FEATURE:
<223> OTHER INFORMATION: 30D10 heavy chain VH: CDR1

<400> SEQUENCE: 292

Gly Phe Asn Phe Lys Asp Tyr Phe Met His
1               5                   10

<210> SEQ ID NO 293
<211> LENGTH: 15
<212> TYPE: PRT
<213> ORGANISM: Artificial Sequence
<220> FEATURE:
<223> OTHER INFORMATION: 30D10 heavy chain VH: FR2

<400> SEQUENCE: 293

Trp Val Lys Gln Arg Pro Glu Gln Gly Leu Glu Trp Ile Gly Trp
1               5                   10                  15

<210> SEQ ID NO 294
<211> LENGTH: 16
<212> TYPE: PRT
<213> ORGANISM: Artificial Sequence
<220> FEATURE:
<223> OTHER INFORMATION: 30D10 heavy chain VH: CDR2

<400> SEQUENCE: 294

Ile Asp Pro Glu Asn Gly Asn Thr Ile Tyr Glu Pro Lys Phe Gln Gly
1               5                   10                  15

<210> SEQ ID NO 295
<211> LENGTH: 30
<212> TYPE: PRT
<213> ORGANISM: Artificial Sequence
<220> FEATURE:
<223> OTHER INFORMATION: 30D10 heavy chain VH: FR3

<400> SEQUENCE: 295

Lys Ala Ser Ile Thr Ala Asp Thr Ser Ser Asn Thr Ala Tyr Leu Gln
1               5                   10                  15

Leu Ser Ser Leu Thr Ser Glu Asp Thr Ala Val Tyr Tyr Cys
            20                  25                  30

<210> SEQ ID NO 296
<211> LENGTH: 12
<212> TYPE: PRT
```

-continued

```
<213> ORGANISM: Artificial Sequence
<220> FEATURE:
<223> OTHER INFORMATION: 30D10 heavy chain VH: CDR3

<400> SEQUENCE: 296

Ala Arg Gly Gly Val Gly His Trp Tyr Phe Asp Val
1               5                   10

<210> SEQ ID NO 297
<211> LENGTH: 10
<212> TYPE: PRT
<213> ORGANISM: Artificial Sequence
<220> FEATURE:
<223> OTHER INFORMATION: 30D10 heavy chain VH: FR4

<400> SEQUENCE: 297

Trp Gly Ala Gly Thr Thr Val Thr Val Ser
1               5                   10

<210> SEQ ID NO 298
<211> LENGTH: 417
<212> TYPE: PRT
<213> ORGANISM: Artificial Sequence
<220> FEATURE:
<223> OTHER INFORMATION: 30D10 light chain VL
<220> FEATURE:
<221> NAME/KEY: MISC_FEATURE
<222> LOCATION: (10)..(69)
<223> OTHER INFORMATION: Leader sequence
<220> FEATURE:
<221> NAME/KEY: MISC_FEATURE
<222> LOCATION: (70)..(138)
<223> OTHER INFORMATION: FR1
<220> FEATURE:
<221> NAME/KEY: MISC_FEATURE
<222> LOCATION: (139)..(177)
<223> OTHER INFORMATION: CDR1
<220> FEATURE:
<221> NAME/KEY: MISC_FEATURE
<222> LOCATION: (178)..(228)
<223> OTHER INFORMATION: FR2
<220> FEATURE:
<221> NAME/KEY: MISC_FEATURE
<222> LOCATION: (229)..(249)
<223> OTHER INFORMATION: CDR2
<220> FEATURE:
<221> NAME/KEY: MISC_FEATURE
<222> LOCATION: (250)..(345)
<223> OTHER INFORMATION: FR3
<220> FEATURE:
<221> NAME/KEY: MISC_FEATURE
<222> LOCATION: (346)..(372)
<223> OTHER INFORMATION: CDR3
<220> FEATURE:
<221> NAME/KEY: MISC_FEATURE
<222> LOCATION: (373)..(402)
<223> OTHER INFORMATION: FR4

<400> SEQUENCE: 298

Thr Gly Gly Gly Ala Ala Thr Thr Cys Ala Thr Gly Ala Gly Ala
1               5                   10                  15

Cys Ala Gly Ala Cys Ala Cys Ala Cys Thr Cys Cys Thr Gly Cys Thr
                20                  25                  30

Ala Thr Gly Gly Gly Thr Gly Cys Thr Gly Cys Thr Gly Cys Thr Thr
            35                  40                  45

Thr Gly Gly Gly Thr Thr Cys Cys Ala Gly Gly Cys Thr Cys Cys Ala
        50                  55                  60

Cys Thr Gly Gly Thr Gly Ala Cys Ala Thr Thr Gly Thr Gly Cys Thr
65                  70                  75                  80
```

```
Gly Ala Cys Cys Cys Ala Ala Thr Cys Thr Cys Ala Gly Cys Thr
                 85                  90                  95

Thr Cys Thr Thr Thr Gly Gly Cys Thr Gly Thr Gly Cys Thr Cys
            100                 105                 110

Thr Ala Gly Gly Gly Cys Ala Gly Ala Gly Gly Cys Cys Ala Cys
            115                 120                 125

Cys Ala Thr Cys Thr Cys Thr Thr Gly Cys Ala Ala Gly Gly Cys Cys
            130                 135                 140

Ala Gly Cys Cys Ala Ala Gly Thr Gly Thr Thr Gly Ala Thr Thr
145                 150                 155                 160

Ala Thr Gly Ala Thr Gly Gly Thr Gly Ala Thr Ala Gly Thr Thr Ala
                165                 170                 175

Thr Ala Thr Gly Ala Ala Cys Thr Gly Gly Thr Ala Cys Cys Ala Ala
                180                 185                 190

Cys Ala Gly Ala Ala Ala Cys Cys Ala Gly Gly Ala Cys Ala Gly Cys
                195                 200                 205

Cys Ala Cys Cys Cys Ala Ala Ala Cys Thr Cys Thr Cys Ala Thr
            210                 215                 220

Thr Thr Ala Thr Gly Thr Thr Gly Cys Ala Thr Cys Cys Ala Ala Thr
225                 230                 235                 240

Cys Thr Ala Ala Ala Ala Thr Cys Thr Gly Gly Gly Ala Thr Cys Cys
                245                 250                 255

Cys Ala Gly Cys Cys Ala Gly Gly Thr Thr Ala Gly Thr Gly Gly
            260                 265                 270

Cys Ala Gly Thr Gly Gly Gly Thr Cys Thr Gly Gly Gly Ala Cys Ala
                275                 280                 285

Gly Ala Cys Thr Thr Cys Ala Cys Cys Cys Thr Cys Ala Ala Cys Ala
                290                 295                 300

Thr Cys Cys Ala Thr Cys Cys Thr Gly Thr Gly Gly Ala Gly Gly Ala
305                 310                 315                 320

Gly Gly Ala Gly Gly Ala Thr Gly Gly Thr Gly Cys Ala Ala Cys Cys
                325                 330                 335

Thr Ala Thr Thr Ala Cys Thr Gly Thr Cys Ala Gly Cys Ala Ala Ala
                340                 345                 350

Cys Thr Ala Ala Thr Gly Ala Gly Gly Ala Thr Cys Cys Gly Thr Gly
                355                 360                 365

Gly Ala Cys Gly Thr Thr Cys Gly Gly Thr Gly Gly Ala Gly Gly Cys
                370                 375                 380

Ala Cys Cys Ala Ala Gly Cys Thr Gly Gly Ala Ala Ala Thr Cys Ala
385                 390                 395                 400

Ala Ala Cys Gly Gly Gly Cys Thr Gly Ala Thr Gly Cys Thr Gly Cys
                405                 410                 415

Ala
```

<210> SEQ ID NO 299
<211> LENGTH: 39
<212> TYPE: DNA
<213> ORGANISM: Artificial Sequence
<220> FEATURE:
<223> OTHER INFORMATION: 30D10 light chain VL: CDR1

<400> SEQUENCE: 299
aaggccagcc aaagtgttga ttatgatggt gatagttat          39

<210> SEQ ID NO 300

```
<211> LENGTH: 21
<212> TYPE: DNA
<213> ORGANISM: Artificial Sequence
<220> FEATURE:
<223> OTHER INFORMATION: 30D10 light chain VL: CDR2

<400> SEQUENCE: 300
gttgcatcca atctaaaatc t                                          21

<210> SEQ ID NO 301
<211> LENGTH: 27
<212> TYPE: DNA
<213> ORGANISM: Artificial Sequence
<220> FEATURE:
<223> OTHER INFORMATION: 30D10 light chain VL: CDR3

<400> SEQUENCE: 301
cagcaaacta atgaggatcc gtggacg                                    27

<210> SEQ ID NO 302
<211> LENGTH: 131
<212> TYPE: PRT
<213> ORGANISM: Artificial Sequence
<220> FEATURE:
<223> OTHER INFORMATION: 30D10 light chain VL
<220> FEATURE:
<221> NAME/KEY: MISC_FEATURE
<222> LOCATION: (1)..(20)
<223> OTHER INFORMATION: Leader sequence
<220> FEATURE:
<221> NAME/KEY: MISC_FEATURE
<222> LOCATION: (21)..(43)
<223> OTHER INFORMATION: FR1
<220> FEATURE:
<221> NAME/KEY: MISC_FEATURE
<222> LOCATION: (44)..(56)
<223> OTHER INFORMATION: CDR1
<220> FEATURE:
<221> NAME/KEY: MISC_FEATURE
<222> LOCATION: (57)..(73)
<223> OTHER INFORMATION: FR2
<220> FEATURE:
<221> NAME/KEY: MISC_FEATURE
<222> LOCATION: (74)..(80)
<223> OTHER INFORMATION: CDR2
<220> FEATURE:
<221> NAME/KEY: MISC_FEATURE
<222> LOCATION: (81)..(112)
<223> OTHER INFORMATION: FR3
<220> FEATURE:
<221> NAME/KEY: MISC_FEATURE
<222> LOCATION: (113)..(121)
<223> OTHER INFORMATION: CDR3
<220> FEATURE:
<221> NAME/KEY: MISC_FEATURE
<222> LOCATION: (122)..(131)
<223> OTHER INFORMATION: FR4

<400> SEQUENCE: 302

Met Glu Thr Asp Thr Leu Leu Leu Trp Val Leu Leu Trp Val Pro
1               5                   10                  15

Gly Ser Thr Gly Asp Ile Val Leu Thr Gln Ser Pro Ala Ser Leu Ala
            20                  25                  30

Val Ser Leu Gly Gln Arg Ala Thr Ile Ser Cys Lys Ala Ser Gln Ser
        35                  40                  45

Val Asp Tyr Asp Gly Asp Ser Tyr Met Asn Trp Tyr Gln Gln Lys Pro
    50                  55                  60

Gly Gln Pro Pro Lys Leu Leu Ile Tyr Val Ala Ser Asn Leu Lys Ser
65                  70                  75                  80
```

Gly Ile Pro Ala Arg Phe Ser Gly Ser Gly Cys Gly Thr Asp Phe Thr
                85                  90                  95

Leu Asn Ile His Pro Val Glu Glu Asp Gly Ala Thr Tyr Tyr Cys
            100                 105                 110

Gln Gln Thr Asn Glu Asp Pro Trp Thr Phe Gly Gly Gly Thr Lys Leu
        115                 120                 125

Glu Ile Lys
    130

<210> SEQ ID NO 303
<211> LENGTH: 23
<212> TYPE: PRT
<213> ORGANISM: Artificial Sequence
<220> FEATURE:
<223> OTHER INFORMATION: 30D10 light chain VL: FR1

<400> SEQUENCE: 303

Asp Ile Val Leu Thr Gln Ser Pro Ala Ser Leu Ala Val Ser Leu Gly
1               5                   10                  15

Gln Arg Ala Thr Ile Ser Cys
            20

<210> SEQ ID NO 304
<211> LENGTH: 13
<212> TYPE: PRT
<213> ORGANISM: Artificial Sequence
<220> FEATURE:
<223> OTHER INFORMATION: 30D10 light chain VL: CDR1

<400> SEQUENCE: 304

Lys Ala Ser Gln Ser Val Asp Tyr Asp Gly Asp Ser Tyr
1               5                   10

<210> SEQ ID NO 305
<211> LENGTH: 17
<212> TYPE: PRT
<213> ORGANISM: Artificial Sequence
<220> FEATURE:
<223> OTHER INFORMATION: 30D10 light chain VL: FR2

<400> SEQUENCE: 305

Met Asn Trp Tyr Gln Gln Lys Pro Gly Gln Pro Pro Lys Leu Leu Ile
1               5                   10                  15

Tyr

<210> SEQ ID NO 306
<211> LENGTH: 7
<212> TYPE: PRT
<213> ORGANISM: Artificial Sequence
<220> FEATURE:
<223> OTHER INFORMATION: 30D10 light chain VL: CDR2

<400> SEQUENCE: 306

Val Ala Ser Asn Leu Lys Ser
1               5

<210> SEQ ID NO 307
<211> LENGTH: 32
<212> TYPE: PRT
<213> ORGANISM: Artificial Sequence
<220> FEATURE:
<223> OTHER INFORMATION: 30D10 light chain VL: FR3

<400> SEQUENCE: 307

Gly Ile Pro Ala Arg Phe Ser Gly Ser Gly Cys Gly Thr Asp Phe Thr
1               5                   10                  15

Leu Asn Ile His Pro Val Glu Glu Asp Gly Ala Thr Tyr Tyr Cys
            20                  25                  30

<210> SEQ ID NO 308
<211> LENGTH: 9
<212> TYPE: PRT
<213> ORGANISM: Artificial Sequence
<220> FEATURE:
<223> OTHER INFORMATION: 30D10 light chain VL: CDR3

<400> SEQUENCE: 308

Gln Gln Thr Asn Glu Asp Pro Trp Thr
1               5

<210> SEQ ID NO 309
<211> LENGTH: 10
<212> TYPE: PRT
<213> ORGANISM: Artificial Sequence
<220> FEATURE:
<223> OTHER INFORMATION: 30D10 light chain VL: FR4

<400> SEQUENCE: 309

Phe Gly Gly Gly Thr Lys Leu Glu Ile Lys
1               5                   10

<210> SEQ ID NO 310
<211> LENGTH: 424
<212> TYPE: DNA
<213> ORGANISM: Artificial Sequence
<220> FEATURE:
<223> OTHER INFORMATION: 51C3 heavy chain VH
<220> FEATURE:
<221> NAME/KEY: misc_feature
<222> LOCATION: (1)..(66)
<223> OTHER INFORMATION: Leader sequence
<220> FEATURE:
<221> NAME/KEY: misc_feature
<222> LOCATION: (67)..(138)
<223> OTHER INFORMATION: FR1
<220> FEATURE:
<221> NAME/KEY: misc_feature
<222> LOCATION: (139)..(171)
<223> OTHER INFORMATION: CDR1
<220> FEATURE:
<221> NAME/KEY: misc_feature
<222> LOCATION: (172)..(213)
<223> OTHER INFORMATION: FR2
<220> FEATURE:
<221> NAME/KEY: misc_feature
<222> LOCATION: (214)..(264)
<223> OTHER INFORMATION: CDR2
<220> FEATURE:
<221> NAME/KEY: misc_feature
<222> LOCATION: (265)..(354)
<223> OTHER INFORMATION: FR3
<220> FEATURE:
<221> NAME/KEY: misc_feature
<222> LOCATION: (355)..(390)
<223> OTHER INFORMATION: CDR3
<220> FEATURE:
<221> NAME/KEY: misc_feature
<222> LOCATION: (391)..(423)
<223> OTHER INFORMATION: FR4

<400> SEQUENCE: 310
tggggaattc aggaatggag ctgggttttt ctctttctcc tgtcaggaac tgcaggtgtc    60
ctctctgagg tccagctgca acagtctgga cctgagctgg tgaagcctgg ggcttcagtg   120
aagatatcct gcaagacttc tggatacaca ttcactgaat acatcatgca ctgggtgaaa   180

```
cagagccatg gaaagagcct tgagtggatt ggaggtatta atcctaataa tggtggtact    240
aactacaacc agaagtttaa gggcaaggcc acattgactg tagacacgtc ctccagcata    300
gcctacatgg aactccgcag cctgacatct gaagattctg cagtctatta ttgtgcaaga    360
gacgatggtt actacgtaaa gttcgcttac tggggccaag gactctggt cactgtctct     420 gcag                                                                  424
```

<210> SEQ ID NO 311
<211> LENGTH: 33
<212> TYPE: DNA
<213> ORGANISM: Artificial Sequence
<220> FEATURE:
<223> OTHER INFORMATION: 51C3 heavy chain VH: CDR1

<400> SEQUENCE: 311

```
tctggataca cattcactga atacatcatg cac                                  33
```

<210> SEQ ID NO 312
<211> LENGTH: 51
<212> TYPE: DNA
<213> ORGANISM: Artificial Sequence
<220> FEATURE:
<223> OTHER INFORMATION: 51C3 heavy chain VH: CDR2

<400> SEQUENCE: 312

```
ggtattaatc ctaataatgg tggtactaac tacaaccaga agtttaaggg c              51
```

<210> SEQ ID NO 313
<211> LENGTH: 36
<212> TYPE: DNA
<213> ORGANISM: Artificial Sequence
<220> FEATURE:
<223> OTHER INFORMATION: 51C3 heavy chain VH: CDR3

<400> SEQUENCE: 313

```
gcaagagacg atggttacta cgtaaagttc gcttac                               36
```

<210> SEQ ID NO 314
<211> LENGTH: 141
<212> TYPE: PRT
<213> ORGANISM: Artificial Sequence
<220> FEATURE:
<223> OTHER INFORMATION: 51C3 heavy chain VH
<220> FEATURE:
<221> NAME/KEY: MISC_FEATURE
<222> LOCATION: (1)..(22)
<223> OTHER INFORMATION: Leader sequence
<220> FEATURE:
<221> NAME/KEY: MISC_FEATURE
<222> LOCATION: (23)..(46)
<223> OTHER INFORMATION: FR1
<220> FEATURE:
<221> NAME/KEY: MISC_FEATURE
<222> LOCATION: (47)..(57)
<223> OTHER INFORMATION: CDR1
<220> FEATURE:
<221> NAME/KEY: MISC_FEATURE
<222> LOCATION: (58)..(71)
<223> OTHER INFORMATION: FR2
<220> FEATURE:
<221> NAME/KEY: MISC_FEATURE
<222> LOCATION: (72)..(88)
<223> OTHER INFORMATION: CDR2
<220> FEATURE:
<221> NAME/KEY: MISC_FEATURE
<222> LOCATION: (89)..(118)
<223> OTHER INFORMATION: FR3
<220> FEATURE:

```
<221> NAME/KEY: MISC_FEATURE
<222> LOCATION: (119)..(130)
<223> OTHER INFORMATION: CDR3
<220> FEATURE:
<221> NAME/KEY: MISC_FEATURE
<222> LOCATION: (131)..(141)
<223> OTHER INFORMATION: FR4

<400> SEQUENCE: 314

Trp Gly Ile Gln Glu Trp Ser Trp Val Phe Leu Phe Leu Leu Ser Gly
1               5                   10                  15

Thr Ala Gly Val Leu Ser Glu Val Gln Leu Gln Gln Ser Gly Pro Glu
            20                  25                  30

Leu Val Lys Pro Gly Ala Ser Val Lys Ile Ser Cys Lys Thr Ser Gly
        35                  40                  45

Tyr Thr Phe Thr Glu Tyr Ile Met His Trp Val Lys Gln Ser His Gly
    50                  55                  60

Lys Ser Leu Glu Trp Ile Gly Gly Ile Asn Pro Asn Asn Gly Gly Thr
65                  70                  75                  80

Asn Tyr Asn Gln Lys Phe Lys Gly Lys Ala Thr Leu Thr Val Asp Thr
                85                  90                  95

Ser Ser Ser Ile Ala Tyr Met Glu Leu Arg Ser Leu Thr Ser Glu Asp
            100                 105                 110

Ser Ala Val Tyr Tyr Cys Ala Arg Asp Asp Gly Tyr Tyr Val Lys Phe
        115                 120                 125

Ala Tyr Trp Gly Gln Gly Thr Leu Val Thr Val Ser Ala
    130                 135                 140

<210> SEQ ID NO 315
<211> LENGTH: 24
<212> TYPE: PRT
<213> ORGANISM: Artificial Sequence
<220> FEATURE:
<223> OTHER INFORMATION: 51C3 heavy chain VH: FR1

<400> SEQUENCE: 315

Glu Val Gln Leu Gln Gln Ser Gly Pro Glu Leu Val Lys Pro Gly Ala
1               5                   10                  15

Ser Val Lys Ile Ser Cys Lys Thr
            20

<210> SEQ ID NO 316
<211> LENGTH: 27
<212> TYPE: PRT
<213> ORGANISM: Artificial Sequence
<220> FEATURE:
<223> OTHER INFORMATION: 51C3 heavy chain VH: CDR1

<400> SEQUENCE: 316

Cys His Glu Ala Val Tyr Cys His Ala Ile Asn Val His Cys Asp Arg
1               5                   10                  15

Ser Gly Tyr Thr Phe Thr Glu Tyr Ile Met His
            20                  25

<210> SEQ ID NO 317
<211> LENGTH: 14
<212> TYPE: PRT
<213> ORGANISM: Artificial Sequence
<220> FEATURE:
<223> OTHER INFORMATION: 51C3 heavy chain VH: FR2

<400> SEQUENCE: 317
```

```
-continued

Trp Val Lys Gln Ser His Gly Lys Ser Leu Glu Trp Ile Gly
1               5                   10

<210> SEQ ID NO 318
<211> LENGTH: 17
<212> TYPE: PRT
<213> ORGANISM: Artificial Sequence
<220> FEATURE:
<223> OTHER INFORMATION: 51C3 heavy chain VH: CDR2

<400> SEQUENCE: 318

Gly Ile Asn Pro Asn Asn Gly Gly Thr Asn Tyr Asn Gln Lys Phe Lys
1               5                   10                  15

Gly

<210> SEQ ID NO 319
<211> LENGTH: 30
<212> TYPE: PRT
<213> ORGANISM: Artificial Sequence
<220> FEATURE:
<223> OTHER INFORMATION: 51C3 heavy chain VH: FR3

<400> SEQUENCE: 319

Lys Ala Thr Leu Thr Val Asp Thr Ser Ser Ser Ile Ala Tyr Met Glu
1               5                   10                  15

Leu Arg Ser Leu Thr Ser Glu Asp Ser Ala Val Tyr Tyr Cys
            20                  25                  30

<210> SEQ ID NO 320
<211> LENGTH: 12
<212> TYPE: PRT
<213> ORGANISM: Artificial Sequence
<220> FEATURE:
<223> OTHER INFORMATION: 51C3 heavy chain VH: CDR3

<400> SEQUENCE: 320

Ala Arg Asp Asp Gly Tyr Tyr Val Lys Phe Ala Tyr
1               5                   10

<210> SEQ ID NO 321
<211> LENGTH: 11
<212> TYPE: PRT
<213> ORGANISM: Artificial Sequence
<220> FEATURE:
<223> OTHER INFORMATION: 51C3 heavy chain VH: FR4

<400> SEQUENCE: 321

Trp Gly Gln Gly Thr Leu Val Thr Val Ser Ala
1               5                   10

<210> SEQ ID NO 322
<211> LENGTH: 419
<212> TYPE: DNA
<213> ORGANISM: Artificial Sequence
<220> FEATURE:
<223> OTHER INFORMATION: 51C3 light chain VL
<220> FEATURE:
<221> NAME/KEY: misc_feature
<222> LOCATION: (12)..(83)
<223> OTHER INFORMATION: Leader sequence
<220> FEATURE:
<221> NAME/KEY: misc_feature
<222> LOCATION: (84)..(152)
<223> OTHER INFORMATION: FR1
<220> FEATURE:
<221> NAME/KEY: misc_feature
<222> LOCATION: (153)..(179)
<223> OTHER INFORMATION: CDR1
```

<220> FEATURE:
<221> NAME/KEY: misc_feature
<222> LOCATION: (180)..(230)
<223> OTHER INFORMATION: FR2
<220> FEATURE:
<221> NAME/KEY: misc_feature
<222> LOCATION: (231)..(251)
<223> OTHER INFORMATION: CDR2
<220> FEATURE:
<221> NAME/KEY: misc_feature
<222> LOCATION: (252)..(347)
<223> OTHER INFORMATION: FR3
<220> FEATURE:
<221> NAME/KEY: misc_feature
<222> LOCATION: (348)..(374)
<223> OTHER INFORMATION: CDR3
<220> FEATURE:
<221> NAME/KEY: misc_feature
<222> LOCATION: (375)..(419)
<223> OTHER INFORMATION: FR4

<400> SEQUENCE: 322

| | | | | | |
|---|---|---|---|---|---|
| tactagttga | catgggcttc | aagatggagt | cacagactca | ggtcttcgta | tttctactgc | 60 |
| tctgtgtgtc | tggtgctcat | gggagtattg | tgatgaccca | gactcccaaa | ttcctgcttg | 120 |
| tatcagcagg | agacagggtt | accataacct | gcaaggccag | tcagagtgtg | attaatgatg | 180 |
| tagcttggta | ccaacagaag | ccagggcagt | ctcctaaact | gctgatatac | tatgcatcca | 240 |
| atcgctacac | tggagtccct | gatcgcttca | ctggcagtgg | atatgggacg | gatttcactt | 300 |
| tcaccatcag | cactgtgcag | gctgaagacc | tggcagttta | tttctgtcag | caggattata | 360 |
| gctctccatt | cacgttcggc | tcggggacaa | agttggaaat | aaaacgggct | gatgctgca | 419 |

<210> SEQ ID NO 323
<211> LENGTH: 27
<212> TYPE: DNA
<213> ORGANISM: Artificial Sequence
<220> FEATURE:
<223> OTHER INFORMATION: 51C3 light chain VL: CDR1

<400> SEQUENCE: 323
aaggccagtc agagtgtgat taatgat       27

<210> SEQ ID NO 324
<211> LENGTH: 21
<212> TYPE: DNA
<213> ORGANISM: Artificial Sequence
<220> FEATURE:
<223> OTHER INFORMATION: 51C3 light chain VL: CDR2

<400> SEQUENCE: 324
tatgcatcca atcgctacac t       21

<210> SEQ ID NO 325
<211> LENGTH: 27
<212> TYPE: DNA
<213> ORGANISM: Artificial Sequence
<220> FEATURE:
<223> OTHER INFORMATION: 51C3 light chain VL: CDR3

<400> SEQUENCE: 325
cagcaggatt atagctctcc attcacg       27

<210> SEQ ID NO 326
<211> LENGTH: 136
<212> TYPE: PRT
<213> ORGANISM: Artificial Sequence
<220> FEATURE:

<223> OTHER INFORMATION: 51C3 light chain VL
<220> FEATURE:
<221> NAME/KEY: MISC_FEATURE
<222> LOCATION: (1)..(24)
<223> OTHER INFORMATION: Leader sequence
<220> FEATURE:
<221> NAME/KEY: MISC_FEATURE
<222> LOCATION: (25)..(47)
<223> OTHER INFORMATION: FR1
<220> FEATURE:
<221> NAME/KEY: MISC_FEATURE
<222> LOCATION: (48)..(56)
<223> OTHER INFORMATION: CDR1
<220> FEATURE:
<221> NAME/KEY: MISC_FEATURE
<222> LOCATION: (57)..(73)
<223> OTHER INFORMATION: FR2
<220> FEATURE:
<221> NAME/KEY: MISC_FEATURE
<222> LOCATION: (74)..(80)
<223> OTHER INFORMATION: CDR2
<220> FEATURE:
<221> NAME/KEY: MISC_FEATURE
<222> LOCATION: (81)..(112)
<223> OTHER INFORMATION: FR3
<220> FEATURE:
<221> NAME/KEY: MISC_FEATURE
<222> LOCATION: (113)..(121)
<223> OTHER INFORMATION: CDR3
<220> FEATURE:
<221> NAME/KEY: MISC_FEATURE
<222> LOCATION: (122)..(136)
<223> OTHER INFORMATION: FR4

<400> SEQUENCE: 326

Met Gly Phe Lys Met Glu Ser Gln Thr Gln Val Phe Val Phe Leu Leu
1               5                   10                  15

Leu Cys Val Ser Gly Ala His Gly Ser Ile Val Met Thr Gln Thr Pro
            20                  25                  30

Lys Phe Leu Leu Val Ser Ala Gly Asp Arg Val Thr Ile Thr Cys Lys
        35                  40                  45

Ala Ser Gln Ser Val Ile Asn Asp Val Ala Trp Tyr Gln Gln Lys Pro
    50                  55                  60

Gly Gln Ser Pro Lys Leu Leu Ile Tyr Tyr Ala Ser Asn Arg Tyr Thr
65                  70                  75                  80

Gly Val Pro Asp Arg Phe Thr Gly Ser Gly Tyr Gly Thr Asp Phe Thr
                85                  90                  95

Phe Thr Ile Ser Thr Val Gln Ala Glu Asp Leu Ala Val Tyr Phe Cys
            100                 105                 110

Gln Gln Asp Tyr Ser Ser Pro Phe Thr Phe Gly Ser Gly Thr Lys Leu
        115                 120                 125

Glu Ile Lys Arg Ala Asp Ala Ala
    130                 135

<210> SEQ ID NO 327
<211> LENGTH: 23
<212> TYPE: PRT
<213> ORGANISM: Artificial Sequence
<220> FEATURE:
<223> OTHER INFORMATION: 51C3 light chain VL: FR1

<400> SEQUENCE: 327

Ser Ile Val Met Thr Gln Thr Pro Lys Phe Leu Leu Val Ser Ala Gly
1               5                   10                  15

Asp Arg Val Thr Ile Thr Cys
            20

<210> SEQ ID NO 328
<211> LENGTH: 9
<212> TYPE: PRT
<213> ORGANISM: Artificial Sequence
<220> FEATURE:
<223> OTHER INFORMATION: 51C3 light chain VL: CDR1

<400> SEQUENCE: 328

Lys Ala Ser Gln Ser Val Ile Asn Asp
1               5

<210> SEQ ID NO 329
<211> LENGTH: 17
<212> TYPE: PRT
<213> ORGANISM: Artificial Sequence
<220> FEATURE:
<223> OTHER INFORMATION: 51C3 light chain VL: FR2

<400> SEQUENCE: 329

Val Ala Trp Tyr Gln Gln Lys Pro Gly Gln Ser Pro Lys Leu Leu Ile
1               5                   10                  15

Tyr

<210> SEQ ID NO 330
<211> LENGTH: 7
<212> TYPE: PRT
<213> ORGANISM: Artificial Sequence
<220> FEATURE:
<223> OTHER INFORMATION: 51C3 light chain VL: CDR2

<400> SEQUENCE: 330

Tyr Ala Ser Asn Arg Tyr Thr
1               5

<210> SEQ ID NO 331
<211> LENGTH: 32
<212> TYPE: PRT
<213> ORGANISM: Artificial Sequence
<220> FEATURE:
<223> OTHER INFORMATION: 51C3 light chain VL: FR3

<400> SEQUENCE: 331

Gly Val Pro Asp Arg Phe Thr Gly Ser Gly Tyr Gly Thr Asp Phe Thr
1               5                   10                  15

Phe Thr Ile Ser Thr Val Gln Ala Glu Asp Leu Ala Val Tyr Phe Cys
            20                  25                  30

<210> SEQ ID NO 332
<211> LENGTH: 9
<212> TYPE: PRT
<213> ORGANISM: Artificial Sequence
<220> FEATURE:
<223> OTHER INFORMATION: 51C3 light chain VL: CDR3

<400> SEQUENCE: 332

Gln Gln Asp Tyr Ser Ser Pro Phe Thr
1               5

<210> SEQ ID NO 333
<211> LENGTH: 15
<212> TYPE: PRT
<213> ORGANISM: Artificial Sequence
<220> FEATURE:
<223> OTHER INFORMATION: 51C3 light chain VL: FR4

<400> SEQUENCE: 333

Phe Gly Ser Gly Thr Lys Leu Glu Ile Lys Arg Ala Asp Ala Ala
1               5                   10                  15

<210> SEQ ID NO 334
<211> LENGTH: 1233
<212> TYPE: DNA
<213> ORGANISM: Homo sapiens

<400> SEQUENCE: 334

| | | |
|---|---|---|
| atgtcgctca tggtcgtcag catggcgtgt gttgggttct tcttgctgga ggggccctgg | 60 |
| ccacatgtgg gtggtcagga caagcccttc ctctctgcct ggcccggcac tgtggtgtct | 120 |
| gaaggacaac atgtgactct tcagtgtcgc tctcgtcttg ggtttaatga attcagtctg | 180 |
| tccaaagaag acgggatgcc tgtccctgag ctctacaaca gaatattccg gaacagcttt | 240 |
| ctcatgggcc ctgtgacccc agcacatgca gggacctaca gatgttgcag ttcacaccca | 300 |
| cactcccca ctgggtggtc ggcacccagc aaccctgtgg tgatcatggt cacaggagtc | 360 |
| cacagaaaac cttccctcct ggcccaccca gtcccctgg tgaaatcagg agagacggtc | 420 |
| atcctgcaat gttggtcaga tgtcaggttt gagcgcttcc ttctgcacag agagggatc | 480 |
| actgaggacc ccttgcgcct cgttggacag ctccacgatg cgggttccca ggtcaactat | 540 |
| tccatgggtc ccatgacacc tgccttgca gggacctaca gatgctttgg ttctgtcact | 600 |
| cacttacct atgagttgtc ggctcccagt gaccctctgg acatcgtggt cgtaggtcta | 660 |
| tatgggaaac cttctctctc agcccagccg ggccccacgg ttcaggcagg agagaatgtg | 720 |
| accttgtcct gcagctcccg gagcttgttt gacatttacc atctatccag ggaggcggag | 780 |
| gccggtgaac ttaggctcac tgcagtgctg agggtcaatg aacattcca ggccaacttc | 840 |
| cctctgggcc ctgtgaccca cggagggaac tacagatgct tcggctcttt ccgtgccctg | 900 |
| ccccatgcgt ggtcagaccc gagtgaccca ctgcccgttt ctgtcacagg taactccaga | 960 |
| aacctgcacg ttctgattgg gacctcagtg gtcatcatcc cctttgctat cctcctcttc | 1020 |
| tttctccttc atcgctggtg tgccaacaaa agaatgctg ttgtaatgga ccaagagcct | 1080 |
| gcagggaaca gaacagtgaa cagggaggac tctgatgaac aagaccctca ggaggtgaca | 1140 |
| tacgcacagt tgaatcactg cgttttcaca cagagaaaaa tcactcgccc ttctcagagg | 1200 |
| cccaagacac ccccaacaga taccagcgtg taa | 1233 |

<210> SEQ ID NO 335
<211> LENGTH: 410
<212> TYPE: PRT
<213> ORGANISM: Homo sapiens
<220> FEATURE:
<221> NAME/KEY: MISC_FEATURE
<222> LOCATION: (1)..(25)
<223> OTHER INFORMATION: Signal peptide
<220> FEATURE:
<221> NAME/KEY: MISC_FEATURE
<222> LOCATION: (34)..(118)
<223> OTHER INFORMATION: D0 domain
<220> FEATURE:
<221> NAME/KEY: MISC_FEATURE
<222> LOCATION: (129)..(218)
<223> OTHER INFORMATION: D1 domain
<220> FEATURE:
<221> NAME/KEY: MISC_FEATURE
<222> LOCATION: (229)..(325)
<223> OTHER INFORMATION: D2 domain
<220> FEATURE:
<221> NAME/KEY: MISC_FEATURE
<222> LOCATION: (321)..(343)
<223> OTHER INFORMATION: Transmembrane domain

```
<220> FEATURE:
<221> NAME/KEY: MISC_FEATURE
<222> LOCATION: (344)..(403)
<223> OTHER INFORMATION: Cytoplasmic tail
<220> FEATURE:
<221> NAME/KEY: MISC_FEATURE
<222> LOCATION: (379)..(384)
<223> OTHER INFORMATION: Immunoreceptor Tyr-based inhibition motif
      (ITIM)

<400> SEQUENCE: 335

Met Ser Leu Met Val Val Ser Met Ala Cys Val Gly Phe Phe Leu Leu
1               5                   10                  15

Glu Gly Pro Trp Pro His Val Gly Gly Gln Asp Lys Pro Phe Leu Ser
            20                  25                  30

Ala Trp Pro Gly Thr Val Val Ser Glu Gly Gln His Val Thr Leu Gln
        35                  40                  45

Cys Arg Ser Arg Leu Gly Phe Asn Glu Phe Ser Leu Ser Lys Glu Asp
    50                  55                  60

Gly Met Pro Val Pro Glu Leu Tyr Asn Arg Ile Phe Arg Asn Ser Phe
65                  70                  75                  80

Leu Met Gly Pro Val Thr Pro Ala His Ala Gly Thr Tyr Arg Cys Cys
                85                  90                  95

Ser Ser His Pro His Ser Pro Thr Gly Trp Ser Ala Pro Ser Asn Pro
            100                 105                 110

Val Val Ile Met Val Thr Gly Val His Arg Lys Pro Ser Leu Leu Ala
        115                 120                 125

His Pro Gly Pro Leu Val Lys Ser Gly Glu Thr Val Ile Leu Gln Cys
    130                 135                 140

Trp Ser Asp Val Arg Phe Glu Arg Phe Leu Leu His Arg Glu Gly Ile
145                 150                 155                 160

Thr Glu Asp Pro Leu Arg Leu Val Gly Gln Leu His Asp Ala Gly Ser
                165                 170                 175

Gln Val Asn Tyr Ser Met Gly Pro Met Thr Pro Ala Leu Ala Gly Thr
            180                 185                 190

Tyr Arg Cys Phe Gly Ser Val Thr His Leu Pro Tyr Glu Leu Ser Ala
        195                 200                 205

Pro Ser Asp Pro Leu Asp Ile Val Val Gly Leu Tyr Gly Lys Pro
    210                 215                 220

Ser Leu Ser Ala Gln Pro Gly Pro Thr Val Gln Ala Gly Glu Asn Val
225                 230                 235                 240

Thr Leu Ser Cys Ser Ser Arg Ser Leu Phe Asp Ile Tyr His Leu Ser
                245                 250                 255

Arg Glu Ala Glu Ala Gly Glu Leu Arg Leu Thr Ala Val Leu Arg Val
            260                 265                 270

Asn Gly Thr Phe Gln Ala Asn Phe Pro Leu Gly Pro Val Thr His Gly
        275                 280                 285

Gly Asn Tyr Arg Cys Phe Gly Ser Phe Arg Ala Leu Pro His Ala Trp
    290                 295                 300

Ser Asp Pro Ser Asp Pro Leu Pro Val Ser Val Thr Gly Asn Ser Arg
305                 310                 315                 320

Asn Leu His Val Leu Ile Gly Thr Ser Val Val Ile Ile Pro Phe Ala
                325                 330                 335

Ile Leu Leu Phe Phe Leu Leu His Arg Trp Cys Ala Asn Lys Lys Asn
            340                 345                 350

Ala Val Val Met Asp Gln Glu Pro Ala Gly Asn Arg Thr Val Asn Arg
```

```
                355                 360                 365
Glu Asp Ser Asp Glu Gln Asp Pro Gln Glu Val Thr Tyr Ala Gln Leu
    370                 375                 380
Asn His Cys Val Phe Thr Gln Arg Lys Ile Thr Arg Pro Ser Gln Arg
385                 390                 395                 400
Pro Lys Thr Pro Pro Thr Asp Thr Ser Val
                405                 410

<210> SEQ ID NO 336
<211> LENGTH: 25
<212> TYPE: PRT
<213> ORGANISM: Homo sapiens

<400> SEQUENCE: 336

Met Ser Leu Met Val Ser Met Ala Cys Val Gly Phe Phe Leu Leu
1               5                   10                  15
Glu Gly Pro Trp Pro His Val Gly Gly
                20                  25

<210> SEQ ID NO 337
<211> LENGTH: 85
<212> TYPE: PRT
<213> ORGANISM: Homo sapiens

<400> SEQUENCE: 337

Trp Pro Gly Thr Val Ser Glu Gly Gln His Val Thr Leu Gln Cys
1               5                   10                  15
Arg Ser Arg Leu Gly Phe Asn Glu Phe Ser Leu Ser Lys Glu Asp Gly
                20                  25                  30
Met Pro Val Pro Glu Leu Tyr Asn Arg Ile Phe Arg Asn Ser Phe Leu
            35                  40                  45
Met Gly Pro Val Thr Pro Ala His Ala Gly Thr Tyr Arg Cys Cys Ser
        50                  55                  60
Ser His Pro His Ser Pro Thr Gly Trp Ser Ala Pro Ser Asn Pro Val
65                  70                  75                  80
Val Ile Met Val Thr
                85

<210> SEQ ID NO 338
<211> LENGTH: 90
<212> TYPE: PRT
<213> ORGANISM: Homo sapiens

<400> SEQUENCE: 338

His Pro Gly Pro Leu Val Lys Ser Gly Glu Thr Val Ile Leu Gln Cys
1               5                   10                  15
Trp Ser Asp Val Arg Phe Glu Arg Phe Leu Leu His Arg Glu Gly Ile
                20                  25                  30
Thr Glu Asp Pro Leu Arg Leu Val Gly Gln Leu His Asp Ala Gly Ser
            35                  40                  45
Gln Val Asn Tyr Ser Met Gly Pro Met Thr Pro Ala Leu Ala Gly Thr
        50                  55                  60
Tyr Arg Cys Phe Gly Ser Val Thr His Leu Pro Tyr Glu Leu Ser Ala
65                  70                  75                  80
Pro Ser Asp Pro Leu Asp Ile Val Val
                85                  90

<210> SEQ ID NO 339
```

```
<211> LENGTH: 97
<212> TYPE: PRT
<213> ORGANISM: Homo sapiens

<400> SEQUENCE: 339

Gln Pro Gly Pro Thr Val Gln Ala Gly Glu Asn Val Thr Leu Ser Cys
1               5                   10                  15

Ser Ser Arg Ser Leu Phe Asp Ile Tyr His Leu Ser Arg Glu Ala Glu
            20                  25                  30

Ala Gly Glu Leu Arg Leu Thr Ala Val Leu Arg Val Asn Gly Thr Phe
        35                  40                  45

Gln Ala Asn Phe Pro Leu Gly Pro Val Thr His Gly Gly Asn Tyr Arg
    50                  55                  60

Cys Phe Gly Ser Phe Arg Ala Leu Pro His Ala Trp Ser Asp Pro Ser
65                  70                  75                  80

Asp Pro Leu Pro Val Ser Val Thr Gly Asn Ser Arg Asn Leu His Val
                85                  90                  95

Leu

<210> SEQ ID NO 340
<211> LENGTH: 23
<212> TYPE: PRT
<213> ORGANISM: Homo sapiens

<400> SEQUENCE: 340

Asn Leu His Val Leu Ile Gly Thr Ser Val Val Ile Ile Pro Phe Ala
1               5                   10                  15

Ile Leu Leu Phe Phe Leu Leu
            20

<210> SEQ ID NO 341
<211> LENGTH: 60
<212> TYPE: PRT
<213> ORGANISM: Homo sapiens

<400> SEQUENCE: 341

His Arg Trp Cys Ala Asn Lys Lys Asn Ala Val Val Met Asp Gln Glu
1               5                   10                  15

Pro Ala Gly Asn Arg Thr Val Asn Arg Glu Asp Ser Asp Glu Gln Asp
            20                  25                  30

Pro Gln Glu Val Thr Tyr Ala Gln Leu Asn His Cys Val Phe Thr Gln
        35                  40                  45

Arg Lys Ile Thr Arg Pro Ser Gln Arg Pro Lys Thr
    50                  55                  60

<210> SEQ ID NO 342
<211> LENGTH: 6
<212> TYPE: PRT
<213> ORGANISM: Homo sapiens

<400> SEQUENCE: 342

Val Thr Tyr Ala Gln Leu
1               5

<210> SEQ ID NO 343
<211> LENGTH: 19
<212> TYPE: PRT
<213> ORGANISM: Homo sapiens

<400> SEQUENCE: 343
```

```
Asp Glu Gln Asp Pro Gln Glu Val Thr Tyr Ala Gln Leu Asn His Cys
1               5                   10                  15

Val Phe Thr

<210> SEQ ID NO 344
<211> LENGTH: 19
<212> TYPE: PRT
<213> ORGANISM: Homo sapiens

<400> SEQUENCE: 344

Asp Glu Gln Asp Pro Gln Glu Val Thr Phe Ala Gln Leu Asn His Cys
1               5                   10                  15

Val Phe Thr
```